(12) United States Patent
Ravichandran et al.

(10) Patent No.: US 8,762,484 B2
(45) Date of Patent: Jun. 24, 2014

(54) UNAFFILIATED WEB DOMAIN HOSTING SERVICE BASED ON A COMMON SERVICE ARCHITECTURE

(75) Inventors: Hari Ravichandran, Lexington, MA (US); Mark Moseley, Lexington, MA (US); Scott Lovell, Malden, MA (US); Brian Brock, Taunton, MA (US)

(73) Assignee: Endurance International Group, Inc., Burlington, MA (US)

( * ) Notice: Subject to any disclaimer, the term of this patent is extended or adjusted under 35 U.S.C. 154(b) by 205 days.

(21) Appl. No.: 13/007,094

(22) Filed: Jan. 14, 2011

(65) Prior Publication Data

US 2011/0179135 A1    Jul. 21, 2011

Related U.S. Application Data

(60) Provisional application No. 61/295,506, filed on Jan. 15, 2010, provisional application No. 61/295,528, filed on Jan. 15, 2010, provisional application No. 61/303,281, filed on Feb. 10, 2010, provisional application No. 61/345,568, filed on May 17, 2010, provisional application No. 61/376,743, filed on Aug. 25, 2010.

(51) Int. Cl.
*G06F 15/16* (2006.01)
*H04L 29/08* (2006.01)
*G06Q 10/06* (2012.01)

(52) U.S. Cl.
CPC ...... *H04L 29/0809* (2013.01); *H04L 29/08072* (2013.01); *G06Q 10/06* (2013.01)
USPC .......................................... 709/217; 709/201

(58) Field of Classification Search
CPC .................. H04L 29/0809; H04L 29/08072; G06Q 10/06
USPC ........................................................ 709/217
See application file for complete search history.

(56) References Cited

U.S. PATENT DOCUMENTS

| | | |
|---|---|---|
| 6,557,036 B1 | 4/2003 | Kavacheri et al. |
| 6,901,377 B1 | 5/2005 | Rosenfeld et al. |
| 7,155,462 B1 | 12/2006 | Singh et al. |
| 7,340,686 B2 | 3/2008 | Matthews et al. |
| 7,558,843 B2 | 7/2009 | Lipscomb et al. |

(Continued)

FOREIGN PATENT DOCUMENTS

| | | |
|---|---|---|
| WO | 2011088349 A2 | 7/2011 |
| WO | 2011088349 A3 | 10/2011 |
| WO | 2013106708 A1 | 7/2013 |

OTHER PUBLICATIONS

Web Services: Concepts, architectures and applications, Gustavo Alonso et al. Springer-Verlag, 2004, Chapter 5.2.4 and 5.3.3 (pp. 141 and 144-147), 27 pages.*

(Continued)

*Primary Examiner* — Tauqir Hussain
(74) *Attorney, Agent, or Firm* — GTC Law Group LLP & Affiliates

(57) ABSTRACT

A website hosting service provides a plurality of services, from a common service architecture, to each of a plurality of unrelated websites, the common service architecture being adapted to provide a different package of services to at least a plurality of unrelated websites.

10 Claims, 34 Drawing Sheets

(56) References Cited

U.S. PATENT DOCUMENTS

| | | | |
|---|---|---|---|
| 7,574,471 B2 | 8/2009 | Fotta et al. | |
| 7,596,615 B2 | 9/2009 | Satkunanathan et al. | |
| 7,716,226 B2 | 5/2010 | Barney | |
| 7,844,513 B2 | 11/2010 | Smith | |
| 7,849,202 B2 | 12/2010 | Muret et al. | |
| 7,900,005 B2 | 3/2011 | Kotsovinos et al. | |
| 7,945,652 B2 | 5/2011 | Tsao et al. | |
| 8,065,327 B2* | 11/2011 | Rosenfield et al. | 707/781 |
| 8,108,406 B2 | 1/2012 | Kenedy et al. | |
| 8,140,681 B2* | 3/2012 | Adam et al. | 709/226 |
| 8,204,799 B1* | 6/2012 | Murray et al. | 705/26.81 |
| 2002/0052782 A1 | 5/2002 | Landesmann | |
| 2002/0143945 A1 | 10/2002 | Shahabuddin et al. | |
| 2002/0147570 A1 | 10/2002 | Kraft et al. | |
| 2002/0198933 A1 | 12/2002 | Kwak | |
| 2003/0061404 A1 | 3/2003 | Atwal et al. | |
| 2003/0172145 A1 | 9/2003 | Nguyen | |
| 2003/0177027 A1 | 9/2003 | DiMarco | |
| 2003/0224781 A1 | 12/2003 | Milford et al. | |
| 2004/0030740 A1* | 2/2004 | Stelting | 709/201 |
| 2004/0098302 A1 | 5/2004 | Feeley | |
| 2004/0103339 A1 | 5/2004 | Chalasani et al. | |
| 2005/0076132 A1 | 4/2005 | Roberts et al. | |
| 2005/0086197 A1 | 4/2005 | Boubez et al. | |
| 2005/0193093 A1 | 9/2005 | Mathew et al. | |
| 2005/0228984 A1 | 10/2005 | Edery et al. | |
| 2005/0246441 A1 | 11/2005 | Chandrasekaran et al. | |
| 2006/0020525 A1 | 1/2006 | Borelli et al. | |
| 2006/0107314 A1* | 5/2006 | Cataldi | 726/15 |
| 2006/0129654 A1 | 6/2006 | Sato | |
| 2006/0235986 A1 | 10/2006 | Kim | |
| 2006/0253596 A1* | 11/2006 | Barone et al. | 709/229 |
| 2006/0288115 A1 | 12/2006 | Neuman | |
| 2007/0067396 A1 | 3/2007 | Blinn et al. | |
| 2008/0065677 A1 | 3/2008 | Howard et al. | |
| 2008/0147812 A1 | 6/2008 | Curtis | |
| 2008/0147856 A1 | 6/2008 | Lee et al. | |
| 2008/0243634 A1 | 10/2008 | Dworkin et al. | |
| 2008/0281915 A1 | 11/2008 | Elad et al. | |
| 2009/0083272 A1 | 3/2009 | Li et al. | |
| 2009/0150995 A1 | 6/2009 | Hogan et al. | |
| 2009/0276771 A1 | 11/2009 | Nickolov et al. | |
| 2009/0323593 A1 | 12/2009 | Barone et al. | |
| 2010/0076863 A1 | 3/2010 | Golomb | |
| 2010/0095067 A1 | 4/2010 | Kosaraju et al. | |
| 2010/0106764 A1 | 4/2010 | Chadwick et al. | |
| 2010/0114654 A1 | 5/2010 | Lukose et al. | |
| 2010/0125826 A1 | 5/2010 | Rice et al. | |
| 2010/0153569 A1 | 6/2010 | Schreiber | |
| 2010/0205302 A1 | 8/2010 | Rechterman | |
| 2010/0306381 A1 | 12/2010 | Lublin et al. | |
| 2010/0325191 A1* | 12/2010 | Jung et al. | 709/202 |
| 2011/0010612 A1 | 1/2011 | Thorpe et al. | |
| 2011/0055859 A1 | 3/2011 | Dasher et al. | |
| 2011/0072073 A1* | 3/2011 | Curtis | 709/203 |
| 2011/0107294 A1 | 5/2011 | Ionfrida et al. | |
| 2011/0161411 A1 | 6/2011 | Rechterman | |
| 2011/0178831 A1 | 7/2011 | Ravichandran | |
| 2011/0178838 A1 | 7/2011 | Ravichandran | |
| 2011/0178840 A1 | 7/2011 | Ravichandran | |
| 2011/0178865 A1 | 7/2011 | Ravichandran | |
| 2011/0178869 A1 | 7/2011 | Ravichandran et al. | |
| 2011/0178870 A1 | 7/2011 | Ravichandran et al. | |
| 2011/0178890 A1 | 7/2011 | Ravichandran et al. | |
| 2011/0179101 A1 | 7/2011 | Ravichandran et al. | |
| 2011/0179102 A1 | 7/2011 | Ravichandran et al. | |
| 2011/0179103 A1 | 7/2011 | Ravichandran et al. | |
| 2011/0179111 A1 | 7/2011 | Ravichandran et al. | |
| 2011/0179112 A1 | 7/2011 | Ravichandran et al. | |
| 2011/0179137 A1 | 7/2011 | Ravichandran et al. | |
| 2011/0179141 A1 | 7/2011 | Ravichandran et al. | |
| 2011/0179142 A1 | 7/2011 | Ravichandran et al. | |
| 2011/0179145 A1 | 7/2011 | Ravichandran et al. | |
| 2011/0179147 A1 | 7/2011 | Ravichandran et al. | |
| 2011/0179150 A1 | 7/2011 | Ravichandran et al. | |
| 2011/0179154 A1 | 7/2011 | Ravichandran et al. | |
| 2011/0179155 A1 | 7/2011 | Ravichandran et al. | |
| 2011/0179156 A1 | 7/2011 | Ravichandran et al. | |
| 2011/0179165 A1 | 7/2011 | Ravichandran | |
| 2011/0179175 A1 | 7/2011 | Ravichandran et al. | |
| 2011/0179176 A1 | 7/2011 | Ravichandran et al. | |
| 2011/0191163 A1 | 8/2011 | Allaire et al. | |
| 2012/0004925 A1 | 1/2012 | Braverman et al. | |
| 2012/0005148 A1 | 1/2012 | Horvitz et al. | |
| 2013/0204746 A1 | 8/2013 | Lee et al. | |
| 2013/0204966 A1 | 8/2013 | Lee et al. | |

OTHER PUBLICATIONS

Web Hosting: an overview by K. Underwood, Gartner Technical Report, 2001, 19 pages, online at http://marcusball.com/marcusball/opinion/CS%20Opinion/90803.pdf. See pp. 2-4.

Web Services: Concepts, architectures and applications, Gustavo Alonso et al., Springer-Verlag, 2004. See chapter 5.2.4 and 5.3.3 (pp. 141 and 144-447), 27 pages.

Int'l Search Report and Written Opinion for PCT/US11/21340, issued Aug. 31, 2011, 8 pages.

Alonso, et al., "Webservices: Concepts, architecture and applications", <URL: http://www.inf.ethz.ch/personal/alonso/Web-book/Chapter-5.pdf>, Springer-verlag, 2004, pp. 123-149.

PCTUS2013021231, International Application No. PCTUS2013021231, International Search Report and Written Opinion mailed May 31, 2013, 13 pages.

Harding, Anne, "A-Server NV: Datacenter-as-a-Service (DAAS.com) Delivers Next Generation Cloud Computing for Service Providers", available at: <http://www.tmcnet.com/usubmit/2009/03/17/4062651.html>, Mar. 17, 2009, 2 pages.

International Application No. PCT/US11/21340, International Preliminary Report on Patentability mailed on Jul. 26, 2012, 5 pages.

* cited by examiner

UNAFFILIATED WEB DOMAIN HOSTING SERVICE BASED ON A COMMON SERVICE ARCHITECTURE

CROSS-REFERENCE TO RELATED APPLICATIONS

This application claims the benefit of the following provisional applications, each of which is hereby incorporated by reference in its entirety: U.S. Ser. No. 61/295,506 filed Jan. 15, 2010; U.S. Ser. No. 61/295,528 filed Jan. 15, 2010; U.S. Ser. No. 61/303,281 filed Feb. 10, 2010; U.S. Ser. No. 61/345,568 filed May 17, 2010; and U.S. Ser. No. 61/376,743 filed Aug. 25, 2010.

BACKGROUND OF THE INVENTION

1. Field

The inventive methods and systems described herein generally relate to internet web hosting and particularly relate to web hosting based on a service pool-based architecture.

2. Description of the Related Art

Web hosts or web hosting systems are companies that provide space on a server they own or lease for use by their clients as well as providing Internet connectivity, typically in a data center. Web hosts can also provide data center space and connectivity to the Internet for servers they do not own to be located in their data center. The web hosting systems are based on special software and hardware technologies. Servers can be divided into several independent virtual hosts. With all the internet server features, each host may include an independent domain name. Different user programs may run without interference on same hardware and operating system. Further, every user may own personal system resources like storage capacity, memory, CPU time, and the like. This may save a lot of cost of host service. The web hosting system may provide a user control panel for controlling domain name, website capacity, file system, database, storage capacity, and the like.

Further, a web hosting system may provide a wide range of e-commerce, application hosting, and connectivity services. Such services are known as web hosting services. A web hosting service is a type of Internet hosting service that allows individuals and organizations to make their own website accessible via the World Wide Web. For example, a company or individual may contract with a web hosting company to provide a specified amount of memory on a server for the company to establish and maintain its web site. In addition, the web hosting system may contract for other types of services, such as, for example, email services, secure socket layer (SSL), file transfer protocol (FTP) service, database services, and real media service allowing streaming audio and video from the company's web site.

Web hosting technology and services has evolved over time, with incremental advances based primarily on improved system performance improvements and virtualization. However, a comprehensive approach to providing the computing, data, and customer services for web hosting that enhances client retention, new client sales, industry consolidation, and supports significant scalability capabilities while ensuring broadly diverse marketing and operation optimization has yet to be undertaken in a novel way.

SUMMARY OF THE INVENTION

In an aspect of the invention, methods and systems may include a services oriented web hosting architecture that may include arranging web servers into service-specific groups with access to common data storage; establishing a service-specific group for each of several web services being provided to web hosting customers; and matching a web service request to a service-specific group and forwarding the request to a server that is most capable of providing a rapid response from the servers in the service-specific group. In the aspect, a web service request is provided by a load balancing server. In the aspect, forwarding the request to a server includes load balancing among the servers in the matched service-specific group to determine the most capable server. In the aspect, forwarding the request is provided by a load balancing server.

In the aspect each server in a service-specific group is programmed to provide a service that is only provided by servers in the service-specific group. Also, providing a rapid response in the aspect includes accessing the common data storage to retrieve or deposit content identified by the web service request.

In another aspect of the invention, a services oriented web hosting architecture includes a plurality of web servers arranged into service-specific groups with access to common data storage, wherein each service-specific group is dedicated to one of several web services being provided to web hosting customers; and a load balancing server for matching a web service request to a service-specific group and for forwarding the request to a server in the service-specific group that is most capable of providing a rapid response. In the aspect, the load balancing server is also for load balancing among the servers in the matched service-specific group to determine the most capable server. Also, in the aspect each server in a service-specific group is programmed to provide a service that is only provided by servers in the service-specific group. In the aspect, any of the plurality of web servers accesses the common data storage to retrieve or deposit content identified by the web service request.

The new web hosting architecture may be associated with an unaffiliated web domain hosting service based on a common service architecture. In an aspect of the invention, a website hosting service may provide a plurality of services from a common service architecture to each of a plurality of [unrelated/unaffiliated] websites. The common service architecture may be adapted to provide a different package of services to at least a plurality of unrelated websites.

The new web hosting architecture may be associated with an unaffiliated web domain hosting service based on common service pools architecture. Further, a website hosting architecture may provide a plurality of services, from a plurality of service pools, to each of a plurality of [unrelated/unaffiliated] websites. The each of the plurality of service pools may be adapted to provide services that may be adapted to be combined into different packages to be delivered to at least a plurality of the [unrelated/unaffiliated] websites.

The new web hosting architecture may be associated with an unaffiliated web domain hosting service based on shared data structure. In another aspect of the invention, a website hosting architecture may provide a plurality of services to each of a plurality of [unrelated/unaffiliated] websites. Any one of the plurality of services may be configured to be deployed to serve any one of the plurality of unrelated websites. Further, the deployed service may extract data from a shared data structure that may maintain data for at least a plurality of the [unrelated/unaffiliated] websites.

The new web hosting architecture may be associated with an unaffiliated web domain hosting service based on service pools with flexible resources. In yet another aspect of the present invention, the website hosting architecture may provide a plurality of services, from a plurality of service pools, to each of a plurality of [unrelated/unaffiliated] websites. The each of the plurality of service pools may be adapted to contribute services to distinct service packages for at least a plurality of [unrelated/unaffiliated] websites. Further, the each of the plurality of service pools distributed across a plurality of servers, each server may be adapted to provide an overlapping service set in order to facilitate flexible resources from each of the plurality of service pools. Furthermore, the each server may be a virtualized server. Additionally, the each server may be a physical server.

The new web hosting architecture may be associated with a common services web hosting architecture with multiple branding. In still another aspect of the present invention, the website hosting service may provide a plurality of services, from a common service architecture, to each of a plurality of [unrelated/unaffiliated] websites. The each of the plurality of services may be adapted to contribute to a distinct package of services for at least a plurality of [unrelated/unaffiliated] websites. Further, the web hosting service may be marketed through a plurality of websites, at least a plurality of sites that may describe different market specific offerings for the packages of services.

The market specific offerings may include different brands for the offerings, different messages for the offerings, different service terms and conditions for the offerings, different pricing structures for the offerings, and the like.

The new web hosting architecture may be associated with a common services web hosting architecture with multiple branding and OSS consistency. In an aspect of the invention, the website hosting service may provide a plurality of services, from a common service architecture, to each of a plurality of unrelated websites. The each of the plurality of services may be adapted to contribute to a distinct service package for at least a plurality of [unrelated/unaffiliated] websites. Further, the web hosting service may be marketed through a plurality of websites. Each one of the plurality of sites may offer a different market specific offering and each market specific offering may be maintained under a consistent look and feel associated with the market specific offering when presenting account service user interfaces.

The market specific offerings may include different brands for the offerings, different messages for the offerings, different service terms and conditions for the offerings, different pricing structures for the offerings, and the like.

The new web hosting architecture may be associated with a web hosting service based on a common service architecture and third party services. In an aspect of the present invention, the website hosting service may provide a plurality of services to each of a plurality of unrelated websites each of the plurality of services may be adapted to contribute to a distinct service package for at least a plurality of [unrelated/unaffiliated] websites. Further, at least one of the plurality of services serving a third party [interface/API/plug-in/service] may allow a third party to access the distinct service package. The third party may experience information consistent with a market specific service offering.

The new web hosting architecture may be associated with migration of a web hosting service from one architecture to another, where at least one is a service pool architecture. In an aspect of the invention, an automated tool for migration of a website hosting service from a first website hosting architecture to a second website hosting architecture may be provided. The first architecture may include a server architecture that may serve a plurality of services dedicated exclusively to a specific website. The second web hosting architecture may include a server architecture that may serve a plurality of common services to a plurality of [unrelated/unaffiliated] websites.

The new web hosting architecture may be associated with migration of a web hosting service from one box per customer architecture to a multiple box per customer architecture. In another aspect of the invention, an automated tool for migration of a website hosting service from a first website hosting architecture to a second website hosting architecture may be provided. The first architecture may include a server architecture that may serve the services necessary for a specific website from a single machine. The second web hosting architecture may include a server architecture that may serve a plurality of common services from a plurality of machines to a plurality of [unrelated/unaffiliated] websites.

The new web hosting architecture may be associated with migrating a web hosting service from a one box per customer architecture to a cloud computing architecture. In yet another aspect of the invention, an automated tool for migration of a website hosting service from a first website hosting architecture to a second website hosting architecture may be provided. The first architecture may include a server architecture that may serve the services necessary for a specific website from a dedicated machine. The second web hosting architecture may include a server architecture that may serve a plurality of common services from a plurality of machines to a plurality of [unrelated/unaffiliated] websites using a cloud computing architecture. Further, the dedicated machine of the first website hosting architecture may have one or more substantially duplicate machines for backup purposes.

The new web hosting architecture may be associated with migration of a web hosting service from a one box per customer architecture to a grid computing architecture. In still another aspect of the present invention, an automated tool for migration of a website hosting service from a first website hosting architecture to a second website hosting architecture may be provided. The first architecture may include a server architecture that may serve the services necessary for a specific website from a dedicated machine. The second web hosting architecture may include a server architecture that may serve a plurality of common services from a plurality of machines to a plurality of [unrelated/unaffiliated] websites using a grid computing architecture. Further, the dedicated machine of the first website hosting architecture may have one or more substantially duplicate machines for backup purposes.

The new web hosting architecture may be associated with migration of a web hosting service from a one box per multiple customer architecture to a cloud or grid computing architecture with many boxes for many customers. In yet another aspect of the present invention, an automated tool for migration of a website hosting service from a first website hosting architecture to a second website hosting architecture may be provided. The first architecture comprising a server architecture that may serve the services necessary for a plurality of distinct websites from a dedicated machine. The second web hosting architecture may include a server architecture that may serve a plurality of common services from a plurality of machines to a plurality of [unrelated/unaffiliated] websites using at least one of a cloud computing architecture and a grid computing architecture. Further, the dedicated machine of the first website hosting architecture may have one or more substantially duplicate machines for backup purposes.

The new web hosting architecture may be associated with migration of a web hosting service from a dedicated environment for each customer to a shared environment for multiple customers. In still another aspect of the present invention, an automated tool for migration of a website hosting service from a first website hosting architecture to a second website hosting architecture may be provided. The first architecture may include a server architecture that may serve the services necessary for a customer's websites from a dedicated machine. The second web hosting architecture may include a server architecture that may serve a plurality of [unrelated/unaffiliated] customers from a plurality of shared servers.

In an embodiment of present invention, the first web hosting architecture may include dedicated memory for each customer. Further, the second web hosting architecture may include shared memory across multiple customers. The second web hosting architecture may be a cloud computing environment, a grid computing environment, and the like. Furthermore, the second web hosting architecture may include a plurality of common service pools disposed across a plurality of servers.

The new web hosting architecture may be associated with migration of a web hosting service from a dedicated environment for each customer to a shared environment for multiple customers. In an aspect of the present invention, an automated tool for migration of a website hosting service from a first website hosting architecture to a second website hosting architecture may be provided. Each website hosting architecture may include a server architecture that may serve a plurality of common services from a plurality of machines to a plurality of [unrelated/unaffiliated] websites.

In the aspect, at least one environment may be a cloud computing environment, a grid computing environment, and the like. Further, the at least one environment may include a plurality of common service pools disposed across a plurality of servers.

The new web hosting architecture may be associated with migration of a web hosting service from a virtualized environment to a shared environment for multiple customers. In another aspect of the present invention, an automated tool for migration of a website hosting service from a first website hosting architecture to a second website hosting architecture may be provided. The first architecture may include a virtualized server architecture that may serve the services necessary for a customer's websites from a specific virtual machine. The second web hosting architecture may include a server architecture that may serve a plurality of [unrelated/unaffiliated] customers from a plurality of shared servers.

In the aspect, the shared environment may be a cloud computing environment, a grid computing environment, and the like. Further, the shared environment may include a plurality of common service pools disposed across a plurality of servers.

The new web hosting architecture may be associated with migration of a web hosting service from one architecture to another, wherein a virtual network is used during migration. In an aspect of the present invention, an automated tool for migration of a website hosting service from a first website hosting architecture to a second website hosting architecture may be provided. A Virtual Network may be used during migration that may facilitate keeping the network active during the movement of IP addresses from one architecture to the other architecture.

The new web hosting architecture may be associated with an unaffiliated web domain common hosting service with service representative plug-ins. In yet another aspect of the present invention, a website hosting service that may provide a plurality of services, from a common service architecture, to each of a plurality of unrelated websites may be provided. The each of the plurality of services may be adapted to contribute to a distinct service package for at least a plurality of [unrelated/unaffiliated] websites. The web hosting service may be marketed through a plurality of websites. The each one of the plurality of websites may offer a different market specific offering. The service representatives supporting a plurality of different market specific offerings may be provided with information that may facilitate providing the appropriate service for a particular market specific offering.

In an embodiment, a method of website hosting is provided. The method may include serving a plurality of website hosting services. One of the plurality of website hosting services may be adapted to meet a website service requirement of each of a plurality of unrelated websites. Further, the one of the plurality of website hosting services may be adapted differently for each of a plurality of different service packages. The plurality of different service packages may include a first package of services for a first website and a second package of services for a second website. The first service package of the plurality of different service packages may be provided to a plurality of related websites. The related websites may share a common client website hosting subscriber. Further, the first service package of the plurality of different service packages may be provided to at least one website that may be unaffiliated with the plurality of related websites. The first website and second website may be unrelated websites. At least two of the plurality of website hosting services may be served from different servers. Further, the plurality of website hosting services may be common services provided by a common service architecture. In the embodiment, the common service architecture may include a cloud computing based server architecture, a grid computing based server architecture, and the like. The method may adapt one or more of the plurality of website hosting services to meet a website service requirement. Further, the method may include combining the one or more adapted website hosting services to provide a service package. The method may also include serving a plurality of different service packages to at least a plurality of unrelated websites.

In an embodiment, a method of website hosting is provided. The method may include serving a plurality of website hosting services from a plurality of service pools. A service pool may include a plurality of servers each configured to serve the same website hosting service. The plurality of service pools may include a cloud computing based server architecture, a grid computing based server architecture, and the like. The method may include adapting a website hosting service from at least two of the plurality of service pools to meet website service requirements of a plurality of unrelated websites. The method may further include combining the adapted website hosting service from the at least two of the plurality of service pools to provide a plurality of different service packages for the plurality of unrelated websites.

In an embodiment, a method of website hosting is provided. The method may include serving a plurality of website hosting services. At least two of the plurality of website hosting services may be served from different servers. The method may include deploying any of the plurality of website hosting services to meet website service requirements of a plurality of unrelated websites. Further, the method may include accessing, with at least one deployed website hosting service, data from a shared data structure that maintains data for at least a plurality of the unrelated websites. The shared data structure may be configured in a distributed database. Further, the shared data structure may include a virtual file system. The shared data structure may maintain data that may facilitate configuring any one of the plurality of website hosting services to be deployed to serve any one of the plurality of unrelated websites. In the embodiment, the shared data structure may be accessible to a plurality of servers configured into service pools for at least one of configuring and deploying any one or more of the plurality of website hosting services. The shared data structure may include data security features to ensure secure separation of data for at least a plurality of the unrelated websites. Further, a web hosting architecture for serving the plurality of website hosting services may include a cloud computing based server architecture, a grid computing based server architecture, and the like. In an embodiment, a method of website hosting is provided. The method may include serving a plurality of website hosting services from a plurality of service pools. A service pool may include a plurality of servers each configured to serve the same website hosting service. The plurality of service pools may include a cloud computing based server architecture, a grid computing based server architecture, a virtual server based architecture, and the like. The method may include adapting a website hosting service from at least two of the plurality of service pools to meet website service requirements of a plurality of unrelated websites. Further, the method may include configuring a server to serve website hosting services from a plurality of service pools. The server may be configured to support a plurality of virtual servers. Each virtual server may provide services of one of the plurality of service pools. At least a portion of the plurality of virtual servers may provide services from two or more of the plurality of services pools. The method may further include combining the adapted website hosting service from the at least two of the plurality of service pools to provide a plurality of different service packages for the plurality of unrelated websites.

In an embodiment, a method of website hosting is provided. The method may include serving a plurality of website hosting services from a plurality of service pools. Each service pool may serve one website hosting service. The service pool may include a plurality of servers each configured to serve the same website hosting service. The method may include providing a plurality of servers configurable to serve one website hosting service. The plurality of servers may include a cloud computing based server architecture, a grid computing based server architecture, a virtual server based architecture, and the like. Further, the method may include determining a demand for server resources for at least one of the plurality of service pools. The method may also include deploying a server from the plurality of servers to serve the one website hosting service served by the at least one of the plurality of service pools based on the server demand for the at least one of the plurality of service pools. The server may be configured to support a plurality of virtual servers. Each virtual server may provide services of one of the plurality of service pools. At least a portion of the plurality of virtual servers may provide services from two or more of the plurality of services pools. The method may further include adapting a website hosting service from at least two of the plurality of service pools to meet website service requirements of a plurality of unrelated websites.

In an embodiment, a method of website hosting is provided. The method may include serving a plurality of website hosting services. At least two of the plurality of website hosting services may be served from different servers. The method may include adapting one or more of the plurality of website hosting services to meet website service requirements. Further, the method may include combining the one or more adapted website hosting services to provide a plurality of service packages. The method may also include configuring the plurality of service packages into different market-specific offerings. A distinct package of services may be described differently in a first market specific offering than in a second market specific offering. At least a first distinct package of services and a second distinct package of services may be marketed through a specific market specific offering. The method may include offering the different market-specific offerings through a plurality of websites. In addition, the method may include serving the plurality of different service packages to at least a plurality of unrelated websites.

In an embodiment, a method of website hosting is provided. The method may include serving a plurality of website hosting services. At least two of the plurality of website hosting services may be served from different servers. The method may include adapting one or more of the plurality of website hosting services to meet a website service requirement. Further, the method may include combining the one or more adapted website hosting services to provide a plurality of different service packages to be served to at least a plurality of unrelated websites. The different market specific offerings may include different brands, messages, service terms, pricing structures, and the like, for the offerings. Further, a plurality of different service packages may be marketed through one of the plurality of marketing websites. The method may further include presenting, in an account service user interface of a website hosting account, visual elements that may be consistent with one of the plurality of market-specific offerings through which the website hosting account was initiated. The visual elements that are consistent may be provided by one or more servers using a code library and in combination with skins that may be associated with the market specific offering. In the embodiment, two market specific offerings may offer the same distinct service package at two different pricing structures.

In an embodiment, a method of website hosting is provided. The method may include serving a plurality of website hosting services. At least two of the plurality of website hosting services may be served from different servers. The method may include adapting one or more of the plurality of website hosting services to meet website service requirements. Further, the method may include combining the one or more adapted website hosting services to provide a plurality of service packages. The method may include configuring the plurality of service packages into different market-specific offerings. In the embodiment, the different market specific offerings may include different brands, different messages, different service terms and conditions, different pricing structures, and the like, for the offerings. Further, a distinct service package may be included with a market specific offering. A plurality of distinct service packages may be marketed through one of the plurality of marketing websites. Two market specific offerings may offer the same distinct service package at two different pricing structures. The method may include offering the different market-specific offerings through a plurality of websites. The method may also include providing information to service representatives supporting a plurality of different market-specific offerings that may facilitate supporting a specific service package based on a specific market-specific offering. The information that may facilitate providing the appropriate service may be sourced from a common data store that may be accessible to a plurality of service representatives. The service representatives may be provided with information that may facilitate providing the appropriate service by an operational support system that may facilitate associating a client support request with a market specific offering.

In an embodiment, a CRM system is provided. The CRM system may include a plurality of website hosting modules that may be configured as service pools to provide website hosting services to a plurality of unrelated websites. A portion of the website hosting services may be adapted and combined into a service package to meet website service requirements. The CRM system may include an operational support system module for making data for each of the plurality of website hosting modules accessible. Further, the CRM system may include a customer relationship management module for facilitating client and agent interactions by enabling access by the client and agent to the data that may be made accessible by the operational support system.

In another embodiment, a CRM system is provided. The CRM system may include a plurality of website hosting modules that may be connected to provide website hosting services to a plurality of unrelated websites. A portion of the website hosting services may be deployed to meet website service requirements. At least one of the deployed website hosting services may be configured to access data from a shared data structure module of the plurality of website hosting modules that may maintain data for at least a plurality of unrelated websites. Further, the CRM system may include an operational support system module for making data for each of the plurality of website hosting modules accessible. The operational support system may facilitate access to data associated with any of: business operations, a service pool platform, a load balancer, third party services, a common data store, skins and code library, clients, a CRM workflow, an analytics facility, and the like. In addition, the CRM system may include a customer relationship management module for facilitating client and agent interactions by enabling access by the client and agent to the data that may be made accessible by the operational support system.

In an embodiment, a CRM system is provided. The CRM system may include a plurality of website hosting modules that may be configured as service pools to provide website hosting services to a plurality of unrelated websites. A portion of the website hosting services may be adapted and combined into a service package to meet website service requirements. The method may include an operational support system module for making data for each of the plurality of website hosting modules accessible. Further, the CRM system may include a customer relationship management module for facilitating client and agent interactions by enabling access by the client and agent to the data that may be made accessible by the operational support system. The client and agent interactions may be organized into a workflow for handling a client problem.

In another embodiment, a CRM system is provided. The CRM system may include a plurality of website hosting modules that may be connected to provide website hosting services to a plurality of unrelated websites. A portion of the website hosting services may be deployed to meet website service requirements. At least one of the deployed website hosting services may be configured to access data from a shared data structure module of the plurality of website hosting modules that may maintain data for at least a plurality of unrelated websites. Further, the CRM system may include an operational support system module for making data for each of the plurality of website hosting modules accessible. The operational support system may facilitate access to data associated with any of: business operations, a service pool platform, a load balancer, third party services, a common data store, skins and code library, clients, a CRM workflow, an analytics facility, and the like. In addition, the CRM system may include a customer relationship management module for facilitating client and agent interactions by enabling access by the client and agent to the data that may be made accessible by the operational support system. The client and agent interactions may be organized into a workflow for handling a client problem.

In an embodiment, a CRM system is provided. The CRM system may include a plurality of website hosting modules that may be configured as service pools to provide website hosting services to a plurality of unrelated websites. A portion of the website hosting services may be adapted and combined into a service package to meet website service requirements. The CRM system may include an operational support system module for making data for each of the plurality of website hosting modules accessible. Further, the CRM system may include a customer relationship management module for facilitating client and agent interactions by enabling access by the client and agent to the data that may be made accessible by the operational support system. The CRM system may include a module for reporting data relevant to a business function.

In another embodiment, a CRM system is provided. The CRM system may include a plurality of website hosting modules that may be connected to provide website hosting services to a plurality of unrelated websites. A portion of the website hosting services may be deployed to meet website service requirements. At least one of the deployed website hosting services may be configured to access data from a shared data structure module of the plurality of website hosting modules that may maintain data for at least a plurality of unrelated websites. Further, the CRM system may include an operational support system module for making data for each of the plurality of website hosting modules accessible. The operational support system may facilitate access to data associated with any of: business operations, a service pool platform, a load balancer, third party services, a common data store, skins and code library, clients, a CRM workflow, an analytics facility, and the like. In addition, the CRM system may include a customer relationship management module for facilitating client and agent interactions by enabling access by the client and agent to the data that may be made accessible by the operational support system. The CRM system may include a module for reporting data relevant to a business function.

In an embodiment, a method of website hosting is provided. The method may include serving a plurality of website hosting services. At least two of the plurality of website hosting services may be served from different servers. The method may further include adapting one or more of the plurality of website hosting services to meet a website service requirement. In addition, the method may include combining the one or more adapted website hosting services to provide a service package. At least one of the plurality of website hosting services serving a third party interface may allow access to a third party service in the service package. In the embodiment, the third party service may be accessible in the distinct service package consistent with a market-specific service offering. Further, the third party service may be offered as a component of the service package. The third party service may be accessible through a software API, a software plug-in, a link to a third-party service, and the like. The link may be a URL to a third-party website, a customized link that may activate a third-party service, customized with market-specific service offering information, and the like. Also, the third party interface may include one of an API, a plug-in, a web service, a URL redirector, and the like. The third party service may be presented to a first website hosting client with a look and feel that may be distinct from a look and feel of the third party service presented to a second website hosting client.

Further, the method may include serving a plurality of different service packages to at least a plurality of unrelated websites.

In an embodiment, a method of automatic website hosting service migration is provided. The method may include determining a plurality of website-specific hosting services provided by a first website hosting architecture that may serve the plurality of website-specific hosting services to a specific website. Serving the corresponding common website hosting service may include adapting the common website hosting service to meet website hosting requirements for a plurality of unrelated websites. The method may further include analyzing the plurality of website-specific hosting services to identify at least one of the plurality of website-specific hosting services that may correspond to a common website hosting service of a second website hosting architecture. Further, the first website hosting architecture may include data storage dedicated to each website. The second website hosting architecture may include shared data storage that may maintain data for at least a plurality of the unrelated websites. The second website hosting architecture may serve the plurality of common website hosting services from a plurality service pools. Each service pool of the plurality of service pools may provide a single website hosting service of the plurality of common website hosting services. The second website hosting architecture may serve a plurality of common website hosting services to a plurality of unrelated websites. Further, each of a plurality of the single website hosting services may be adapted and provided to a website in a service package that may be representative of the plurality of website-specific hosting services that may be provided to the website by the first website hosting architecture. In addition, the method may include serving the corresponding common website hosting service from the second website hosting architecture, in response to a request for the at least one of the plurality of website-specific hosting services. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In another embodiment, a method of automatic website hosting service migration is provided. The method may include determining a plurality of website hosting services that may be provided to a website from a first website hosting architecture that may serve a plurality of common website hosting services to a plurality of unrelated websites. The first website hosting architecture may serve the plurality of common website hosting services from a plurality service pools. Each service pool of the plurality of service pools may provide a single website hosting service of the plurality of common website hosting services. The method may further include establishing a website-specific hosting service for each of the plurality of determined website hosting services to be served from a second website hosting architecture that may serve website-specific hosting services to a specific website. The second website hosting architecture may include data storage dedicated to each website. The first website hosting architecture may include shared data storage that may maintain data for at least a plurality of the unrelated websites. In addition, the method may include serving the corresponding website-specific hosting service from the second website hosting architecture, in response to a request for at least one of the plurality of website hosting services that may be provided to the website from the first website hosting architecture. The second website hosting architecture may comprise one of a grid and a cloud computing environment and optionally, the first website hosting architecture comprises one of a grid and a cloud computing environment. Alternatively, the first website hosting architecture comprises one of a grid and a cloud computing environment and the second website hosting architecture comprises a virtual computing environment.

In an embodiment, a method of automatic website hosting service migration is provided. The method may include determining a plurality of website-specific hosting services provided by a first website hosting architecture that may serve the plurality of website-specific hosting services to a specific website by a single server. Serving the corresponding common website hosting service may include adapting the common website hosting service to meet website hosting requirements for a plurality of unrelated websites. The method may further include analyzing the plurality of website-specific hosting services to identify at least one of the plurality of website-specific hosting services that may correspond to a common website hosting service of a second website hosting architecture. Further, the first website hosting architecture may include data storage dedicated to each website. The second website hosting architecture may include shared data storage that may maintain data for at least a plurality of the unrelated websites. The second website hosting architecture may serve the plurality of common website hosting services from a plurality service pools. Each service pool of the plurality of service pools may provide a single website hosting service of the plurality of common website hosting services. Each of a plurality of the single website hosting services may be adapted and provided to a website in a service package that may be representative of the plurality of website-specific hosting services provided to the website by the first website hosting architecture. In addition, the plurality of website-specific hosting services provided to a specific website by the single server may be provided as a service package of adapted services by a portion of the plurality of servers. The service package may be derived from the plurality of common website hosting services of the second website hosting architecture. Also, the method may include serving the corresponding common website hosting service from any of a plurality of servers of the second website hosting architecture, in response to a request for the at least one of the plurality of website-specific hosting services. The second website hosting architecture may serve a plurality of common website hosting services to a plurality of unrelated websites from the plurality of servers.

In another embodiment, a method of automatic website hosting service migration is provided. The method may include determining a plurality of website hosting services being provided to a website from a first website hosting architecture that may serve a plurality of common website hosting services to a plurality of unrelated websites from a plurality of servers. The first website hosting architecture may serve the plurality of common website hosting services from a plurality service pools. Each service pool of the plurality of service pools may provide a single website hosting service of the plurality of common website hosting services. The method may further include establishing a website-specific hosting service for each of the plurality of determined website hosting services to be served from a second website hosting architecture that may serve a plurality of website-specific hosting services to a specific website by a single server. Further, the second website hosting architecture may include data storage dedicated to each website. The first website hosting architecture may include shared data storage that may maintain data for at least a plurality of the unrelated websites. In addition, the method may include serving the corresponding website-specific hosting service from the second website hosting architecture, in response to a request for at least one of the plurality of website hosting services that may be provided to the website from the first website hosting architecture.

In an embodiment, a method of automatic website hosting service migration is provided. The method may include determining a plurality of website-specific hosting services that may be provided by a first website hosting architecture that may serve the plurality of website-specific hosting services to a specific website by a website-dedicated server. Serving the corresponding common website hosting service may include adapting the common website hosting service to meet website hosting requirements for a plurality of unrelated websites. The method may further include analyzing the plurality of website-specific hosting services to identify at least one of the plurality of website-specific hosting services that may correspond to a common website hosting service of a second website hosting architecture. Further, the first website hosting architecture may include data storage dedicated to each website. The second website hosting architecture may include shared data storage that may maintain data for at least a plurality of the unrelated websites. The second website hosting architecture may serve the plurality of common website hosting services from a plurality service pools. Each service pool of the plurality of service pools may provide a single website hosting service of the plurality of common website hosting services. Each of a plurality of the single website hosting services may be adapted and provided to a website in a service package that may be representative of the plurality of website-specific hosting services provided to the website by the first website hosting architecture. The website-dedicated server of the first website hosting architecture may have one or more substantially duplicate servers for backup purposes. In addition, the method may include serving the corresponding common website hosting service from any of a plurality of servers of the second website hosting architecture, in response to a request for the at least one of the plurality of website-specific hosting services. The second website hosting architecture may serve a plurality of common website hosting services to a plurality of unrelated websites from the plurality of servers using a cloud computing architecture.

In an embodiment, a method of automatic website hosting service migration is provided. The method may include determining a plurality of website hosting services that may be provided to a website from a first website hosting architecture that may serve a plurality of common website hosting services to a plurality of unrelated websites from a plurality of servers using a cloud computing architecture. Further, the first website hosting architecture may serve the plurality of common website hosting services from a plurality service pools. Each service pool of the plurality of service pools may provide a single website hosting service of the plurality of common website hosting services. The method may further include establishing a website-specific hosting service for each of the plurality of determined website hosting services that may be served from a second website hosting architecture that may serve a plurality of website-specific hosting services to a specific website by a website-dedicated server. The second website hosting architecture may include data storage dedicated to each website. The first website hosting architecture may include shared data storage that may maintain data for at least a plurality of the unrelated websites. In addition, the method may include serving the corresponding website-specific hosting service from the second website hosting architecture, in response to a request for at least one of the plurality of website hosting services that may be provided to the website from the first website hosting architecture.

In an embodiment, a method of automatic website hosting service migration is provided. The method may include determining a plurality of website-specific hosting services that may be provided by a first website hosting architecture that may serve the plurality of website-specific hosting services to a specific website by a website-dedicated server. Further, serving the corresponding common website hosting service may include adapting the common website hosting service to meet website hosting requirements for a plurality of unrelated websites. The method may also include analyzing the plurality of website-specific hosting services to identify at least one of the plurality of website-specific hosting services that may correspond to a common website hosting service of a second website hosting architecture. The first website hosting architecture may include data storage dedicated to each website. The second website hosting architecture may include shared data storage that may maintain data for at least a plurality of the unrelated websites. Furthermore, the second website hosting architecture may serve the plurality of common website hosting services from a plurality service pools. Each service pool of the plurality of service pools may provide a single website hosting service of the plurality of common website hosting services. In addition, each of a plurality of the single website hosting services may be adapted and provided to a website in a service package that may be representative of the plurality of website-specific hosting services that may be provided to the website by the first website hosting architecture. Also, the website-dedicated server of the first website hosting architecture may have one or more substantially duplicate servers for backup purposes. The method may further include serving the corresponding common website hosting service from any of a plurality of servers of the second website hosting architecture, in response to a request for the at least one of the plurality of website-specific hosting services. The second website hosting architecture may serve a plurality of common website hosting services to a plurality of unrelated websites from the plurality of servers using a grid computing architecture. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In another embodiment, a method of automatic website hosting service migration is provided. The method may include determining a plurality of website hosting services that may be provided to a website from a first website hosting architecture that may serve a plurality of common website hosting services to a plurality of unrelated websites from the plurality of servers using a grid computing architecture. The first website hosting architecture may serve the plurality of common website hosting services from a plurality service pools. Each service pool of the plurality of service pools may provide a single website hosting service of the plurality of common website hosting services. In addition, the method may include establishing a website-specific hosting service for each of the plurality of determined website hosting services to be served from a second website hosting architecture that may serve a plurality of website-specific hosting services to a specific website by a website-dedicated server. The second website hosting architecture may include data storage that may be dedicated to each website. Further, the first website hosting architecture may include shared data storage that may maintain data for at least a plurality of the unrelated websites. The method may also include serving the corresponding website-specific hosting service from the second website hosting architecture, in response to a request for at least one of the plurality of website hosting services being provided to the website from the first website hosting architecture. The second website hosting architecture may comprise one of a grid and a cloud computing environment and optionally, the first website hosting architecture comprises one of a grid and a cloud computing environment. Alternatively, the first website hosting architecture comprises one of a grid and a cloud computing environment and the second website hosting architecture comprises a virtual computing environment.

In an embodiment, a method of automatic website hosting service migration is provided. The method may include determining a plurality of website-specific hosting services that may be provided by a first website hosting architecture that may serve the plurality of website-specific hosting services to a specific website by a website-dedicated server. Further, serving the corresponding common website hosting service may include adapting the common website hosting service to meet website hosting requirements for a plurality of unrelated websites. The first website hosting architecture may include data storage dedicated to each website. The second website hosting architecture may include shared data storage that may maintain data for at least a plurality of the unrelated websites. The second website hosting architecture may serve the plurality of common website hosting services from a plurality service pools. Each service pool of the plurality of service pools may provide a single website hosting service of the plurality of common website hosting services. Further, each of a plurality of the single website hosting services may be adapted and provided to a website in a service package that may be representative of the plurality of website-specific hosting services that may be provided to the website by the first website hosting architecture. The website-dedicated server of the first website hosting architecture may have one or more substantially duplicate servers for backup purposes. The method may also include analyzing the plurality of website-specific hosting services to identify at least one of the plurality of website-specific hosting services that may correspond to a common website hosting service of a second website hosting architecture. The method may include serving the corresponding common website hosting service from any of a plurality of servers of the second website hosting architecture, in response to a request for the at least one of the plurality of website-specific hosting services. The second website hosting architecture may serve a plurality of common website hosting services to a plurality of unrelated websites from the plurality of servers using at least one of a cloud and a grid computing architecture. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In another embodiment, a method of automatic website hosting service migration is provided. The method may include determining a plurality of website hosting services that may be provided to a website from a first website hosting architecture that may serve a plurality of common website hosting services to a plurality of unrelated websites from the plurality of servers using at least one of a cloud and a grid computing architecture. The second website hosting architecture may include data storage dedicated to each website, and wherein the first website hosting architecture comprises shared data storage that maintains data for at least a plurality of the unrelated websites. Further, the first website hosting architecture may serve the plurality of common website hosting services from a plurality service pools. Each service pool of the plurality of service pools may provide a single website hosting service of the plurality of common website hosting services. The method may further include establishing a website-specific hosting service for each of the plurality of determined website hosting services to be served from a second website hosting architecture that may serve a plurality of website-specific hosting services to a specific website by a website-dedicated server. In addition, the method may include serving the corresponding website-specific hosting service from the second website hosting architecture, in response to a request for at least one of the plurality of website hosting services that may be provided to the website from the first website hosting architecture. The second website hosting architecture may comprise one of a grid and a cloud computing environment and optionally, the first website hosting architecture comprises one of a grid and a cloud computing environment. Alternatively, the first website hosting architecture comprises one of a grid and a cloud computing environment and the second website hosting architecture comprises a virtual computing environment.

In an embodiment, a method of automatic website hosting service migration may include determining a plurality of website-specific hosting services that may be provided by a first website hosting architecture that may serve the plurality of website-specific hosting services to at least one of a client's websites by a server that may be dedicated to serving the services necessary for the client's websites. Further, serving the corresponding common website hosting service may include adapting the common website hosting service to meet website hosting requirements for a plurality of unrelated websites. The method may include analyzing the plurality of website-specific hosting services to identify at least one of the plurality of website-specific hosting services that may correspond to a common website hosting service of a second website hosting architecture. The first website hosting architecture may include data storage dedicated to each client. The second website hosting architecture may include shared data storage that may maintain data for at least a plurality of the unrelated clients. Further, the second website hosting architecture may serve the plurality of common website hosting services from a plurality service pools. Each service pool of the plurality of service pools may provide a single website hosting service of the plurality of common website hosting services. Each of a plurality of the single website hosting services may be adapted and provided to a website in a service package that may be representative of the plurality of website-specific hosting services provided to the website by the first website hosting architecture. In addition, the website-dedicated server of the first website hosting architecture may have one or more substantially duplicate servers for backup purposes. The method may also include serving the corresponding common website hosting service from any of a plurality of shared servers of the second website hosting architecture, in response to a request for the at least one of the plurality of website-specific hosting services. The second website hosting architecture may serve a plurality of unrelated clients from a plurality of shared servers. The plurality of shared servers of the second website hosting architecture may operate in a cloud computing environment, a grid computing environment, and the like. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In another embodiment, a method of automatic website hosting service migration may include determining a plurality of website hosting services that may be provided to a website from a first website hosting architecture that may serve a plurality of unrelated clients from a plurality of shared servers. The first website hosting architecture may serve the plurality of common website hosting services from a plurality service pools. Each service pool of the plurality of service pools may provide a single website hosting service of the plurality of common website hosting services. Further, the method may include establishing a website-specific hosting service for each of the plurality of determined website hosting services to be served from a second website hosting architecture that may serve the plurality of website-specific hosting services to at least one of a client's websites by a server that may be dedicated to serving the services necessary for the client's websites. The second website hosting architecture may include data storage dedicated to each website. The first website hosting architecture may include shared data storage that may maintain data for at least a plurality of the unrelated websites. In addition, the method may include serving the corresponding website-specific hosting service from the second website hosting architecture, in response to a request for at least one of the plurality of website hosting services that may be provided to the website from the first website hosting architecture. The second website hosting architecture may comprise one of a grid and a cloud computing environment and optionally, the first website hosting architecture comprises one of a grid and a cloud computing environment. Alternatively, the first website hosting architecture comprises one of a grid and a cloud computing environment and the second website hosting architecture comprises a virtual computing environment.

In an embodiment, a method of automatic website hosting service migration is provided. The method may include determining a plurality of first common website hosting services that may be provided by a first website hosting architecture that may serve a plurality of common services from a plurality of machines to a plurality of unrelated websites. The first website hosting architecture may be a cloud computing environment, a grid computing environment, and the like. Further, the plurality of machines of the first website hosting architecture may be configured into a plurality of common service pools. The method may further include analyzing the plurality of first common website hosting services to identify at least one of the plurality of first common website hosting services that may correspond to a common website hosting service of a second website hosting architecture. In the embodiment, the second website hosting architecture may be a cloud computing environment, a grid computing environment, and the like. In addition, the plurality of machines of the second website hosting architecture may be configured into a plurality of common service pools. The method may also include serving the corresponding common website hosting service from the second website hosting architecture, in response to a request for the at least one of the plurality of first common website hosting services. The second website hosting architecture may serve a plurality of common website hosting services from a plurality of machines to a plurality of unrelated websites. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In an embodiment, a method of automatic website hosting service migration is provided. The method may include determining a plurality of website-specific hosting services that may be provided by a first website hosting architecture that may serve the plurality of website-specific hosting services to at least one of a client's websites by a virtual server that may be dedicated to serving the services necessary for the client's websites. Further, serving the corresponding common website hosting service may include adapting the common website hosting service to meet website hosting requirements for a plurality of unrelated websites. The first website hosting architecture may include data storage dedicated to each client. The second website hosting architecture may include shared data storage that may maintain data for at least a plurality of the unrelated clients. In addition, the website-dedicated virtual server of the first website hosting architecture may have one or more substantially duplicate virtual servers for backup purposes. The plurality of shared servers of the second website hosting architecture may operate in a cloud computing environment, a grid computing environment, and the like. The method may also include analyzing the plurality of website-specific hosting services to identify at least one of the plurality of website-specific hosting services that may correspond to a common website hosting service of a second website hosting architecture. The second website hosting architecture may serve the plurality of common website hosting services from a plurality service pools. Each service pool of the plurality of service pools may provide a single website hosting service of the plurality of common website hosting services. Further, each of a plurality of the single website hosting services may be adapted and provided to a website in a service package that may be representative of the plurality of website-specific hosting services provided to the website by the first website hosting architecture. The method may include serving the corresponding common website hosting service from any of a plurality of shared servers of the second website hosting architecture, in response to a request for the at least one of the plurality of website-specific hosting services. The second website hosting architecture may serve a plurality of unrelated clients from a plurality of shared servers. The second website hosting architecture may comprise one of a grid and a cloud computing environment and optionally, the first website hosting architecture comprises one of a grid and a cloud computing environment. Alternatively, the first website hosting architecture comprises one of a grid and a cloud computing environment and the second website hosting architecture comprises a virtual computing environment.

In another embodiment, a method of automatic website hosting service migration is provided. The method may include determining a plurality of website hosting services that may be provided to a website from a first website hosting architecture that may serve a plurality of unrelated clients from a plurality of shared servers. The first website hosting architecture may serve the plurality of common website hosting services from a plurality service pools. Each service pool of the plurality of service pools may provide a single website hosting service of the plurality of common website hosting services. Further, the method may include establishing a website-specific hosting service for each of the plurality of determined website hosting services to be served from a second website hosting architecture that may serve the plurality of website-specific hosting services to at least one of a client's websites by a virtual server that may be dedicated to serving the services necessary for the client's websites. The second website hosting architecture may include data storage dedicated to each website. The first website hosting architecture may include shared data storage that may maintain data for at least a plurality of the unrelated websites. In addition, the method may include serving the corresponding website-specific hosting service from the second website hosting architecture, in response to a request for at least one of the plurality of website hosting services that may be provided to the website from the first website hosting architecture. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In an embodiment, a method of automatic website hosting service migration is provided. The method may include determining a plurality of IP addresses served by a first website hosting architecture to be migrated to a second website hosting architecture. The second website hosting architecture may be a cloud computing architecture, a grid computing architecture, and the like. The method may further include configuring a virtual network that may connect the first website hosting architecture with the second website hosting architecture to facilitate responding to requests to access the plurality of IP addresses during migration. In addition, the method may include serving data via the virtual network that may be suitable for a response to a request to access resources accessible through one of the plurality of IP addresses from one of the first website hosting architecture and the second website hosting architecture based on a status of migration of the resources. Further, the data may be sourced from the second website hosting architecture when the status of migration may indicate the data that may be suitable for a response has been migrated. The data may also be sourced from the first website hosting architecture when the status of migration may indicate that the data that may be suitable for a response has not been migrated.

In another embodiment, a method of automatic website hosting service migration is provided. The method may include determining a plurality of website hosting services that may be provided by a first website hosting architecture to at least one website. The first website hosting architecture may serve the plurality of website hosting services to a specific website. The method may further include analyzing the plurality of website hosting services to identify at least one of the plurality of website hosting services that may correspond to a common website hosting service of a second website hosting architecture. The second website hosting architecture may serve a plurality of common website hosting services to a plurality of unrelated websites. In addition, the method may include configuring a virtual network that may connect the first website hosting architecture with the second website hosting architecture to facilitate responding to a network request to access services that may be provided to the at least one website during migration. The method may also include serving one of the at least one of the plurality of website hosting services from the first website hosting architecture and the corresponding common website hosting service from the second website hosting architecture via the virtual network based on a migration status of the at least one website, in response to the network request. In an embodiment serving the corresponding common website hosting service includes determining a migration status for the at least one of the plurality of website-specific hosting services and serving one of the at least one of the plurality of website-specific hosting services from the first website hosting architecture and the corresponding common website hosting service from the second website hosting architecture based on the determination. Alternatively an embodiment, the first website hosting architecture comprises one or more of a grid computing environment, a cloud computing environment, and a virtual computing environment.

In an embodiment, a method of survival analysis is provided. The method may include receiving website hosting client data for a plurality of clients. The website hosting client attribute data may include client in-service data. Further, the client attribute data may include new client origination rate data. The website hosting client data may be received from a module of a common service website hosting platform. Further, the module may be an operational support system module. The method may further include calculating, with a server, a model of website hosting client survival by applying a population survival analysis algorithm to the website hosting client data. Further, calculating a model of website hosting client survival may include incorporating third-party data in the model. The third-party data may include at least one of unemployment data, interest rate data, macroeconomic data, and the like.

In another embodiment, a method of survival analysis is provided. The method may include receiving website hosting client attribute data for a plurality of clients. The website hosting client attribute data may include client in-service data. Further, the client attribute data may include new client origination rate data. The website hosting client data may be received from a module of a common service website hosting platform. The module may be an operational support system module. The method may further include applying a survival analysis algorithm to the data. In addition, the method may include determining a survival rate for a second plurality of clients based on a survival rate of a first plurality of clients. The first and second pluralities of clients have at least two common website hosting client attributes. Further, determining a survival rate may include incorporating third-party data to determine the survival rate. The third-party data may include at least one of unemployment data, interest rate data, macroeconomic data, and the like.

In yet another embodiment, a method of survival analysis of website hosting clients is provided. The method may include extracting website hosting related data for a plurality of clients from a plurality of data sources accessible to a plurality of servers in a website hosting system. The plurality of clients may be at least one of unrelated and unaffiliated. Further, extracting website hosting related data may be executed by an operational support system module of the website hosting system. The method may include selecting a survival analysis algorithm. The method may further include applying the selected survival analysis algorithm to the extracted website hosting related data to generate survival analysis data for a first portion of the plurality of clients. In addition, the method may include determining a second portion of the plurality of clients based on similarities to the first portion of the plurality of clients. Further, the method may include predicting survival for the second portion of the plurality of clients based on the survival analysis data and a measure of a degree of similarity to the first portion of the plurality of clients. Also, the predicting survival may include incorporating third-party data into the prediction. The third-party data may include at least one of unemployment data, interest rate data, macroeconomic data, and the like. Further, the website hosting related data for a plurality of clients may include new client origination rate data.

In an embodiment, a method of mapping website hosting product offerings is provided. The method may include receiving data representing a plurality of web domain offerings that may be available to a plurality of website hosting clients. The method may include receiving website hosting client usage data for a portion of the plurality of web domain offerings. Further, the method may include determining similarity among the plurality of web domain offerings for a plurality of dimensions of similarity based on analysis of the client usage data with a server. In addition, the method may include presenting on an electronic display a portion of the plurality of web domain offerings in a three-dimensional visual representation that may use a visual element to represent a degree of similarity among the portion of the plurality of web domain offerings. The visual element may reflect at least one dimension of the plurality of dimensions of similarity. The three dimensional visual representation may be a three dimensional map. Further, the degree of similarity may be determined by correlating client profiles among pairs of offerings. In the embodiment, the visual element may be distance, object size, text size, size of an element connecting one offering to another and the like. Further, the element connecting one offering to another may be a directional arrow that may be indicative of the degree of similarity. The three dimensional visual representation may be adapted based on a dimension of similarity. The dimension of similarity may be related to one of a product, a service, an offering of a common service architecture website hosting service, and the like. Also, the method may include presenting a user selector for a dimension of similarity that may cause the three-dimensional visual representation to adapt to reflect a dimension of similarity indicated by the user selector.

In another embodiment, a method of charting website hosting product offerings is provided. The method may include receiving data that may represent a plurality of web domain offerings that may be available to a plurality of website hosting clients. The method may also include receiving website hosting client usage data for a portion of the plurality of web domain offerings. Further, the method may include determining similarity among the plurality of web domain offerings for a plurality of dimensions of similarity based on analysis of the client usage data with a server. In addition, the method may include presenting on an electronic display a portion of the plurality of web domain offerings in a two-dimensional table that may display a degree of similarity for each pair of domain offerings in the portion of the plurality of web domain offerings for at least one dimension of the plurality of dimensions of similarity. The displayed degree of similarity may be determined by correlating client profiles among pairs of offerings. Further, the dimension of similarity may be related to one of a product, a service, and an offering of a common service architecture website hosting service. In the embodiment, determining similarity may include incorporating third-party data. The third-party data may include at least one of unemployment data, interest rate data, macroeconomic data, and the like.

In an embodiment, a method of client retention assessment is provided. The method may include receiving website hosting client usage data for a plurality of website hosting services. The method may include analyzing with a server the website hosting client usage data to determine patterns of hosting service usage. Further, the method may include associating the patterns of hosting service usage with client retention information. The client retention information may include website hosting client survival analysis results. In addition, the method may include using a server to statistically analyze the associated patterns and client retention information to determine factors that predict website hosting clients not to be retained. In the embodiment, the statistical analysis may be a covariance analysis. The method may further include identifying at least one website hosting client based on the determined factors to facilitate website hosting client retention. Identifying at least one website hosting client based on the determined factors may include comparing the determined factors to website hosting client usage data for the plurality of website hosting services. Further, the determined factors that may predict website hosting clients not to be retained may be based on website hosting client survival analysis results. The determining factors that may predict website hosting clients not to be retained may include user interaction patterns of prospective clients who may have viewed web domain offerings but may not have purchased the web domain offerings. The determining factors that may predict website hosting clients not to be retained may include incorporating third-party data therein. The third-party data may include at least one of unemployment data, interest rate data, macroeconomic data, and the like.

In an embodiment, a method of client financial results assessment is provided. The method may include receiving website hosting client usage data for a plurality of website hosting services. The method may include analyzing with a server the website hosting client usage data to determine patterns of hosting service usage. The website hosting client usage data may include website hosting client survival analysis results. Further, the method may include associating the patterns of hosting service usage with client financial results information. In addition, the method may include using a server to statistically analyze the associated patterns and client financial results information to determine factors that may predict website hosting clients not to produce favorable financial results. In the embodiment, the statistical analysis may be covariance analysis. The method may further include identifying at least one website hosting client based on the determined factors to facilitate improving website hosting client financial results. Further, identifying at least one website hosting client based on the determined factors may include comparing the determined factors to website hosting client usage data for the plurality of website hosting services. The determined factors that may predict website hosting clients not to produce favorable financial results may be based on website hosting client survival analysis results. The determining factors that may predict website hosting clients not to produce favorable financial results may include user interaction patterns of prospective clients who may have viewed web domain offerings but may not have purchased the web domain offerings. Also, the method may include using the determined factors to predict the financial impact of acquisition of a plurality of clients. Further, determining factors that predict website hosting clients not to produce favorable financial results may include incorporating third-party data therein. The third-party data may include at least one of unemployment data, interest rate data, macroeconomic data, and the like.

In an embodiment, a method of web domain offerings selection is provided. The method may include configuring a matrix of web domain offerings and clients who may have purchased at least one of the web domain offerings. The web domain offerings may represent website hosting services, packages of website hosting services, and the like. The method may include populating the matrix with web domain offering-purchase information for the clients. Further, the method may include processing the matrix with a random forest algorithm to produce a probability of purchase for each entry in the matrix. In addition, the method may include identifying entries in the matrix that may represent favorable probabilities of a client purchasing a web domain offering.

In another embodiment, a method of targeting offers to clients is provided. The method may include taking web domain offering purchase information for a plurality of clients. The method may include taking web domain offering information for a plurality of web domain offerings. Further, the method may include determining with a server a probability that at least a subset of the plurality of clients may purchase at least a subset of the plurality of web domain offerings. Determining a probability may include applying a random forest algorithm to the web domain offering purchase information and the web domain offering information. The method may further include identifying with a server a subset of the plurality of web domain offerings that may represent favorable probabilities of web domain offering purchase for a client. In addition, the method may include determining information for web domain offerings not purchased by the plurality of clients. The plurality of web domain offerings may include website hosting services. Also, the method may include determining which of the plurality of web domain offerings may not have been purchased by each of the plurality of clients.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 10 depicts a schematic block diagram of common service architecture with a service representative plug-in;

DETAILED DESCRIPTION OF THE PREFERRED EMBODIMENT(S)

Figure 1:
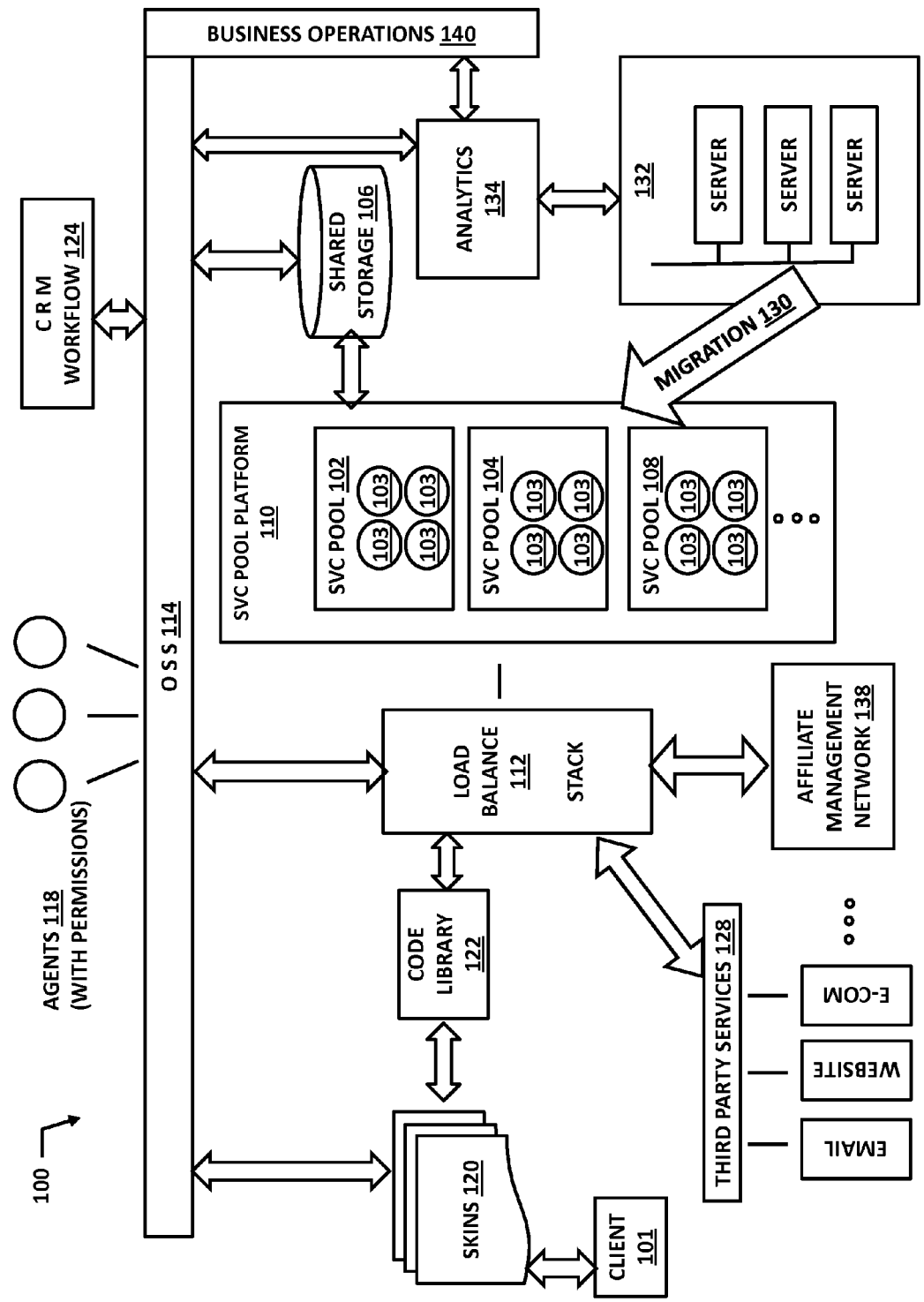
FIG. 1 depicts a block diagram of the new web hosting architecture.

FIG. 1 illustrates an overview of a common service architecture 100 for providing web hosting and related services to a plurality of clients. The common service architecture 100 may provide web hosting services to the plurality of unrelated/unaffiliated clients, such as a client 101 through a plurality of servers (e.g. web servers) that may be logically grouped into service pools based on common services that may be offered by the architecture. Exemplary service pools depicted in FIG. 1, including service pool 102, service pool 104 and service pool 108 may be supported by a service pool platform 110 that may include a plurality of web servers 103. The web servers 103 may have access to content and other website hosting data related to the hosting clients and hosted websites through a shared storage 106. The clients 101 and web hosting agents 118 may access the shared storage 106 and the common services through an Operational Support System 114 (OSS 114) that may provide functionalities, such as an initial layer of security, server group load balancing, server group access management through distribution of access requests to service pools and/or individual servers, and the like.

The service pools may include one or more service-specific groups of web servers 103 for providing various services such as, but not limited to, email, HTML services, website generation, behavior tracking, transactional services, data access (e.g. FTP), media streaming, e-commerce, and the like. The service groups may consist of servers that serve one of the specific services provided by the web hosting platform of the common service architecture 100. By grouping servers into service pools and executing a single type of service in a service pool, server execution may be made highly efficient with potentially a substantial portion of the executing software residing in fast access memory, such as cache memory for each processor. A load balancer 112 may be disposed between clients 101 and other individuals or systems that interact with the web hosting platform and the service pools to facilitate distributing web hosting service requests to each particular service pool based on the type of request being made. In addition, the load balancer 112 may implement algorithms for distributing the request to one or more servers within a particular service pool. For example, a request for dynamic website generation may be forwarded to a lightly loaded server in a website generation service pool. The particular service pool may respond to the request and obtain or deliver necessary data or information by accessing the shared storage 106 as shown in FIG. 1. The shared storage 106 may implement structured queries similarly to a database for retrieving the required information. The retrieved information may then be forwarded to the particular service pool; a response may be generated and subsequently passed to the client. For example, the shared storage 106 may store images that may be required for generating a dynamic website. The website generation service pool may then use the retrieved data to dynamically create the website and provide a response to the client.

The request may be in the form of a Web Services Description Language (WSDL). WSDL is an XML grammar that describes network services as a collection of communication endpoints that may be capable of exchanging messages. The WSDL formatted document may include type, message, operation, port type, binding, port, and the like for defining web services. The binding mechanism may be tied to various protocols and message formats including SOAP 1.1, HTTP GET/POST, MIME, or some other formats, as known in the art.

The request or response data may be in the form of packets. The packets may include information such as an IP address of a host, an IP address of a destination, number of hops, time to live, and the like. These parameters are well defined in Internet Protocol versions such as IP v.4 and IP v.6.

The load balancer 112 may receive one or more data packets. As described herein and elsewhere, the load balancer 112 may identify the type of services requested by the client. In addition, the load balancer 112 may implement an algorithm to forward the request to a server within the service-specific group.

The WSDL may associate a priority with the request type. For example, a higher priority may be provided for financial transaction requests with respect to the request for informational services. The load balancer 112 may utilize the information embedded in the data packets to assign a priority to the request. In other embodiments, a criterion of first-come-first-serve basis may be adopted for the request.

The priority information embedded in the data packets may be utilized to determine the order of the requests in a priority queue. For example, a priority facility of the load balancer 112 may determine the priority associated with a request and rearrange the priority queue before identifying the type of service being requested and therefore to which service pool should the request be forwarded.

The service pools may provide inter-operable machine-to-machine interaction, which may be referred as 'web services'. The web services may be either simple or complex. Note that this categorization is merely exemplary and other such categorizations may be possible and are included herein.

The simple web services pool may include, without limitation, point to point, RPC and messaging based services, non-transactional services (such as simple request followed by a response), web security, and the like. Similarly, the complex web services may include a framework for business-to-business collaborations and business process management. In addition, this service pool may include a plurality of servers subdivided based on characteristics of complex web services such as multiple parties' interactions, collaboration and work flow, transactions, security, and the like.

The number of servers in each of the service pools may be variable and may be based on traffic information, type of service within a service pools (e.g., emails), website generation, transactions, simple request response, scalability of each servers in each service pools, and the like. Alternatively, the number of servers for receiving the requests in each of the service pools may be fixed.

The criteria of simple web service and complex web service may be used to identify the number of servers in each service pool. For example, the number of servers provided for simple web service may be 100. Similarly, for a complex web service, the number may be 300. These servers may be equally distributed among various service categories. Alternatively, these servers may be equally distributed among different categories of simple web services.

The service pool may include services for indexing traffic data, thumbnails, and other information about web sites. A catalogue service that may provide access to product data, product description, product comparison, electronic commerce and the like.

Similarly the service pool may include authentication service for the clients 101 (e.g. web hosting subscribers) and the agents 118 that may enable access to other services. The authentication services may be associated with transaction services that may provide billing and accounting applications for conducting financial transactions for the clients and the agents.

An informational service may enable businesses, researchers, data analysts, and developers to easily and cost-effectively process vast amounts of data. The service pool may include a payment service that may allow the clients and the agents 118 to make financial transactions for making payments for online purchases.

Likewise fulfillment service may enable sellers to ship items to the clients and track information related to its delivery. A simple queue service may provide a hosted message queue for web applications. A database web service may enable the clients to run queries on structured data stored in an online common data store. In addition, a virtual cloud service may create logically isolated set of e-commerce instances to be connected to an existing network using a VPN connection. Furthermore, hosting services, workflow automation services, product development services in a virtual space, chatting services, project management services, virtual meeting services, online repository services, data exchange services and the like may include in the service pools.

The load balancer 112 facility may facilitate improved web hosting performance through balancing of service and content requests received from a plurality of sources. These sources may be dispersed geographically and may request for services such as, but not limited to, content management, e-commerce, web pages, online repositories, and the like. Servicing a large number of clients simultaneously presents challenges to scalability of web service architectures. The common service architecture 100 may facilitate simultaneously servicing many client users by streamlining requests, to different servers within the pool of services, and thereby ensuring high performance and scalability.

An intelligence facility that may be associated with the load balancer 112 may identify the request type of a web service request. This identification may be performed based on the service description provided in the WSDL. For example, the WSDL may provide a type of service element in XML for identifying the type of service.

In addition, the intelligence facility may also determine the specific server from a service-specific group for forwarding the service request. The service request may be forwarded immediately after the determination step.

The intelligence facility may be programmed for parallel execution to determine the type of services and the allocation of server within the specific group. Further, the intelligence facility may maintain the status of all the servers in a service-specific group. This may accelerate the process of allocating servers in a service-specific group.

The load balancer 112 may include a security facility. The security facility may be embedded inside the load balancer 112 or may be a separate device. Both the hardware and software enabled security features may be provided by the load balancer 112. The software enabled security features may provide certificate generation, validation, content filtering, and the like. For example, a financial transaction request may include a verification certificate, which may be verified before commencing with the transaction. Similarly, a hardware security module may include IP filtering, secure crypto-processor, and the like.

In addition, the security facility may use Hypertext Transfer Protocol Secure (HTTPS), which may provide encryption and secure identification of service requests.

The load balancer 112 may balance the request received for the plurality of clients using network load balancing (NLB) mechanism or component load balancing mechanism. For example, the NLB mechanism may balance load by redistributing IP requests among the identified pool of services. This may ensure availability. For example, in case any server fails, the load may be redistributed among the remaining cluster. Further, the load balancer 112 may utilize a unicast mode or a multicast mode using a single network load balancing adapter.

In addition, the NLB mechanism may provide failover and failback using a virtual IP address, directing traffic to a single server, optimization of servers assigned for a particular service, and synchronization of data for a particular pool of service, and the like.

A component load balancing mechanism may allow dynamic load balancing for various application components. It may be noted that various services may include transaction services, tracking services, email services, and other such application services. The component load balancing mechanism may utilize the services of the application center, which may be entrusted to instantiate components when requests are received from either application center. The request for components may be directly instantiated by the client by executing an Application Programming Interface (API).

The shared storage 106 may be configured for the plurality of service pools. Each service pool may require content for servicing a web request. The content may be obtained from or delivered to the shared storage 106 using a secured access mechanism such as sign on authentication or secure SQL script and the like. In addition, storage of the content in the shared storage 106 may ensure reduction in the risk of data loss due to server crashes.

The shared storage 106 may be implemented as a standalone database, as a distributed database, or a combination thereof. Further, the shared storage 106 database may implement a relational database that may reduce redundancy of data and optimize storage space. Information may be stored in form of tables and views. This may facilitate removal of redundant information.

The shared storage 106 may provide secured access to the service pools. An administrator may write SQL scripts for security verification. These scripts, when executed, may facilitate access to the shared storage 106. Alternatively, the server may be programmed to generate automated scripts that may provide authenticated access to the shared storage 106.

The shared storage 106 may be a distributed database. The disturbed database may facilitate transaction management, incremental storage. Further, the distributed database may facilitate reduction in communication overheads, increase in performance, and enhancement in reliability and availability of the shared storage 106. Consequently, this may increase performance by introducing parallel execution of queries. In addition, horizontal fragmentation, vertical fragmentation or fixed fragmentation may allow faster execution of queries. Various algorithms for concurrency control may also be provided to overcome simultaneous access of various data.

The shared storage 106 may be configured to enable a backup of stored data. In addition, an API may be provided for analyzing performance of the shared storage 106. This process is referred to as 'Tuning'. Tuning the shared storage 106 may enhance performance, improve data integrity, and facilitate fast execution of queries and other parameters in the shared storage 106. The API may allow recovery of the crashed shared storage 106. In order to avoid frequent crashes, the shared storage 106 may be replicated; this may provide uninterrupted access to stored data even during crashes.

The shared storage 106 may be implemented as a data warehouse and may incorporate an API for invoking analytical services, graphs and the like. For example, the informational service for a cellular operator may be stored in a service-specific group 'informational services'. The cellular operator may be interested in identifying relevant areas of operation. Such a request may be forwarded to the service-specific group in the service pools. The service-specific group, entrusted for providing the response, may access the shared storage 106 using the API, and may generate a required response for the request. The shared storage 106 may be configured as a data warehouse.

The shared storage 106 may be implemented as a plurality of data marts. These data marts may be dispersed in different geographical regions and may be integrated with each other to form a data warehouse, as known in the art.

A security access level may exist that allows direct execution of Ad hoc queries to the shared storage 106 thereby allowing submission of a native request to the shared storage 106. Although such access may have a negative impact on the shared storage 106 as it may increase its vulnerability to crashes, certain situations may best be served by allowing controlled execution of Ad hoc queries such as for managing data recovery in data warehouses.

Figure 3:
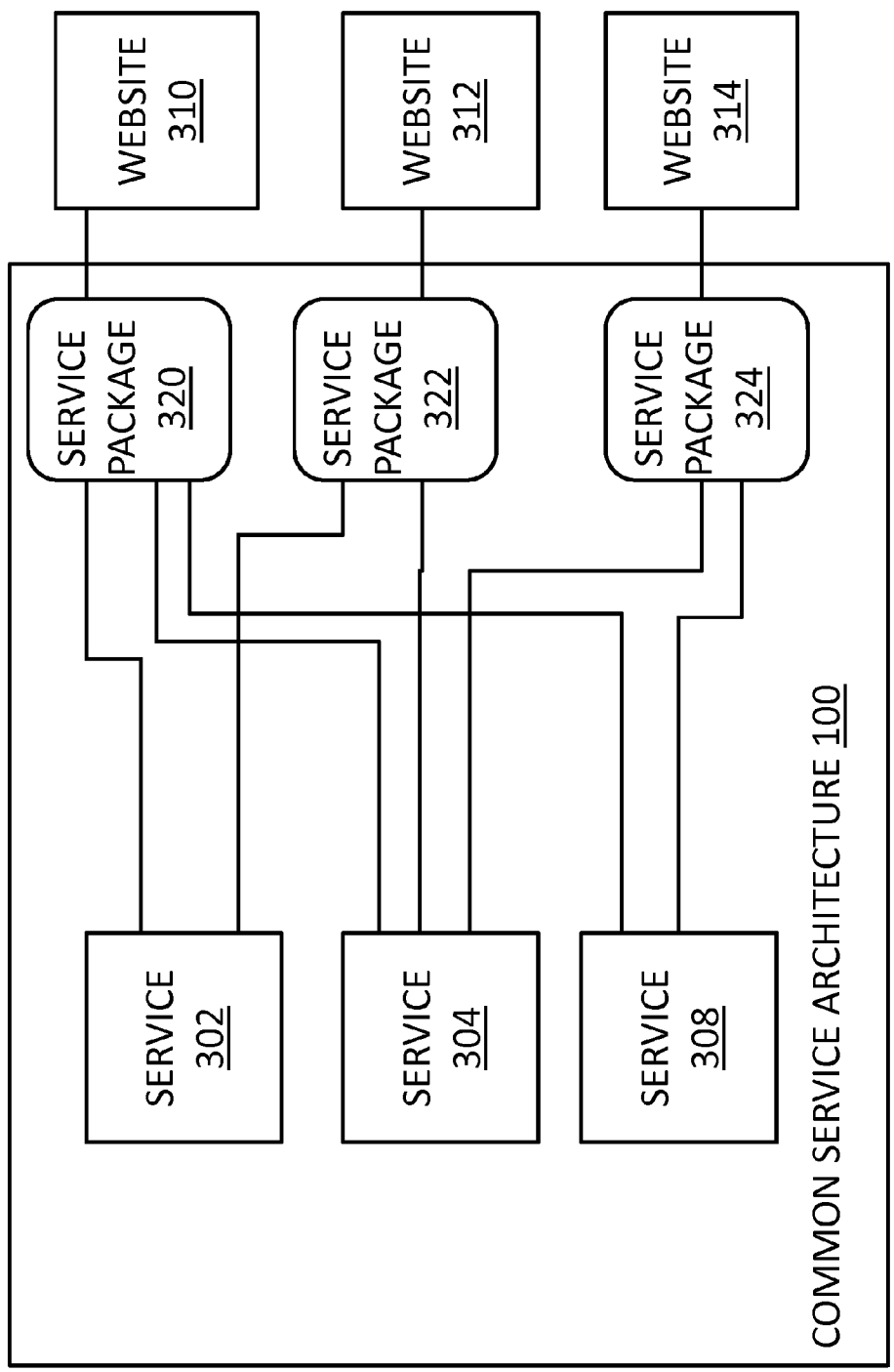
FIG. 3 depicts a schematic block diagram of a common service architecture that supports a website hosting service for providing a plurality of services from the common service architecture.

FIG. 3 illustrates a schematic block diagram of a common service architecture 100 that may support a website hosting service for providing a plurality of hosting related services. In the example of FIG. 3, the services may include exemplary services such as an HTML service 302, an email service 304, and a chat service 308 for providing HTML, email, and chat services to one or more of a plurality of websites. The services may be provided to the websites by servers associated with the common service architecture to facilitate providing each of the services; the servers may be web servers, or other types of computer-based servers. Exemplary server types may include email servers, Hyper Text Markup Language (HTML) servers, chat servers, File Transfer Protocol (FTP) servers, and the like; however, these are only representative servers and the services may be provided by these or other servers as are known in the art. The plurality of websites may include unaffiliated/unrelated websites as depicted in FIG. 3 as website 310, website 312, and website 314.

The common service architecture 100 may be adapted to provide grouped services to the websites. Accordingly, in an embodiment, a package of services may be created that addresses specific needs, preferences, contractual requirements, subscription policies, and the like of a hosted website. The common service architecture 100 may provide a different package of services to at least a plurality of these unrelated websites. Exemplary packages of services as depicted in FIG. 3 may include a service package 320 that may package a three email address service and an HTML service, a service package 322 that may package a two hundred email address service, and service package 324 that may package one thousand email address service and a one thousand member chat service. Although each distinct package is associated with only one website in the embodiment of FIG. 3, a package of services may be subscribed to by one or more websites and a website may subscribe to one or more packages of services.

The common service architecture 100 may support adapting the services for offering the plurality of packages of services such as for use in the websites. The services may be adapted by means of one or more of a code library 122 and skins 120. By the use of the skins 120 and the code library 122, the common services architecture 100 may offer different service offerings simultaneously. The various different websites 310, 312, and 314 may represent clients of the web hosting platform who subscribe to differentiated packages of services that are offered by the common service architecture 100. For example, the website 310 may represent a website for a college student, the website 312 may represent a website for a small business, and the website 314 may represent an intranet for a large multi-national company. The services required by each of the websites may vary based on the type and/or intent of the website. Accordingly, as an alternate example, the website 310 may require two email addresses, the website 312 may require twenty email addresses, and the website 314 may require a few thousand email addresses. The common service architecture 100 may provide the required email service to each of the websites by adapting a common email service of the common service architecture 100 in various ways so that each website has access to a package of services that meet the needs of that website.

The service packages 320, 322, and 324 may be provided to individual websites from the common service architecture 100 by applying the requirements, preferences, or subscription terms of each website. In an embodiment, the common service architecture 100 may include an email service 304 that may provide a different package of the email service to each of the unaffiliated websites. In an embodiment, the email service 304 may be adapted for each of the websites so that each website may receive the email service 304 as per the website's hosting subscription package. In an example, an email service provided by the email service 304 may be adapted to appear as a two email service package for the website 310, a twenty email service package for the website 312, and a few thousand email service package for the website 314.

An adapted package of services may be provided for a website. Such an adapted package of services may be dedicated to providing differentiated services for the website.

An adapted package of services may be a combination of two or more services, such as a combination of HTML and email services or a combination of email and chat services. An adapted package of services may alternatively be a website-specific variation of a common service architecture service. Any combination of services or combination of adapted services may be provided by the common service architecture 100. The service package 320 may represent an adapted service with an HTML service 302 and an email service 304 combined together. The adapted HTML service included in service package 320 may offer a certain HTML capabilities to the website 310. Similarly, the email service 304 may be adapted to facilitate offering a service package supporting thirty email addresses to the website 310 and a different number of email addresses for use in other service packages such as the service packages 322 and 324. Similarly, the service package 324 may represent an adapted email service and an adapted chat service combined together. The adapted email service may offer a service package supporting one-hundred email addresses to the website 314.

Figure 4:
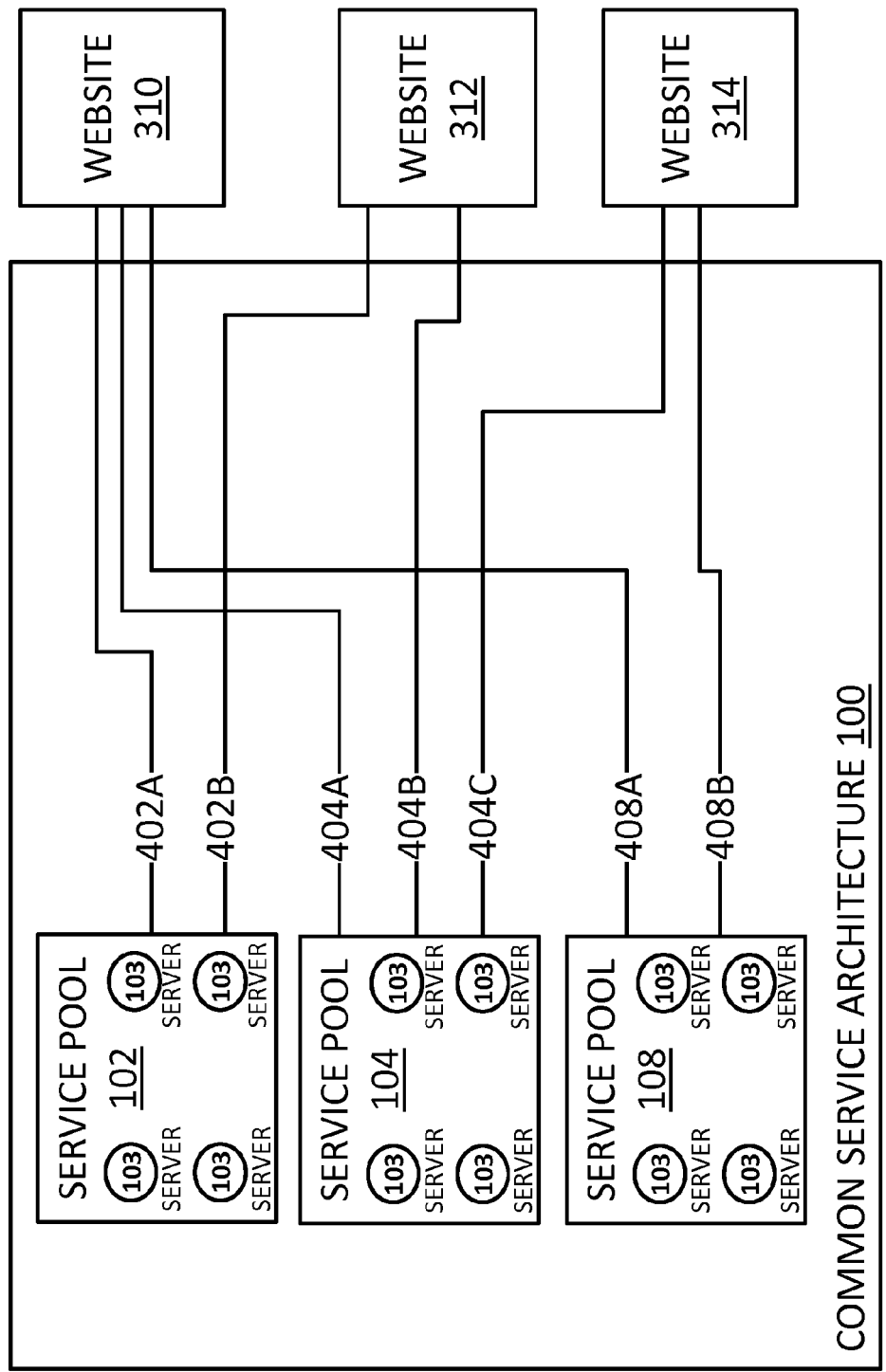
FIG. 4 depicts a schematic block diagram of a common service architecture that supports a website hosting service for providing a plurality of services from a plurality of service pools.

FIG. 4 illustrates a schematic block diagram of a common service architecture 100 that may support a website hosting service. The common service architecture 100 may provide a plurality of services from a plurality of service pools to a plurality of unrelated/unaffiliated websites, such as website 310, website 312, and website 314 as depicted in FIG. 4. In the example of FIG. 4, the service pools may include exemplary service pools, such as an HTML service pool 102, an email service pool 104, and a chat service pool 108, which may be adapted to provide a plurality of market-specific services to the websites.

The service pools may include one or more servers such as a plurality of servers 103 as depicted in FIG. 4. The servers included in the service pools may be logically grouped on the basis of common web hosting services. One or more of the service pools may be adapted to provide adapted services 402A through 408B that may be adapted to meet specific needs of web hosting clients for use in related, unrelated, or unaffiliated hosted websites such as websites 310, 312, and 314. Adapted services 402A through 408B may be sources from a common service pool but may be adapted to be provided to a particular website. In an example, service pool 102 may provide a common HTML service that may be adapted differently to serve different websites. Service pool 102 may adapt the common HTML service to provide adapted service 402A for website 310 and may provide the common HTML service adapted differently as adapted service 402B for website 312. Similarly to this example, adapted services 404A, 404B, and 404C may be adapted differently from a common email service that is provided by the servers associated with service pool 104. Likewise adapted services 408A and 408B may be adapted differently from a common chat service that is provided by the servers associated with service pool 108.

The service pools may include one or more service-specific groups of servers for providing various services such as, but not limited to, email, HTML services, website generation, behavior tracking, transactional services, data access (e.g. FTP), media streaming, e-commerce, and the like. Each service pool may consist of servers that provide one web hosting service provided by the common service architecture 100. Each service pool may provide a different service (e.g. service pool 102 may provide an HTML service and service pool 104 may provide an email service). By grouping servers into the service pools and executing a single type of service on the servers of a particular service pool, server execution may be highly efficient with potentially a substantial portion of the executing software residing in fast access memory, such as cache memory for each processor. This may improve website performance, reduce the number of servers required, support massive scalability of web hosting subscribers, and the like.

The service pools may provide inter-operable machine-to-machine interaction, which may be referred as 'web services'. The web services may be either simple or complex. The simple web services pool may include, without limitation, point-to-point, RPC and messaging based services, non-transactional services (such as simple request followed by a response), web security, and the like. The complex web services may include a framework for business-to-business collaborations and business process management. In addition, this service pool may include a plurality of web servers subdivided based on the characteristics of complex web services such as multiple parties' interactions, collaboration and work flow, transactions, security, and the like.

The number of servers in each of the service pools may be variable and may be based on traffic information, type of service within a service pools (e.g., emails), website generation, transactions, simple request response, scalability of each server, and the like. Alternatively, the number of servers for receiving a web hosting request (e.g. accessing website content) in each of the service pools may be fixed, although the fixed number for the service pool 102 may be different than the fixed number for the service pool 104.

The common service architecture 100 may include a plurality of servers 103 arranged in service pools (e.g. the service pools 102, 104 and 108) that facilitate offering packages of services to clients who may desire to have their websites hosted. A need may exist for providing a customized package of services to a website hosting architecture client. Accordingly, service packages that address specific needs of the hosted websites may be created.

The common service architecture 100 may facilitate adapting common services handled by the servers in the service pools to provide different packages of services. The common services may be embodied as integrated software running on one or more of the service pool servers and capable of adapting services to needs of the client. Alternatively, the common services may be embodied as separate servers such as load balance servers 112 and/or code library 122 servers and the like. In an example, the common services may adapt a common email service associated with service pool 104 so that a website may receive an email service package as per the terms of a client's web hosting subscription with the common service architecture 100. Examples of adaptation of services may include the skins 120 and the code library 122 and the like. Adapted different service packages may include a combination of two or more services, such as a combination of HTML and email services or a combination of email and chat services. An adapted package of services may alternatively be a website-specific variation of a single common service architecture service (e.g. two variations of an email service).

Figure 5:
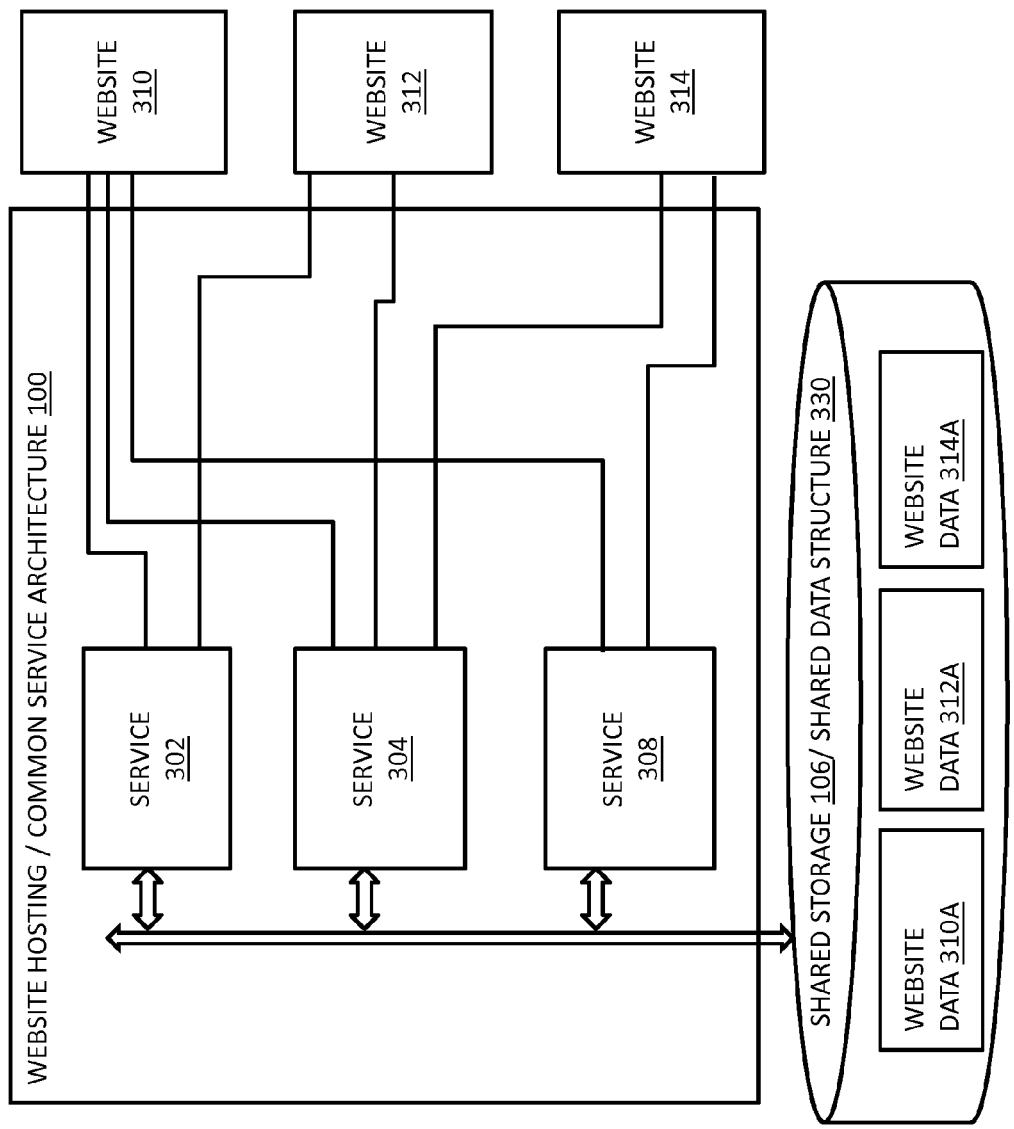
FIG. 5 depicts a schematic block diagram of a common service architecture, for providing a plurality of services to each of a plurality of [unrelated/unaffiliated] websites.

FIG. 5 illustrates a schematic block diagram of a website hosting architecture that may comprise a common service architecture 100 for supporting a web hosting service. The website hosting architecture may provide a plurality of services to a plurality of unrelated/unaffiliated websites. A plurality of services available from the website hosting architecture may be configured to be deployed to serve the websites. In the example of FIG. 5, the service may include exemplary services such as an HTML service 102, an email service 104, and a chat service 108. The website hosting architecture may further include a common data store 106 that may maintain data for a plurality of unrelated/unaffiliated websites. A deployed service may extract from the common data store 106 data related to serving a website. Data related to serving a website in the common data store 106 may be logically separated so that each deployed service may access data that is related to a specific website. In the example of FIG. 5, website data 310A may be related to website 310 and it may not be related to website 312 and 314. Similar relationships among website data 312A, 314A and the websites may be understood. The website data may be extracted from a shared data structure 330 that may be accessible through the shared storage 106, which maintains a portion of the website data. The shared storage 106 may contain data for at least the plurality of websites. As noted herein, the at least a plurality of websites may be unrelated or unaffiliated. Alternatively, at least a portion of the websites may be related/affiliated, such as if the portion of websites is owned by a common entity.

Data that is maintained in the common data store 106 may be shared data for a plurality of websites. Examples of such common data may include date and time information, content from third parties, content that is displayed on a first website that is sourced from a second website, and the like.

Further in the example of FIG. 5, each service may require access to website data for servicing a web request. The website data may be obtained from or delivered to the shared storage 106 using a secured access mechanism such as sign on authentication or secure SQL script and the like. The shared storage 106 may provide secured access to the services. An administrator may write SQL scripts for security verification. The scripts, when executed, may facilitate access to the shared storage 106. The server may be programmed to generate automated scripts that may provide authenticated access to the shared storage 106.

In addition, if the common data store 106 is accessible to a plurality of servers, storage of the website data in the shared storage 106 may ensure reduction in the risk of data loss due to server crashes.

The shared storage 106 may be implemented as a standalone database, as a distributed database, a virtual database, a flat file system, cloud-based storage, grid-based storage, combinations thereof, and the like. Further, an underlying database of the shared storage 106 may implement a relational database that may reduce redundancy of data and optimize storage space. Information may be stored in the form of tables and views. This may facilitate removal of redundant information.

The shared storage 106 may be a distributed database. The distributed database may facilitate transaction management and incremental storage. Further, the distributed database may facilitate reduction in communication overheads, increase in performance, and enhancement in reliability and availability of the shared storage 106. Consequently, this may increase performance by introducing parallel execution of queries. In addition, horizontal fragmentation, vertical fragmentation or fixed fragmentation may allow faster execution of queries. Various algorithms for concurrency control may also be provided to overcome simultaneous access of various data.

Figure 6:
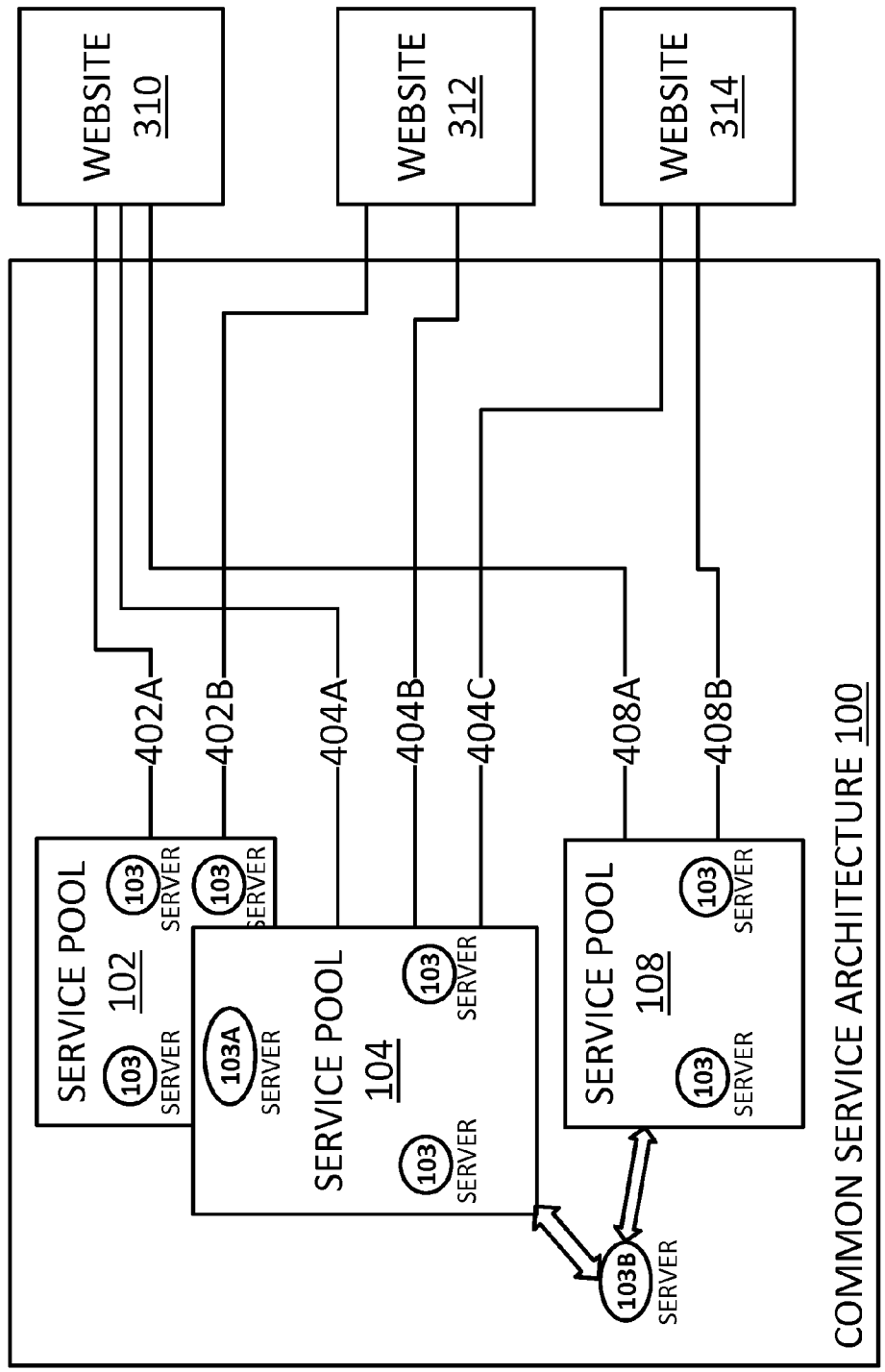
FIG. 6 depicts a schematic block diagram of a common service architecture that supports a website service for providing a plurality of services from a plurality of service pools.

FIG. 6 depicts a schematic block diagram of a common service architecture 100 that may support a website hosting service for providing a plurality of services from a plurality of service pools. The service pools may be distributed across a plurality of servers so that a portion of these servers that may be associated with a first service pool may also be associated with a second service pool, thereby sharing a server between two service pools. These servers may be physical servers, virtual servers, web servers, cloud-computing based servers, grid-computing based servers, or any combination thereof. In the example of FIG. 6, the service pools may include exemplary service pools, such as an HTML service pool 102, an email service pool 104, and a chat service pool 108. The plurality of services may be provided by some servers that provide an overlapping set of services from a plurality of service pools and by other servers that are each dedicated to a specific service pool. The services may be provided to a plurality of unrelated/unaffiliated websites as depicted by website 310, website 312, and website 314. The plurality of services may include various website related services, such as email services, Hyper Text Markup Language (HTML) services, chat services, File Transfer Protocol (FTP) services, and the like. One or more of the service pools may be adapted to contribute adapted services as depicted by elements 402A through 408B to distinct websites. An adapted service 402A that includes an email service from service pool 102 may be provided to a website 310 by adapting a common email service of the common service architecture 100 in a way that the need of the website may be met by subscribing to the adapted email service. Likewise that same common email service may be adapted and provided as adapted email service 402B for website 312.

One or more service pools may be distributed across the servers. In the example of FIG. 6, some servers, such as a server 103A may be adapted to provide an overlapping service set in order to facilitate flexible allocation of resources from more than one service pool. For example, when dedicated email servers in the email service pool 104, are servicing to full capacity, the server 103A that also services the HTML service pool 102 may serve a request for an email service. One or more servers may be adapted to provide an overlapping service set. An exemplary overlapping service set provided by a server may include email services, HTML services, chat services, and other services generally associated with website hosting. Various combinations of services may be configured on a server to form an overlapping service set. Although the example of FIG. 6 depicts a server 103A providing services from two different service pools, the server 103A may, in an alternative embodiment, provide services from three or more service pools. In another example of FIG. 6, some servers, such as a server 103B may be configured outside any service pool to facilitate flexible allocation of resources from more than one service pool. For example, the server 103B may provide services to any of the service pools such as service pool 104 and service pool 108. One or more servers may be adapted to provide an services from outside a service pool.

Each of the websites may be serviced by any of the servers in the common service architecture 100. The service pools in FIG. 6 may be understood to include any of the plurality of services described herein, such as email services, HTML services, chat services, web designing services, ecommerce services, and the like, which are supported by the common service architecture 100. Further, a service subscribed to by a website may be handled by any of the servers. The service pools may be configured to adapt the services provided by the flexible resource servers 103 for any of the websites. The service pools may include servers 103 for providing adapted services to the websites. The service pools may be provided with differentiated services for the websites.

The components described above and elsewhere herein may be combined in various ways to form these and other embodiments of the common service architecture 100 for supporting a website hosting architecture.

Figure 7:
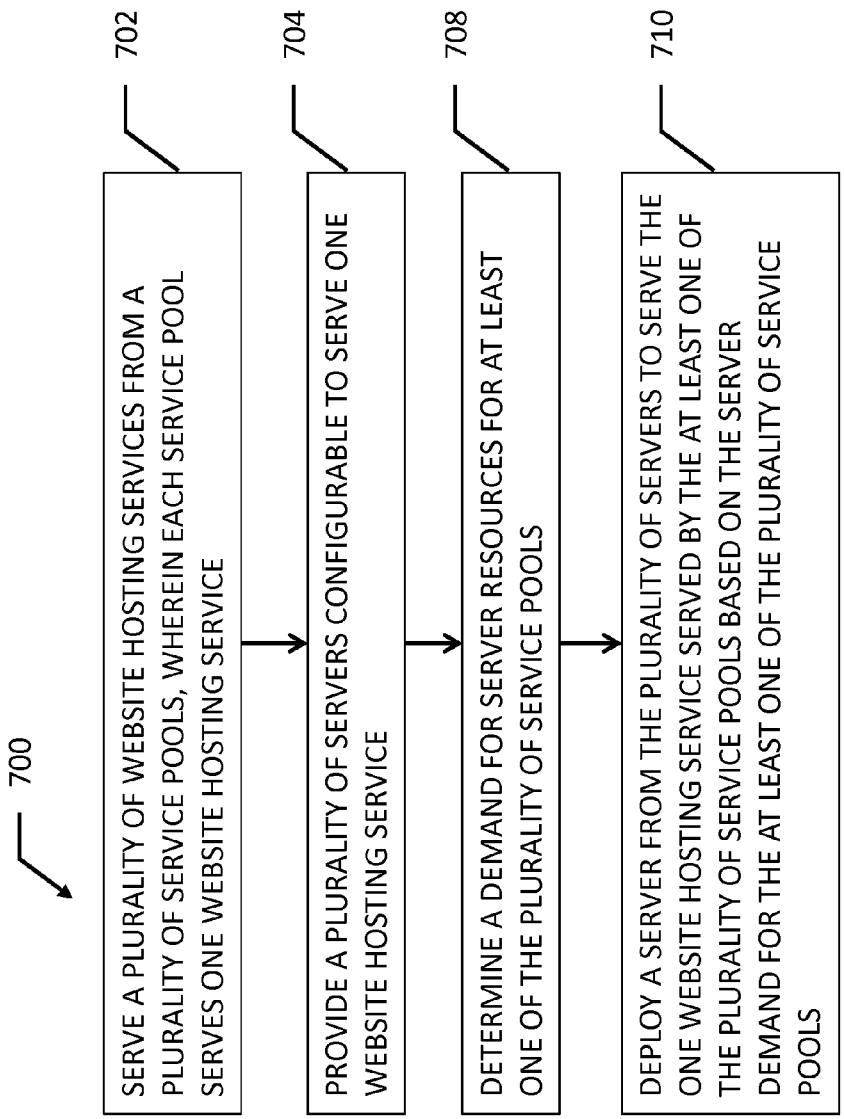
FIG. 7 depicts a flowchart that illustrates a method of website hosting.

FIG. 7 depicts a flowchart for a method 700 of website hosting. The method 700 may include serving a plurality of website hosting services from a plurality of service pools, at step 702. Each service pool may serve one website hosting service. At step 704, the method 700 may provide a plurality of servers that may be configurable to serve one website hosting service. Further, the method 700 may include determining a demand for server resources for at least one of the plurality of service pools, at step 708. In addition, the method 700 may include deploying a server from the plurality of servers to serve the one website hosting service served by the at least one of the plurality of service pools based on the server demand for the at least one of the plurality of service pools, at step 710.

A service pool may include a plurality of servers each configured to serve the same website hosting service. The method 700 may further include adapting a website hosting service from at least two of the plurality of service pools to meet website service requirements of a plurality of unrelated websites. The plurality of servers may include a cloud computing based server architecture, a grid computing based server architecture, a virtual server based architecture, and the like. The server may be configured to support a plurality of virtual servers. In an embodiment, each virtual server may provide services of one of the plurality of service pools. At least a portion of the plurality of virtual servers may provide services from two or more of the plurality of services pools.

The common service architecture 100 may provide access to web hosting services through a plurality of properties that may be distinct in look, features, and pricing while tying back to the web hosting platform of the common service architecture 100. The web servers 103 may have access to content through the shared storage 106. The clients may access the web hosting platform through an interface that may be uniquely associated with the property through which they contracted for the web hosting services.

Although the underlying resources and services of the web hosting platform may be elegantly structured around the service pools, the shared storage 106, and the load balancer 112 as described herein that may provide a wide variety of capabilities, performance levels, service offerings, and the like, potential clients and agents may prefer to be provided with web hosting and web service packages that address their specific needs and are presented in terms that fit to their expectations or knowledge sphere. Not only can the web hosting platform support various combinations of services traditionally offered by web hosting providers, but through a novel concept of skins 120 and a code library 122, the web hosting platform may appear as substantially different offerings simultaneously. By configuring a variety of different looking web site portals with the skins 120 and the code library 122 that provide various portions of the full services available through the platform at various prices, it may be made to appear to a client that there is a diverse marketplace of web hosting providers to choose among. However, rather than these various different web hosting web sites representing competitors in the web hosting marketplace, they represent differentiated packages of services provided by the web hosting platform.

Through a novel application of the skins 120 and the code library 122 to website design and other electronic interface methods (e.g. email, ftp, and the like), the underlying web hosting platform may appear as a consumer level web hosting platform through a first web site and it may also appear as an enterprise level web hosting platform through a second web site. Through a third web site it may appear as a low cost web hosting site for college students and through a fourth web site it may appear as a not-for-profit web hosting site for non-profit organizations. While the client in each case may gravitate toward the web hosting site that fits his/her needs or interests, the skins 120 and the code library 122 may collaborate to seamlessly connect the client to the underlying web hosting platform, without having to reveal to the client the substantial sophistication and complexity embodied therein. Once a client has established a web hosting account or otherwise arranged for web hosting through the website of his/her choice, the client may access many, if not all of the features of the web hosting platform. However, these features may be presented to the user in a mode that is consistent with the theme of the website through which they arranged web hosting. In this way, a college student may manage services for a hosted web site using the college student skinned website and a corporate IT manager may manage services for an enterprise wide hosted web domain using an enterprise level skinned web site; yet each may still be managing the same service (e.g. user access security) in the web hosting platform without knowing it.

In addition to accessing features of the underlying new web hosting platform using a consistent branded look and feel each time a particular client accesses the platform features, this same branded interface may allow a web hosting client to manage the client's web hosting account settings, features, and information. In this way, even when performing account administrative tasks (e.g. updating a mailing address of a web hosting account holder) the web hosting client may access his/her account through the same branded appearance that he/she used to establish the web hosting account. Therefore, the multi-branding capabilities supported by the skins 120 and the code library 122 may ensure that a web hosting client views every accessible aspect of the web hosting architecture through a consistent and branded interface.

The skins 120 and the code library 122 may collaborate to provide the uniquely different appearance to the same underlying services. The code library 122 in association with the skins 120 may include code to support translation and/or conversion of service control and configuration commands between the client-oriented skinned website and the underlying web hosting platform. The skins 120 in association with the code library 122 may facilitate presenting the features, services, and the like of the underlying platform to the client in a client-oriented look and feel that may be consistent with the theme of the website through which the client accesses the web hosting platform.

The further description discusses how the skins 120 and the code library 122 may provide, individually and in combination this rich multi-branding, co-opetitive external view of the web hosting platform resources and services.

The web hosting platform of the common service architecture 100 may be associated with the code library 122 and various interface skins that support presenting the platform in a multi-branding environment. As depicted in FIG. 1, the load balancer 112 may be coupled to the code library 122 which may include programs, databases, code in various languages, and the like for instantiating user interface themes based on a plurality of skins or website templates associated with the platform. The code library 122 may support themes that are depicted through a website, software, applications, databases, e-commerce applications and the like. A skin may facilitate providing a user interface such as a web page that may allow a user to indirectly interact with the service pools and other aspects of the platform, such as for providing various web related services.

The code library 122 may reside on one or more servers that may be the same as or different from the servers in the service pools. The code library 122 may reside in one or more of the service pools, may reside in the shared storage 106, or may be distributed across one or more servers that may be physically separated from each other. The code library 122 may be logically grouped and then distributed across a plurality of servers. In other embodiments, the code library 122 may be segmented according to service types provided by the code library 122 and may reside in storage accessible to a plurality of servers associated with each service type in a separate service pool. Similar to the services being provided in response to a request for service described herein, the service pools of the code library 122 may be established to provide code library services in response to a request made through one of the multi-branding websites. In yet another embodiment, a portion of the code library 122 may be integrated in the load balancer 112.

In the context of computing terminology, a 'skin' may indicate features of a graphical user interface (GUI) that may enable a customized presentation or theme of generalized software and/or websites. The customized presentation may facilitate marketing of the web hosting services provided through the web hosting platform through a website intended to suit individual needs (specific look and feel) by drawing user attention to the specific arrangement of elements in the website. This skinned customization of general website features may facilitate presenting a different level of detail based on the customization supported by the skins 120. The different level of detail that may be presented can be used to present the same underlying web hosting capabilities to users with differing objectives. For example, a skin may be configured to present a different level of detail that may attract an expert user to make an informed decision as compared to a skin configured to attract a novice user.

Software that is amenable to or may facilitate changes in presentation (e.g. according to customization rules) may be referred to as 'skinnable' software and a customized presentation (e.g. a website) generate from skinnable software may be called a 'skinned' website. A plurality of skins may be associated with skinnable software, so that the services of the web hosting platform may be presented in different forms on different websites for the purpose of providing a custom interface to a user of the web hosting platform.

Skinnable software may provide additional features such as improved usability, better interface, aesthetically appealing display, changed look and feel of the features, and rearrangement of the interface elements according to user preferences. Skinnable software may support presenting to a user who works on different computers executing different operating systems the same look and feel of a web page on the two different computers running different operating systems. In this way the invention may support presenting the same website with the same look and feel on the two different computers/operating systems (e.g. a PC and a MAC) by applying a unique skin for each of the two environments.

A skin may be used to customize a website that provides access to the web hosting platform for a potential customer (e.g. a web hosting client) based on any of the following type of target organization to request hosting, amount of web space desired, number of employees to interact with the hosted web service/site, type of web services to be hosted, and the like. By way of example, and not limitation, a representative of a large organization with several hundred employees may prefer a website skinned to show an 'Offer for Corporate Clients.'

When the skins 120 and the code library 122 are taken into consideration as a collaborative effort to provide customizations of user interfaces to the platform, it may be noted that the underlying architecture of the skinned website may be coded and applied to the code library 122 to construct a website according to skin-specific requirements.

An output (e.g. a website providing signup or access to the platform) based on any of the plurality of skins may be implemented by a program, which may be initialized or triggered in coordination with a plurality of conditions. The conditions may include a trigger received from the load balancer 112. In another embodiment, the trigger may be in response to a client activity. In yet another embodiment, the trigger may be in response to pre-defined conditions such as time of day, special holiday, and the like. An example may include providing a skin to the existing website on the occasion of 'Thanksgiving' displaying special offers for that day.

An automated rule may be embedded in the program code implementing such a skin. Thus, in response to a user action on the website, a function call to the code library 122 may instantiate spawning a process in the memory, thereby presenting an appropriate skinned version of a website. In may be noted that the example illustrated above is exemplary and implementation described in the above example may be cloned in other application software, social networking sites, media players, web browsers and customized applications offered for free or sale in accordance with embodiments of this invention.

Skinning associated with web pages, software applications, social networking sites and the like associated with the service pools may be implemented with a Model-View-Controller architecture. This may enable a flexible structure for easy customization of a GUI implemented with the skinnable software. In addition, the GUI may remain independent from and indirectly linked to application functionality allowing definition or design of a customized skin independent of the underlying functionality. Such customization may be limited to aspects of the GUI that are not dependent on the functionality (e.g. color, language, and the like). However, deep changes in the position and function may be possible in order to customize the software application and/or web pages.

As described above, the websites for accessing the platform may be skinnable. However, the skinnable features provided by at least the skins 120 and/or the code library 122 of the web hosting platform may be used to customize a web hosting client's websites that are hosted by the common service architecture 100. Such skinning of customer websites may be implemented according to the underlying technology described herein. In one example, skinning may be implemented to allow presentation of hosted websites to depict major changes to the layout and structure of the underlying websites. In other examples, skinning may allow minor changes such as change in color, background and the like. In yet another example, the amount of customization that may be implemented may be based on preferences that may be provided by the web hosting client or tracked through a web browser, and the like.

In another example, the platform may host a social networking site. A plurality of skins may be provided that may allow customization of presentation of the social network site. For example, Cascade Style Sheet (CSS) implementation may permit visual changes to the presentation of a client login portion of the social networking site. The use of XML and XSLT may allow more significant changes to the presented layout of the web page of the social networking site.

The code library 122 may be accessible from one or more URLs. In addition to facilitating customization of the presentation of website content and services, a skin may determine which combination of components of the code library 122 is accessible. In an example, a skin may be used to facilitate reseller agreements by allowing the reseller to present components of the code library 122 in a visual manner consistent with the reseller's other offerings. The code library 122 may include a software component for validating a password.

Further, the code library 122 may include a component for redirecting users to a different URL (Universal Resource Locator).

In addition to the skinning capabilities described herein, the code library 122 may provide additional website related features that may support other manifestations of skinning. One manifestation may occur when a specific product or service is offered from a plurality of different websites. This may allow an on-line retailer to offer a product or service from several different websites making it look as if there are multiple sources for the product or service. Another manifestation is using third parties to resell the product or services. The code library 122 may be organized to provide both types of skinning. The code library 122 may be configured to provide a skin that may visualize the web page in tune with the reseller's website thereby allowing the reseller to sell services offered by many vendors in a common look and feel. In addition, the code library 122 may facilitate providing a limited set of products or services through a website presented according to one skin. Likewise, another, different set of products and/or services offered by the same merchant may be sold from a website presented based on a different skin. This may allow the users of the code library 122 to define a skin according to their requirements or to assemble a group of services for presentation through a website configured according to a particular skin based on a service requirement. Further, the code library 122 may include various scripted routines such as administrative routines to help manage data, database related routines, file/folder routines that allow a person to work with files or folders on the server, and the like.

The skins 120 may enable targeting of different categories of web hosting services that may be specific to customers with specific needs. This may include the ability to target affinity groups such as hikers, wind power enthusiasts, and the like. Further, the skins 120 may allow targeting different levels of consumers such as novices or experts and different decision making patterns. The skins 120 may not process the client interactions with the websites that are customized based on the skins 120, but may facilitate providing different ways to market the services and/or products using the same underlying common service architecture 100 through the code library 122. These different skins 120 may expose a potential web hosting client to different aspects of the underlying web hosting technology by enabling packaging the different services together.

Various skins of websites providing hosting services may differ mainly in the amount of storage space, resource flexibility, and monthly bandwidth offered by a given plan that is associated with the skin. For example, a skin targeting a client representing individuals and small businesses may facilitate providing a starter plan and a premium plan. The starter plan may provide a single domain name, a single email address, and the like. The prime plan may include unlimited storage and bandwidth, unlimited email accounts, unlimited domain names, unlimited email accounts, and the like. The skin may also facilitate providing services such as website management that may enable a client to create a dynamic website, website marketing that may enable a client to generate traffic to the website, e-commerce solutions including credit card processing, shopping carts and the like that may allow the client to sell items and accept payment, mobile email, and business review services such as RATEPOINT.

In another embodiment, a skin targeting a client representing less sophisticated entities may facilitate configuring a website that may not offer any choice to the web hosting client/customer. For example, such a website may provide the client with only one plan, limited storage and bandwidth, and the like.

A skin may target a client representing a technology savvy consumer. The skin may facilitate presenting more technical information about the hosting plan.

A skin may use common design elements with another skin. In other embodiments, the skin may not use the same interface as any other skin, appearing to be completely independent.

Apart from look and feel and target audience, a skin may also differ according to a price charged for an underlying product or service. Likewise, a skin may allow selling the same service at different prices. A skin may facilitate creating packages that differ only in the limitations placed on the use of the underlying technology such as storage space, resource flexibility, bandwidth, and the like.

Third party skinnable application development may be provided a service pool that handles access to available utilities and application software. On a web page serviced by this service pool, a tab corresponding to personalization may list skinning software that the user may download for personalization of web pages and/or other software products. In this scenario, the code library 122 may track the customization implemented by the client with a session ID, using the downloaded skinning software and may track this personalization in the form of a skin. The tracked skin may be utilized for providing customized web interface during future interactions.

In one embodiment, the client may download third party skinning software and create the skins 120 using tools and drawing objects provided in the skinning software. The client may submit this skin to the service pool that may automatically integrate the skin into the interface associated with the client.

The plurality of skins may be associated with a plurality of code libraries. In addition to supporting the customization of presentations of websites in association with the skins 120 as described herein, the plurality of code libraries may include various functions that may not be limited to visual presentation of the different skins, such as presentation of data in RSS feeds, integration of data from multiple databases, aggregation of results produced by statistical analysis, presentation of forms of subscribing to a service and the like. By way of example and not as a limitation, the code library 122 may spawn up a spell checker in a text message provided in a particular web page. In another example, the code library 122 may be implemented as a function to pop-up special offers to a visitor after tracking the interest of a client based on browsing history. These and other examples of implementation of specific functions using program code may lead to categorization of code libraries based on functionality, programming language used for implementation, location of the code library 122 (local or distributed across network), type of instantiation, complexity of code, algorithm used for implementing a specific functionality such as but not limited to quick sort, bubble sort and the like. Thus code libraries may be categorized based on functionality.

FIG. 1 further illustrates an exemplary embodiment of the code library 122 being categorized based on functionality. The code library 122 may be organized based on presentation library, network library, multimedia library, database library, graphics rendering library, mathematical library, and transaction library.

The presentation library may include software components, program code, or Dynamic Link libraries (DLL) for formatting and presentation of web pages. In addition, the presentation library may include program code for implementation of skin corresponding to websites, arrangement of elements and graphics, formatting of websites and the like. The presentation library may include a software component for generating random passwords. The presentation library may enable the user to add data to the content being displayed on a website. The presentation library may include a software component for displaying a copyright date at the bottom of a web page. Further, the presentation library may facilitate random display of a series of graphics by the user.

The network library may include a code for linking various URLs, DNS, hyperlinks, and other code libraries distributed across a network, such as the Internet. The network library may also facilitate communication services related to the skins 120 and/or instantiating network service such as chats, emails, maintaining sessions and the like.

Likewise, the multimedia library may facilitate playing of music files related to various formats, including video files, and enabling multimedia in different skins dynamically on request from other applications. In addition, the multimedia library may facilitate streaming of audio and video files on requirement. For example, when a specific skin is applied to create a website, the multimedia library may dynamically initiate libraries for spawning flash files for animating the website.

The database library may provide integration of data to be obtained from the common database to be applied to a skin during implementation. For example, the website may include an RSS feed that may allow news to be displayed in one implementation of skin of a website. The database library may include a software component for holding multiple data transactions in a transaction so that if one fails the whole transaction will fail. The database library may include a software component for blocking entrance to a part of a site on Saturdays and Sundays. The code library 122 may include a software component for counting how many times a link and/or graphic has been clicked. The code library 122 may further include a software component for displaying a small portion from a previous record accompanied with a couple of dots to indicate that there is more text beyond what is being shown on the screen.

Similarly, date and time library may allow integration of calendar into the webpage. For example, in another implementation of a skin, a calendar may be provided on the webpage presenting current time and date and the due date for expiry of a particular service associated with a service pool. The data and time library may include a software component for displaying date and time. The time displayed is the time of the server. The date and time library may display the number of viewers currently viewing the website. The code library 122 may further allow the user to display time without the seconds. Moreover, the code library 122 may include a software code for displaying a program code without executing the same.

Graphics rendering library may facilitate presentation of special effects on the skin including color, animation, font, picture and the like so that these may be correctly rendered on the client's device.

Math library may allow integration of mathematical functions into the skins 120 at runtime. For example, the mathematical library may generate a calculator at runtime when another skin is implemented on the client's device. The code library 122 may include ways to add colors to alternate rows of the query results. The math library may also include some built-in functions such as typecasting functions, formatting functions, math functions, and the like. The code library 122 may include a software component for a countdown to a particular date with ASP, and the like. Likewise, the math library may include a hit counter for tracking the usage of a website. The code library 122 may enable a person to create dynamic image maps with ASP. The code library 122 may include a software component for committing or aborting transactions.

Transaction library may facilitate different types of transactions associated with the implementation of the skins 120.

Further, it may be noted that the underlying web pages may be formatted according to the program code provided in the skins 120 and may instantiate one or more code libraries without deviating from the scope and spirit of the present invention.

The code library 122 may be implemented using various technologies and programming languages as known in the field of computer science. Programming languages such as C#, C++, JAVA, VISUAL BASIC, PYTHON, PHP, VISUAL C++ may be utilized for writing code; these libraries may be implemented using object oriented methodology for reusability of code and reducing the implementation by inheritance. Other technologies including COM/DCOM and JAVABEANS may be utilized to produce reusable software components. These components may be configured in a manner to be able to transact a request independent of the platform and underlying architecture thereby making the virtual platform and language independent.

One or more code libraries may be DLL files and may be instantiated dynamically based on requirement. In addition, calls to these DLL files may be made by one or more program codes during execution. In another implementation, the program code may identify the location and presence of the DLL before executing the code.

The code library 122 may be associated with tracking of information associated with client actions on a website. The tracking of client actions may be performed based on cookies or other technologies as known in the art. In addition, customization of the web pages or other software applications may be performed and information stored with the username so that at a later stage the same may be analyzed and implemented as skin for a specific client.

The code library 122 may be dynamically updated once the new version is uploaded. For example, when a new version of the code is uploaded through an interface for updating code libraries, the new version may replace the older version of the code library 122 and subsequently the newer version may be integrated with requests received thereafter.

The code library 122 may include a software code for hiding/presenting an ID number on the website. The code library 122 may include a software code for encrypting and storing passwords in ASP, and the like. The code library 122 may also include a software code for forcing the person to download a file instead of opening the same inside a browser window. The code library 122 may include a software code for formatting the date as per the format mm/dd/yyyy. The code library 122 may include a software code for generating passwords.

The code library 122 may also include a program code for providing one or more security functions. For example, the code library 122 implementing security may provide authenticity to a client based on certificate validation. Likewise in another example, a code may be executed in a sandbox model to verify potential to harm the client.

The code library 122 may include a software component for validating a password. Further, the code library 122 may include a component for redirecting clients to a different URL (Universal Resource Locator). Further, the code library 122 may include various scripted routines such as administrative routines to help manage data, database related routines, file/folder routines that allow a person to work with files or folders on the server, and the like.

Figure 8:
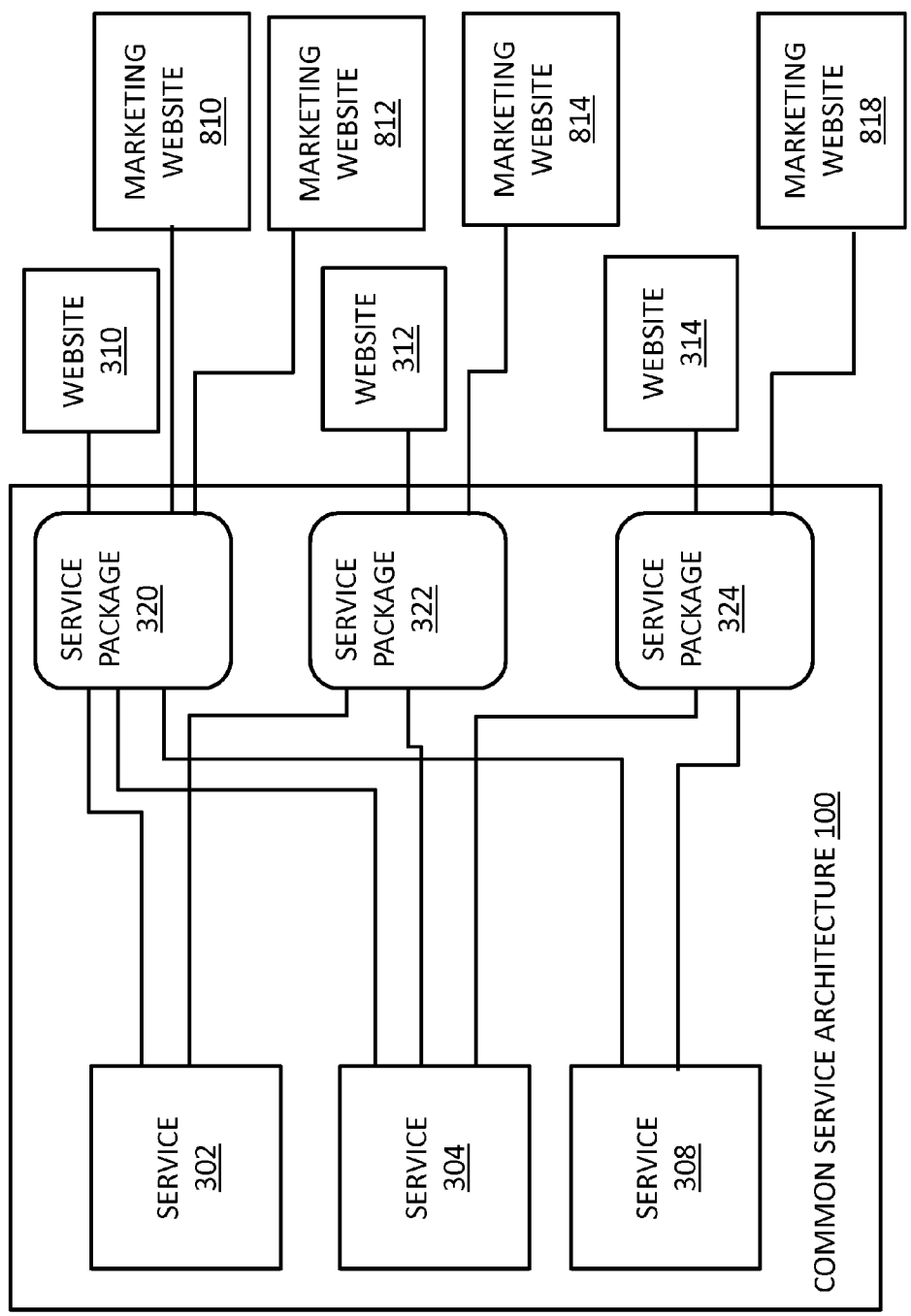
FIG. 8 depicts a schematic block diagram of a new website hosting platform that is associated with common service architecture that supports multiple branding.

FIG. 8 depicts a schematic block diagram of a new website hosting platform that may be associated with common service architecture 100 that supports multiple branding. In the example of FIG. 8, the website hosting platform may provide a plurality of services from the common service architecture 100 to a plurality of websites. The services may include exemplary services such as an HTML service 302, an email service 304, and a chat service 308. The websites served by the website hosting platform may be related or unrelated. The services available to be adapted to contribute to a distinct package of services may also include website hosting services, such as website generation services, transactional services, data access (e.g. FTP), media streaming, e-commerce, and the like. Examples of the websites may include a website for a college student such as website 310, a website for a small business such as website 312, and a website for a large multinational company such as website 314.

Further, each of the services may be adapted to contribute to a distinct package of services for at least a plurality of the websites. The distinct package of services may include exemplary service packages, such as service package 320, service package 322, and service package 324.

The common service architecture 100 may support adaptation of various services for use in hosted websites. For example, the HTML service 302, the email service 304, and the chat service 308 may adapt the common service architecture services to facilitate contributing to the packages of services for the websites. Further, differentiated services may be provided for the website. Furthermore, examples may include a code library 122, skins 120, and the like. A 'skin' may indicate features of a graphical user interface (GUI) that may enable a customized presentation or theme of the websites.

Through the skins 120 and the code library 122, the new web hosting common service architecture 100 may appear differently in different marketing websites. In an example, the web hosting services may appear as a consumer level web hosting platform through a first website and it may also appear as an enterprise-level web hosting platform through a second website. Through a third website it may appear as a low-cost web hosting site for college students and through a fourth website it may appear as a not-for profit web hosting site for non-profit organizations. A user in each case may gravitate toward the web hosting site that fits his needs or interests. The skins 120 and the code library 122 may collaborate to seamlessly connect the user to the underlying common service architecture 100 without having to reveal to the user the substantial sophistication and complexity embodied therein. Once a client has established a web hosting account or otherwise arranged for web hosting through the website of his/her choice, the user may access many, if not all features of the common service architecture 100 through the market-specific offering through which the client signed up for website hosting. However, these features may be presented to the user in an interface that may be consistent with the theme (e.g. market-specific offering) of the website through which they arranged the web hosting. In this way, a college student may manage services for a hosted website using the college student skinned website and a corporate IT manager may manage services for an enterprise-wide hosted web domain using an enterprise level skinned website; yet, each may still be managing the same underlying common service (e.g. user access security) in the web hosting platform without knowing it.

Further, the web hosting service may be marketed through one or more marketing websites. At least a plurality of marketing websites as depicted in FIG. 8 may present the web hosting services in different market-specific offerings. In an example marketing website 810 may present sports-management specific web hosting offerings, marketing website 812 may present religion-focused web hosting offerings, marketing website 814 may present the web hosting platform as student-friendly service offerings, and marketing website 818 may present the web hosting platform services as would be attractive to a corporate IT manager. Although specific marketing websites are depicted as being associated with specific service packages, any service package that may be served by the common service architecture may be offered through any market-specific marketing website. These customized marketing presentations of the common service architecture web hosting services may facilitate marketing of the web hosting services to suit individual needs (specific look and feel) by drawing user attention to visual and auditory elements in a marketing website. Further, the skins 120 of the common service architecture 100 may not directly process client interactions with the marketing websites, but alternatively may facilitate provisioning of different ways to market the web hosting services that are based on common services of the underlying common service architecture 100; client interactions may be processed through the code library 122. The plurality of services of the common service architecture 100 may also facilitate provisioning services such as: website management that may enable a client to create a dynamic website; website marketing that may enable a client to generate traffic to the website; e-commerce solutions including credit card processing; shopping carts; and the like that may allow the client to sell goods and services and to accept payment, mobile email, business review services (e.g. RATEPOINT), and the like.

The market specific offerings may include different brands for the offerings. The web hosting platform may enable web hosting clients to maintain a branded interface for having a look and feel each time the client may access the web hosting platform features. The branded interface may allow the web hosting client to manage web hosting account settings, features, information, and the like related to the client's web hosting subscription account with the platform. In this way, even when the client is performing account administrative tasks (e.g. updating a mailing address of a web hosting account holder), the client may access his/her account through the same branded appearance that he/she used to establish the web hosting account. Therefore, the multi-branding capabilities (e.g. skins 120 and the code library 122) may ensure that a web hosting user may view every accessible aspect of the web hosting architecture through a consistent and branded interface.

The market specific offerings may include different messages for the offerings. The web hosting platform may provide different messages for the different services provided by the web hosting platform. The messages may include advertisements, announcements, and the like, which may be displayed on the websites.

The market specific offerings may include different service terms and conditions for the offerings. The web hosting platform may ask web hosting clients to agree to a few terms and conditions such as prohibiting online gambling, unsolicited e-mailing, and the like. In an example, the web hosting platform may strongly react to any use or attempted use of an Internet account or computer without the owner's authorization. The web hosting platform may suspend or cancel a client's access to any or all services that may be provided by the web hosting platform when it is found that the account has been inappropriately used. For example, if a web hosting client indulges in online gambling, unsolicited e-mailing, copyright infringement activities, and the like, the services provided to such a client may be terminated by the web hosting platform even if the clients have the right to the content provided by them.

The web hosting platform may provide different pricing structures for the offerings. The web hosting platform may provide a variety of website portals with the skins 120 and the code library 122 that may provide various portions of the full services available through the platform at various prices. The website portals may be different looking and it may be made to appear to a user that there is a diverse marketplace with various web hosting providers to choose from. The web hosting websites may represent differentiated packages of services provided by the web hosting platform. For example, the web hosting platform may provide different pricing structures for a same service that may be availed by a student and a company manager.

The common service architecture 100 may include providing the OSS 114 to facilitate supporting clients who may need help in web hosting-related activities associated with the architecture. The OSS 114 may facilitate management of various processes, such as, but not limited to, request processing, monitoring of web traffic, inventory management, provisioning services, configuring network components, fault management, and the like. Provisioning may include the process of preparing a computing environment to provide (new) services to its web hosting clients. The OSS 114 may support provisioning by allowing an agent to access secure and non-secure aspects of the platform to help a client or an agent with the addition of a service or a process to the client's web hosting account. For example, the operational support staff (e.g. agent) may upgrade a client's web hosting plan using the OSS 114 in real time. Alternatively, in another example, the agent may block the access of a particular client to the web hosting platform for failing to comply with the accepted terms and conditions. The OSS 114 may include an administrative console that may facilitate modification of client web space (e.g. moving of files, deleting of files, and the like). Additionally, the OSS 114 may facilitate enabling client-specific fault tolerance, seamless integration of new shared computing or data storage resources, and the like. In addition to these client service-based capabilities, the OSS 114 may include business support features that may facilitate customer-oriented financial processes, such as taking orders, processing bills, collecting payments, and the like.

The OSS 114 may allow the web hosting platform service provider (or his designated agents and the like) to provide functionality, including client relational management, client messaging, client ticketing, client dashboard for reporting, and operational management, billing, and the like. In an embodiment, the OSS 114 may include features and capabilities that facilitate business management, service management, network management, and the like. As described herein and elsewhere, the business management features associated with the OSS 114 may facilitate providing operational information to operational staff associated with new hosting platform. This may include information related to clients, hosting plans, current status, and the like. Likewise, OSS-based business management features may include applications related to calendaring, collaboration, billing, administration, and the like for managing the business and other related services associated with the client.

Service management may be defined as a collection of information technology capabilities that make the business processes functional. The OSS 114 may facilitate service management of various information technology and related processes associated with high quality servicing of the new web hosting platform. For example, the OSS 114 may facilitate service management of service level agreements with the clients that may include, for example, minimum uptime availability of the hosted site, timely access to bandwidth, resources, email performance, and the like. For example, email communication may be bound by a service level agreement that may define the time within which the email will be received by the recipient under normal circumstances. The OSS 114 may allow an agent to examine email performance against the service level agreement both periodically or on an ad-hoc basis to help with client management. Because the OSS 114 may allow an agent to examine a plurality of clients' accounts, the agent may be able to quickly determine if a range of clients email performance is achieving a service-level agreement. In another example, the service level agreement may be with respect to the response time of an application. In this regard, the web hosting platform may record various activities that may be accessed through the OSS 114 for helping an agent to ensure compliance with the service-level agreement. Other service management functions may include, but not limited to, customer care, service development and operation, quality of service, and accounting.

The common service architecture 100 may include a network management capability that may be associated with the OSS 114. The network management capabilities accessible through the OSS 114 may include, without limitation, authorization, configuration management, fault management, security management, performance management, resource management, route analysis, accounting management, and the like. With respect to network management, various hardware and software services related to a client account, a third-party service, a service-level agreement, and the like may be configured by an agent using the OSS 114. For example, a fault tolerance software service may monitor other services running in the OSS 114 to record any occurrence of a fault. Network management data may be collected using agents, sniffers, real time monitoring, and synthetic monitoring, and may be utilized for network planning and maintenance.

The OSS 114 may provide different access methods for supporting network management such as SNMP, command-line interface, custom XML, window management instrumentation, transaction language, CORBA, NETCONF, java management extensions, and the like. The OSS 114 may support managing networks that allow integration of new network components without reconfiguring the network. Additionally, the OSS-based network management capabilities may facilitate integration of heterogeneous network components into the network; these heterogeneous components may interact with each other to collect data related to management of the network. For example, a router in the platform may be managed by the OSS 114 for filtering IP address on pre-defined criteria and the heterogeneous components may collect the IP addresses presented, the filtered addresses, and the filter criteria in real time.

The OSS 114 may be a centralized service located at a single location or it may be distributed following a distributed model of computing. While it may at first appear easy to manage such a service from a single location, there may be issues related to scalability of the management of the network, and the like. Managing the network or operations from a single location may increase load on the OSS 114 due to factors such as lack of flexibility, reconfiguration, and the like. For example, changes in static topology may be introduced at the management level and introduced in the network at the operational level. Since fault management is usually related to the static topology of the network, there may be issues related to the performance of the network in case of a fault. Therefore, in another aspect of the invention, a distributed OSS model may be implemented. Following a distributed model for implementing operational support services, various heterogeneous resources of the platform may be integrated using distributed computing technologies. For example, Common Object Request Broker Architecture (CORBA) may be utilized for integrating distributed services of the OSS 114 in a distributed framework. Likewise, Web services may be integrated with the OSS 114 in a distributed environment. To this end, UDDI and WSDL may facilitate the implementation of various services. Additionally, the OSS 114 may be implemented using Enterprise Java Beans (EJB) or other technologies such as Remote Method Innovation (RMI), JavaBeans, and the like. It may be noted that architecture for implementing various services such as business management, service management, network management, and other management service may vary in design and implementation according to the technology for enablement of the OSS 114 in a distributed environment.

The OSS 114 (or portions thereof) may operate on a cloud computing environment. The cloud may provide an interface for management of services related to business management, network management, service management, and the like. In this scenario, the cloud may facilitate location-free access with a freedom to the administrator to manage services from one or more locations.

The OSS 114 may be coupled to any module of the common service architecture 100 including, for example, the load balancer 112 module. The load balancer 112 module may receive requests from the agents 118 that need to be communicated to a particular services pool. Depending on the implementation of the OSS 114, such a request may appear to the load balancer 112 as being received directly from the cloud computing environment.

The OSS 114 may facilitate management of an affiliate management network 138, third-party services 128 that may be coupled to the web hosting platform through the cloud, and access the shared storage 106 for retrieving client information for accomplishing requests by business management, service management, network management, and the like.

Customer Relationship Management (CRM) may be an integral part of maintaining good customer relationship. The OSS 114 may be connected to a CRM workflow 124 and the client information aggregated at the CRM workflow 124 may be analyzed by the OSS 124 for creating better client management metrics. In this aspect, various services associated with the OSS 114 namely business management, network management, service management, and the like, may be utilized alone or in combination with the CRM workflow 124 for better client management. Further, the OSS 114 may be integrated to include the CRM workflow 124 for better coordination and management of customers. Reseller and other intermediaries in the value chain may also be managed through the CRM workflow 124. For example, a service ticket related to a reseller may be processed at higher priority than a service ticket for one of the clients. In another example, a service ticket generated for the reseller may be processed at a specified service location that may have local training specific to supporting resellers.

The OSS 114 may be coupled to the skins 120 and the code library 122 functionality described herein that may facilitate maintaining a look and feel throughout a client's overall web hosting experience. In this aspect, the administrator of the web hosting platform may integrate the skins 120 and the code library 122 based on the subscription plan. The OSS 114 may allow the administrator to append the look and feel components into the website on request. To facilitate a consistent look and feel of the OSS 114, the platform may record various user interaction parameters, such as the alignment text on a client device, the size and location of graphics of the client device, the layout, color combination, and the like, as per client preferences. Look and feel information, such as the recorded parameters and skin configurations associated with a client web hosting account may be correlated with the client's hosting plan information and may be stored in the database. An agent may use the OSS 114 to set up a feature to record the client interactions to be stored in the shared storage 106. Alternatively, client interactions associated with the OSS 114 may be stored in the shared storage 114, an external database, both, and the like.

The OSS 114 may record information relating to client interaction that may include device type (for example, the client may use different devices at different times or locations). Accordingly, the OSS 114 may utilize algorithms for identifying the best interface for a particular client based on the information, such as device, location, and content to be rendered. The rendering of an OSS client interface on a particular device may be based on the identification of the device (e.g. by the skin functionality described herein), the identity of the client to the OSS 114, the identified client preference information stored in the shared storage 106, the hosting plan and/or the brand identity of the web hosting subscribed to by the client, and the like.

By working cooperatively with the skins 120 and the code library 122 described herein, the OSS 114 may accommodate multiple front-end representations of common OSS and data. The front-end representations may be consistent with the brand of the web hosting that the client has subscribed to.

The OSS 114 may transcend traditional technology by incorporating billing and reporting functionality; the business management services of the OSS 114 may be entrusted with the task of presenting consolidated access to billing information, usage information, traffic patterns, data usage, and the like. In an embodiment, this information may be applied to an analysis of a web hosting service agreement associated with the service management part of the OSS 114 to help reduce costs, identify future business needs, allow a web hosting client to better serve its clients, and the like.

The OSS 114 may provide web hosting software that may be deployed across a plurality of platforms, including UNIX, Linux, Windows, Mac OS, and the like. The web hosting software may maintain the same look and feel across the plurality of platforms. The web hosting software may be packaged with a security certificate that may enable a software function for a client having adequate rights. Likewise, a security facility may be integrated within the OSS 114 that may authenticate a client.

An automated software process that communicates with the OSS 114 may be referred as a particular embodiment of an agent as described herein. Any agent (automated or human) interacting with the OSS 114 may request a plurality of services which may be constrained and/or defined in association with the agent's set of permissions related to the OSS 114, the common service architecture 100, and the like. Different agents may be categorized into a permission category or level based on their permissions. Permission levels may include, but are not limited to, an administrator, having the largest set of permissions; a moderator, with a reduced set of permissions; a web hosting client: and a client of a web hosting client with the least set of permissions. The OSS 114 may maintain an access control list for each agent listing the permissions assigned to them. The set of permissions associated with the agent may be examined when an agent logs on, and the OSS 114 may limit the services available to the agent. The set of permissions may also be examined when an agent requests a particular service from the OSS 114.

The OSS 114 may implement different kinds of security, including password-based access, digital certificates, encryption, and the like, for authenticating the agent and the permissions associated with a particular agent. In embodiments, color may be used to differentiate the different skins of the webpage by a particular permission set associated with an agent. Likewise, the permission set may determine the amount of customization that the agent may be authorized to perform on the front end.

The OSS 114 may include the CRM workflow 124, a client messaging facility, a client ticketing system, a reporting and operational management dashboard facility, a billing system, a scaled down console for partners, and the like. Although, these facilities may not be directly integrated with the client interface, the administrator may access these services to accomplish tasks related to customer services that have been pending or require immediate attention. For example, the administrator may receive a request about rendering of a particular web page from a client. The administrator may directly check the ticket associated with the problem due to its immediate nature.

The capabilities of the OSS 114 may facilitate identifying peak traffic and usage for a web hosting client and initiating actions for handling an increase in peak traffic, such as by increasing the scalability of the service pools, by activating a set of additional servers, or by operating the service pool at higher utilization levels.

The OSS 114 may utilize widgets to allow customization of web pages, increased performance, security, and reusability of code. A widget may be a reusable portion of software code that may be incorporated into a front-end presentation by the OSS 114. The OSS 114 may facilitate embedding of widgets into a webpage, a blog, a profile, a social media site, and the like. The OSS 114 may also facilitate grouping of a plurality of widgets onto a console.

Using a widget may allow presentation of common web hosting-related information to appear differently to different agents (e.g. by using different skins as described herein) without the need to rewrite the software code. The widget may be individually refreshed independently of a web page, such as for implementing dynamic web browser functionality with a reduced platform and network load. A widget may be configured to utilize security protocols to protect client information.

The OSS 114 may utilize a security profile of an agent to identify if the agent is permitted to access a specific widget. The OSS 114 may use security profiles to facilitate customizing an agent's display by showing only those widgets authorized by the agent's set of permissions.

The OSS 114 may provide a widget library. An agent may customize the display by selecting a widget from the widget library. The widget library may be password protected and the availability of the content may be based on the set of permissions for a particular agent.

The OSS 114 may include a widget builder software module that may allow an agent to create a widget with no coding knowledge.

The widget may be implemented using web technologies. These technologies may include, but are not limited to, AJAX, JSON, XML, JavaScript, Flash, HTML, and CSS. Widget implementation may be dependent on web browser APIs.

One or more widgets can be grouped for inclusion into a console. The console may be designed to facilitate a particular operational service, including, but not limited to, transaction management, online payment, ticketing control, request tracking, paperless invoicing, tracking a client request, IP address tracking, management of IP services, policy-based redirection of services, management of services, to-do list, and graphical presentation of results, marketing activities, performance information, and other management features related to network hosting management. In embodiments, the console may be a system console, a virtual console, a command line console, terminal emulator, and the like.

The widget may be modified and updated. A single widget may be changed or updated within a console without affecting the other widgets included in the console. Likewise, a group of widgets may be updated without affecting other widgets in the console.

The widgets may allow the agent complete access to various client-related information including, but not limited to, billing reports, client files, emails, and documents. For example, the agent may select a widget that displays a warning related to the expiration of the subscription agreement. The widget may access the billing details of the client and compare the present data with subscription data to provide an early warning that may prompt the agent to renew the subscription.

Widgets and consoles may facilitate OSS services that facilitate tracking of data flow inherent in business. For example, the agent may have access to a widget that may allow viewing of billing information and data usage associated with a specific client, such as over a preset period of time, and the like.

In another example, organizations may use a hosted web space for collaborative working such as product development. The progress of product development may require participation from various departments, including R & D, sales, and marketing. In this scenario, a widget may be implemented to track use of the hosted web space by various corporate functions and facilitate depicting various charts to indicate which corporate function is a business driver in a research environment.

The OSS 114 may provide access for managing a technical set up of the service including, but not limited to, location of files, documents, shared resources, location of hosted web pages, and maintaining permission settings. Furthermore, a customer support front end for the OSS 114 may be integrated with the ticketing and the messaging facility to generate customized messages and/or reports on behalf of the client.

The reporting facility associated with the OSS 114 may utilize Crystal Reports or an ODBC connection to generate custom reports and data generated web pages without the need for one-off databases. As described herein and elsewhere, the reporting facility may be a part of business management or service management. Additionally, the information may be utilized for performing various analytics on the usage patterns of visitors.

The OSS 114 may include a messaging facility, which provides a means for exchanging information or maintaining customer messaging. The messaging facility may implement various kinds of messaging applications, protocols, and authentication algorithms. For example, the OSS 114 may include an e-mailing service for exchanging information with clients. Likewise, Voice over Internet Protocol (VOIP) may be utilized for implementing voice services. In another example, RADIUS authentication may enhance the implementation of authentication. Other applications such as SMS text messaging, instant messaging, voice, facsimile, and voice-messaging applications, and the like may be utilized. The messaging facility may handle a large volume of client messages daily. The messaging facility may also enforce brand identity by providing a unified look and feel to match a client's general web hosting look and feel. The messaging facility may route the messages into a pool to allow monitoring of support volume, which may be carried out on a brand-by-brand basis.

The messaging facility associated with the OSS 114 may be provided by one of the service pools and may include server-based e-mail platforms such as LINUX POSTFIX/SENDMAIL, MERAK mail, and the like. Likewise, third-party email services may be included in the messaging service, such as GMAIL, YAHOO!, HOTMAIL, EVERYONE.NET, and the like.

Service pools facilitating the messaging facility may utilize the shared storage 106 for accessing client information. The client information may allow for integration of a billing facility with the messaging facility. This integration may be facilitated by one or more management service in the OSS 114 as described above. In one scenario, an automated standardized billing report may be integrated with the messaging facility and provided by the message facility server. Similarly, automation may be utilized by the OSS 114 to provide for one-time or recurring billing, renewal charges, discounts, and the like.

The messaging facility may include administration of e-mail at the OSS 114. The messaging facility may utilize a widget to handle administration of e-mail. The widget may be utilized to create a unique user-friendly environment to facilitate administration of e-mail. The messaging facility may also utilize a console containing a plurality of widgets to handle administration of e-mail. The messaging facility may enable a client to add voice offerings to an existing broadband service with a manageable expenditure. Additionally, the OSS 114 may incorporate services that may allow invoicing for both voice and data on a single bill. This interface may support CDR imports for switches, such as ALIANZA, PBXWARE, ASTERISK, TEKELEC, and the like.

The OSS 114 may facilitate providing one bill for multiple web hosting services; these services may include document management, document collaboration, network management, customer management, and the like. The client may pay electronically for using these multiple services. Additionally, the OSS 114 may empower the clients to control all aspects of their service via web. The OSS 114 may make suggestions to clients about the new brands or plans available in the hosting platform to increase their average revenue and improve retention. In addition, attractive margins on brand and/or plan may be offered to clients for wining their loyalty.

The OSS 114 may include a client support e-mail facility, which may be managed by the messaging facility. The client support e-mail facility may manage mail or respond to messages from the client 101, the agents 118, or other external entities. The client support e-mail facility may enforce brand identity by ensuring that messages to a client originate from an e-mail address associated with the appropriate brand. Likewise, proper terminology for the client's brand may be incorporated by the client support e-mail facility. All messages may be forwarded to service pools associated with messaging for creating logs and understanding support volume on a brand-by-brand basis.

The messaging facility may manage thousands of messages every day; these messages may be analyzed by the corresponding service pools and/or the load balancer 112 facility for creating daily activity reports, authenticating valid address, identifying spam emails, and the like.

The OSS 114 may provide an authentication service, such as an authentication facility, which may provide real time authentication of messages as they are received. The authentication facility may be updated in real time. Additionally, client profiles may be updated dynamically whenever a client's status or Internet service is changed.

The OSS 114 may include a ticketing system for solving client problems. Client problems may be related to, but are not limited by, web services, queries, product inquiries, and billing inquiries. The client or agent may also initiate an inquiry via telephone, e-mail, chat, SMS message, instant message, and the like. The ticketing system may allow a customer service representative to respond to the inquiry by any of: e-mail, telephone, chat, and a client's control panel. The ticketing system will allow a customer service representative to respond in a communication means that may be the same or different from the means used by the client 101 or an agent to initiate the inquiry. The ticketing system may facilitate teams of customer service representatives that may contain different levels of support. The ticketing system may provide a means to identify the best customer service representative to respond to the inquiry. The best customer service representative may be chosen on the basis of, but is not limited by, location, brand, customer platform, level of support purchased, and length of time since the inquiry was initiated. The ticketing system may provide a means for escalating an inquiry to a higher level of customer service representative. In addition, the ticketing system may allow a supervisor to identify competencies of a customer service representative by monitoring past performance. The supervisor may use the ticketing system to identify competencies of customer service representatives for specific kinds of inquiries. The ticketing system may also provide the supervisor a means to determine how a customer service representative is assigned the next inquiry. The assignment of the next inquiry may be customized.

The client and agent inquiries in the ticketing facility may be grouped into message queues. The ticketing facility may coordinate with the messaging facility for analyzing message queues of client and agent inquiries. The message queues may be categorized according to the type of inquiry. A customer service representative who best fulfills the criteria for answering an inquiry may be identified by the ticketing facility and the inquiry may be forwarded to the identified customer service representative for resolution. The ticketing facility may defy the traditional approach of using round robin distribution of inquiries among customer service representatives instead distributing inquiries to customer service representatives with known competency of answering inquiries from a specific area to assure full customer satisfaction.

The ticketing facility may receive an inquiry from the client 101 or an agent via e-mail, SMS, chat, facsimile, telephone, and the like. In one scenario, the client 101 or the agent may use a control panel located on a web page to enter an inquiry. An inquiry entered by the client 101 or the agent may be queued up for processing, categorized according to type of ticket, and forwarded to the ticketing facility for processing. The control panel may include a list box that may allow the client 101 or the agent to categorize the inquiry which may allow faster processing of the inquiry; thus, reducing delays in processing. In another scenario, the client 101 or the agent may be connected to the Internet through a mobile device and may submit a ticket through SMS; the OSS 114 may implement an SMS processing facility for catering to an inquiry submitted via SMS. The inquiry may be converted into a universal format for processing. Thus, the OSS 114 may provide a format conversion facility for converting an inquiry to a universal format such as XML or plain text for processing by the ticketing facility.

The ticketing facility may include a response facility for providing a response to the client 101 or the agent who submits an inquiry. The response may be automated to support heterogeneous group of devices, including (but not limited to) mobile devices, e-mail, voicemails, SMS, and the like. In one implementation, the response may be in a universal format. The universal format may facilitate the conversion to a format that may be rendered on a device from which the inquiry was sent. Thus, the ticketing facility may identify the format of the inquiry and may reply to it in the received format. Therefore, multiple devices may be integrated into the ticketing facility to provide flexibility and scalability to the client 101 or the agent.

A knowledge base of the OSS 114 may be associated with the ticketing facility, which may include legacy data of a previous inquiry that was answered by a customer service representative. An OSS customer service representative may utilize this repository to identify a possible solution to an inquiry by the client 101 or the agent. A top solution (or a set of potential solutions) may be communicated to the client 101 or the agent. Of course, the customer service representative's contextual understanding of the query and the customer service representative's discretion to suggest the best possible solution may be important. Alternatively, ticketing facility may demonstrate intelligence and may implement a complex algorithm to identify a best possible solution for customer service representative; this may require contacting the client 101 or the agent for more information and passing the same to the ticketing facility before the ticketing facility suggests a solution.

The ticketing facility may communicate with other shared databases or other external repositories; these repositories may include details of the client 101 or the agent; inquiries received from different clients or agents may be analyzed and correlated to identify the client 101 or the agent initiating an inquiry. In addition, analysis of inquiry may facilitate identification of location of the support center handling the ticket. Further, response provided to an inquiry may also be analyzed for assessing the performance of customer service representatives at that location and for monitoring internal quality.

A ticketing facility may automatically route an inquiry to a customer service representative based on the level of support purchased by the client 101 or the agent. For example, premium support may be provided to a client identified as elite; an inquiry received from this client may be given higher priority and may be attended to first. Similarly, an inquiry may be automatically routed to a customer service representative based on location, brand, platform, length of time in the queue, and the like. An inquiry may be distributed to the customer service representative based on plurality of factors, including (but not limited by) programmable software, random distribution, logical grouping of customer service representatives, round robin distribution, and the like. Of course, brand identity may be enforced at all levels in compliance with organizational objectives.

A ticketing facility may facilitate tracking of an issue raised by the client 101. The issue may contain a problem, a question, a request, an action, and the like. The issue may be raised in the form of a ticket. The ticketing facility may assign a ticket to an issue reported by the client 101. The ticket may be placed in a queue until such a time that it is resolved and/or closed. A unique ticket numbering system may allow for tracking of a client issue. Once the client issue is addressed by the provider, the client 101 may terminate or close the corresponding ticket through a ticket user interface. The provider may terminate or close the ticket upon addressing the client issue. The ticketing facility may automatically terminate or close a ticket when the client issue is addressed.

The ticketing facility may automatically characterize a client issue by type of issue. The type of issue may contain a billing question, a hardware problem, a software problem, a request to change a service, a termination request, and the like.

The ticketing facility may provide a means for changing a priority level associated with a ticket. The priority level may reflect associated importance of a ticket when compared to other tickets. The priority level may also reflect the overall length of time between ticket initiation and ticket resolution. The ticketing facility may provide a user interface that may allow a client to change the priority level of a ticket. Alternatively, the ticketing facility may allow the provider to change the priority level of a ticket. Further, alternatively, the ticketing facility may automatically adjust the priority level of a ticket. The automatic adjustment may be based on a set of criteria for ticket priority. The set of criteria for ticket priority may contain an amount of time elapsed since a ticket has been opened, a type of issue, an importance or size of client, a level of support that the client subscribes to, and the like. The priority level of a ticket may contain low, normal, high, urgent, and the like. The priority level of a ticket may be raised or lowered at any time.

The ticketing facility may provide a user interface to the administrator or the support staff for viewing a plurality of tickets. The user interface may allow a provider to view a selection of tickets for a client, for a specific priority level, for a specific type of issue, and the like. The ticket may be accessible through a control panel. The control panel may allow the administrative staff to perform an action on a ticket. The action on a ticket may include create, submit, modify, add note to, reject, abandon, close, and the like.

The ticketing facility associated with the OSS 114 may be implemented in a multi-tier architecture. Each tier may be associated with a level of support to be provided. The level of support or tier for a ticket generated for a service request submitted by a particular client may be based on a plan associated with that client. A client who has a plan that provides immediate support may be considered a high tier (e.g. tier 3) service client, whereas a client with an 'email only support' type plan may be considered a low tier (e.g. tier 1) service client. A service tier may be associated with a service request time instead of a client service plan. In an example, a high priority issue may be allocated to a very high tier (e.g. tier 3 or 4) that may result in a ticket that is generated for such a service request being escalated. Service requests may be routed to one or more service locations based on the service tier associated with the request. In an example, a tier 4 service request may be routed to a senior technical support engineer in headquarters so that he/she can have direct access to key development personnel to resolve the issue. In another example, a tier 1 service request may initially be routed to an automated service facility that may generate automated support responses based on a syntactic and/or keyword parsing of the service request. In another example, a tier 2 request may be routed to a service center in a low cost region and a tier 3 request may be routed to a location with highly technically qualified support agents.

The OSS 114 may include a billing facility for generating billing details for a client. The common service architecture 100 may facilitate billing that maintains brand identity. The OSS 114 may initiate processes for upgrading client usage plans through the administrative console. The administrative console may comprise a GUI that may allow the client to upgrade or downgrade the web hosting plan. Accordingly, the OSS 114 may change the billing plan of the client.

Agents associated with the OSS 114 may view client billing information. For example, an agent may utilize a control panel to view billing details. The agent may choose from a variety of billing-related actions, such as without limitation, modifying, upgrading, discontinuing a subscription, and the like. A billing facility associated with the OSS 114 may include access rights that may facilitate determining if the agent is allowed to modify, upgrade, or discontinue the subscription, such as based on a client's subscription agreement. An agent who is allowed to modify a client's subscription may choose to upgrade the subscription level, may select a different billing schedule, or may modify another aspect of the client's subscription. In response to submission of this request, the agent may be presented with a different skin that may be associated with the changed client web hosting plan/features.

The OSS 114 may facilitate an agent using the OSS 114 to access a common view of multiple plans that may be rendered through different skins to the clients. These plans may be associated with different brand names; however, because they may be implemented in association with the common service pools architecture, the OSS agent may view both the brand specific features and the features that are supported by elements of the common service architecture 100. The common service architecture 100 may facilitate offering different brand names associated with different hosting plans while servicing them through an integrated view of the back end architecture elements.

A client who is subscribed to a plan may be automatically associated to that plan's brand so that an agent viewing the client account may be able to see the client's selected brand through the OSS 114. Thus, the OSS 114 may incorporate an ability to correlate a client or an agent with the brand name, and plan and automatically render the skins 120 corresponding to this brand name to the agent. This may be similar to the agent being granted proxy access to the client's account through the OSS 114 while retaining advanced access capabilities available to an agent through the OSS 114 as described herein. In addition, an agent may view plurality of client accounts and may move from one brand view to another brand view (e.g. one hosting plan to a different plan) from within the interface of the OSS 114.

The OSS 114 may include analytical tools for analyzing different aspects of the customer relationship management. Additionally, an analytics facility 134 may facilitate measurement of different aspects including, but not limited to, customer satisfaction, monthly billing, web traffic, load analysis, new customer addition, and the like.

The OSS 114 may facilitate aggregating data from various sources associated with the common service architecture 100, such as a billing facility, a support ticketing facility, the CRM workflow 124, and the like to facilitate viewing the aggregated data by members of web hosting customer service groups (e.g. agents). The service groups may include the administrator of one or more services, support staff, customer service representatives, some other kinds of support-focused representatives, agents and the like. In an embodiment, the OSS 114 may facilitate transforming and/or formatting aggregated for rendering on an OSS interface for the customer service representative. The format for rendering may be user defined or system defined.

Various statistical analyses may be performed on the aggregated data for analyzing various parameters associated with various service aspects of the web hosting platform. Parameters to be analyzed may include, without limitation web traffic, downtime, ticket queues, support request rate, support request duration, support request escalation, other customer relationship management parameters, and support requests by brand, by hosting package, by length of service contract, and the like. Providing analysis of these and other parameters associated with the web hosting platform may allow an OSS agent to understand a client support request or problem in context of the factors that most relate to or impact the problem associated with the request. In an example, a web hosting platform may service a large number of clients distributed across diverse locations. Each client of the web hosting platform may engage in one or more activities, such as addition of mailbox, upgrade of plan, and the like through a particular web hosting brand. Analysis of parameters such as association of adding a mailbox through a particular brand may indicate that a client accessing the web hosting platform through that particular brand may be more likely to experience a problem with adding a mailbox than do clients who access the platform through another brand, and that a workaround has proven effective for clients of the particular brand. In this way, when the support request is presented to the agent, the agent may be able to quickly identify the brand and view the analysis associated with that brand to better resolve the client's support request.

As described herein, the OSS 114 may provide a unified interface to the customer service representative (e.g. agent) for managing various support activities that may allow an agent to service a diversity of brand-specific clients without necessarily having to access the platform directly through the specific brand. Alternatively, the OSS 114 may facilitate a user accessing the web hosting platform through the brand in experiencing the same environment as the client 101. In this way, multiple brands may also be managed by a single agent.

The web hosting platform supported by the common service architecture 100 may be implemented as service-oriented software architecture that may allow the software capabilities to be delivered and consumed as a service as in known in the art. The various endpoint interfaces associated with such a software service may be provided as service-based interfaces as well. One or more of these endpoint service-based interfaces may be associated with a user (e.g. through a device) such as the customer service representative or agent, a technical specialist, a sales specialist, an administrator and the like. Service-based endpoint interfaces may alternatively be some other type of interface, such as machine, network, or similar programmatic interface. The various OSS interfaces and endpoints may be synchronized to display the same data, thereby maintaining consistency of the OSS 114 through the web hosting platform. In another embodiment, data consistency may be associated with and/or based on a specific brand, client, web hosting plan, and the like.

The OSS 114 may be implemented in any of a large variety of software programming models, languages, techniques, and the like. One such exemplary programming model is Object Oriented Programming in which the data and methods may be isolated from each other. Furthermore, various principles of inheritance, abstraction, and polymorphism may be utilized in embodiments of the common service architecture 100.

In another implementation, the OSS 114 may be organized as a base architecture where the data and services originate, and as a cloud-level portion that supports cloud computing environments. Additionally, a cloud-type network processing architecture may overlay the base architecture to provide client support interfaces that may facilitate ticketing and other service access for multiple clients with multiple skins. Each client may be engaged in a specific support activity. When a large number of users are engaged in different support activities, it may be necessary to support millions of nearly simultaneous support activities. The cloud-level portion of the OSS 114 may be operated within a cloud computing environment to support agents performing activities and/or services across multiple clients and multiple brands being provided from cloud computing resources while ensuring that changes made to a specific client may be visible to all service support representatives throughout the cloud-based OSS embodiment. This may ensure that moderation made to any service with respect to one or more clients is visible across all aspects of the web hosting platform even if portions are operating as cloud computing resources. Further, the web hosting platform may be implemented in association with cloud computing that may facilitate providing support regionally by directing service requests through the cloud to an agent that may be local or at least within a similar time zone to the client. In an example, the client may be located in India and a service request may be routed through the cloud to a service group of agents located in India or the Philippines. However, the service request, and any service ticket or other CRM data generated as a result of such a request may be located in any or a number of locations, including a shared storage 106 associated with the web hosting platform of the common service architecture 100. Alternatively, a local service support representative may validate a local service support request and the information associated with the request may be presented to a technical specialist who may be accessing the platform through a client device located in a different geographic region. The same information may be displayed on the interface of the service support representative and on the technical specialist for consistency and improved customer service.

As described herein, the service support representative may be able to manage multiple skins for one or more clients from a unified OSS interface. This may be beneficial because a client may intentionally use different skins to differentiate access to his hosted web content for different users. One example of such an environment may be based on an organizational hierarchy associated with the hosted web content. In this aspect, different users may have different skins. A particular service support representative may support the activities for this web hosting client by directly supporting the clients associated with the particular web hosting client. Because different clients may have different access rights to a web hosted content based on the brand with which they may be associated, the service support representative may be entrusted with the task of ensuring that all clients are able to access and/or perform activities for which they have the access rights while providing service support to different users of the web hosting client. To do this, the OSS 114 may facilitate an agent interface that may allow full access to all of a client's features and services even when the agent is servicing a particular client of that web hosting client. Further, in addition to the service support representatives providing technical support to a client, the service support representative may be called upon to promote sales (e.g. suggesting that a client upgrade his/her access to the web hosted content to improve a capability related to a support request), provide cross-client support, and facilitate branding of services so that a brand-specific client does not need to be aware of the presence of other brands for accessing the same web hosted content.

The OSS 114 may provide different views of the web hosting environment and the common service architecture 100 to an administrator, a billing representative, a manager, a technical representative, an agent or to some other person associated with the OSS interface.

The OSS 114 may be implemented on a hardware platform executing software that may support virtualization. Virtualization is generally implemented as a process that executes software independently of the underlying hardware. Virtualization may be implemented as fully isolated from the hardware, partially isolated from the hardware (e.g. to support some real-time activity) also known as para-virtualization.

In a virtual environment, each operational service may be associated with a separate virtual machine, thereby allowing different technical representatives to manage, analyze, and control these services in isolation from each other. Alternatively, virtualization may facilitate the multi-brand capabilities of the common service architecture 100. Virtualization may also be beneficial during migration of hosted content from a third-party web hosting service to the common service architecture 100.

Virtualization may facilitate optimal hardware utilization. Multiple virtual machines may be executed on a single hardware for increasing operational efficiency of the common service architecture 100. In an embodiment, the virtual machine may be a system virtual machine or a process virtual machine. Various advantages may accrue by implementing virtualization such as existence of multiple OS environments on a single computer, implementation of an instruction set architecture (ISA), application provisioning, maintenance, high availability, and disaster recovery.

Figure 2:
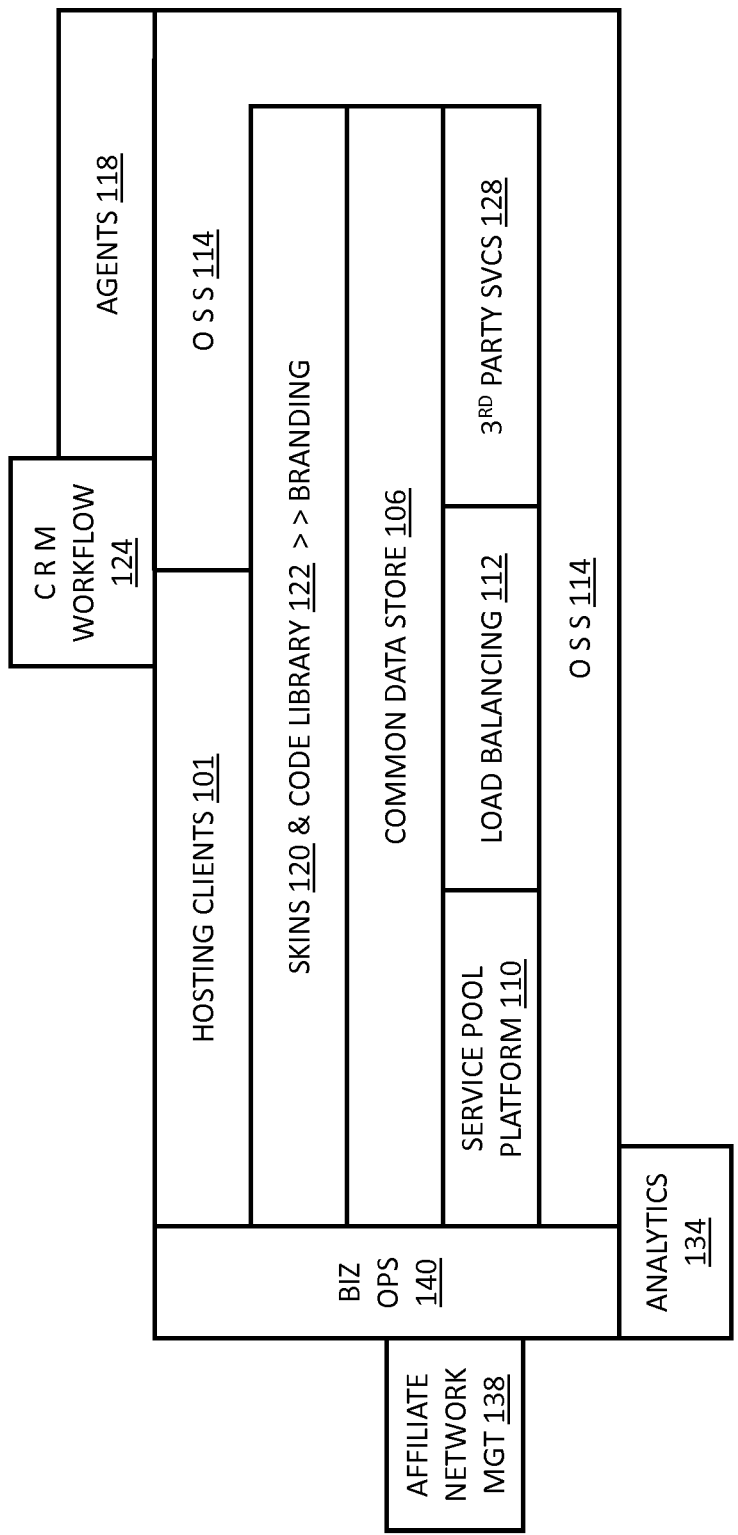
FIG. 2 depicts an overview of the architecture of an operational support service (OSS)

FIG. 2 illustrates an overview of the architecture of the OSS 114 as a layer that connects to all aspects of the common service architecture 100. Through this comprehensive association at the client level, affiliate level, business operation level, physical server pool and data storage level affords an agent using the OSS 114 to provide client support the opportunity to confidentially access any aspect of the platform to provide the service. A client who has a support question about data security may be serviced by an agent who may access the shared storage 106 as a database manager in order to check database security features and settings for both the physical data storage and the logical data storage associated with the client. Many other such examples of how the OSS 114 may allow an agent to service a client from both the client level interface to the platform and the low level "bottom-up" view of the platform are possible.

Therefore, the OSS 114 layer may allow agents to access secure and non-secure aspects of the platform. The OSS 114 layer may allow agents to access the platform like a hosting client. Alternatively, the OSS 114 may allow the agents 118 to access the platform independent of the hosting client views or limitations. The OSS 114 layer may also be connected to CRM workflows. The client information aggregated from a CRM database may be analyzed by the OSS 114 for creating better client management metrics. In this aspect, various services associated with the OSS 114 namely business management, network management, service management, and the like may be utilized alone or in combination with the CRM for better client management.

Further, the OSS 114 may be coupled to the skins 120 and the code library 122. The skins 120 and the code library 122 may facilitate maintaining a look and feel throughout a client's overall web hosting experience. In this aspect, the administrator of the web hosting platform may integrate the skins 120 and the code library 122 based on the subscription plan. In an embodiment, the OSS 114 may allow the administrator to append look and feel components into the web site on request. The OSS 114 may facilitate management of third-party services that may be coupled to the platform through the cloud, accessing a shared storage 106 for retrieving client information, and for accomplishing requests by business management, service management, network management, and the like. In an example, the third-party services may include payment gateway, advertisement engine, email services, ecommerce facilities, and the like. The capabilities of the OSS 114 may facilitate identifying peak traffic and usage for a web hosting client and thereafter, may facilitate initiating actions for handling an increase in peak traffic, such as by increasing the scalability of the service pools, by activating a set of additional servers, or by operating the service pool at higher utilization levels. Further, in an embodiment of the invention, the OSS 114 may be coupled to the load balancer 112. The load balancer 112 may receive requests from the OSS 114 agents that need to be communicated to a particular services pool. Depending on the implementation of the OSS 114, such a request may appear to the load balancer 112 as being received directly from the cloud computing environment.

Further, the OSS 114 may be coupled to business operations 140. The business operations 140 may be further associated with an analytics facility 134 and an affiliate network 138. The business operations 140 may include migration of web service from a traditional platform to the common service architecture 100; monitoring of web traffic, access control, billing, configuration of public and private IP address, bandwidth measurement; and integration of third-party services such as payment gateways and the like. Further, the aggregated data collected from one or more of these services may be analyzed at the analytics facility 134 for assessing the performance of the web hosting platform or one or more services associated with it. Similarly, the affiliate network 138 may be integrated with the business operations 140 for providing advertisement in the web pages and for generating revenues.

The OSS 114 may further be coupled to the analytics facility 134. The analytics facility 134 may provide statistical data about the user traffic analysis. The analysis may include the traffic growth, the source of the traffic, information about viewing pattern and loyalty, popular landing and exiting page, and the like.

The OSS 114 may further be coupled to the affiliate network 138. The affiliate network 138 may act as an intermediary between website publisher and merchants. Affiliate networks may provide links and banners, program sign-up sheets, payment services, and sales tracking. The affiliate network 138 may provide a program in which the publisher of a website may receive a portion of income for generating leads, traffic, or sales to a merchant website. The publisher may sign up for an affiliate program in order to make more money and may do so by placing banner or text links on their website.

Figure 9:
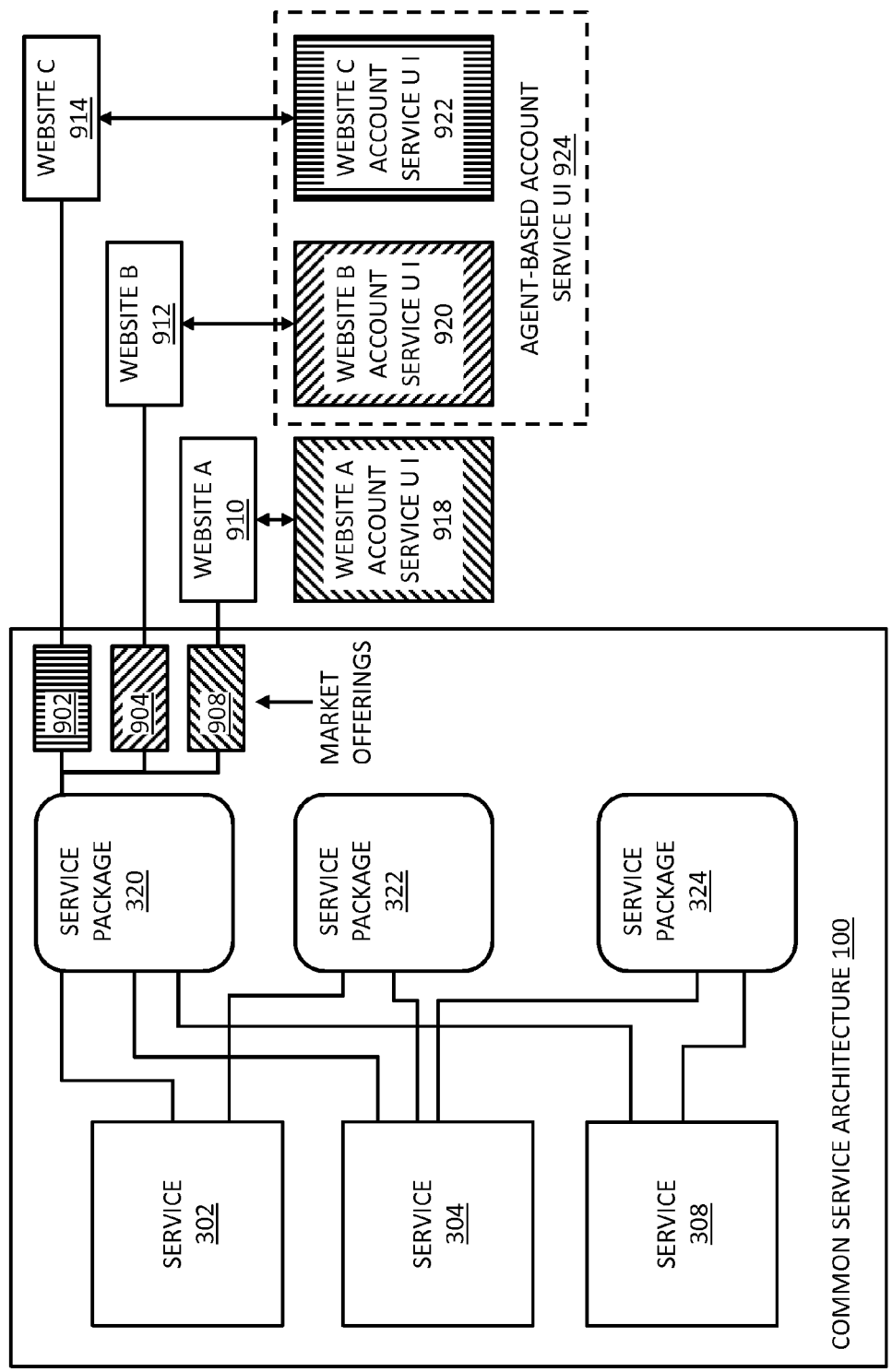
FIG. 9 depicts a schematic block diagram of common service architecture that supports a website hosting service which provides a plurality of services to each of a plurality of unrelated websites.

FIG. 9 illustrates a schematic block diagram of common service architecture 100 that may support a website hosting service which may provide a plurality of services to each of a plurality of unrelated websites. As described in FIG. 3, the plurality of hosting services may include exemplary services such as an HTML service 302, an email service 304, and a chat service 308 for providing HTML, email, and chat services to a plurality of websites. The services may be served to the websites by servers associated with each of the services; the servers may be web servers. Exemplary server functionality may include email servers, Hyper Text Markup Language (HTML) servers, chat servers, File Transfer Protocol (FTP) servers, and the like; however, these are only representative servers and the services may be provided by these or other servers as known in the art. The plurality of websites may include unaffiliated/unrelated websites as depicted in FIG. 9 such as website A 910, website B 912, and website C 914.

Each of the plurality of services may be adapted to contribute to a distinct service package for at least a plurality of unrelated/unaffiliated websites. Exemplary packages of services may include a service package 320, a service package 322, and a service package 324. For example, the service package 320 may package a five email address service and an HTML service. In another example, the service package 322 may package a five hundred email address service, and the service package 324 may package two thousand email address service and a two thousand member chat service. Although each distinct package may be associated with only one website in the embodiment of FIG. 9, a package of services may be subscribed by one or more websites and a website may subscribe to one or more packages of services.

The website hosting service provided by the common service architecture 100 may be marketed through a plurality of marketing sites, such as marketing websites, marketing emails, advertisements, electronic publications, print publications, and the like. The plurality of marketing sites may be different looking, with different terms so as to make it appear to a potential web hosting client that there is a diverse marketplace of web hosting providers to choose from even though the underlying common service architecture 100 may provide the distinct package of services for any of the different looking market specific offerings. The common service architecture 100 may offer different market specific offerings for various packages of services and other features available from the website hosting service. Exemplary market specific offerings may include, but are not limited to, market offering 902, market offering 904, and market offering 908.

A customized presentation for each marketing site may facilitate marketing of the website hosting services provided by the common service architecture 100 through a marketing website that may be intended to suit individual needs (specific look and feel) by drawing user attention to, for example a specific arrangement of elements in the marketing website. The customized presentation may be provided to each marketing site. The skins 120 may or may not process a user's interactions with the websites, but may facilitate provisioning different ways to market the services and/or products using the same underlying common service architecture 100 through the code library. The skins 120 may also facilitate the provision of services such as website management that may enable a client to create a dynamic website, website marketing that may enable a client to generate traffic to the website, e-commerce solutions including credit card processing, shopping carts, and the like that may allow the client to sell items and accept payment, mobile email, and business review services.

The market specific offerings may include different brands for the offerings that may maintain a branded interface (e.g. a look and feel) each time a client may access the web hosting platform features, such as through an account service user interface. Such a branded interface may allow the client to manage his/her web hosting account settings, features, and information in an environment that is consistent with the look and feel of a marketing site through which the web hosting account was initiated. In this way, even when the client is performing account administrative tasks (e.g. updating a mailing address of a web hosting account holder), the client may access his/her account through the same branded appearance that attracted him/her to the web hosting service. Therefore, the multi-branding capabilities supported by the skins 120 and the code library 122 may ensure that a web hosting user may view every accessible aspect of the common service architecture 100 through a consistent and branded interface.

The market specific offerings may include different messages for the offerings. The web hosting platform may provide different messages for different services provided by the web hosting platform. The messages may include advertisements, announcements, and the like, which may be displayed on the websites. The messages may be directed at certain interests, such as fantasy sports, hobbies, political agendas, religious preferences, and the like. These messages may entice a potential web hosting client to consider the market specific offering as a representation of an aspect of the website hosting service that appeals to him/her. A theme associated with such messages may be maintained through the use of skins 120 to generate client account service user interfaces. In this way, the client can access the sophisticated capabilities and features of the common service architecture 100 in message-specific interfaces.

The market specific offerings may include different service terms and conditions for the offerings. Different service terms and conditions may be adjusted based on the client acquisition objective of a market specific offering. Terms for a marketing specific offering focused toward parents of young children may emphasize safe web browsing habits and terms that enforce limitations on access to certain website content; thereby preventing a client who agrees to these terms from posting content on a hosted website that is inappropriate for young children. In another example, terms and conditions for a market specific offering focused toward firearms enthusiasts may require compliance with some of the National Rifleman's Association membership terms.

Even with these different service terms and conditions, the web hosting platform may ask potential web hosting clients to agree to a few terms and conditions such as prohibiting online gambling, unsolicited e-mailing, and the like. In an example, the web hosting platform may strongly react to any use or attempted use of an Internet account or computer without the owner's authorization. The web hosting platform may suspend or cancel a client's access to any or all services that may be provided by the web hosting platform when it is found that the account has been inappropriately used. For example, if a web hosting client indulges in online gambling, unsolicited e-mailing, copyright infringement activities, and the like, the services provided to such a customer may be terminated by the web hosting platform. The customers may have the right to the content provided by them.

The web hosting platform may provide different pricing structures for the different market specific offerings. The web hosting platform may provide a variety of service packages via the skins 120 and the code library 122 that may provide access to various portions of the full range of adapted services available through the common service architecture 100 at various prices. The web hosting websites may represent differentiated packages of services provided by the web hosting platform. For example, the web hosting platform 100 may market different pricing structures for a service to a student than for the same or similar service targeted to a company IT manager.

In the example of FIG. 9, the different market offerings may include one or more distinct service packages. For example, the market offerings 902, 904, and 908 may include the service package 320. The market offerings 902, 904, and 908 may offer these one or more service packages to the plurality of unrelated/unaffiliated websites such as website A 910, website B 912, and website C 914. The plurality of unrelated/unaffiliated websites may be configured with agent-based accounts. The plurality of unrelated/unaffiliated websites may provide the different market offerings to the agent-based accounts through a plurality of account service user interfaces such as account service user interface 918, account service user interface 920, and account service user interface 922. In an example, the websites such as website B 912 and website C 914 may be associated with an agent-based account user interface 924. The agent-based accounts initiated through a particular market specific offering may be maintained under a consistent look and feel associated with the particular market specific offering when presenting account service user interfaces such as 918, 920, and 922.

Figure 10:
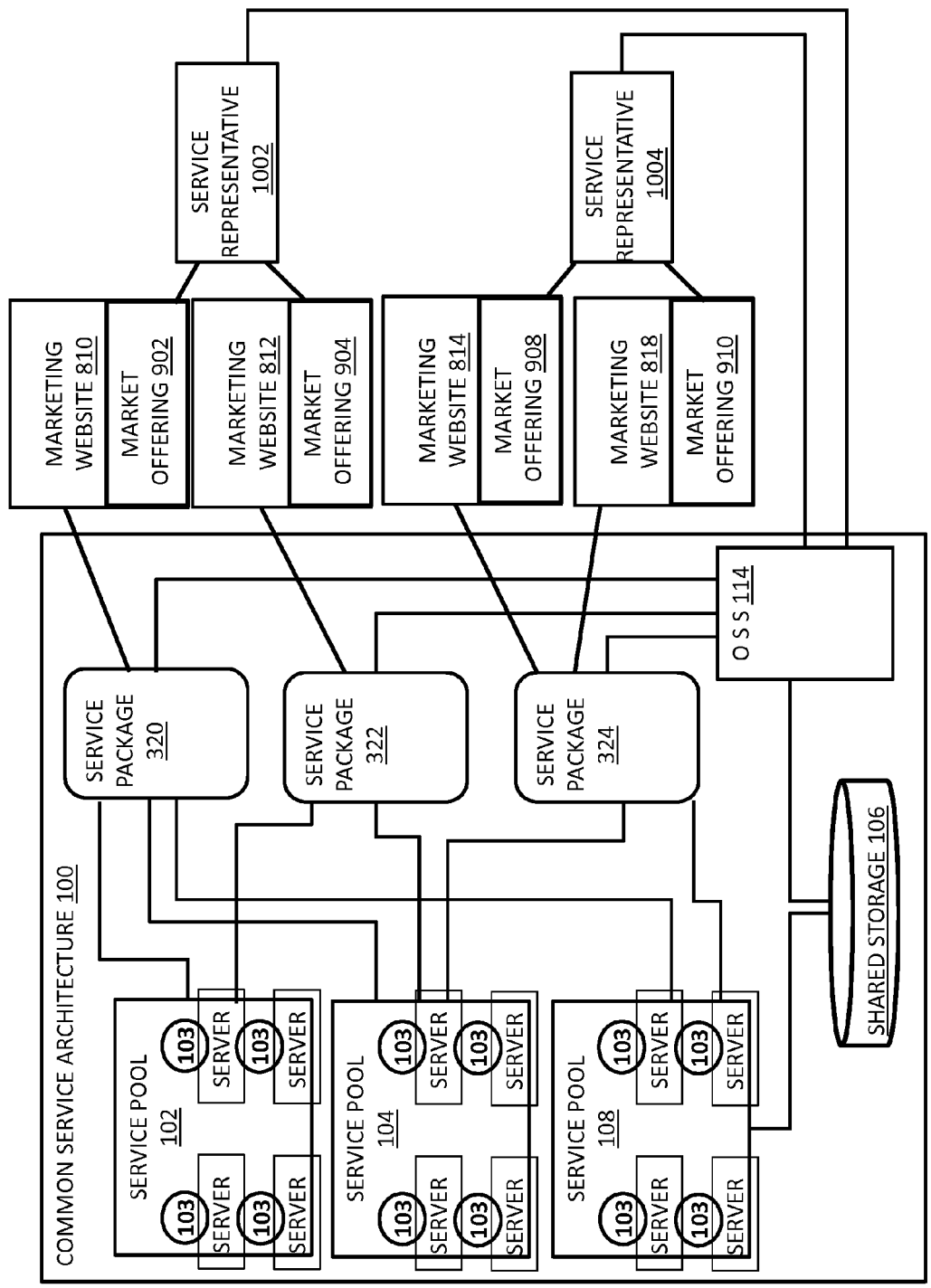

Referring to FIG. 10 a service representative 1002 may need to provide support to a client for a particular client hosting account. Agents may interact with a wide variety of clients, necessitating access to the market-specific offering associated with a particular client to address website hosting account questions and support needs. To ensure that the branding associated with each market specific offering may be carried through to interactions between the client and a platform agent, the agent is provided with information that facilitates providing the appropriate service for the market specific offering associated with the client. This may ensure that the messages, look-and-feel, terms, and pricing structures associated with the market specific offering linked to the client website hosting account may be made visible to the agent when either is accessing the client website hosting account, such as for service purposes. While the client may always access the common service architecture 100 through the market-specific offering based service user interface, an agent may be presented with both the market-specific offering user interface to view the same information as the client and with a more generalized user interface that allows the agent to view other market specific offerings, other service packages, and other services of the common service architecture. The operational support system (OSS) 114 of the present invention may further facilitate an agent presenting new or different services or packages of services to the client through his/her market specific offering by ensuring that the agent has access to information that facilitates providing the appropriate service.

FIG. 10 further illustrates a schematic block diagram of a common service architecture 100 that may support a website hosting service. The web hosting service may provide a plurality of distinct services to a plurality of websites, such as website 310, website 312, and website 314. The websites may be unrelated or unaffiliated. In the example of FIG. 10, the services may include exemplary services such as an HTML service 302, an email service 304, and a chat service 308 for providing HTML, email, and chat services to one or more plurality of websites.

Further, each of the services may be adapted to contribute to a distinct package of services for at least a plurality of websites. The distinct package of services may include exemplary service packages, such as service package 320, service package 322, and service package 324. Various services may be adapted for use in the websites. For example, the HTML service 302, the email service 304, and the chat service 308 may be adapted for contributing the packages of services to the websites. Differentiated services may be dedicated for the website.

The web hosting service may be marketed through one or more marketing websites. At least a plurality of marketing websites, which may include exemplary marketing websites, such as marketing website 810, marketing website 812, marketing website 814, and marketing website 818, may describe different market specific offerings for the packages of services. Each one of the plurality of marketing websites may offer a plurality of market specific offerings. The plurality of market specific offerings may include exemplary market offerings, such as market offerings 902, market offering 904, market offering 908, and market offering 910.

Further, service representatives supporting a plurality of different market specific offerings may be provided with information facilitating providing an appropriate service for a particular market specific offering. Exemplary service representatives include a service representative 1002 and a service representative 1004. In an example, the information provided to the service representatives may be obtained from the OSS 114. The information provided to the OSS 114 may be associated with a service package. The service package may include metadata that may be available to a service representative through a user interface and may help the service representative to determine what portion of the services in the service package is associated with the market specific offering. The services required by each of the websites may vary based on the type and/or intent of the website.

Further, the OSS 114 may receive information from more than one service packages. For example, the OSS 114 may receive information from the service package 322 and the service package 324. The service representatives may serve more than one market offering such as the market offering 1004 may serve the market offering 908 as well as the website 910.

Figure 11:
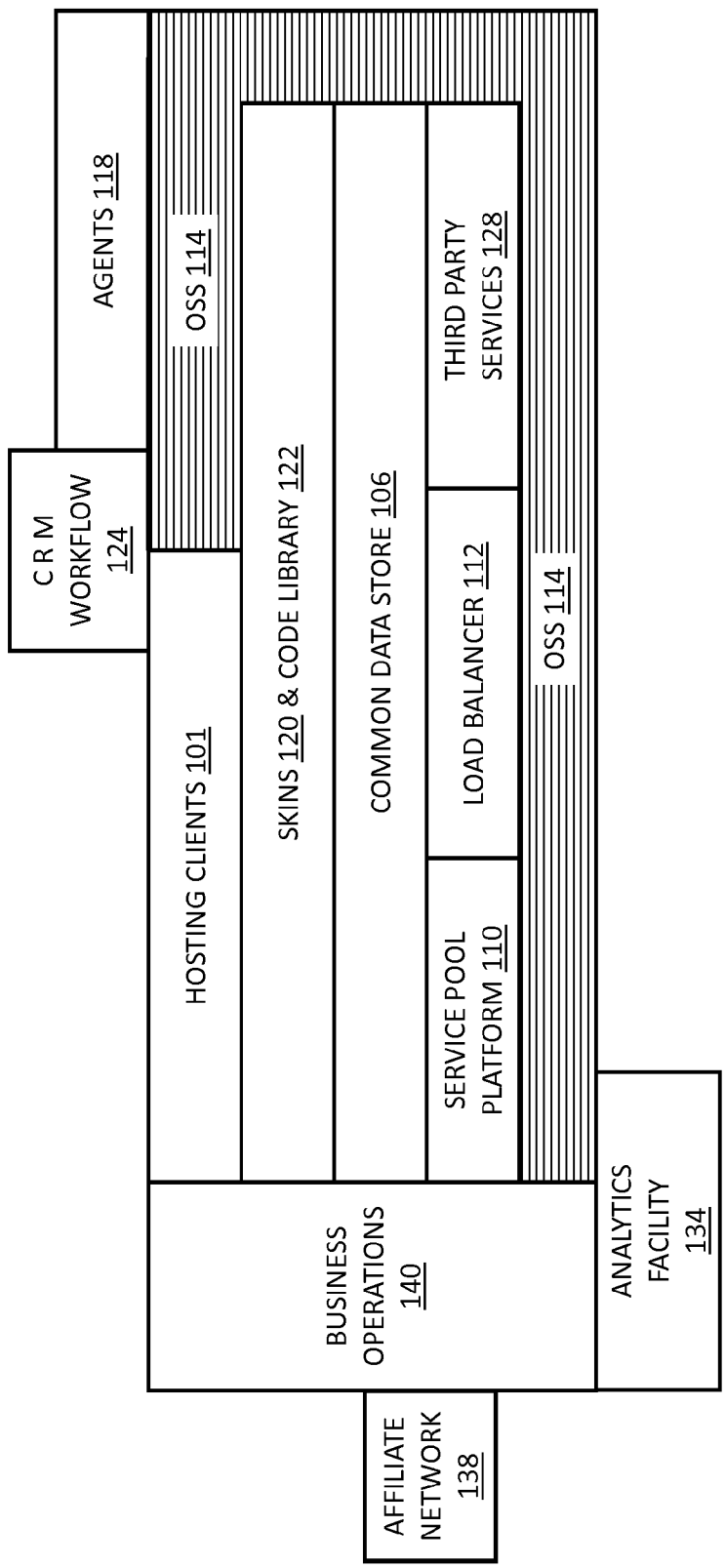
FIG. 11 depicts a schematic block diagram of a customer relationship management (CRM) system for accessing data for client and agent interactions.

FIG. 11 illustrates a schematic block diagram of the embodiment of FIG. 2 in which a customer relationship management (CRM) system also referred as 'Operational Support System 114' or 'OSS 114' may enable access to data for client and agent interactions with any component of an unaffiliated web domain hosting, such as the common service architecture 100 described herein.

As illustrated in FIG. 11, the OSS 114 may facilitate access to data associated with connect to all aspects of the web hosting architecture as an interface or interaction facilitation layer. Through this comprehensive association at the client level, affiliate level, business operation level, physical server pool, and data storage level, agents 118 may provide client support while confidentially accessing any aspect of the web hosting platform. A client 101 who may have a support question about data security may be serviced by an agent 118 who can access the common data store 106 similarly to a database manager in order to check database security features and settings for both the physical data storage and the logical data storage associated with the client. Therefore, the OSS 114 may allow the agents 118 to access secure and non-secure aspects of the web hosting platform.

Further, the OSS 114 may allow the agents 118 to access the web hosting platform like hosting clients 101 to allow the agents 118 to experience the web hosting platform just as the client experiences it. However, the OSS 114 may also allow the agents 118 to access the web hosting platform independent of client-specific views or limitations to broadly provide services across each element of the web hosting platform 100.

The OSS 114 may facilitate management of third-party services 128 that may be coupled to the web hosting platform, such as through a cloud networking environment. The OSS 114 may enable access to third party services, third-party service data, third-party support interfaces, and the like that may facilitate an agent 118 of the web hosting platform 100 in addressing client 101 problem with a third-party service.

By enabling data access for any component of the platform 100, the OSS 114 may facilitate management of the platform 100, such as by providing data that may be useful in identifying peak traffic and usage for a web hosting client and thereafter, may facilitate initiating actions for handling an increase in peak traffic, such as increasing the scalability of the service pools, activating a set of additional servers, or operating the service pool at higher utilization levels.

The OSS 114 may be coupled to any facility of the web hosting architecture including, for example, a load balancing facility 112. The load balancing facility 112 may receive requests from the agents 118 that may need to be communicated to a particular services pool.

The OSS 114 may also be coupled to the business operations facility 140. The business operations facility 140 may facilitate migration of web service from a traditional platform to the new architecture; monitoring web traffic, access control, billing, configuration of public and private IP address, bandwidth measurement; and integration of third-party services 128, such as payment gateways, overall operation and optimization of service offerings, and the like.

The OSS 114 may allow the agents 118 to provide functionality, including client relational management, client messaging, client ticketing, client dashboard for reporting, and operational management, billing, and the like. The OSS 114 may include features and capabilities that facilitate business management, service management, network management, and the like. As described herein and elsewhere, the business management features associated with the OSS 114 may facilitate providing operational information to operational staff associated with new hosting platform. This may include information related to clients, hosting plans, current status, and the like. Likewise, OSS-based business management features may include applications related to calendaring, collaboration, billing, administration, and the like for managing the business and other services associated with the client.

The affiliate network 138 may act as an intermediary between website publisher and merchants. Affiliate networks may provide links and banners, program sign-up sheets, payment services, and sales tracking. The affiliate network 138 may provide a program in which the publisher of a website may receive a portion of income for generating leads, traffic, or sales to a merchant website. The publisher may sign up for an affiliate program in order to make more money and may do so by placing banner or text links on the website.

Figure 12:
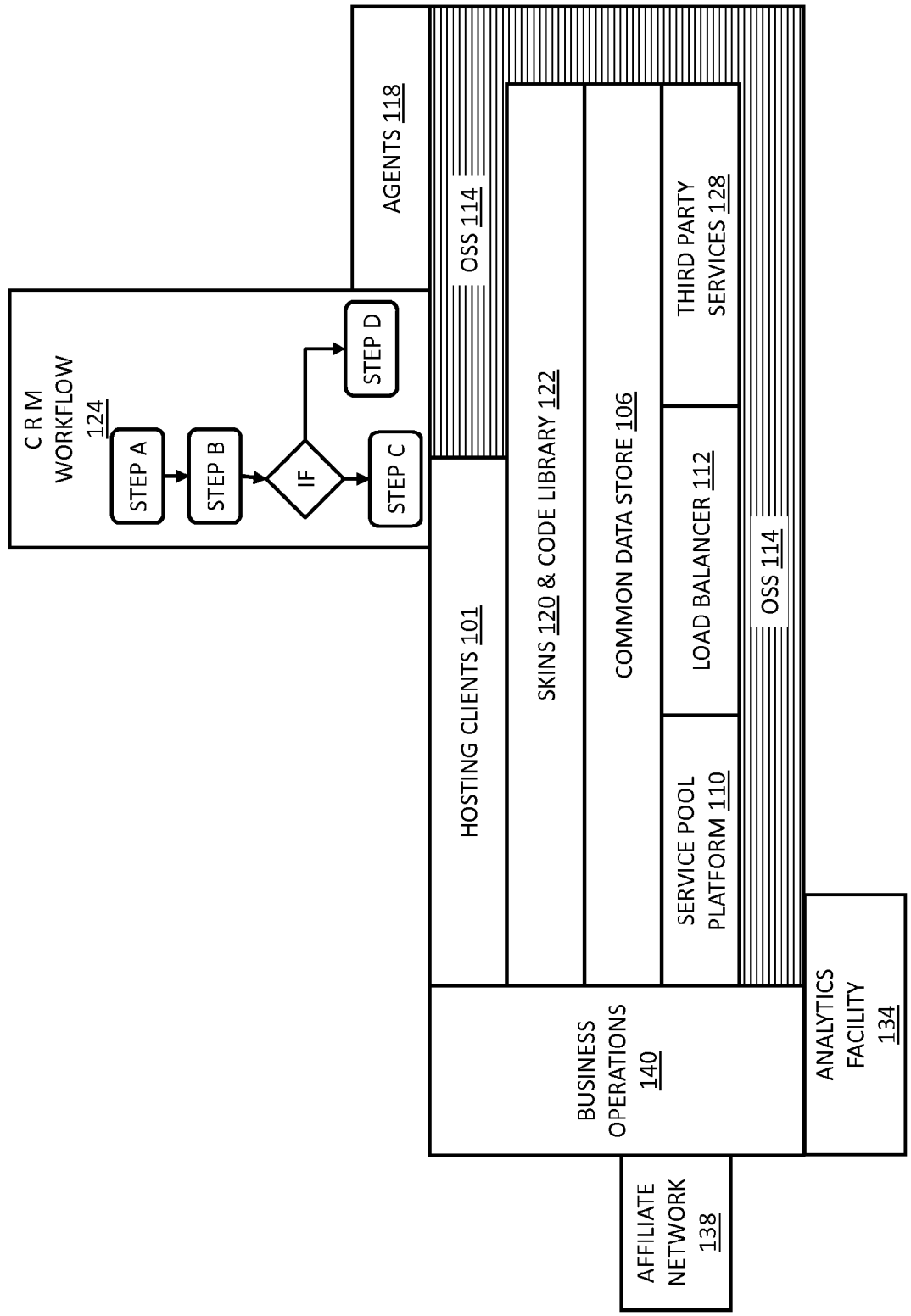
FIG. 12 depicts a schematic block diagram of the CRM system of FIG. 11 that is configured to facilitate handling a client problem.

FIG. 12 illustrates a schematic block diagram of an alternate embodiment of the invention of FIG. 11 in which a CRM workflow 124 is configured with the OSS 114 to facilitate handling a client problem. As noted for FIG. 11, the OSS 114 may enable access to data for client and agent interactions with any component of the unaffiliated web domain hosting.

The OSS 114 may be connected to the CRM workflow 124 and the client information aggregated at the CRM workflow 124 may be analyzed by the OSS 114 for creating better client management metrics. In this aspect, various services associated with OSS 114, such as business management, network management, service management, and the like may be utilized alone or in combination with the CRM workflow 124 for better client management. Further, the OSS 114 may be integrated to include the CRM workflow 124 for better coordination and management of customers. Reseller and other intermediaries in the value chain may also be managed through the CRM workflow 124. For example, a service ticket related to a Reseller may be processed at higher priority than a service ticket for one of the web hosting platform clients. In another example, a service ticket generated for the Reseller may be processed at a specified service location that may have local training specific to supporting Resellers.

Further, the client/agent interactions in the CRM system may be organized in a workflow for handling a client problem. The workflow may be a ticketing workflow. The OSS 114 may include a ticketing system for solving client problems. The client problems may be related to, but not limited by, web services, queries, product inquiries, and billing inquiries. For example, referring to the CRM workflow 124, a client or agent may initiate an inquiry at step A of the ticketing workflow. The inquiry may be initiated via telephone, e-mail, chat, SMS message, instant message, and the like. The inquiry entered by the client or agent may be queued up for processing, categorized according to type of ticket, and forwarded to the ticketing facility for processing. In another scenario, the client or agent may be connected to the Internet through a mobile device and may submit a ticket through short message service (SMS). The OSS 114 may implement an SMS processing facility for catering to an inquiry submitted via SMS. The inquiry may be converted into a universal format for processing. Thus, the OSS 114 may provide a format conversion facility for converting an inquiry to a universal format such as XML or plain text for processing by the ticketing facility.

In response to the inquiry, at step B, the ticketing system may allow a customer service representative to respond to the inquiry by any of e-mail, telephone, chat, and a client's control panel. The ticketing system may allow a customer service representative to respond through a communication means that may be the same or different from the means used by the client or agent to initiate the inquiry. Alternatively, the ticketing facility may include a response facility for providing a response to a client or agent who submits an inquiry. The response may be automated to support heterogeneous group of devices, including (but not limited to) mobile devices, e-mail, voicemails, SMS, and the like. In one implementation, the response may be in a universal format. The universal format may facilitate the conversion to a format that can be rendered on a device from which the inquiry was sent. Thus, the ticketing facility may identify the format of the inquiry and may reply to it in the received format. Therefore, multiple devices can be integrated into the ticketing facility to provide flexibility and scalability to the client or the agent.

If the customer service representative is unable to answer the client inquiry, the ticketing system may provide a means for escalating an inquiry to a supervisor at step D. In another scenario, if the client or the agent is unable to get solution to an inquiry made to the automated system, the ticketing system may send the inquiry to a customer service representative at step D. The ticketing system workflow may get terminated at step C, if the customer service representative satisfactorily answers the client query. In addition, the ticketing system may allow a supervisor to identify competencies of a customer service representative by monitoring past performance. The supervisor may use the ticketing system to identify competencies of customer service representatives for specific kinds of inquiries. The ticketing system may also provide the supervisor a means to determine how a customer service representative is assigned the next inquiry.

Figure 13:
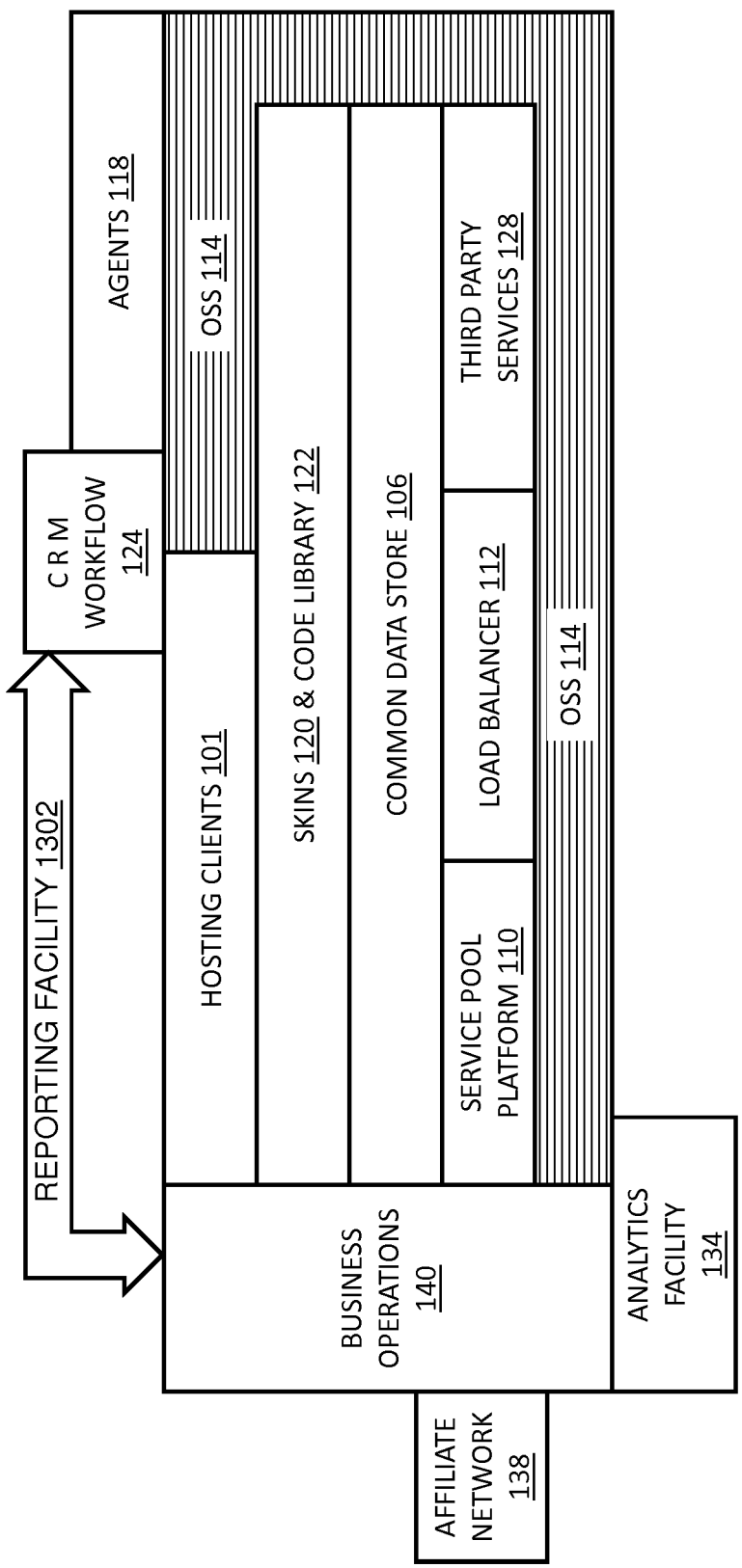
FIG. 13 depicts a schematic block diagram of the CRM system of FIG. 11 that includes a reporting facility.

FIG. 13 illustrates a schematic block diagram of an alternate embodiment of the embodiment shown and described with respect to FIG. 11 that includes a website hosting platform including a CRM system or an Operational support system 114 ('OSS 114') with a reporting facility 1302. As described herein, the OSS 114 may enable access to any element of the website hosting platform during client/agent interactions with any component of the unaffiliated web hosting platform. In addition to the features and capabilities associated with embodiments in FIGS. 11 and 12, the embodiment of FIG. 13 may include a reporting facility 1302 that may provide various reports that may be relevant to a business function of the platform. Reports from the reporting facility 1302 may be routed to the business operations facility 140, such as financial reports, and the like.

The OSS 114 may include a CRM facility, a client messaging facility, a client ticketing system, a reporting and operational management dashboard facility, a billing system, a scaled down console for partners, and the like. Although these facilities may not be directly integrated with the client 101 interface, an administrator or agent 118 may access these services to accomplish tasks related to customer services that have been pending or require immediate attention. The reporting facility 1302 may automatically, periodically, manually, or any combination thereof, capture agent access to these services and report them.

Combining the OSS 114 with the reporting facility 1302 may facilitate transcending traditional reporting technology by incorporating billing, usage, traffic, web hosting platform performance and utilization, and other items in a reporting dashboard. Such combining of features may help to reduce web hosting costs, identify future business needs, better serve a client, and the like.

A client support front end for the OSS 114 may be integrated with the reporting facility 1302 to generate customized messages and/or reports on behalf of the client. The reporting facility 1302 associated with the OSS 114 may utilize off the shelf reporting tools, customized reporting tools, or an open database connectivity (ODBC) connection to generate custom reports or web pages without the need for one-off databases. The reporting facility 1302 may be a part of a business management or service management capability of the common service architecture 100.

A variety of services may be offered by the common service architecture 100 web hosting platform. While many services being provided may be native to the web hosting platform, there may be others that are available to web hosting clients and clients' clients from third parties. Using third parties may allow the web hosting platform to readily expand the type and number of services offered without taking on a large product development program. This may facilitate making some services available through the platform sooner than if developed as native to the platform. The third-party services 128 may be provided by a wide range of vendors and may cover important service areas such as commerce, communication, marketing, website management, and the like.

The third-party services 128 may be associated with the web hosting platform of the common service architecture 100 through a variety of interfaces, including through the load balancer 112, and the like. The platform may alternatively include a third-party service facility for providing interface with, management of, and access to the third-party services 128. In an example the load balancer 112 may be associated with a third-party service facility that may operate on one or more of the service pools. One feature of the third-party service facility may allow a web hosting service provider to offer a service provided by a third-party to a web hosting client or to the web hosting client's client. The services provided by a third-party may be accessible to the client through a web hosting control panel. The services provided by a third-party may be integrated with or simply accessible through the web hosting platform. An integrated service provided by a third-party may be connected to the web hosting system by an API. A third-party service may be integrated with web hosting client's websites through a plug-in capability that may allow a web hosting client to simply identify a selected third-party service to the platform and third-party integration software operating on the platform may configure an interface through which the web hosting client's clients may access the third-party service. Alternatively, a third-party service may operate independently of the web hosting platform and access to the third-party service (e.g. by a web hosting client) may be done through accessing a URL that navigates out of the web hosting platform domain to the third-party domain. The web hosting platform may be configured with third-party services interfaces that accept a plugin (similar to a plug-in for providing additional functionality to an email program or a web browser) provided by the third-party that seamlessly makes the third-party services accessible to web hosting clients and their users. It is envisioned that a web hosting client may be able to select a third-party service by comparing the third-party services 128 based on a number of criteria including, but not limited by type of service, cost, desired outcome, brand of service, and the like.

Third-party service providers may desire to engage web hosting platform clients so as to establish a business relationship with the client. This may be beneficial for the client, the third-party and a facilitator of the web hosting platform. While some of the third-party services 128 may be offered at no direct cost to the web hosting platform clients, there may be opportunities for the web hosting platform facilitator to derive revenue from a service provided by a third-party. The revenue may indeed be derived from the client or it may be paid by the third-party, such as from revenues derived by the third-party from other clients of the service, advertisers, and the like. In an embodiment where revenue is generated from the third-party, the revenue may be a flat fee, a periodic fee, a fee based on a number of the web hosting platform clients that use the service, a percentage of the third-party revenue from their use, a referral fee, and the like. In a case where revenue is generated from a client, the revenue may be a one-time charge, a periodic charge, a percentage of sales, and the like.

The web hosting service provider may provide an incentive for a client to use a service provided by a third-party. Such an incentive may include a free trial, a credit, a discount, a promotional term, and the like. Alternatively, the web hosting service provider may include a service provided by a third-party free of charge. The web hosting service provider may offer to supplement the free service with an additional component. The web hosting service provider may generate revenue from a client agreeing to the additional component. The web hosting service provider may provide maintenance service for a service provided by a third-party. The web hosting service provider may generate revenue from the maintenance service by charging a one-time maintenance fee, a periodic maintenance fee, a fee based on actual maintenance services provided, and the like.

The web hosting service provider may rebrand a service provided by a third-party to maintain uniform look and feel for a client. A client may choose a service from among a plurality of substantially identical services which may be differently branded.

The third-party service facility may allow collaboration between the web hosting service provider and a plurality of third-party service providers. A web hosting service provider may compile a list of approved third-party service providers. The list of approved service providers may be stored in the shared storage 106. The web hosting service provider and the third-party service provider may engage in a partnership. The partnership may include an arrangement of sharing revenue, a combined marketing strategy, a complimentary service, and the like. The third-party partnership may be based on various factors such as competency in a specific technology area, competitive advantage in a particular process, strategic organizational goal, and the like.

The web hosting platform may provide opportunities for its clients to commercialize their web hosting content and web pages. Such commercialization may include providing tools for performing transactions directly with a client's users, collecting fees from advertisers, and the like. Such capabilities may be provided by third-parties through a commerce service that may be accessed through a third-party service facility as described herein. A third-party commerce service may include a means for a web hosting client to accomplish a sale transaction with its clients. The sale transaction may be one of a real-time transaction, a delayed transaction, an off-line transaction, and the like. The commerce service may include a means to allow a web hosting client's clients to select an item, a quantity of an item, a delivery method, a payment method, and the like. The item may be one of several type of item, including a product and a service. The quantity of an item may vary based on type of item, availability of item, and the like. The delivery method may also vary based on type of item, and may include instant (online) delivery, shipping, personal, and the like. The web hosting client's clients may be able to enter a relevant address for the sale transaction, which may include a billing address, a shipping address, and the like. The payment method may also vary based on type of item, and may include credit card, check, wire transfer, online payment, gift card, and the like.

A third-party commerce service may include a shopping cart application. The shopping cart application may be one of an open source application, a commercial application, and the like. The web hosting service provider may offer different levels of the shopping cart application. The different levels of shopping cart application may include a free starter version and one or more upgraded versions. The web hosting provider may derive revenue from an integration of a shopping cart with the client's website, a sale of an upgraded version of the shopping cart for use with the client's website, a software update for the shopping cart, a sale of additional features of the shopping cart, and the like.

The shopping cart application may be a freely-available application. The web hosting provider may be able to derive revenue from an integration of the freely-available shopping cart application with its hosting environment.

A third-party commerce service may provide a merchant account facility. A merchant account is a type of bank account that allows a business to accept a payment from a customer by a debit or credit card. The merchant account also serves as an agreement between a retailer, a merchant bank and payment processor for the settlement of a credit and/or debit card transaction. The merchant account facility may permit the web hosting service provider to allow a client a means to gather purchase information from a client's client. The merchant account facility may process the purchase information or may refer the information to a third-party for processing. The web hosting service provider may generate revenue from the merchant account facility. The revenue may be based on one of a flat fee, a percentage of a sale, and the like. Alternatively, the payment method included with the commerce service may include an online payment. The online payment may include a payment system such as PayPal, an escrow system, and the like. A client's user may use an online payment to pay for a purchase made from a client's website. The web hosting service provider may receive a payment based on price of item sold, volume of sale, periodic flat fee, and the like.

A third-party service may include facilitating various type payments for electronic transactions, such as a gift card. A client may issue a gift card through a third-party which would allow a gift card holder to make a purchase from the client for up to the amount of the gift card. The gift card may be one or more of electronic, paper, and the like. The web hosting service provider may receive payment when a client issues a gift card, when a client's user uses a gift card, and the like. The web hosting service provider may receive a payment based on amount of each gift card, number of gift cards issued, number of gift cards redeemed, periodic flat fee, and the like.

The commerce service may allow a client to sell third-party inventory on its web site. A client may sell third-party inventory to supplement the client's own catalog.

A third-party commerce service may include providing security for transactions conducted through web sites hosted by the web hosting platform. The security features may allow a client's user to shop from a client's website with a degree of confidence. The security provided may include one or more of a security certificate, a security rating, an ecommerce approval, and the like.

Communication, particularly electronic communication is critical to gaining the greatest benefit from hosted web services, and for building a successful web presence. Therefore, the web hosting platform may ensure that communication features and services are readily available to web hosting clients. While the platform may provide various communication services directly, there are many third-party communication services that may provide capabilities that go beyond those of the platform provided communication services. Therefore, the platform may provide a variety of third-party communication services. In order to fulfill a customer's communication need, the communication service may include a server for email, calendar, contact list, VOIP, and the like. The communication service may provide more than one level of communication service. Different levels of communication service may be provided depending on cost, client need, size of client's organization, type of service desired, type of technology utilized, and the like. The web hosting service provider may integrate the communication service into the hosting environment. The web hosting service provider may provide access to a third-party communication service that is not integrated with the web hosting platform. The web hosting service provider may generate revenue from a client's use of the communication service by billing either the client or the third-party service provider. The revenue may be generated by charging a periodic fee for access, by charging on a volume of use basis, by charging a provider a per-client fee, and the like. In an example of a communication service a client may access an email server or client software, such as an EXCHANGE server or the like. The EXCHANGE server may provide a client with advanced features, such as managing email, calendar, contact list, and the like. Such a communication service may provide access to collaboration features of email client programs, such as OUTLOOK and OUTLOOK WEB ACCESS to facilitate a client securely sharing information.

A third-party communication service associated with the web hosting platform may include mobile access. Mobile access may allow a client to access the aspects of the web hosting platform, such as operational support services from a wireless device. A wireless device may include a cellular telephone, a smartphone, a personal data assistant (PDA), and the like. Mobile access may include BLACKBERRY service, ACTIVESYNC service, GOODLINK service, and the like.

The web hosting platform may be associated with a third-party service capability that may include a domain service. The domain service may provide a client the ability to manage a domain, register a domain, mask domain registration information, park a domain, and the like. The support and/or billing for the domain service may be provided by the web hosting service provider, by a third-party, and the like.

In a case, when a client uses the domain service to park a domain, an advertisement may be displayed in an end client's web browser when the parked domain is accessed. The advertisement displayed may be related to the parked domain, a search word used to find the parked domain, a general demographic, and the like. The client owner of the parked domain may influence which advertisements are presented. In exchange for facilitating parking the domain, the web hosting service provider may receive a percentage of the revenue when a client clicks on the advertisement that is presented.

The web hosting platform may be associated with a third-party service that may include a marketing service. Such a marketing service may include a web directory listing, an advertising platform, an email marketing system, a website rating system, a customizable toolbar, and the like. The web directory listing service may provide a means to improve a client website's rank among results in a search engine. An improvement in the rank may be produced through purchase of a higher rank, optimization of a client's website that results in a higher rank, and the like. The web directory listing may be customized by website type, client's user demographics, intended market, and the like. The advertising platform may include a pay-per-click marketing campaign, YAHOO search, GOOGLE ADWORDS, and the like. The email marketing system may allow a client to create and send a newsletter, offer, announcement, promotion, and the like to his/her client. A client may use the email marketing system to communicate with his/her client to generate, maintain, enhance, and the like a relationship with the client. A relationship with a web hosting client's client may include a friendship, a professional relationship, and the like. The web hosting client may use the email marketing system to build and manage an e-mail list. A web hosting client may use the email marketing system to initiate, monitor, continue, suspend, and the like an e-mail campaign. The marketing service may allow a web hosting client to import a target audience list from a database.

The marketing service may include a design service. The design service may include logo design, website design, promotional material design, newsletter design, and the like.

The third-party services 128 provided by the web hosting platform may include a website management service. Such a website management service may include website design, creation, maintenance, backup, recovery, and the like. Website design may include a range of design services, including complete design, predefined template, drag-and-drop design facility, and the like. The website maintenance facility may include an optimization service which may recommend localization of certain services for optimized load times thereof. The website maintenance facility may scan the website to prevent an attack by malware, and the like.

The third-party services 128 provided by the web hosting platform may be produced with a wide variety of programming tools and may be implemented in a variety of programming languages, including various combinations to provide the various services (e.g. HTML, FLASH, and the like for web browser display integration). The third-party services 128 may be based on open-source software, off the shelf modules, fully customized software, a combination thereof, and the like.

Figure 14:
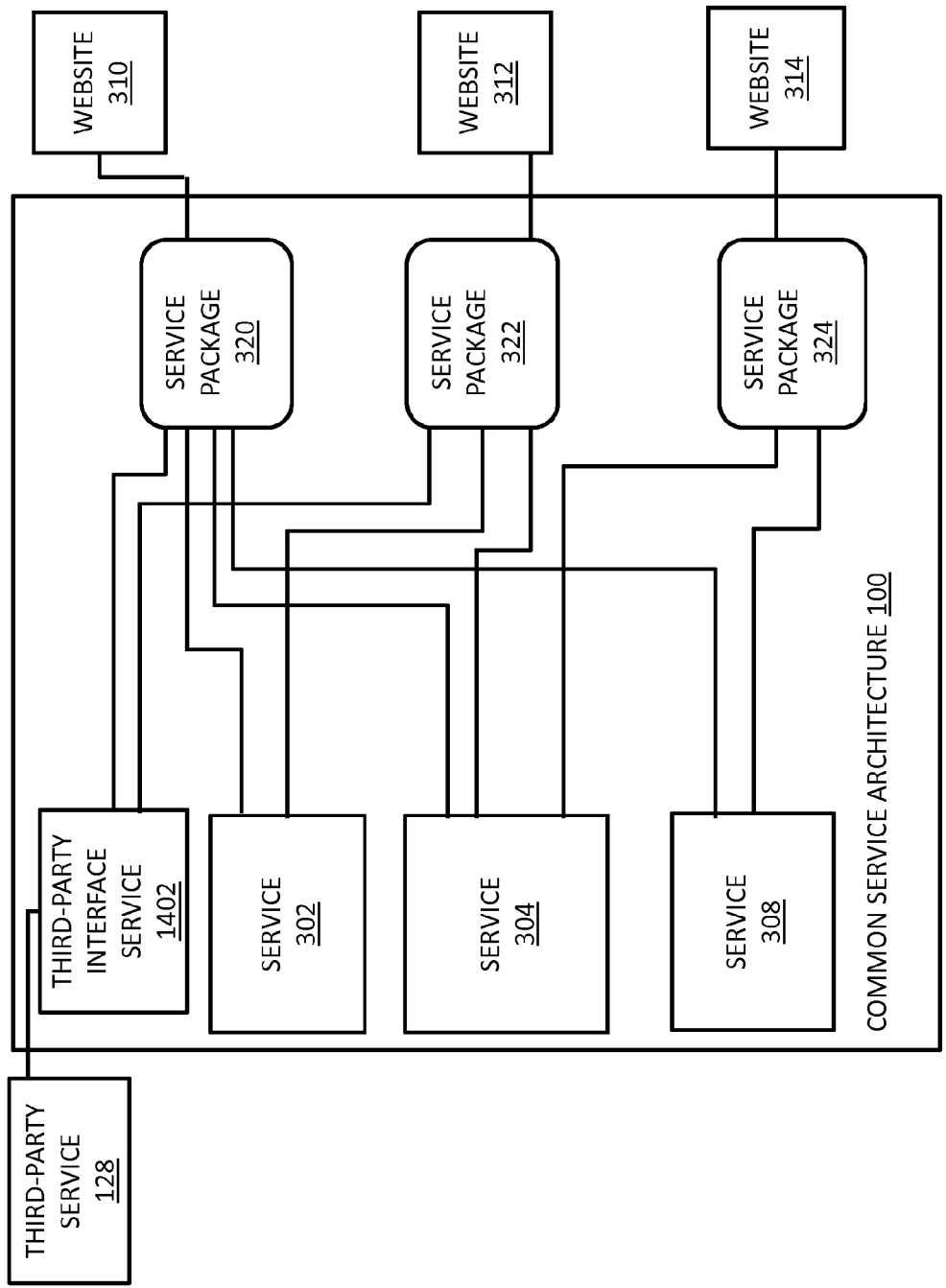
FIG. 14 depicts a schematic block diagram of a common service architecture for offering a third party service to a plurality of websites.

FIG. 14 illustrates a schematic block diagram of a common service architecture 100 capable of offering a third party service 128 to a plurality of websites. The common service architecture 100 may offer a plurality of services such as an HTML service, an email service, a chat service, and the like, to the websites. Exemplary websites may include a student owned website 310, a small business website 312, and a corporate intranet website 314. One or more of the plurality of services may be adapted to contribute to a distinct service package for the websites, which may be unrelated or unaffiliated. Further, one or more services may serve a third party interface 1402 that may be capable of allowing a third party to access the distinct service package subscribed by the website using the third party service 128. Alternatively, the third party interface 1402 that may facilitate allowing web hosting client or user of a hosted website to access the third party service as a component of a distinct service package that is offered to the website. A third party, a web hosting client, or a user of a hosted website may experience information consistent with a market specific service offering associated with the distinct service package, the hosted website, or any combination thereof.

Third party services 128 may be marketed in association with the common service architecture 100 in a plurality of market specific service offerings, such as through a market specific service offering website. Access to a third party service via the common service architecture 100 may facilitate providing information associated with the third-party service so that it appears to be consistent with a market-specific service offering, such as a market specific marketing website. A client of the common service architecture 100 may access the services of the architecture through a market specific interface that may be enabled by the skins 120 and the code library 122. The client and/or a user of a hosted website may access the third party services through the same market specific interface.

Many services provided to the websites may be native to the common service architecture 100 and there may be other services such as third party services that may be made available to web hosting clients and users of the hosted websites. Employing services offered by third parties may allow the common service architecture 100 to readily expand the type and number of services offered by the web hosting platform without taking on a large product development program for developing these services. This may facilitate making some services available through the common service architecture 100 sooner than if developed as native to the common service architecture 100. As mentioned, the web hosting platform may offer specific services for use by the third parties in a distinct service package. The service package may addresses specific needs, preferences, contractual requirements, subscription policies, and the like of a hosted website. The third-party services may be provided by a wide range of vendors and may include exemplary services such as commerce, communication, marketing, website management, and the like.

The third-party services such as the third party service 128 may be associated with the common service architecture 100 through a variety of interfaces, such as a third party interface 1402. The common service architecture 100 may alternatively include a third party service facility for providing the third party interface 1402 with management of, and access to the third-party service 128. One feature of the third party service facility may allow a web hosting service provider to offer a service provided by a third-party to a web hosting client or users of the web hosting client. The services provided by a third-party may be accessible to the client through the client's web hosting control panel. The services provided by the third-party may be integrated with or simply accessible through the common service architecture 100.

An integrated service provided by the third-party may be connected to the common service architecture 100 by an application programming interface (API). Further, the third party service 128 may be integrated with hosted websites using the third party service 128 through a plug-in capability. The plug-in capability may allow a web hosting client to link a selected third party service to a distinct service package offered by the web hosting platform. Third party integration software operating on the common service architecture 100 may configure an interface through which the web hosting clients and/or users of a hosted website may access the third party service 128.

Alternatively, the third party service 128 may operate independently of the common service architecture 100 and access to the third party service 128 (e.g. by a user of a website or by a client hosting the website) may be done by accessing a URL that navigates out of the common service architecture 100 domain to the third party domain. The common service architecture 100 may be configured with a third-party service interface 1402 that may accept a plug-in (e.g. similar to a plug-in for providing additional functionality to an email program or a web browser) provided by the third-party. The plug-in may seamlessly make the third party service 128 accessible to clients hosting their websites and the hosted website users.

A client hosting a website may be able to select a third party service by comparing the third party services offered by the common service architecture 100 based on a number of criteria including, but not limited by type of service, cost, desired outcome, brand of service, and the like.

Third party service providers may desire to engage the web hosting platform clients so as to establish a business relationship with the client. This may be beneficial for the client, the third-party, and a facilitator of the common service architecture 100. In an example, there may be opportunities for the web hosting platform facilitator to derive revenue from a service provided by a third party. The revenue may be derived from the client or it may be paid by the third party, such as from revenues derived by the third party from other users of the service, advertisers, and the like.

When revenue is generated from the third party, the revenue may be a flat fee, a periodic fee, a fee based on the number of the clients that use the third party service 128 in their website, a percentage of the third-party revenue from their use, a referral fee, and the like. When the revenue is generated from a client, the revenue may be a one-time charge, a periodic charge, a percentage of sales, and the like.

The web hosting service provider may provide an incentive for a client to use a service provided by a third-party. Such an incentive may include a free trial, a credit, a discount, a promotional term, and the like. The web hosting service provider may include a service provided by a third party on a website, free of charge. Further, the web hosting service provider may offer to supplement the free service with an additional component. The web hosting service provider may generate revenue from a client agreeing to the additional component. The web hosting service provider may provide maintenance service for a service provided by a third-party. The web hosting service provider may generate revenue from the maintenance service by charging a one-time maintenance fee, a periodic maintenance fee, a fee based on actual maintenance services provided, and the like.

The web hosting service provider may also rebrand a service provided by a third-party to maintain uniform a look and feel of the third party service 128 for a client. A client hosting a website may choose a service from among a plurality of substantially identical services, which may be differently branded.

The third party service facility may allow collaboration between the web hosting service provider and a plurality of third-party service providers. A web hosting service provider may compile a list of approved third-party service providers. The list of approved service providers may be stored in a shared database, such as common data store 106 of the common service architecture 100. The web hosting service provider and one or more approved third-party service providers may engage in a partnership. The partnership may include an arrangement of sharing revenue, a combined marketing strategy, a complimentary service, and the like. The third-party partnership may be based on various factors such as competency in a specific technology area, competitive advantage in a particular process, strategic organizational goal, and the like.

Exemplary third party services may include service for performing electronic transactions, marketing, and the like. Specifically, a third-party service may include a commerce service that may include a means for a client to accomplish a sale transaction with a user of a website. The sale transaction may be one of a real-time transaction, a delayed transaction, an off-line transaction, and the like. The third-party commerce service may include a shopping cart application. The shopping cart application may be one of an open source application, a commercial application, and the like. Another exemplary third party service 128 may be a marketing service. The common service architecture 100 may be associated with the marketing service. Such a marketing service may include a web directory listing, an advertising platform, an email marketing system, a website rating system, a customizable toolbar, and the like.

Traditional web-hosting platforms have well-documented drawbacks. One of these drawbacks is the cost and complexity of switching from one platform to another. In addition to the cost associated with terminating a web-hosting service agreement, a client seeking to change his or her web-hosting service provider would have to move data from one server to another, and may encounter downtime during the migration process, making the client's web site unavailable. These downtimes present a serious barrier to a client switching between different web-hosting service providers. A migration facility capable of minimizing or preferably eliminating the downtime associated with a client's switch of web-hosting service provider may be an effective solution to this barrier and may open greater opportunities for web-hosting clients to find a web-hosting provider that offers the balance of branding, cost, features, and scalability desired.

Migration drawbacks may also be significant barriers to effective business activities related to merging (e.g. through acquisition) web-hosting providers. Consolidation is a common process for maturing and reducing costs in various industries so reducing the barriers to such consolidation may prove very beneficial for the participants in the web-hosting industry at large. Generally, when a web-hosting service provider acquires another web-hosting service provider, to achieve many of the benefits of consolidation, the acquired provider's clients need to be merged with the acquirer's web-hosting system and service offerings. One approach to this is to migrate each of the web-hosting clients of the acquired provider into the acquirer's system. In order to prevent client dissatisfaction which can result in loss of revenue, this migration must be as seamless as possible, with no downtime for clients of the acquired web-hosting provider and no disruption of service for the acquiring web-hosting provider's clients. Although consolidation provides great benefits, migration often must maintain the look and feel (e.g. user interfaces, languages, features, etc.) of the acquired web-hosting provider. With at least these factors being considered, a web-hosting client migration facility for migrating a client from an acquired web-hosting system to the acquiring web-hosting architecture while eliminating web site downtime or data access disruption can facilitate a web-hosting service provider growing his/her business by acquiring other web-hosting service providers.

Such a web-hosting migration facility may be offered by the common service architecture 100 to facilitate client relocation to the common service architecture 100. A web-hosting migration facility 130 of the common service architecture 100 may also facilitate migrating from various configurations of web-hosting providers to the common service architecture 100. Because the common service architecture 100 may use dedicated service pools (of servers) and traditional web-hosting service providers, or a combination of all (or substantially all) services on one server or group of servers as may be needed to support the web hosting client's level of service requirements, the migration facility 130 must support migration among these substantially different web hosting architectures. In the event that a service that is being provided to an acquired web hosting client is not provided by one of the service pools of the common service architecture 100, the migration facility 130 must be flexible enough to allow for creation of new service offerings in the common service architecture 100. This may be done by establishing new service pools or adding a new service to a service pool that already offers a similar service (e.g. establishing a different type of email service to execute on servers in existing email service pool).

To facilitate reduced or ideally zero down time for a web hosting client being migrated to the common service architecture 100, migration may take advantage of migration features of the common service architecture 100 that may allow, among other things partial data transfer and backup, as well as partial website (e.g. URL, individual service, etc.) migration without interruption of service or data access. Partial data transfer and backup may allow a portion of a web hosting client's content to be relocated into the shared storage 106 of the common service architecture 100 so that client access to content provided through the web hosting client's web site (for example) can be directed to either the original data source or through the common service architecture 100 to the shared storage 106. Similarly, partial website or service-specific migration may enable migration of services over time. In an example, email accounts using an email service being provided by a web hosting provider that has been acquired that is the same as an email service offered by the common service architecture 100, may be migrated before other portions of an acquired web hosting client's account. In this way, the migration may be accomplished in one-step or in a multi-step process where services are moved separately. The service pool may provide a backup of the migrated services.

The migration facility 130 may transfer a plurality of web services, such as web page code, email service, conference service, calendar service, e-commerce service, exchange service, databases, and the like. The migration facility 130 may operate in a fully automated manner.

Migration may require or may benefit from separating services to be migrated from data to be migrated. As is described herein, the common service architecture 100 treats services and data differently than conventional web hosting architectures to take advantage of its service pools and shared data store features. Therefore, the migration facility 130 may separate the services to be migrated from and the underlying data to be migrated. However, separating services from data may be a complex operation and may require some level of manual interaction. Migration may therefore combine elements of automated and manual transfer.

The migration facility 130 may include an API that may facilitate automating the migration process. The API may allow programmatically interfacing with the plurality of service pools, shared database facility, load balancer 112, the skins 120 and the code library 122, and any other feature, service, or interface of the common service architecture 100, and the like. The API may reside in the code library 122 and it may be dynamically initialized in real time for migrating a client's services into the common service architecture 100. The API may provide access to automated tools for migration (e.g. software) that may normally execute in the load balancer 112 for migration of a client from another web-hosting platform. The API may be distributed so that portions of it may exist in various facilities of the common service architecture 100, such as the code library 122, the load balancer 112, the service pools, the OSS 114, and the like, and may be executed dynamically and in real time.

The migration approach may depend upon a number of factors, such as, but not limited to: service and data separation complexity, type of data, format of data, amount of data, type of metadata associated with data, structural and logical association of data, and the like. Migration approach may also depend on the general category of the data, applications, and/or services provided in the web hosting account to be transferred. The migration facility 130 may facilitate tailoring the migration process depending on this migration category. In an example, the migration facility 130 may provide a user interface that may allow the client to select the migration category. Migration categories may include one or more of data migration, application migration, business process migration, and the like. As a further example of migration categorization, application migration may be required when CRM (Customer Relationship Management) or SCM (Supply Chain Management) software or the like are embedded in a client website being migrated. Because a web hosting account to be migrated may include more than one migration category, the migration facility 130 may be tasked with performing a migration involving several migration categories. Through the aforementioned user interface, a client may be able to select the categories to migrate, as well as the order in which to complete the migration.

Data in a source web-hosting account may be formatted differently than the data in the shared storage 106. Consequently, some reformatting or format conversion may be required for proper migration. In an embodiment, the migration facility 130 may automatically transform client data from one format to another, such as from a database format to an XML format, or vice-versa.

Application migration may involve automated, semi-automated, and/or manual migration. Automated migration of an application may be applicable for some common applications or applications for which the common service architecture 100 is already authorized to execute (e.g. through a license for the application). Manual migration of an application may be appropriate for custom applications or for applications for which a new license must be acquired and may be accomplished by physically installing the application in the common service architecture 100.

The migration facility 130 may facilitate migration of a business process by identifying individual components, or steps, of the business process and mapping the components using business-process management tools on the common service architecture 100 before migration of client data. Client data integrity is thus maintained throughout the migration process. This migration continues until the entire business process and business logic embedded in the process is migrated.

The migration facility 130 may provide a plurality of migration methods. A user presented with a selection of migration methods may pick a method most suitable for a particular client, situation, data type, and the like. A migration method may differ from another migration method on how client data is separated from client services.

The migration facility 130 may process and analyze data as part of the migration process. The data may be broken into a plurality of components that meet one or more criteria of data categories associated with the common service architecture 100. Each component may be migrated into the common service architecture 100 and stored in the shared storage 106. These steps may be performed using automated software tools without manual intervention.

The migration facility 130 may maintain the security and access permission associated with the data being migrated when it is migrated into the shared storage 106 so that data security details such as access permissions, passwords, and the like, that were required to access the data in the acquired web hosting platform may be enforced using the data segmenting and security capabilities of the shared storage 106 of the common service architecture 100. Such security configurations may affect routing of the migrating data through the load balancer 112 so that the data security is maintained throughout the migration process.

The migration facility 130 may include a third party migration tool or service. The third party migration tool or service may facilitate the migration of third party services into the common service architecture 100. For example, email address book entries may be transferred into the common service architecture 100 using the proprietary tools of the email software provider. Likewise, the migration facility 130 may utilize TDMF™ (Transparent Data Migration facility 130) from SOFTEK to provide capabilities such as throttling/pacing data movement during migration.

The migration facility 130 may ensure secure transfer of data into the common service architecture 100. The migration facility 130 may use a marker or a save point during the migration process to facilitate ensure data integrity during migration. The migration facility 130 may be able to roll back a migration to a particular marker (also known as a save point) in case of failure during the migration process. The migration facility 130 may also insert a marker or save point between each data point. In the event of data migration process failure, subsequent transfer of data may initiate from last marked point. In case of a severe migration failure, the migration facility 130 may roll back all the previously taken migration steps.

The migration facility 130 may achieve hardware independence by incorporating software capable of integrating multiple data repositories and hardware such as hard disks, free agents, and the like seamlessly into the common service architecture 100 during the migration process. This may be important since the common service architecture 100 may include services pools catering to different services. The service pool may be configured using a plurality of servers, each of which may have different configurations, hardware, processing capability, manufacturer, and the like.

A client may wish to migrate to the new web-hosting platform independently, without involving the client's existing web hosting service provider. This may be the case when secrecy of data is paramount or when the client wants to utilize his or her own resources for transferring data. The migration facility 130 may provide a migration help utility to aid a client in such a transfer. The help utility may include a list of steps that the client may need to follow to undertake the migration into the common service architecture 100. The migration help utility may include a demonstration to show a client how to carry out the migration process. For example, the first migration help utility screen may list the steps involved in the migration. The second step may involve identifying the type of migration, the hardware and software involved in the migration, and the various errors that may occur during the migration process. The migration help utility may also provide a list of critical issues observed during the migration process specifically in migrating business processes.

The migration facility 130 may collect information about existing web hosting configuration. By collecting existing web hosting configuration information the migration facility 130 may be able to create a new web hosting platform that more accurately matches a client's needs. The configuration information collected may be related to sever configuration, network configuration, database configuration, and the like. For example, the server configuration may include collection of information related to number of CPUs, logical partitions, type of file system, and the like. This information may be collected using automated tools. Alternatively, a user interface may be provided for receiving information about the web hosting configuration to be migrated. The corresponding configuration information may be entered by the client or by the web hosting service provider and then used by the migration facility 130 to configure the migration methodology.

The migration facility 130 may include a software tool with an ability to facilitate creating a migration data map based on the data and services to be migrated. The tool may include a graphical user interface that a client or web hosting provider may use to create a migration data and service map that may help guide and ensure compliance with the original intent and capabilities of the web hosting account being migrated.

The migration facility 130 may initiate the data migration process by identifying data structures representing data and other web services to be migrated. This identification step may include loading data structures and generating a map of associated data. The migration facility 130 may use a software tool to facilitate automatically identifying data from the data map to be transferred to the common service architecture 100. The map of associated data may be modified manually to assure accuracy. Rules for transfer of data may be created before initiating the transfer of data. The data migration repository may be used as a temporary storage for analysis, recording errors, correcting exceptions, creating a log of rejects between the old architecture and the common service architecture 100, and the like. The temporary storage may be a part of the common service architecture 100 or may be external; that is, outside both the old architecture and the common service architecture 100. Finally, the migrated data may be transferred into the common service architecture 100.

The migration facility 130 may allow direct migration, phased migration, or parallel migration of data. Direct migration may involve moving the existing data from the old architecture to the common service architecture 100 completely and running the same from the common service architecture 100. Likewise, the phased migration may be by moving the data to the common service architecture 100 in segments. During phase migration, both the source and common service architecture 100 may operate in parallel.

Further, migration may also involve transfer of Domain Name Server (DNS). In this aspect, the migration facility 130 may include a software module that may automatically create a log of configuration information from the old architecture and implements it on the common service architecture 100. Alternatively, the DNS configuration setting may be applied manually by entering the required information into the common service architecture 100. The DNS may be replicated in the common service architecture 100 and both the new and the old architecture may be operated conditionally for a specific time before the old architecture is removed.

Likewise, in some instances migration may include replication and/or migration of active directory services, especially in an environment where the Internet and intranet reside on a single server. In such cases, the migration of active directory may be facilitated by either replicating the active directory in the common service architecture 100 using an automated tool or manually copying the configuration settings into the common service architecture 100. In another aspect, an automated software tool may transfer the active directory residing in the old architecture directly to the common service architecture 100.

The migration facility 130 may ensure the transfer of a security related parameter, such as a domain password, registry key, access information of the existing host, transfer of databases, SSL certificates, version compatibility, email addresses and the like. Failure to transfer any one of these parameters may result in failure of the migration process. In this case, manual intervention may be required to complete the migration process.

Once the migration of a website is complete, the migration facility 130 may utilize an automated testing facility to ensure full functionality and configuration of the migrated website. In addition, errors detected during testing may be recorded in a log file and utilized for rectification of correction of those errors.

Web hosting architectures may include physically dedicated or shared hosting and virtual server-based hosting. In physical dedicated hosting, each web hosting client may be provided a dedicated physical computing resource (e.g. a blade in a rack-based server deployment). Physical hosting may also be executed as a shared service in which a single server handles multiple web hosting clients. This type of web hosting service may be suitable for low cost, low performance hosting. Virtual server web hosting may enable a web hosting provider to offer near-dedicated server capabilities and performance without the costs of individually dedicated hardware. A virtualized web hosting platform may hide physical characteristics of the platform from the web hosting client but may still associate one web hosting client to one virtual server (also known as a container).

Due to the general structural constraints of internet style routing, migration techniques have been based on a batch process that requires taking down a batch of URLs (e.g. 255) to migrate even one URL. The routing limitation relates to a constraint that a URL may not be advertised as existing at two different physical places at the same time; therefore, changing the physical location of even one URL may result in various URLs within the same range of 255 URLs being affected. Therefore, batch-based migration techniques may affect up to as many as 255 URLs at a time.

The migration facility 130 may embody a virtual network-based migration technique that may overcome the routing limitations of batch-based migration while supporting individual IP address migration. This technique may include setting up a proxy (e.g. virtual LAN) for all IP addresses to be migrated and managing routing based on the migration status. With this technique, migration may occur on a URL-by-URL basis without other URLs being affected. In addition, new physical IP addresses may be broadcasted one-by-one as migration proceeds.

Migration may involve various source and destination architectures. Although migration may generally support the features and benefits described hereinabove, particular configurations of source and destination architectures may necessitate modifications to migration. The following scenarios exemplify some of the variety of migration architectures covered by the migration facility 130.

The migrating facility of the common service architecture 100 may facilitate migration of a web hosting service from one architecture to another, where at least one may be service pool architecture. The migrating facility may include an automated tool for migrating a website hosting service from a first website hosting architecture to a second website hosting architecture, the first architecture may include a server architecture that may serve a plurality of services dedicated exclusively to a specific website. The second web hosting architecture may include a server architecture that may serve a plurality of common services to a plurality of unrelated and/or unaffiliated websites.

The migrating facility 130 of the common service architecture 100 may facilitate migration of a web hosting service from a one box per customer architecture to a multiple box per customer architecture. The migrating facility 130 may include an automated tool for migration of a website hosting service from a first website hosting architecture to a second website hosting architecture. The first architecture may include a server architecture that may serve the services necessary for a specific website from a single machine and the second web hosting architecture may include a server architecture that may serve a plurality of common services from a plurality of machines to a plurality of unrelated and/or unaffiliated websites.

The migrating facility 130 of the common service architecture 100 may facilitate migration of a web hosting service from a one box per customer architecture to a cloud computing architecture. The migration facility 130 may include an automated tool for migration of a website hosting service from a first website hosting architecture to a second website hosting architecture. The first architecture may include a server architecture that may serve the services necessary for a specific website from a dedicated machine and the second web hosting architecture may include a server architecture that may serve a plurality of common services from a plurality of machines to a plurality of unrelated and/or unaffiliated websites using a cloud computing architecture. The dedicated machine of the first website hosting architecture may have one or more substantially duplicate machines for backup purposes.

The migrating facility 130 of the common service architecture 100 may facilitate migration of a web hosting service from a one box per customer architecture to a grid computing architecture. The migration facility 130 may include an automated tool for migration of a website hosting service from a first website hosting architecture to a second website hosting architecture. The first architecture may include a server architecture that may serve the services necessary for a specific website from a dedicated machine and the second web hosting architecture may include a server architecture that may serve a plurality of common services from a plurality of machines to a plurality of unrelated and/or unaffiliated websites using a grid computing architecture. The dedicated machine of the first website hosting architecture may have one or more substantially duplicate machines for backup purposes.

The migrating facility 130 of the common service architecture 100 may facilitate migration of a web hosting service from a one box per multiple customer architecture to a cloud or grid computing architecture with many boxes for many customers. The migration facility 130 may include an automated tool for migration of a website hosting service from a first website hosting architecture to a second website hosting architecture. The first architecture may include a server architecture that may serve the services necessary for a plurality of distinct websites from a dedicated machine and the second web-hosting architecture may include a server architecture that may serve a plurality of common services from a plurality of machines to a plurality of unrelated and/or unaffiliated websites using at least one of a cloud computing architecture and a grid computing architecture. The dedicated machine of the first website hosting architecture may have one or more substantially duplicate machines for backup purposes.

The migrating facility 130 of the common service architecture 100 may facilitate migration of a web hosting service from a dedicated environment for each customer to a shared environment for multiple customers. The migration facility 130 may include an automated tool for migration of a website hosting service from a first website hosting architecture to a second website hosting architecture. The first architecture may include a server architecture that may serve the services necessary for a client's websites from a dedicated machine and the second web-hosting architecture may include a server architecture that may serve a plurality of unrelated and/or unaffiliated customers from a plurality of shared servers. The dedicated environment may include dedicated memory for each customer wherein the shared environment may include shared memory across multiple customers. The shared environment may be a cloud-computing environment. The shared environment may be a grid-computing environment. The shared environment may include a plurality of common service pools disposed across a plurality of servers.

The migrating facility 130 of the common service architecture 100 may facilitate migration of a web hosting service from a dedicated environment for each customer to a shared environment for multiple customers. The migration facility 130 may include an automated tool for migration of a website hosting service from a first website hosting architecture to a second website hosting architecture. Each server architecture may include a server architecture that may serve a plurality of common services from a plurality of machines to a plurality of unrelated and/or unaffiliated websites. At least one environment may be a cloud-computing environment or a grid-computing environment. At least one environment may include a plurality of common service pools disposed across a plurality of servers.

The migrating facility 130 of the common service architecture 100 may facilitate migration of a web-hosting service from a virtualized environment to a shared environment for multiple customers. The migration facility 130 may include an automated tool for migration of a website hosting service from a first website hosting architecture to a second website hosting architecture. The first architecture may include a virtualized server architecture that may serve the services necessary for a client's websites from a specific virtual machine and the second web hosting architecture may include a server architecture that may serve a plurality of unrelated and/or unaffiliated customers from a plurality of shared servers. The shared environment may be a cloud-computing environment or a grid-computing environment. The shared environment may include a plurality of common service pools disposed across a plurality of servers.

The migrating facility 130 of the common service architecture 100 may facilitate migration of a web-hosting service from one architecture to another, wherein a virtual network may be used during migration. The migration facility 130 may include an automated tool for migration of a website hosting service from a first website hosting architecture to a second website hosting architecture. A virtual network may be used during migration to facilitate keeping the network active during the movement of IP addresses from one architecture to the other architecture.

The automated migration facility 130 as described herein may support migration from a wide variety of web hosting architectures to a wide variety of web hosting architectures. Some exemplary migration scenarios are described in detail herein. Others can be understood to be accomplished using the automated migration techniques, methods, networks, and features described in the exemplary scenarios and through this disclosure. Migration may be automated by the automated migration facility 130 between the following architectures. Automated migration may occur from either of the two architectures to the other of the two architectures noted here: cloud computing environment and cloud computing environment, cloud computing environment and grid computing environment; grid computing environment and grid computing environment; virtual server computing environment and cloud computing environment; virtual server computing environment and grid computing environment; virtual server computing environment and virtual server computing environment; one box per website and one box per website; one box per website and cloud computing environment; one box per website and grid computing environment; one box per website and virtual server computing environment; one box per client and one box per client; one box per client and one box per website; one box per client and cloud computing environment; one pox per client and grid computing environment; one box per client and virtual server computing environment; dedicated services per website and dedicated services per website; dedicated services per website and cloud computing environment; dedicated services per website and grid computing environment; dedicated services per website and virtual server computing environment; dedicated services per website and one box per website; dedicated services per website and one box per client; dedicated services per website and common service platform; one box per client and common service platform; one box per website and common service platform; cloud computing environment and common service platform; grid computing environment and common service platform; virtual server computing environment and common service platform. Any of the combinations described herein, and others that may be now or in the future known to one skilled in the art may be implemented via a virtual private network as described herein. Migration among the combinations described herein may be performed for a single user, single website, single client, single service, subset of clients, subset of services, subset of websites, and the like. Migration among the combinations described herein may be partial, aborted, limited, complete, initiated from a first combination and completed to a second combination, migrated between similar architectures to provide better services lower cost, and the like. Migration may be initiated by the receiving architecture, initiated by the sending architecture, initiated by a third party, and the like. Migration may include use of a third party, introduction of third party data to satisfy a requirement of migration, migration of a portion of clients or websites or services from a first architecture to a second architecture and migration of another portion of clients or websites or services from the first architecture to a third architecture. Migration may include the deletion of data, deletion of clients, deletion of websites, and the like. Other migration aspects associated with the automated migration facility 130 described herein may also be associated with the migration architecture combinations described herein.

Figure 15:
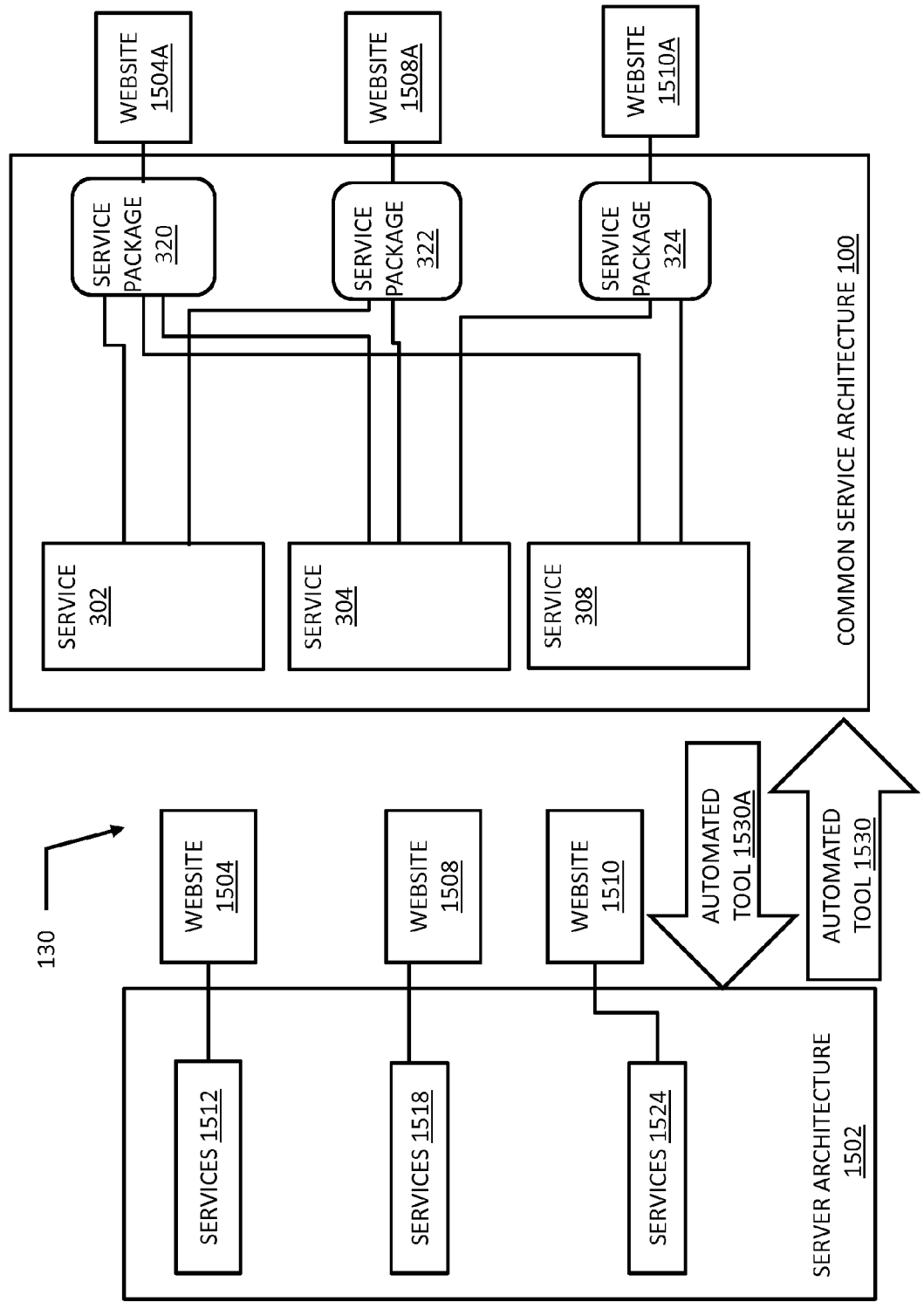
FIG. 15 depicts a schematic block diagram of a process for migrating a website hosting service from a first website hosting architecture to a second website hosting architecture.

FIG. 15 illustrates a schematic block diagram of a process for migrating a website hosting service from a first website hosting architecture (referred as 'server architecture 1502') to a second website hosting architecture (referred as 'common service architecture 100'). The common service architecture 100 may include a migration facility 130 that may include an automated migration tool 1530 capable of enabling substantially an automated migration of the website hosting service from the server architecture 1502 to the common service architecture 100. In particular, migration may include migrating support for websites in the server architecture 1502 to the common service architecture 100

The server architecture 1502 may serve a plurality of services dedicated exclusively to a specific website. Exemplary services served by the server architecture 1502 may include an email service 1512, which may be dedicated exclusively to a website 1504. Similarly, an email service 1518 may be dedicated exclusively to website 1508. Further, an HTTP service 1524 may be dedicated exclusively to website 1510. The common service architecture 100 may serve a plurality of common services for a plurality of unrelated/unaffiliated websites as described herein.

The common server architecture 100 may include a plurality of services. Exemplary services offered by the common server architecture 100 may include an HTML service 302, an email service 304 and a chat service 308. The plurality of services of the common service architecture 100 may adapt one or more services for a specific website based on terms of the subscription agreed to by a web hosting client. The one or more adapted services may be packaged into a service package. Exemplary service packages may include service package 320 that offers an HTML and a two email address service package, service package 322 that offers an HTML, a twenty email address and a 10 member chat service package, and service package 324 that offers a five hundred email address and a five member chat service package.

Migration of the website hosting service from the server architecture 1502 to the common service architecture 100 may be facilitated by the automated migration tool 1530. The automated migration tool 1530 may facilitate providing services in the common service architecture 100 to a plurality of web sites that are being migrated from the server architecture 1502 to the common service architecture 100. Services that were dedicated to a specific website in the server architecture 1502 may now be provided using the services, service pools, service packages, and the like that may include: web page code access, email service, conference service, calendar service, e-commerce service, exchange service, databases, and the like as may be provided by the common service architecture. The automated migration tool 1530 may operate in a fully automated manner.

Migration may require or may benefit from separating services to be migrated from website data to be migrated. As is described herein, the common service architecture 100 may handle services and data differently as compared to the server architecture 1502 in order to take advantage of features such as service pools and shared data store offered by the common service architecture 100. Therefore, the automated migration tool 1530 may separate the services to be migrated from the underlying data (e.g. website content) to be migrated. However, separating the services from the data may be a complex operation and may require some level of manual interaction. Migration may therefore combine elements of automated and manual migration.

The automated migration tool 1530 may include an application programming interface (API) that may facilitate automating the migration 130. The API may allow programmatically interfacing with the service pools, the shared storage 106, the load balancer 112, the skins 120 and the code library 122, and any other feature, service, or interface of the common service architecture 100. The API may reside in the code library 122 and it may be dynamically initialized in real time for migrating a client's services into the common service architecture 100. The API may provide access to the automated migration stool 1530 (e.g. software). In an example the API may execute in the load balancer 112, a server 103, and the like. The API may be access distributed portions of the automated migration tool 1530 that may, for example be distributed across various facilities of the common service architecture 100, such as the code library 120, the load balancer 112, the service pools 102, 104 and 108, the operating support system 114 ('OSS 114'), and the like. The API and/or automated migration tool may be executed dynamically and in real time.

Migration 130 may depend upon a number of factors, such as, but not limited to: service and data separation complexity, type of data, format of data, amount of data, type of metadata associated with the data, structural and logical association of the data, and the like. Migration 130 may also depend on the general category of the data, applications, and/or the services provided in the web hosting client's account that is to be transferred. The automated migration tool 1530 may facilitate tailoring migration 130 depending on this migration category. In an example, the automated migration tool 1530 may provide a user interface that may allow a user to select the migration category. Migration categories may include one or more of data migration, application migration, business process migration, and the like. As a further example of migration categorization, application migration may be required when CRM (Client Relationship Management) or SCM (Supply Chain Management) software, or the like, are embedded in a client website being migrated. Because a web hosting account to be migrated may include more than one migration category, the automated migration tool 1530 may be tasked with performing a migration involving several migration categories. Through the aforementioned user interface, a user may be able to select the categories to migrate, as well as, the order in which to complete migration 130.

Data in the web hosting account at the server architecture 1502 may be formatted differently than data in the shared storage 106 of the common service architecture 100. Consequently, some reformatting or format conversion may be required for proper migration. The automated migration tool 1530 may automatically transform the data from one format to another, such as from a database format to an XML format, or vice-versa.

Applications provided by the web hosting client and/or made available to users of the websites hosted by the server architecture 1502 may be migrated via the automated migration tool 1530. Migrating an application may involve establishing a copy of a licensed application and enabling it to execute on servers of the common service architecture 100. An exemplary application migration may involve automated, semi-automated, and/or manual migration. Automated migration of an application may be applicable for some common applications or applications for which the common service architecture 100 may be authorized to execute (e.g. through a license for the application). Manual or automated migration tool 1530 assisted migration of an application may be appropriate for custom applications or for applications for which a new license must be acquired. Manual migration may be accomplished for such applications by executing an application installation process for the desired applications that results in installing the application to reside in and/or execute in the common service architecture 100.

The automated migration tool 1530 may facilitate migration of a business process by identifying individual components, or steps, of the business process and mapping the components using business-process management tools on the common service architecture 100 before migration of the data. Client data integrity may thus be maintained throughout migration 130. Migration 130 may continue until the entire business process and business logic embedded in the business process is migrated.

The automated migration tool 1530 may provide a plurality of migration processes. The migration tool 1530 may automatically select a migration process for each type of data, user, website, client, and the like. The automated migration tool 1530 in association with the common service architecture elements that facilitate client interaction may present a selection of migration processes to a user. The selection of migration processes may be based on data to be migrated, the type of server architecture being migrated from, and the like. The client may pick a process most suitable for a particular client, situation, data type, and the like. In an example of differences between migration processes, a first migration process may separate data from services in a first way and a second migration process may separate data from services in a second way.

The automated migration tool 1530 may process and analyze the data as part of migration 130. Alternatively, the data may be broken into a plurality of components that meet one or more criteria of data categories associated with the web hosting platform of the common service architecture 100. Each component may be migrated into the web hosting platform of the common service architecture 100 and stored in the shared storage 106. These steps may be performed using automated software tools without manual intervention.

The automated migration tool 1530 may maintain the security and access permission associated with the data being migrated when the data is migrated into the shared storage 106 so that data security details, such as access permissions, passwords, and the like required to access the data in the web hosting platform of the server architecture 1502 may be enforced using the data segmenting and security capabilities of the data storage 106 of the common service architecture 100. Such security configurations may affect routing of the data, which is being migrated, through the load balancer 112 so that the data security may be maintained throughout migration 130.

The automated migration tool 1530 may include access to a third party migration tool or service. Alternatively, the third-party migration tool or service may be integrated with the automated migration tool 1530. The third party migration tool or service may facilitate the migration of third party services into the common services architecture 100. For example, email address book entries may be transferred into the common service architecture 100 using proprietary tools of the email software provider. Likewise, the automated migration tool 1530 may utilize a utility that supports transparent data migration to provide capabilities such as throttling or pacing data movement during migration 130.

The automated migration tool 1530 may ensure secure transfer of the data into the common service architecture 100. The automated migration tool 1530 may use a marker or a save point during migration 130 to ensure data integrity once migration 130 is over. The automated migration tool 1530 may be able to roll back a migration to a particular marker (also known as a save point) in case of failure during migration 130. The automated migration tool 1530 may also insert a marker or save point between each data point. In the event of occurrence of a failure in the data migration process, transfer of data may be initiated from the last marked point. In the event of a severe migration failure, the automated migration tool 1530 may roll back all previously performed migration steps.

The automated migration tool 1530 may achieve hardware independence by incorporating software capable of integrating multiple data repositories and hardware such as hard disks, free agents, and the like seamlessly into the common service architecture 100 during migration 130. This may be important since the common service architecture 100 may include services pools catering to different services. The service pools may be configured using a plurality of servers, each of which may have different configurations, hardware, processing capability, manufacturer, and the like.

In an example, a client may wish to migrate to the web hosting platform of the common service architecture 100 independently, without involving the client's existing web-hosting service provider, i.e., provider of the server architecture 1502. This may be required when secrecy of the data is paramount or when the client wants to utilize his or her own resources for transferring the data. The automated migration tool 1530 may provide a migration help utility to aid a client in such a transfer. An exemplary migration help utility may include a list of steps to be followed by the client to undertake the migration into the common service architecture 100. The migration help utility may include a demonstration to show a client how to carry out migration 130. For example, a first screen of the migration help utility may list the steps involved in migration 130. A next step may involve identifying the type of migration, the hardware and software involved in the migration, and the various errors that may occur during the migration process. The migration help utility may also provide a list of critical issues observed during the migration process specifically in migrating business processes.

The automated migration tool 1530 may collect information about the existing web hosting configuration. By collecting this information, the automated migration tool 1530 may be able to create a web hosting platform that may match a client's needs more accurately. The information of the web hosting configuration may be related to sever configuration, network configuration, database configuration, and the like. For example, the server configuration may include collection of information related to number of CPUs, logical partitions, type of file system, and the like. This information may be collected using automated tools. Alternatively, a user interface may be provided for receiving information about the web hosting configuration to be migrated from the server architecture 1502. The corresponding configuration information may be entered by the client or by the web hosting service provider and then used by the automated migration tool 1530 to carry out migration 130.

The automated migration tool 1530 may include a software tool with an ability to facilitate creation of a migration data map based on the data and the services to be migrated. The tool may include a graphical user interface that a client or web hosting provider may use to create a migration data and service map that may help guide and ensure compliance with the original intent and capabilities of the web hosting account being migrated.

The automated migration tool 1530 may initiate the data migration process by identifying data structures representing the data and the services to be migrated. This identification step may include loading data structures and generating a map of associated data. The automated migration tool 1530 may use a software tool to facilitate automatic identification of the data from the data map to be transferred to the new web hosting platform of the common service architecture 100. The map of associated data may be modified manually to assure accuracy. Rules for transfer of the data may be created before initiating the transfer of the data. A data migration repository may be used as a temporary storage for analysis, recording errors, correcting exceptions, creating a log of rejects between the server architecture 1502 and the common service architecture 100, and the like. The data migratory repository may be a part of the common service architecture 100 or may be external; that is, outside both the server architecture 1502 and the common service architecture 100. Finally, the migrated data may be transferred into the common service architecture 100.

The automated migration tool 1530 may allow direct migration, phased migration, or parallel migration of data. Direct migration may involve moving the existing data from the server architecture 1502 to the common service architecture 100 completely and running the data from the common service architecture 100. Similarly, the phased migration may involve moving the data to the common service architecture 100 in segments. During phased migration, both the web hosting service of the server architecture 1502 and web hosting service of the common service architecture 100 may operate in parallel.

Further, migration may also involve transfer of Domain Name Server (DNS). In this aspect, the automated migration tool 1530 may include a software module that automatically creates a log of configuration information from the server architecture 1502 and implements the configuration information on the common service architecture 100. Alternatively, the DNS configuration setting may be applied manually by entering the required information into the common service architecture 100. The DNS may be replicated in the common service architecture 100 and both the architectures may be operated conditionally for a specific time before the server architecture 1502 is removed.

Likewise, in some instances migration may include replication and/or migration of active directory services, especially in an environment where Internet and intranet reside on a single server. In such cases, the migration of active directory may be facilitated by either replicating the active directory in the common service architecture 100 using an automated tool or manually copying the configuration settings into the common service architecture 100. In another aspect, an automated software tool may transfer the active directory residing in the server architecture 1502 directly to the common service architecture 100.

The automated migration tool 1530 may ensure the transfer of a security related parameter, such as a domain password, registry key, access information of the existing host, transfer of databases, SSL certificates, version compatibility, email addresses, and the like. Failure to transfer any one of these parameters may result in failure of migration 130. In this case, manual intervention may be required to complete migration 130. Further, the automated migration tool 1530 may allow reverse migration.

Once the migration of a website is complete, the automated migration tool 1530 may utilize an automated testing facility to ensure full functionality and configuration of the migrated website. In addition, errors detected during testing may be recorded in a log file and utilized for rectification or correction of those errors.

Figure 16:
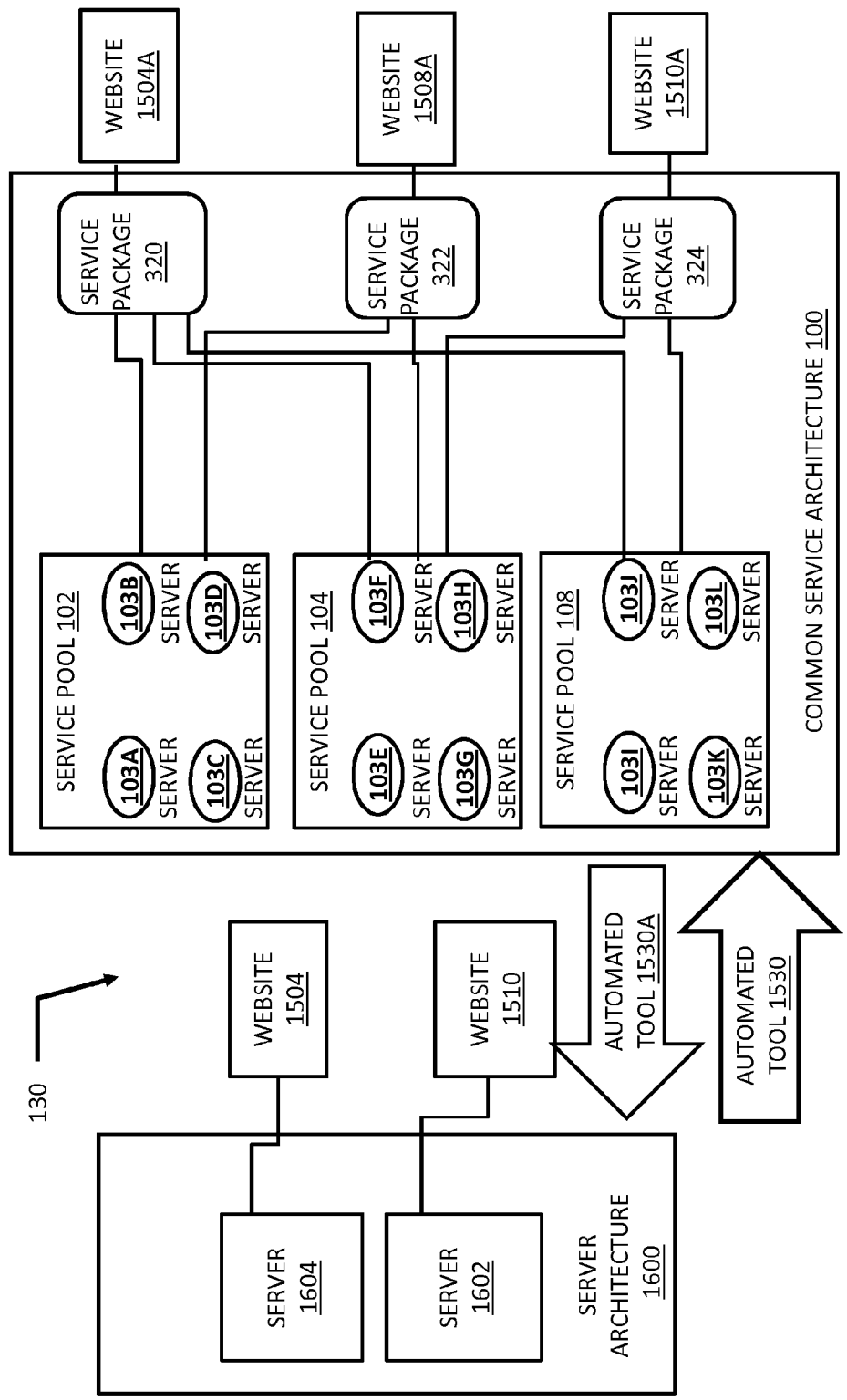
FIG. 16 depicts a schematic block diagram of a migration process for migration of a web hosting service from server architecture to common service architecture.

FIG. 16 illustrates a schematic block diagram of a migration process 130 for migration of a web hosting service from server architecture 1600 to common service architecture 100. Migration 130 may be performed by a migration facility of the common service architecture 100 that may include an automated migration tool 1530. The automated migration tool 1530 may allow reverse migration. The server architecture 1600 may serve services necessary for a specific website from a single machine. Exemplary servers, such as a server 1604 may serve a website 1504. Further, all services required by the website 1504 may be served by the server 1604. For example, the server 1604 may be capable of handling twenty email address accounts and ten chat accounts for the website 1504. The common service architecture 100 may serve a plurality of common services from a plurality of machines to a plurality of unrelated/unaffiliated websites. The plurality of services may be provided by a plurality of web servers that may be grouped into a plurality of service pools based on the services offered by the servers. Exemplary service pools of the plurality of service pools may include an HTTP service pool 102, an email service pool 104 and a chat service pool 108.

As mentioned above and herein, the automated migration tool 1530 may facilitate migration of the web hosting service from the server architecture 1600 to the common service architecture 100. The services found on each server 1602 and 1604 of the server architecture 1300 may be identical or may be tailored to each specific website. The automated tool 1530 may determine which of the services provided by each server 1602 and 1604 may be mapped to a common service in the common service architecture 100 and may generate appropriate service adaptation information (e.g. metadata, website service preferences, and the like) to facilitate servers 103 of the common service architecture 100 to adapt the common services provided by the service pools (102, 104, 108) to generate service packages that replicate the services provided by the server architecture 1600 to the migrating websites. In an example, server 1604 may include a service that provides twenty email accounts and a low-volume e-commerce service to student website 1504. The server 1602 may provide a twenty email account service and an environmental friendly look-and-feel chat service to nonprofit website 1510. The migration facility 130 may use the automated migration tool 1530 and other migration capabilities to migrate hosting of the three websites to the common service architecture 100 to adapt the common services for each migrated website.

The configuration of the common service architecture that may result from the migration shown in FIG. 16 may be as follows. The servers of the service pool 102 may adapt a common e-commerce service provided by service pool 102 and a common email service provided by service pool 104 to generate service package 320 that may include a twenty email account service and a low-volume e-commerce service with the same student-focused look and feel of website 1504 for migrated student-focused website 1504A. Further, servers of the service pool 104 may adapt the common email service provided by the service pool 104 to generate service package 322 that may include a five-hundred account email service with the same large business-focused look and feel of website 1510 for migrated large business website 1510A. Similarly servers of the service pool 108 may facilitate providing a service package 324 that may include a twenty email account service from a common email service provided by service pool 104 and an environmentally friendly look-and-feel chat service from a common chat service provided by service pool 108. The services adapted for website 1510A may include the same nonprofit look and feel of website 1510 prior to migration. In each migration example above, skins 122 and code library 120, as well as other elements of the common service architecture 100 may be utilized to provide the adapted services that facilitate the migrates websites to appear identical to those website prior to migration. In a similar way, skins 122 and code library 120 may facilitate each web hosting client for each of the migrated websites to interact with the common service architecture 100 using the same look and feel as the client had with the server architecture 1300.

Figure 17:
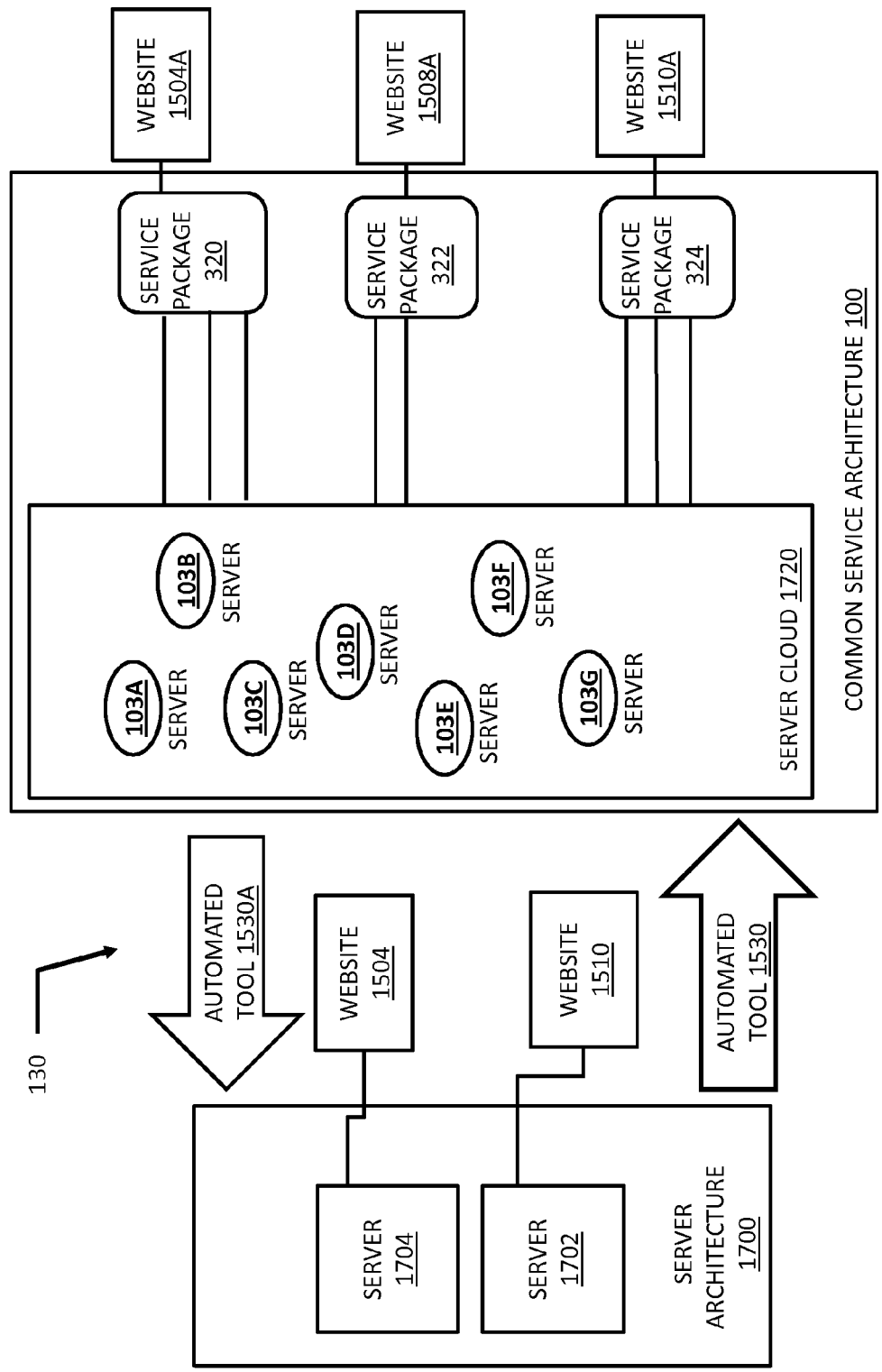
FIG. 17 depicts a schematic block diagram of a migration process and facility for migration of a website hosting service from server architecture to common server architecture that is based in a server cloud arrangement.

FIG. 17 illustrates a schematic block diagram of a migration process and facility 130 for migration of a website hosting service from server architecture 1700 to common server architecture 100 that is based on a server cloud 1720 arrangement. As with other embodiment of the migration facility 130, migration 130 may be performed by an automated migration tool 1530. The automated migration tool 1530 may allow reverse migration.

The example of FIG. 17 is similar to the embodiment of FIG. 16 in many ways. However, FIG. 17 depicts migration from a server architecture 1700 that may serve the services necessary for a specific website from a dedicated machine, such as server 1704 providing all the services necessary for website 1504 to a web hosting architecture comprising a server architecture that serves a plurality of common services from a plurality of machines to a plurality of [unrelated/unaffiliated] websites using a cloud computing architecture 1720. In the example of FIG. 17, all common services are provided by the common service architecture 100 from servers 103x deployed in a server cloud 1720. The servers 103x in the server cloud 1720 may be logically grouped into service pools so that a cloud server 103x may provide one of the common services and several of the cloud servers 103x may provide the same common service. Alternatively, servers in the cloud architecture 1720 may be configured as virtual servers, wherein a plurality of virtual servers on one physical server may be organized into a service pool as described herein. To support migrating the support for services previously provided by server architecture 1700 to the common service platform and adapting the common service platform 100 common services to provide individual service packages that matchup to the services previously provided, the servers 103x may be configured by information output from the automated migration tool 1530 based on an assessment of the services offered in the service architecture 1700 prior to migration.

Figure 18:
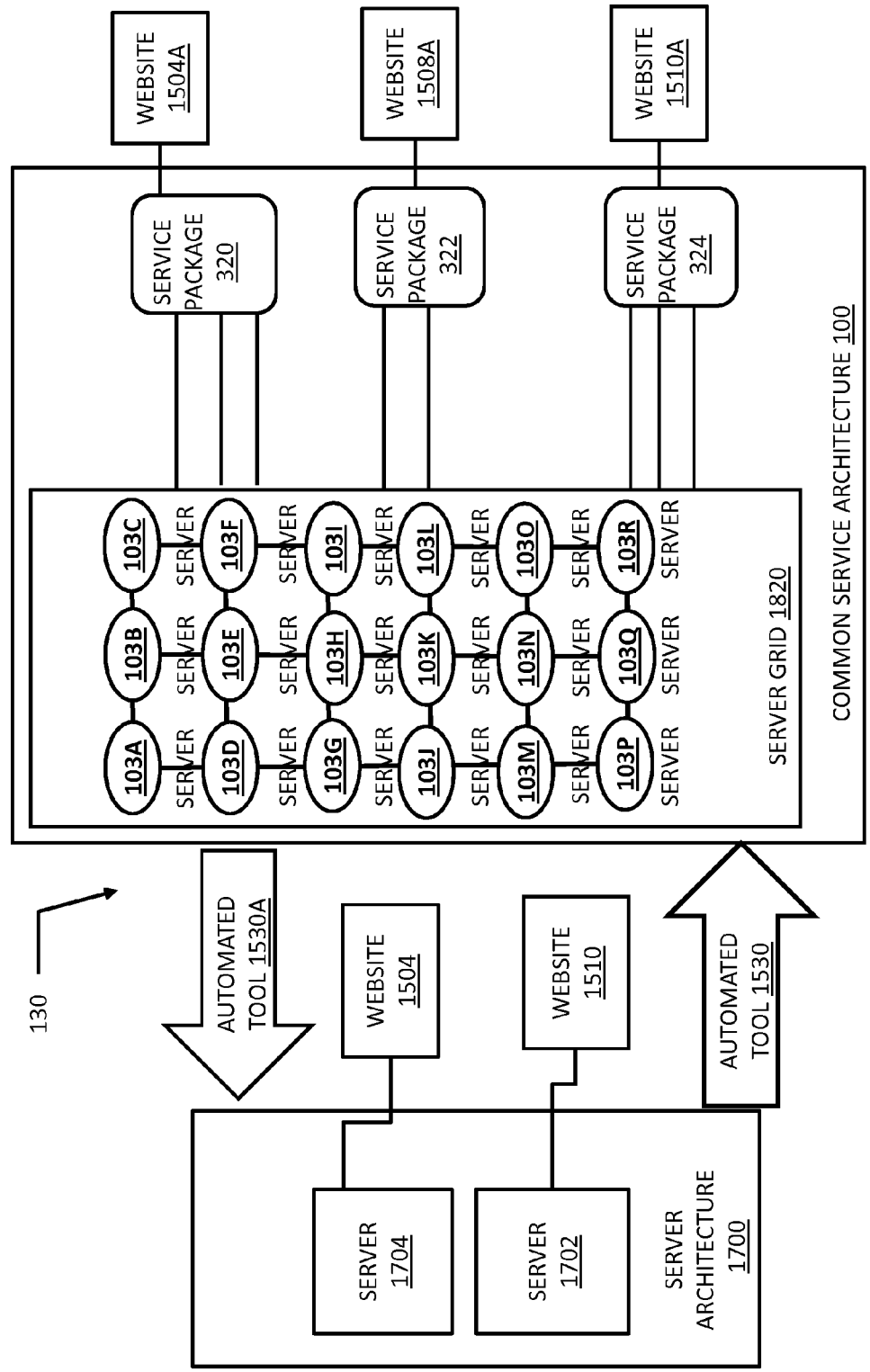
FIG. 18 depicts a schematic block diagram of an alternate embodiment of the migration process of FIG. 17, where the servers of the common service architecture that is based in a server grid.

FIG. 18 illustrates a schematic block diagram of an alternate embodiment of the migration process 130 depicted in FIG. 17 in which the servers 103x of the common service architecture 100 in FIG. 17 are configured in a server grid 1820. Server grid 1820 may enable grouping of servers 103x and/or providing services as described in the embodiment of FIG. 17 while taking advantage of computing and processing capabilities of the server grid 1820.

Figure 19:
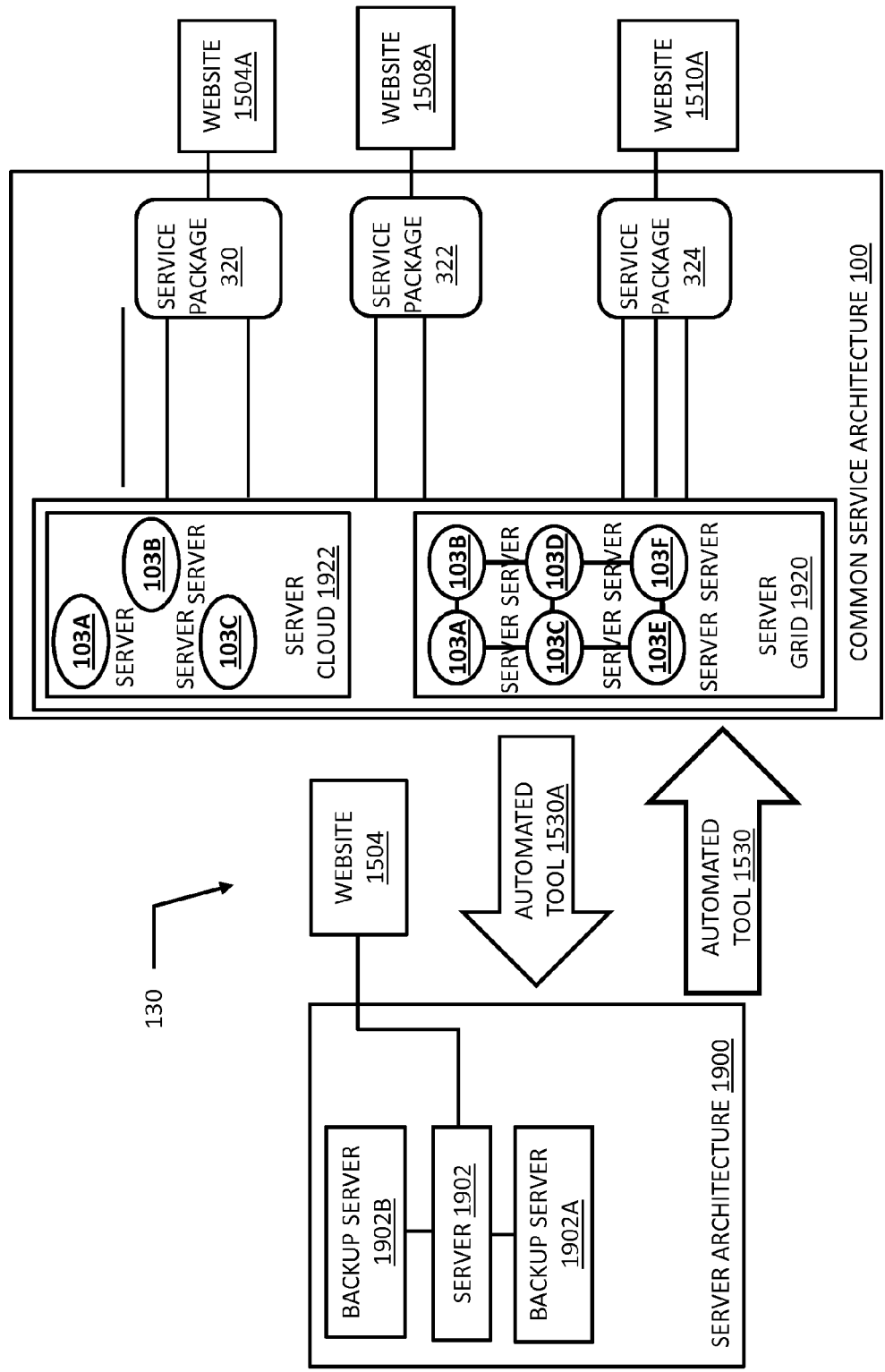
FIG. 19 depicts a schematic block diagram of a migration process for migration of a website hosting service from a one box per multiple client architecture to a many boxes for many clients architecture.

FIG. 19 illustrates a schematic block diagram of a migration process 130 for migration of a website hosting service from server architecture 1900 to common server architecture 100. The server architecture 1900 may be a one box per multiple client architecture and the common server architecture 100 may be a many boxes for many clients architecture. Further, migration process 130 may be performed by an automated migration tool 1530. The automated migration tool 1530 may allow reverse migration. The server architecture 1900 may serve a plurality of services necessary for a plurality of website from a dedicated machine. The dedicated machine may be a server capable of serving all the services required by the plurality of websites. An exemplary server such as a server 1902 may serve website 1504. All services required by the website 1504 may be served by the server 1902. For example, the server 1902 may be capable of handling ten chat accounts and FTP services for the website 1504.

In an embodiment, the dedicated machine of the server architecture 1900 may have one or more substantially duplicate machines for backup purposes. Exemplary duplicate machines may include a backup server 1902A and a backup server 1902B where a duplicate machine may provide all of the services provided by the server 1902, such as email service, e-commerce service, chat service, HTTP service, FTP service, DNS service, calendar service, and the like. Alternatively, the duplicate machine may be a server capable of handling multiple services of different types, such as a combination of email, chat, calendar, HTTP and FTP services. The duplicate machines may restore data from the server 1902 by creating a backup copy of the original data. This backup copy may be stored in the backup servers 1902A and 1902B and may be protected from potential failures of the server 1902. In case the server 1902 fails, one or more of the backup severs may be used to re-create, or restore, the data of the various websites.

The common service architecture 100 may serve a plurality of common services from a plurality of machines to a plurality of websites using at least one of a grid computing architecture (also referred as 'server grid 1920') and a cloud computing architecture (also referred as 'server cloud 1922'). The plurality of websites may include unaffiliated/unrelated websites as depicted in FIG. 19 as migrated website 1504A, website 1508A, and website 1510A.

The server grid 1920 may include a plurality of servers that may provide the plurality of services to the websites. The server grid 1920 may broadly represent many networked loosely coupled computers that may act together to perform large tasks. Exemplary servers of the server grid 1920 may include server 103A, server 103B, server 103C, server 103D, server 103E, and server 103F. The server grid 1920 may enable multiple applications to share computing infrastructure thus may provide flexibility, power efficiency, scalability and availability, instead of dedicated servers and storage for each website. The servers in the server grid 1920 may be pooled and provisioned among the websites on demand. The server grid 1920 may increase the physical resources on demand and thus allow migration of the website hosting service from the server architecture 1900 to the common server architecture 100.

The server cloud 1922 may include a plurality of servers that may provide the plurality of services to the websites. The server cloud 1922 may broadly represent a plurality of shared resources, software and information that may be utilized by the websites. Exemplary servers of the server cloud 1922 may include server 103A, server 103B, and server 103C. The servers in the server cloud 1922 may be shared among the websites on demand.

The services provided by dedicated server 1902 to the website 1504 may be migrated to the common service architecture 100 based on an association of these services with aspects of the common services provided by the common service architecture.

A plurality of email services provided by the server 1902 to the website 1504 may be migrated with the automated migration tool 1530 by identifying a common email service that may be adapted with the servers to provide service packages 320, 322, 324 that result in migrated websites 1504A, 1508A, and 1510A receiving substantially the same services a were provided by the dedicated server 1902 prior to migration. The migration facility 130 may, such as through the automated migration tool 1530 may provide output (e.g. data, metadata, software, and the like) that may be used to provide three distinct service packages to each of websites 1504A, 1508A, and 1510A that match features, including the look-and-feel, of the individual services provided by the server 1902 to the website 1504. Migration 130 finds services in the first website hosting architecture (server architecture 1600) that can be provided by adapting one or more common services in the common services architecture 100 and may configure various website preferences, subscription packages, web hosting client accounts and the like as part of automated migration.

Figure 20:
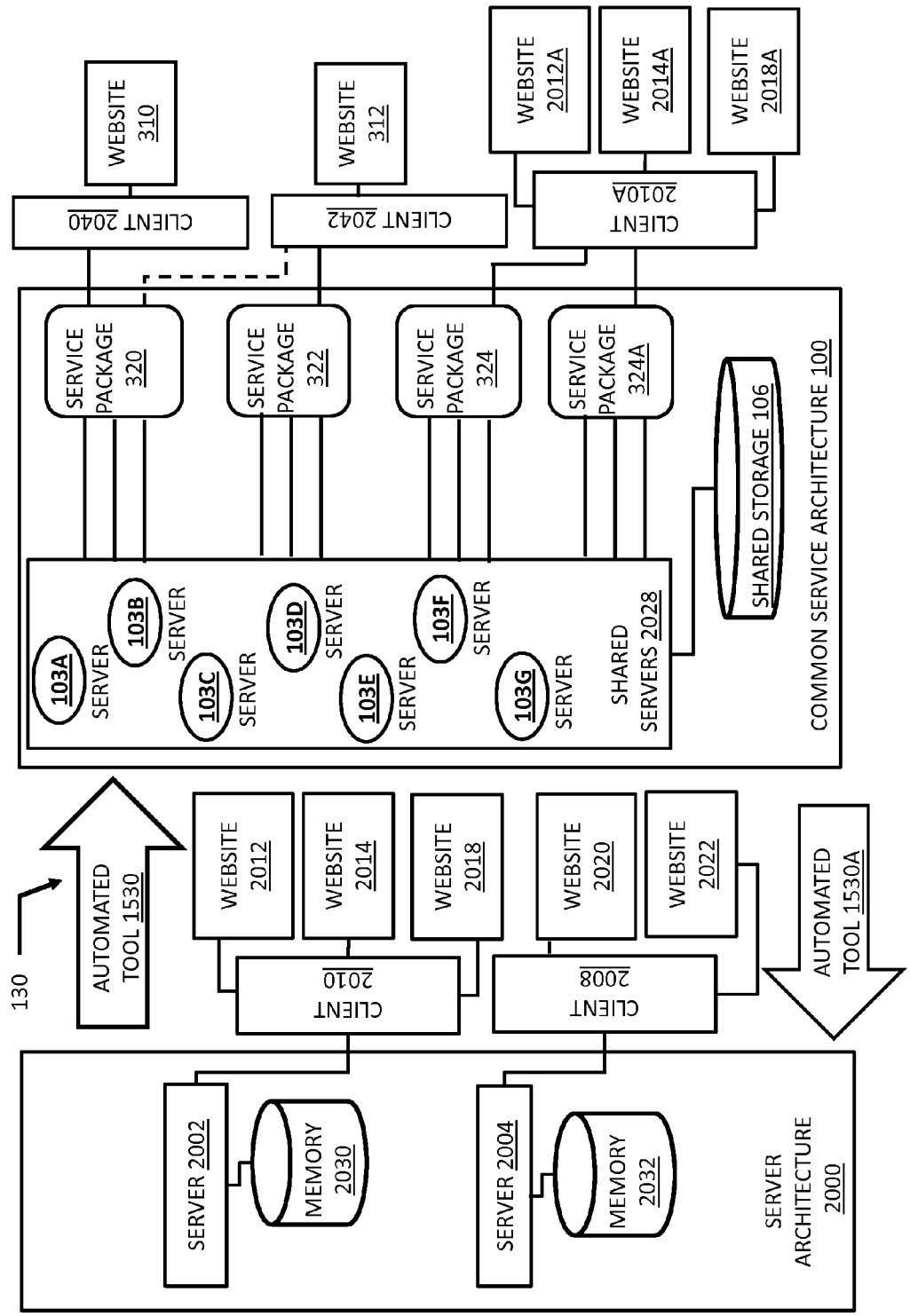
FIG. 20 depicts a schematic block diagram of a migration process for enabling migration of a web hosting service from a dedicated environment for each client to a shared environment for multiple clients.

FIG. 20 illustrates a schematic block diagram of a migration process 130 for enabling migration of a web hosting service from a dedicated environment for each client to a shared environment for multiple clients. Specifically, migration 130 may be performed by an automated migration tool 1530 that may enable migration of a website hosting service from server architecture 2000 to common service architecture 100. The automated migration tool 1530 may allow reverse migration. The server architecture 2000 may serve services necessary for a client's websites from a dedicated machine. The dedicated machine may be a server capable of serving all the services required by the client's websites. Exemplary servers may include a server 2002 with dedicated memory 2030 and a server 2004 with dedicated memory 2032. The server 2002 may provide the services that are necessary for websites owned by a client 2010. Likewise, server 2004 may provide the services that are necessary for websites owned by client 2008.

In the example of FIG. 20, the websites owned by the client 2010 may include exemplary websites as website 2012, website 2014, and website 2018 that may require fifty chat accounts and FTP services for the website 2012, five hundred email address accounts and HTTP services for the website 2014, and a thousand user chat account service for the website 2018. Similarly, the server 2004 may provide the necessary services for websites owned by a client 2008, such as website 2020 that may require a one-thousand transaction per day service, and website 2022 that may require video upload and download/streaming services.

The common service architecture 100 may serve a plurality of unrelated/unaffiliated clients from a plurality of shared servers 2028. In the example of FIG. 20, the plurality of shared servers 2028 may include a server 103A, a server 103B, a server 103C, a server 103D, a server 103E, a server 103F, and a server 103G that each may be any of a variety of server types including web servers, data servers, computing servers, cloud-based servers, and the like. The shared servers 2028 may be shared among a plurality of websites, such as migrated websites 2012A, 2014A, 2018A, and non-migrated websites 310 and 312. The shared environment provided by the shared servers 2028 may include shared memory across the multiple clients 2010A, 2040, and 2042. The shared storage 106 may serve as the shared memory that may store data for the unrelated/unaffiliated hosted websites of the common service architecture 100 clients.

As described with respect to the embodiments of FIG. 17 through 19, data provided by the automated migration tool 1530 may be configured to provide specific service packages from common services hosted by the common service architecture 100. Alternatively, the common services may be embodied as a plurality of software processes running on one or more of the shared servers 2028 for adapting common services to provide the services necessary for each client's websites. The adapted services are depicted by service package 320 for client 2040, service package 322 for client 2042, and service packages 324 and 324A for migrated client 2010A. Alternatively, service package 320 may be provided to more than one client, such as client 2040 and client 2042 as depicted by optional connection between service package 320 and client 2042. Further in this example, two migrated websites owned by client 2010A may receive the same service package (e.g. website 2014A and website 2018A may both receive service package 324A. Such a configuration may occur when the client 2010A has initialized a new website (e.g. 2018A) and has used website 2014A as a template. Until the client 2010A customizes the services for new website 2018A, the adapted common services may be the same for the two websites.

The embodiment of FIG. 20 further illustrates the flexibility of the common service architecture 100 by showing that a single client 2010A may be able to access web hosting services through two or more service packages 324 and 324A to service his websites and/or his hosting account. Each service package 324 and 324A may have a different look-and-feel that may visually indicate to the client 2010A which service package, and therefore which of his hosted website(s) he is accessing. In another example, client 2010A may access his web hosting account configuration and control the web hosting services available to each of his three websites through a look-and-feel of a client interface panel provided through service package 154. Service package 324A may include the services needed for the websites but may not allow for administrative access to the web hosting account, thereby facilitating client 2010A to allow a third party or other user access to various aspects of his website hosting with the common service architecture 100 without providing full access to all aspects of his account.

The common service architecture 100 may be a cloud computing environment. In the cloud computing configuration, the shared servers 2028 may broadly represent a plurality of shared resources, software, and information that may be utilized by the websites. A server of the shared servers 2028 may be shared among the websites on demand, such as to provide a common service through service for adapting by 1708 when demanded by website 310, 312, and the like. The cloud computing configuration may enable provision of the services from the common service architecture 100 in the form of web-based tools or applications that web hosting clients or users of the hosted websites may access and use through a program (e.g. a web browser).

The common service architecture 100 may be a grid computing environment. In the grid computing configuration, multiple unrelated/unaffiliated websites may share computing infrastructure provided by the shared servers 2028 that may provide a flexible, power efficient, and scalable solution for a website. The servers in the grid may be pooled and provisioned to the websites on demand. Further, the grid computing configuration may increase the physical resources when required.

The common service architecture 100 may include a plurality of common service pools disposed across the shared servers. Each of the shared servers 2028 may be logically associated with a service pool to improve server utilization.

Figure 21:
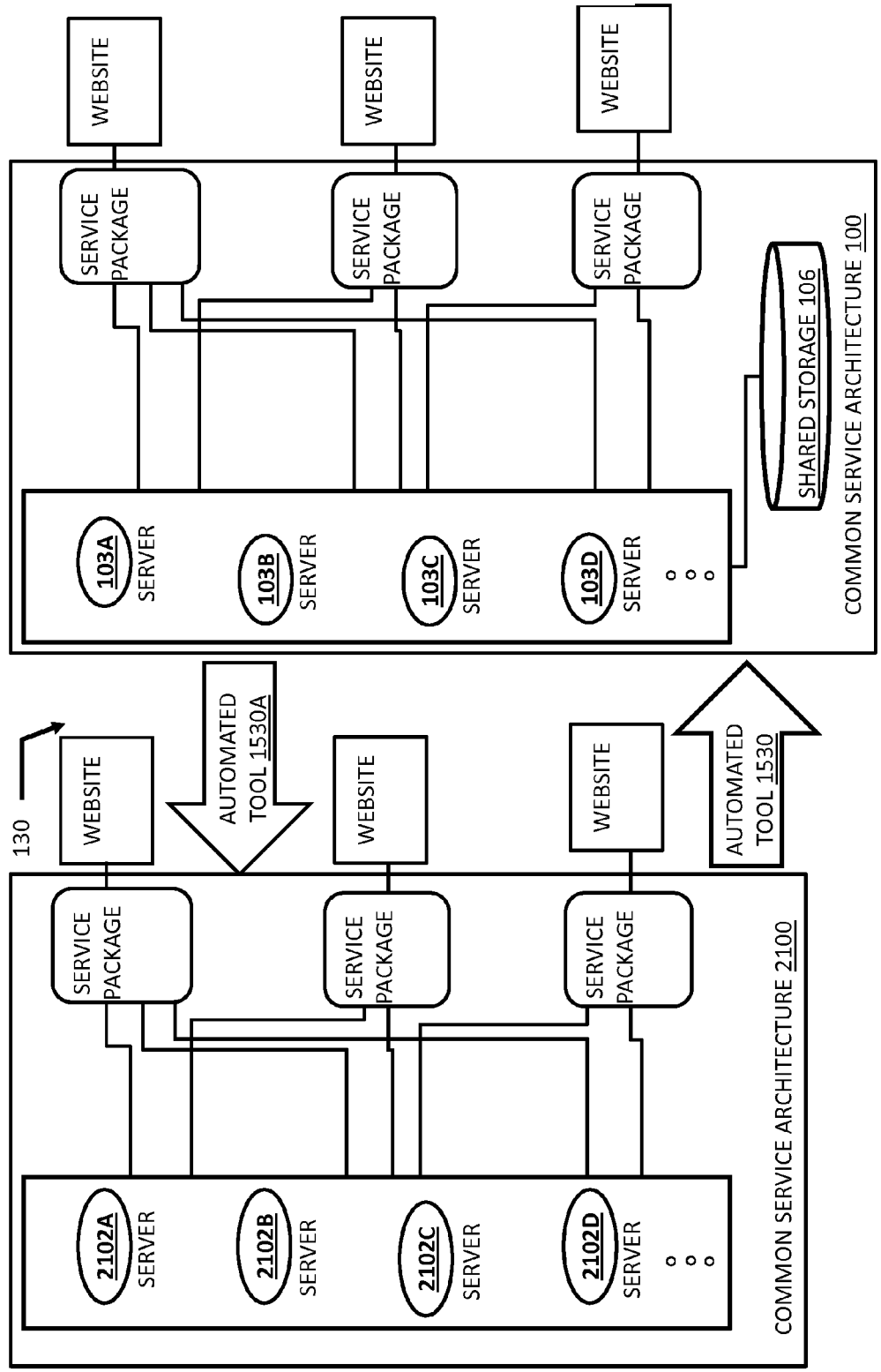
FIG. 21 depicts a schematic block diagram of a migration process for migration of a web hosting service from one common service architecture to another common service architecture.

FIG. 21 illustrates a schematic block diagram of a migration process 130 for migration of a web hosting service from common service architecture 2100 to common service architecture 100. Specifically, an automated migration tool 1530 may enable migration of the website hosting service. The automated migration tool 1530 may allow reverse migration. Each of the server architectures may serve a plurality of common services from a plurality of machines to a plurality of unrelated/unaffiliated websites. The plurality of machines may be a plurality of web servers. Features and capabilities that may relate to serving a plurality of common services from a plurality of machines to a plurality of unrelated websites may be provided by either or both common service architectures (100 and 2100) based on the descriptions of common service architectures which are also referred herein as new web hosting architectures. Migrating from one common service architecture 2100 to another common service architecture 100 may be as basic as copying information related to the adaptation requirements for each website from the shared data store 106 of a first website hosting architecture to the shared data store 106 of a second website hosting architecture and serving the websites to be migrated with the second website hosting architecture. If the first website hosting architecture is configured into service pools, servers in the second website hosting architecture may already serve the same common services as the servers in the first website hosting architecture.

Migration may alternatively include configuring the servers ($2102x$) in the first common service architecture 2100 to work cooperatively with the servers ($103x$) in the second common service architecture 100, thereby effectively increasing the number of machines available to serve the plurality of common services to the plurality of unrelated websites that may include the websites served by the first website hosting architecture and the websites served by the second website hosting architecture.

At least one of the common service architecture 100 and the common service architecture 2100 may be configured as a cloud computing environment. In the cloud computing configuration, the servers may broadly represent a plurality of shared resources, software, and information that may be utilized by the websites. A server may be shared among the websites on demand. The cloud computing configuration may enable provision of the services in the form of web-based tools or applications that web hosting clients or users of the hosted websites may access and use through a program (e.g. a web browser).

At least one of the common service architecture 100 and the common service architecture 2100 may be configured as a grid computing environment. In the grid computing configuration, multiple unrelated/unaffiliated websites may share computing infrastructure provided by the architectures for a flexible, power efficient, and scalable solution. The servers in the grid may be pooled and provisioned to the websites on demand. Further, the grid computing configuration may increase the physical resources when required.

At least one of the common service architecture 100 and the common service architecture 2100 may be configured to include a plurality of common service pools disposed across the plurality of machines. The service pools may include one or more service-specific groups of machines for providing various services such as, but not limited to, email, HTML services, website generation, behavior tracking, transactional services, data access (e.g. FTP), media streaming, e-commerce, and the like. The service groups may consist of machines that provide one of the services provided by the architecture.

Figure 22:
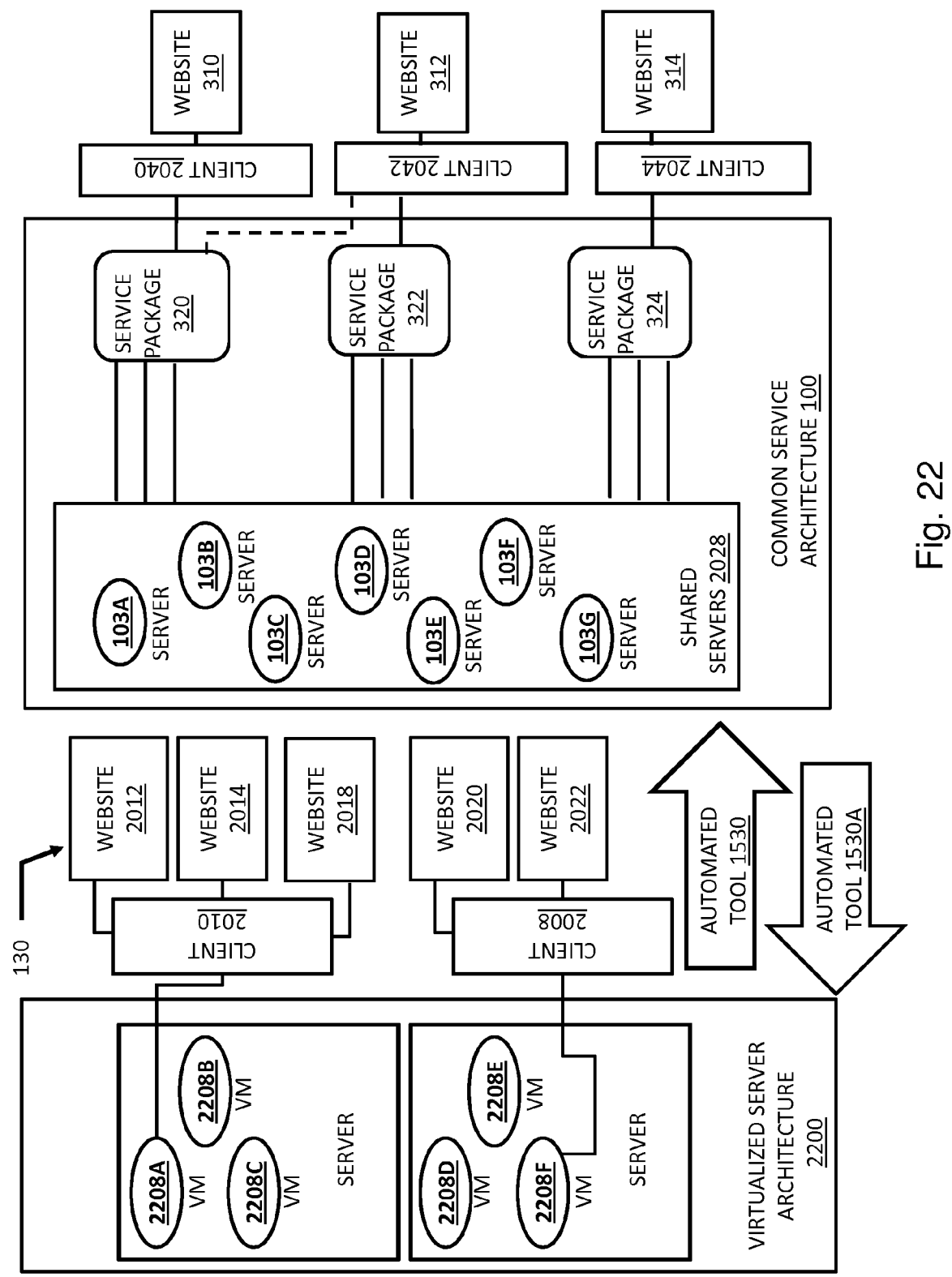
FIG. 22 depicts a schematic block diagram of a migration process for migration of a web hosting service from a virtualized environment to a shared environment for serving multiple clients.

FIG. 22 illustrates a schematic block diagram of a migration process 130 for migration of a web hosting service from a virtualized environment shown as virtualized server architecture 2200 to a shared environment for serving multiple clients. The shared environment may be represented as common service architecture 100 as described herein. Migration process 130 may be performed by an automated migration tool 1530. The automation migration tool 1530 may allow reverse migration. The virtualized server architecture 2200 may be configured to serve services necessary for a client's websites from a specific virtual machine. The dedicated virtual machine may be embodied as software on a server and may be capable of serving all the services required by the website.

The virtualized server architecture 2200 may provide virtual server-based hosting. Virtual server web hosting may enable the web hosting provider to offer near dedicated server capabilities and performance without the costs of individually dedicated hardware. The virtualized server architecture 2200 may hide physical characteristics of the web hosting platform from the web hosting client but may associate one web-hosting client to one virtual server (also referred as a container).

Migration from virtual server architecture 2200 to common service architecture 100 may be nearly identical to migration techniques described above, and in particular may be similar to the migration process described in association with FIG. 20. Whereas the description of the embodiment of FIG. 20 refers to migrating from an architecture based on a 'dedicated machine' for each client's website, the embodiment of FIG. 21 refers to migrating from an architecture based on a 'dedicated virtual machine'. With the caveat that virtual machines operate differently than physical dedicated machines, migration from a dedicated virtual machine environment may function nearly the same as migration from a dedicated machine environment. The dedicated machine environment of FIG. 20 included a plurality of dedicated machines (e.g. servers) with a one-to-one mapping of a machine (2002/2004) to a client (2008, 2010). Likewise for the embodiment of migration process 130 depicted in FIG. 22 there is a one-to-one mapping of a virtual machine (2208A, 2208F) to a client (2008 and 2010). Migration of data, services, and other website hosting elements from virtualized server architecture 2200 may proceed using substantially the same processes as migration from dedicated server architecture 2000. Therefore, the descriptions of migration services, features, benefits, the resulting adapted common service architecture, and the like are not repeated here but instead are described with respect to FIG. 20.

The common service architecture 100 may be configured as a cloud computing environment. In the cloud computing configuration, the shared servers 2028 may broadly represent a plurality of shared resources, software, and information that may be utilized by the websites. A server may be shared among the websites on demand. The cloud computing configuration may enable provision of the services from the common service architecture 100 in the form of web-based tools or applications that web hosting clients or users of the hosted websites may access and use through a program (e.g. a web browser).

The common service architecture 100 may be a grid computing environment. In the grid computing configuration, multiple unrelated/unaffiliated websites may share computing infrastructure provided by the shared servers 2028 that may provide a flexible, power efficient, and scalable solution for a website. The servers in the grid may be pooled and provisioned to the websites on demand. Further, the grid computing configuration may increase the physical resources when required.

The common service architecture 100 may include a plurality of common service pools disposed across a plurality of servers. The plurality of service pools may provide the plurality of services to the websites. The service pools may include one or more web servers. The service pools may be logically grouped on the basis of service offerings. The service pools may include one or more service-specific groups of web servers for providing various services such as, but not limited to, email, HTML services, website generation, behavior tracking, transactional services, data access (e.g. FTP), media streaming, e-commerce, and the like. The service groups may consist of servers that provide one of the services provided by the common service architecture 100.

Figure 23:
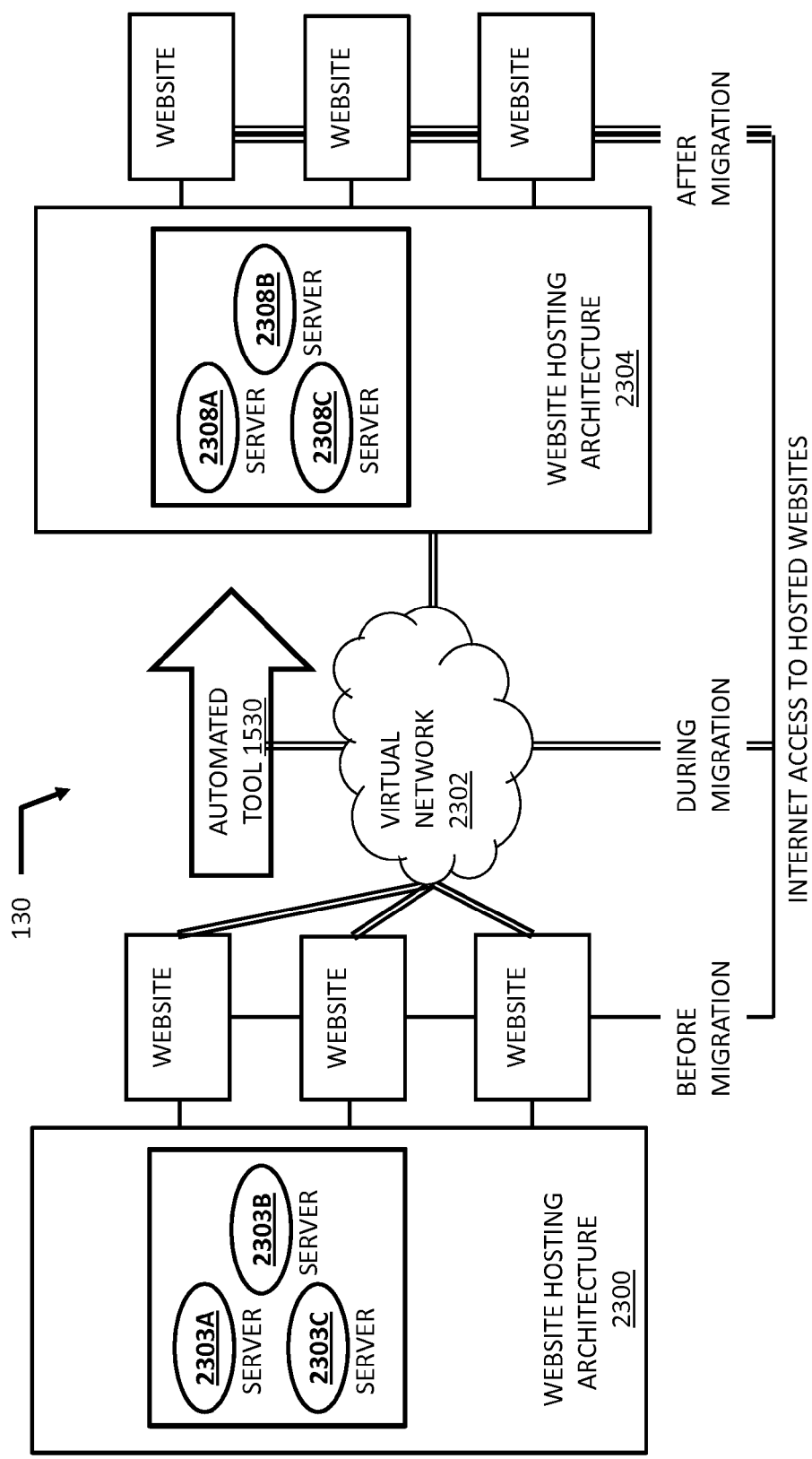
FIG. 23 depicts a schematic block diagram of a migration process for migration of a web hosting service from one web hosting architecture to another web hosting architecture using a virtual network.
Figure 24:
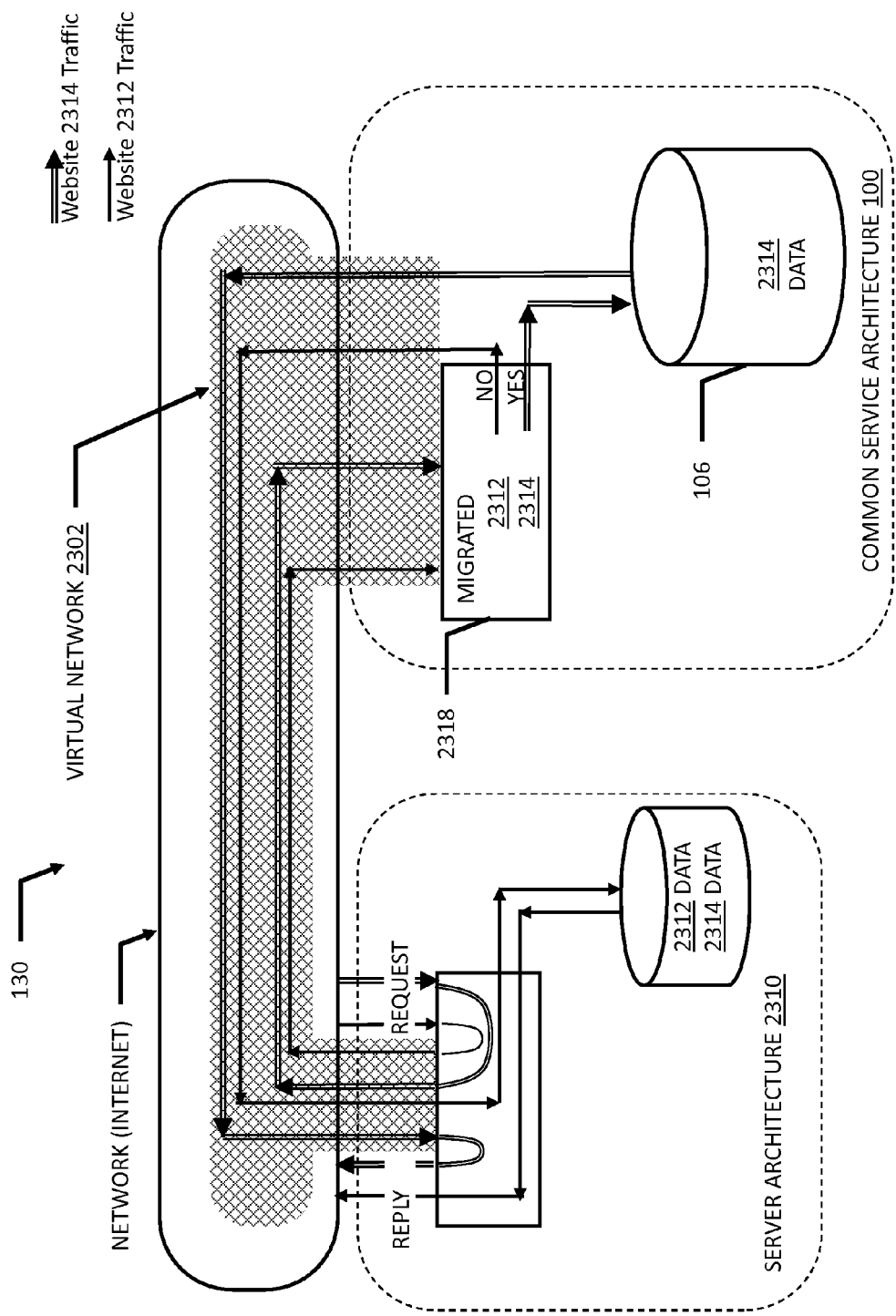
FIG. 24 depicts exemplary request-response cycles for websites during migration from a server architecture to a common service architecture.

FIG. 23 illustrates a schematic block diagram of a migration process 130 for migration of a web hosting service from web hosting architecture 2300 to web hosting architecture 2304 wherein a virtual network, such as an exemplary virtual network 2302, may be used during migration process 130. FIG. 24 illustrates exemplary request-response cycles for websites during migration from server architecture 2310 to common service architecture 100. To the extent that the descriptions of FIGS. 23 and 24 are the same, references to both or either figure will be used below. In an example, web hosting architecture 2300/2310 indicates that the description may be the same for either FIG. 23 or FIG. 24.

An automated migration tool 1530 may be used for migration process 130. The automated migration tool 1530 may allow reverse migration. The virtual network 2302 may be used to facilitate keeping a plurality of websites active during movement of Internet Protocol (IP) addresses from the web hosting architecture 2300/2310 to the web hosting architecture 2304/100. Any of the web hosting architectures 2300/2304/2310/100 may be any one of a grid computing environment, a cloud computing environment, an environment in which common services are grouped together as a service pool, or an environment in which shared servers are used to provide services to a plurality of unrelated/unaffiliated websites. The web hosting architectures 2300/2304/2310/100 may also be a combination of the above environments.

Owing to the general structural constraints of Internet-style routing, migration techniques may be based on a batch process that requires taking down a batch of URLs (e.g. 255) to migrate even one URL. The routing limitation relates to a constraint that a URL cannot be advertised as existing at two different physical places at the same time; therefore, changing the physical location of even one URL may result in various URLs within the same range of 255 URLs being temporarily affected until the migration of the URL is completed. Therefore, batch-based migration techniques may affect up to as many as 255 URLs at a time generally due to how internet routers handle IP addresses.

The automated migration tool 1530 may work cooperatively with a virtual network-based migration technique that may overcome routing limitations of batch-based migration while supporting individual IP address migration. This technique may include setting up a proxy (e.g. virtual LAN) for all IP addresses to be migrated and managing routing based on the migration status.

With this technique, migration may occur on a URL-by-URL basis without other URLs being affected. In addition, new physical IP addresses may be broadcasted one-by-one as migration proceeds. With the use of a virtual network during migration, internet access to hosted websites may access the old physical locations before migration, the virtual network during migration, and the new physical address after migration as depicted in FIG. 23.

Referring to FIG. 24, the virtual-network migration technique may facilitate the migration of old content from an Original Web Host (OWH) that hosts site A (WCA) and site B (WCB) to the common service architecture 100 Web Host (NAWH) through a Virtual LAN or VPN. Although site A and site B may be hosted by the same OWH, each site may be served by a separate server and located a physically disparate locations. Because the virtual network-based migration techniques of the common service architecture 100 may allow clients to completely or incrementally implement a migrated website on a web host of the common service architecture 100, the web pages and services to be migrated may be operated in parallel utilizing both the original web host and the new architecture web host during migration, thereby mitigating the data disruptions normally associated with batch-based migration.

Virtual networking may facilitate improved web hosting migration by supporting assigning one or more addresses to migrating content without externally binding the addresses to a physical interface. Such a configuration may be useful, when multiple occurrences of the web servers are bound to different addresses. Virtual networking or IP may also be referred to as 'circuitless' or loopback interfaces that may be used herein without deviating from the scope of the invention.

Virtual networking may be used where multiple paths are required for facilitating communication between the local gateway and the web server. Virtual networking may also facilitate load balancing, fault tolerance and information redundancy for 24×7 operations. Referring again to FIG. 24, the original web-hosting content at site A and Site B may hold content for responding to a web request. A Virtual Private Network (VPN) may be established in between the original web-hosting server and the new architecture web host. Subsequently, the migration facility 130 associated with the common service architecture 100 may initiate a migration process for transferring content from WCA and WCB to the new architecture web host (NAWH). The entire content may be transferred from WCA to NAWH. Alternatively, the entire content WCB may be transferred to the NAWH with one section of content from WCA being transferred to the NAWH. Another alternative may be that the entire content of WCA may be transferred, while only partial content of WCB may be transferred.

In the embodiment of FIG. 24, WCA content may at most be partially migrated and WCB content may be fully migrated. A web request for hosted web content may be received at the original web host (OWH) for either WCA or WCB. The request may be forwarded to the migration routing server at NAWH over VPN. The NAWH may determine if the request has been migrated; if so, then the NAWH may furnish the necessary content in response to the request. If a web request is received for WCA content that has not been migrated to the NAWH, then the request for WCA content may be send back over the VPN to a server in the OWH for gathering the WCA data and responding to the web request. If the request is for WCB content then the request may be forwarded to servers in the NAWH for gathering the migrated WCB data out of the shared storage 106 and responding to the web request. The WCB response may be forwarded over the VPN before being sent back to the web requester.

Referring again to FIG. 24, to facilitate reduced or ideally zero down time for a website being migrated to the common service architecture 100, migration may take advantage of migration features of the common service architecture 100 that may allow, among other things, partial data transfer and backup, as well as partial website (e.g. URL, individual service, etc.) migration without interruption of service or data access. Partial data transfer and backup may allow a portion of a website content to be relocated into a shared storage 106 of the common service architecture 100 so that user access to content provided through the website (for example) may be directed to either the original data source or through the common service architecture 100 to the shared storage 106.

Similarly, partial website migration or service-specific migration may enable migration of services over time. In an example, email accounts may be migrated before other portions of an acquired web-hosting client's account. In this way, the migration may be accomplished in one-step or in a multi-step process where services may be moved separately. The service pools of the common service architecture 100 may provide a backup of the migrating services.

The virtual-network migration technique shown in FIG. 24 may facilitate the migration of old content from an original web host server architecture 2310 that hosts a websites 2312 and 2314 to the web host of the common service architecture 100 through a virtual network 2302. The virtual network 2302 may be a virtual private network. Although websites 2312 and 2314 may be served by server architecture 2310, each site may be served by a separate server and located at physically separate locations. Because the virtual network-based migration techniques may allow clients to completely or incrementally implement a migrated website on a new web host, the web pages and services to be migrated may be operated in parallel utilizing both the original web host and the new web host during migration, thereby mitigating the data disruptions normally associated with batch-based migration.

Virtual networking may facilitate improved web hosting migration by supporting assigning one or more addresses to migrating content without externally binding the addresses to a physical interface. Such a configuration may be useful when multiple occurrences of web servers are bound to different addresses. Virtual networking or VPN may also be referred herein as 'circuitless' or loopback connections without detracting from the scope of the invention.

Virtual networking may be used, for example to facilitate using multiple network communication paths for facilitating communication between a local gateway and a web server. Virtual networking may also facilitate load balancing, fault tolerance, and information redundancy for 24×7 operations. Referring again to FIG. 24, the original web hosting content at website 2312 and website 2314 may hold content for responding to a web request. A VPN may be established between a server in the server architecture 2310 and a server in the common service architecture 100. Subsequently, the automated migration tool 1530 associated with the common service architecture 100 may initiate a migration process for transferring content from the websites to the common service architecture 100.

In the example of FIG. 24, website 2312 content is at most partially migrated and website 2314 content is fully migrated. An Internet request for hosted web content may be received at the original web host 2310 for either website 2312 or 2314. The request may be forwarded to a migration routing server 2318 over a virtual network 2302. The migration routing server 2318, which may be one of the servers 103 or load balancers 112 of the common service architecture 100 may determine if the request has been migrated; if so, then the common service architecture 100 may furnish the necessary content in response to the request. If a web request is received at the migration routing server 2318 for website 2312 content that has not been migrated, then the request for website 2312 content may be sent back over the virtual network 2301 to a server in server architecture 2310 for gathering the website 2312 data and responding to the web request. If the request is for 2314 content, then the request is forwarded to servers in the common service architecture 100 for gathering the migrated website 2314 data out of the common storage 106 and responding to the web request. The website 2314 response may be forwarded over the virtual network 2302 before being sent back to the web requester. Alternatively, the common service architecture 100 may respond directly to the web requester.

The web hosting platform 100 may include an analytics facility 134 for analyzing data for predicting and managing the retention of the client, mapping of various products that may be offered to the clients, conducting data mining, conducting predictive analysis, and the like. The analytics facility 134 may facilitate applying various types of statistical analyses on data that is obtained from a variety of sources including client interactions with the web hosting platform 100, products available to clients, product sales performance data, product roadmaps, client retention data, competitive offerings, acquired entity data, third party data, and the like. A key source of data is the large diversity of web hosting clients. Web hosting client-related data may include data provided by a client during registration for web hosting. This client provided data may include client details such as individual identification (e.g. user name), organization with which the client maybe associated (e.g. client employer), physical location, subscribed web hosting plan, prior web hosting experience, prior web hosting provider, and the like. We will discuss associations of the analytics facility 134 and client-related data in detail below.

The web hosting platform 100 may be substantially based on client subscriptions. Survival analysis for a subscription business may be based on an application of statistical models from medicine. In medicine, survival analysis is based on using statistical tools to look at survival rates of patients against a control group. Kaplan-Maier statistical tools are used in medicine, and similar techniques may be applied to look at survival rates of web hosting clients. Survival is generally represented as a mathematical curve starting at 100% and declining over time, such as a number of subscription days, months, or years on the new web hosting platform 100. The large populate of clients that use the new architecture web hosting platform 100 may facilitate building survival analysis applications based on those clients and the time clients remain subscribed to the platform to see how long they survive and why they survive. Longer surviving clients mean longer term billing. To access the massive amount of client-related data for survival and retention analysis, the analytics facility 134 may plug into the OSS of the new architecture web hosting platform 100 to strip off information about clients, client patterns and behavior for use with survival analysis facilities, including black box type facilities. With the analytics facility 134, one can view stacked indexes of survival characteristics based on survival rates for a variety of client parameters, such as client origin. In an example clients may be sourced variously from specific geographies (e.g. Russia), from referrals (e.g. GOOGLE internet/web search results), from acquisitions, and the like. The stacked index may show retention characteristics by origin to facilitate focusing client retention activities.

Hazard analysis facilitates determining the big driving factors for client retention or loss. Activity patterns of clients can be used as co-variants in hazard analysis for retention-factor detection. Example client patterns may include frequency of contact, price activity, domain registration, and the like. In an example, clients who have not registered a domain in more than six months may appear in a group of higher hazard clients than those who have registered a domain within the past six months.

The analytics facility 134 may also be beneficial in product management, marketing, sales, and development. The analytics facility 134 may include product mapping/confidence calculation that may be presented on a three-dimensional (3D) product map. Such a 3D map may include distances on X, Y and Z dimensions for all customers for all customer products, thereby determining client data-related distances between correlated products. A large scale implementation of the new architecture web hosting platform 100 may include more than one-million client and may also include a large number of products some of which differ only by price while others differ substantially in functionality, features, and the like. With a very large number of clients and a large number of products, a product mapper may provide insight into which products are interesting to which customers. A product mapper may also enable developing insight about potential interest in products that have a very small number of users by determining its proximity to a product with a large number of users. Even when products look completely unrelated, the product mapper algorithms look at usage patterns of customers who buy one product or another and determine "distance relevance" of one product to another. One potential result of the product mapper algorithms is clustering of products along dimensions not readily apparent from the product itself. Clustering may enable development of product profiles of related products that may suggest certain product bundling options and/or co-marketing approaches. By analyzing closely clustered products, a product that is selling well to a small group of clients may be able to be positioned to be sold to a large group of clients who are buying another product in the cluster.

The analytics facility 134 may also facilitate turning independent customer-by-customer profiles into sales and product offering opportunities. For any given product, an odds calculator facility uses information about all clients who bought the product and all clients who did not to determine the odds of selling the product to each customer. The odds calculator then fits an algorithm into that odds calculation so that there is a better than even chance of making a sale. Using an algorithm that attempts to make large numbers of predictions from relatively small sample data sets, such as a random forest algorithm from computer gaming science, the odds calculator generates a massive prediction grid of all customers (e.g. X axis) and all products (e.g. Y axis)). Suitable algorithms may include the following capabilities: produce highly accurate classifications; handle large number of input variables; estimates the importance of variables for classification; estimates missing data; maintains accuracy when a large portion of data is missing; facilitates computing proximity of data classes for detecting outliers and for visualizing the data; and facilitates experimental detection of interaction of variables. Techniques for this use may include homogeneous tree algorithms that achieve diversity through randomization, and heterogeneous combinations of multiple tree algorithms, such as mean margins decision tree learning algorithms, standard entropy-reducing decision tree learning algorithms, multivariate decision trees, oblique decision trees, perceptron decision trees, and the like. Alternative to learning decision tree type algorithms include multiclass support vector machines, and algorithms that facilitate predictive analysis of current and historical facts to make predictions, such as classification tree algorithms, regression tree algorithms, Classification And Regression Tree (CART) algorithms, CHi-squared Automatic Interaction Detector (CHAID) algorithms, QUEST algorithms, C5 algorithms, and boosted trees algorithms. Client-related data that overlaps between a customer who bought the product and one who did not is then used to determine the odds that another customer with that same overlapping data will buy the product. This produces an odds ratio for that represents the likelihood that each customer will buy each product. This can be presented in an odds ratio stack for a given customer that facilitates determining high odds ratio for similar customers buying the product. Over time, the sales results of products that are offered for sale to similar customers are factored into the results and the odds are recalculated. Because the new architecture web hosting platform 100 has a massive number of clients 101 (over one-million), the existing sales data turns out to be a generally useful for fitting an algorithm as described above. Being based on computer gaming and science concepts, the odds calculator may automatically generate and fit an algorithm that presents measurable odds that are reflected by the actual client sales data. In addition, because the odds calculator method includes feedback based on ongoing sales attempts the algorithm that was initially fit to the existing sales data is automatically adjusted and refined as sales data is provided. Such a tool may be useful to help agents 118 pick more products to offer for sale to many customers.

The analytics facility 134 may operate on a variety of data types that may be obtained from a variety of sources. Data may be acquired via a data mining facility, accessed directly by the analytics facility 134, through third party data sourcing facilities 128, and the like. Data may preferably be obtained through the OSS facility because it may provide better analysis as it includes data from a large pool of web hosting clients 101. Acquisition activity is also another notable source of data for various analytics processing. Newly acquired entities often have rich data related to their clients, web hosting products, performance, and the like. Evaluating potential acquisition targets is one application of the analytics facility 134 so data that may be obtained from or about potential acquisitions may facilitate decisions about the acquisition and potential impact on existing clients 101.

Predicting and managing client 101 retention may benefit from client retention analysis based on various survival analysis techniques that may be borrowed from the medical and actuarial fields and applied to the subscription-based web hosting platform business model. In a subscription-based business model, the attrition rate of the clients 101 has sometimes been related to factors such as client dissatisfaction, cheaper and/or better offers from the competitors, more successful sales and/or marketing by the competitors, or reasons related to the client web hosting need "life" cycle. Thus, by analyzing the survival rate of the clients 101 in a subscription-based business model, preventive measures may be taken beforehand to retain clients. While the web hosting platform client agreement is predominantly subscription-based, other subscription-based businesses may benefit from similar survival analysis techniques, such as mobile phone networks, computer security services, data backup services, mobile add-on services, and the like.

The analytics facility 134 may facilitate applying survival analysis to identify the key factors in survival and attrition of clients 101 and thus, enable retention of the clients. The survival analysis may allow predicting when client accounts will turn, how long the clients 101 will stay, rates of churn, and the like. Survival analysis may be associated with a branch of statistics that may involve the modeling of time-to-event data which includes the study of durations between events. A few exemplary web hosting platform-related events may include loss of a client 101, addition of a client 101, renewal of a client 101, upgrade of a client account, suspension of a client account, default of an account, and many other experience of interest associated with the client 101. Survival analysis as applied to a subscription-based business model may generally include the use of a survival function to represent the probability of the occurrence of a client-retention related event. A suitable survival equation may be denoted as: '$S(t)=Pr(T>t)$' where "S" is the probability of survival at a point in time represented by "t"; t is a future point in time or perhaps a length of time, T denotes the time to failure (or some other action that terminates survival), and "Pr" denotes a probability function. Thus, the survival function may indicate the probability that the time of failure is later than some specified time; alternatively it may indicate the probability that a client 101 will remain a client beyond a future point in time "t".

To facilitate client retention management benefits, the survival analysis techniques described herein and elsewhere may facilitate study of the extent to which factors that are normally associated with the clients have affected some existing clients' survival duration; thereby potentially being useful in predicting the survival time for other clients 101. By analyzing a wide variety of client-related data for surviving clients as well as lost clients, performing survival analysis may facilitate determining key factors that may be involved in retaining clients 101. If an association between a factor and client retention may be established with a good confidence level, then the factor may be considered a key factor of client retention. Further analysis may be performed to determine if there is a one or more clients 101 to whom the factor is considered a key retention factor. An example of a key factor may include a rate of positive support events reported by the client 101. Survival analysis, such as a basic survival curve may be applied against any client-related parameter (e.g. survival factor) or a combination thereof to determine aspects related to client retention based on that parameter.

Further, the survival rate analysis facility may be configured to operate as a black box that may allow any pertinent data parameter to be analyzed for its relationship to client retention. For assessing client related data parameters, such a client retention analysis black box may be interfaced with the OSS facility of the new architecture web hosting platform 100 to directly analyze any type of client information that is accessible through the OSS. The objective of such a deployment of the survival rate analysis black box may include ongoing client retention parameter analysis. In an example of a black box application of the survival rate analysis facility, client origin may be analyzed against client survival to determine one or more relationships between client retention and origin. In this way, a user of the survival rate analysis facility may determine the expected survival rate over time of clients 101 who were originated through affiliate referrals. A low survival rate may indicate that affiliate referrals are not a good source of long term clients 101. The black box could be used to determine an association between client location and retention so that retention efforts could be properly directed locations of interest that have undesirable retention rates. The results may be presented as a stacked index of survival characteristics based on survival rate and client location or origin.

More generally, a black box analysis facility based on a survival rate model may be useful in determining the interaction of stimuli, client characteristics, decision process, client responses, and the like with retention. Such an analysis may allow for the assessment of controllable items, such as stimuli and items that are outside of the control of the web hosting facilitator, such as client characteristics and decisions. Examples of some facets of elements that could be analyzed for association with client retention include: stimuli, such as marketing stimuli, the 4 marketing "Ps" (product, price, place, and promotion); environmental stimuli which may include factors like economic, technological, political, cultural, demographic, and natural; client characteristics which may include attitudes, motivation, perceptions, personality, lifestyle, knowledge; decision factors which may include problem recognition, information search, alternative evaluation, purchase decision, and post-purchase behavior; client responses which may include product choice, brand choice, dealer choice, purchase timing, and purchase amount.

The client survival rate based on one or more parameters for a given period of time that extends into the future may indicate the probability that a client 101 that is associated with the one or more parameter will repurchase or re-subscribe in that particular period given the current product offering.

The platform may be used to build a database of survival data based on analysis of current client survival and retention. A database of survival data may be utilized to track historical survival and retention analysis that may be useful in further understanding details related to a lack of survival of former clients as new approaches for retention are developed. In addition, the database may be used to predict the survival or retention of the same client set for a new or different business model or product line. The stored survival data may further allow conducting an analysis of the survival or retention of the same set of clients 101 at different time frames.

Generally, survival rate may be a measure of lifetime related to an event, or of a length of time until/from the occurrence of an event. Survival rate analysis results may provide an indication and/or a probability of how much longer a client 101, or a group of clients 101, may be retained after an event takes place (e.g. acquisition of a competitive web hosting entity, increase/decrease in prices, and the like). Therefore, modeling events within a survival analysis facility may help with client retention efforts. It may also provide some estimate of the cost (e.g. in lost recurring subscription revenue) of taking an action. This may be useful in comparing a projected benefit from taking the action (e.g. increasing subscription revenue by increasing subscription rates) against the projected loss of clients 101 due to the action. Survival analysis may also be useful in projecting subscription revenue over time to help in establishing timing for certain events. In this way, taking an action that may cause a meaningful reduction in subscribers may be timed to occur when new subscriber rates are increasing to provide some offsetting revenue.

The survival analysis may involve various techniques including, but not limited to, Kaplan-Meier, Failure rate, Accelerated failure time model, Censoring, hazard function, discriminant analysis, multivariate analysis, logistic regression, rough data models, genetic programming, and others. The Kaplan-Meier analysis is a technique that involves the generation of tables and plots related to survival analysis based on event history data. The Kaplan-Meier analysis may be utilized to interpret data relating to survival analysis, evaluate the time period of association of a client (e.g. client subscription term), and to analyze financial data for evaluating sub-business, i.e., monthly recurring payments. Further, the plot of the Kaplan-Meier analysis may include depicting the survival data as a series of horizontal steps of declining magnitude which, when a large enough sample is taken, approaches the true survival function for clients 101 under the study. The value of the survival function between successive distinct sampled observations may be assumed as constant. With two different factors, two different Kaplan-Meier curves may be obtained for a client 101. The two different curves may be compared through a Log-rank test which is used to compare the survival distributions of two samples.

Another form of analysis that may be applied to new web hosting client retention related data may include failure rate analysis. Failure rate analysis helps in understanding factors that impact a frequency or time-to-failure of an engineered system (e.g. a hardware component). A failure rate may be expressed as failures per hour and therefore is dependent on the passage of time. As a system ages, the predicted failure rate is likely to increase because sample data from a population of similar systems will include a larger number of failures than when a system is young. Therefore, it is often the case that a failure rate of a system in its fifth year of service may be many times greater than its failure rate during its first year of service. Further, the failure rate analysis may be utilized to identify a probability of a system failing at any given point in time. Alternatively, one can predict a time when a given system is likely to fail. When failure analysis is applied to web hosting subscription data, one may predict when any given client 101 or category of client may stop renewing a web hosting subscription. Certain measurable activities (e.g. visits to a client's hosted web content or web pages) may be useful in determining if a web hosting client 101 may be more likely to renew and therefore extend the 'failure rate. Renewal rates of similar clients 101 may also help in understanding when a client is likely to 'fail' to renew.

For complete observation of a client 101, an ideal client retention analysis may include all of the time from when the client 101 first subscribes to the web hosting platform services until the time that the client 101 disassociates from the web hosting platform. However, clients 101 engage and disengage with the platform on any given day so such an analysis, while ideal, may lead to an indefinite study due to waiting for an event associated with the client to occur (e.g. disengaging with the platform). Therefore, instead of conducting the survival analysis for each client 101 for an indefinite time, the analytics facility 134 may conduct the survival analysis for a portion of clients 101 over a fixed time interval. However, survival analysis for a particular time frame may not give the complete data regarding the clients and thus may lead to left and right censoring of the clients. The right censoring may occur when a client 101 disassociates with the web hosting platform 100 before the end of the survival analysis time frame. The left censoring may occur when the client 101 disassociates with the web hosting platform 100 before the survival analysis time frame begins. In embodiments of the invention, the analytics facility 134 may employ proportional hazards models to overcome the left and right censoring of the clients 101. In examples, the proportional hazards model may be Cox proportional hazards model.

The survival of a client 101 may be characterized by other statistical functions including a hazard function. A hazard function may be useful in helping to identify reasons for failure by organizing factors that may contribute to loss of a client 101 based on relevance of the factors. Each factor, event, client data parameter, and the like may be subjected to a hazard analysis to determine its contribution to client retention. A hazard function may be denoted by the mathematical function h(t) or $\lambda(t)$ in various survival analysis algorithms. The hazard function may be defined as an event rate at time 't' that is conditional on web hosting client survival until time 't' or later (mathematically T≥t). In terms of how it may be used in web hosting client retention analysis, it may predict the instantaneous rate of change of the probability that a client 101 will not continue as a client at time 't' based on the requirement that the client 101 was retained until time t. As known in the art, a formula for calculating a hazard of an event can be depicted as:

$$\lambda(t)dt = Pr(t \leq T < t + dt \mid T \geq t) = \frac{f(t)dt}{S(t)} = -\frac{S'(t)dt}{S(t)}$$

Therefore, the hazard function may be utilized by the analytics facility 134 to identify and potentially rank reasons for failure. The hazard function may also use factor analyses and/or other statistical analyses to organize client-retention factors based on their relevance. The factors may correspond to the parameters associated with the web-hosting client subscriptions. The statistical analyses may include, without any limitation, analysis of covariance (ANCOVA) and factor analysis. The ANCOVA is a general linear model and has a continuous outcome variable and one or more factor variables (qualitative). ANCOVA is treated as a merger of analysis of variance and regression for continuous variables. The ANCOVA tests whether certain factors have an effect on the outcome variable after removing the variance for which quantitative predictors (covariates) account. The factor analysis is a collection of methods used to examine how underlying constructs influence the responses on a number of measured variables. As known in the art, the factor analyses are of two types: Exploratory Factor Analysis (EFA), which attempts to discover the nature of the constructs influencing a set of responses, and Confirmatory Factor Analysis (CFA), which tests whether a specified set of constructs is influencing responses in a predicted way.

In an example, the hazard function analysis may allow predictions and analysis of the financial impact of mergers and acquisitions, impact of new product offerings, various promotion schemes, and the like. Mergers and acquisitions may include acquiring individuals that have their own websites, corporate houses, students having their own web pages and websites, non-profit organizations, and the like. Analysis of the survival of clients 101 on the basis of the new types of offerings may include analyzing the introduction of new product lines for the clients 101, new features in the products, combo packs of different products, additional discounts and schemes for a limited period, and providing free trial options. Analysis of the survival of clients 101 based on various promotion schemes may help identify if promotion schemes impact client retention, such as direct marketing; promotion offerings based on price, product characteristics, client, and location; and identifying additional product needs for existing clients and offering products to them. The hazard functions may also allow implementation of proportional hazard models that may facilitate further prediction of potential impact on client retention when a covariate is increased (e.g. more promotion, larger acquisition, etc.). In addition, the hazard function may allow implementation of conditional failure rate to augment client retention assessment.

The analytics facility 134 may facilitate survival analysis through the use of discriminant analyses. The discriminant analyses may include univariate analysis and multivariate analysis. The univariate analysis may allow classification of data into two sets using a discriminant equation. In an example, the two sets may be the retained clients and the lost clients. The discriminant function may be modeled in computer software for classifying the clients 101 into one of the two sets. Further, the univariate analysis may also be useful in predicting the clients 101 who may fall into the lost category and hence, timely corrective action may be initiated for retaining those clients 101. The multivariate analysis may allow modeling of a discriminant equation into more than two sets: retained clients; lost clients; and uncertain clients. The discriminant equation may be utilized for classifying clients 101 into one of the sets, which may be modeled. Further, the classification of clients 101 in different sets may facilitate understanding of the client behavior. Also, it may allow prediction of client behavior based on the earlier obtained data.

The analytics facility 134 may include implementing survival analysis with logistic regression model. A logistic regression model is a type of predictive model that may be used when a target variable is a categorical variable with two categories. In an example, the two categories may be client retained/client lost or client purchases product/client doesn't purchase the product.

The survival analysis may be implemented by rough data models. This model may involve partitioning of the whole data set and further ordering the set elements of the partition based on some cumulative parameters.

The survival analysis may be implemented by genetic programming. This approach may involve finding a complex equation that may define a data set in the best possible manner. The genetic programming may further be utilized in analyzing client behavior and identifying strategies for client retention.

The survival analysis may be utilized by the analytics facility 134 for other applications other than identification of client retention. The other applications of the survival analysis may include, without limitation, reinforcement strategy. The system may estimate the timing of a client 101 leaving the system and may also allow creating a strategy for retention of the client 101. The retention strategies may be modeled around 'the 4 Ps'—product, price, place, and promotion. The retention strategies may also be modeled around '7 Cs'— Connection, Concurrency, Comprehension, Communication, Conceptualization, Collaboration, and Collective Intelligence. The other applications may include designing an acquisition strategy, identifying the timing for acquisition, and the like. The applications may also include comparisons of the survival and/or hazard strategy. The other applications may also include allowing companies to develop client loyalty and treatment strategies to maximize the value of the existing clients. Further, for newly acquired clients, the survival analysis may help companies develop strategies to increase the desired pool of clients.

Further, the new architecture web hosting platform 100 may offer a variety of products to current and prospective web hosting clients 101. The analytics facility 134 may be utilized by a facilitator of the new architecture web hosting platform 100 in analyzing attributes associated with current and new products to ensure offering products that are highly likely to be desirable by clients 101. A web hosting platform facilitator may use the analytics facility 134 to create two dimensional (2D) or three dimensional (3D) maps of product spaces that may depict products and their distances from one another in a client data-dimensional space. The product distance maps may show different types of products at a relative distance with each other. The distance between the different products is indicative of a degree of commonality along one of the client data-dimensions. For a given client data dimensional space, the distance between various products may indicate potential associations among products that otherwise may be functionally quite different. In an example, a domain privacy product may be found to have properties that make it desirable to clients 101 who own a web page optimization product based on the 3D proximity of the two products.

Figure 28:
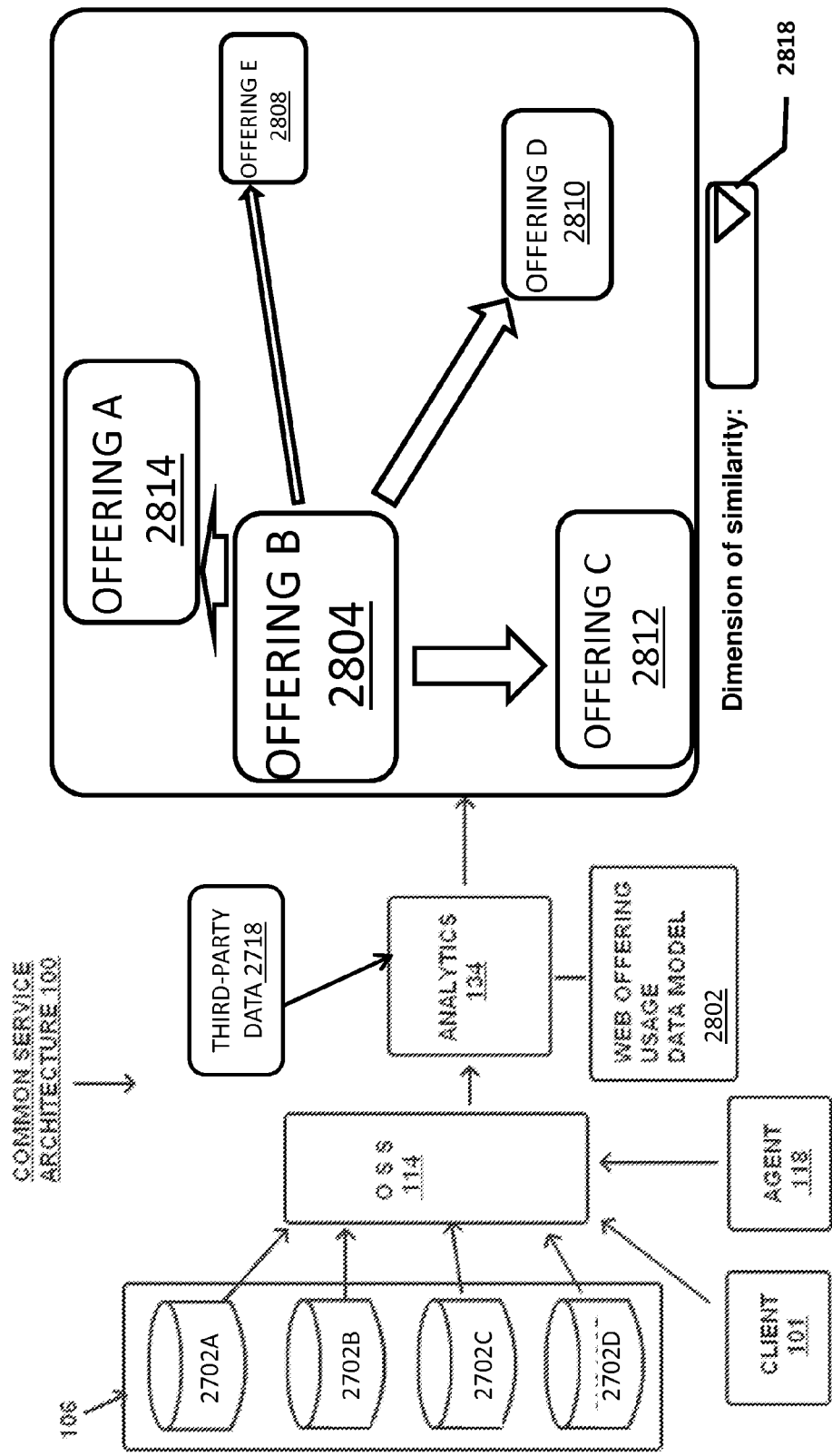
FIG. 28 depicts a schematic block diagram of a common service architecture that supports a website hosting service for providing 3D visualization of a product/service/offering mapping analysis.

Referring to FIG. 28, which depicts a 3D mapping of certain products offered through the new architecture web hosting platform 100, the various products B, C, D, E, F, G, and H may be depicted so that the relative size of the product outline and text is indicative of the proximity to the comparison product A. The relative size of the product icon compared to product A is indicative of the similarity of the product to product A as measured along the client data dimensional axes. In the example of FIG. 28, product A may share more common attributes with product B as compared to product C. Therefore, the distance between product A and product B will be relatively smaller than between product A and product C. Similarly, product A may share more in common with product H than with product E. Therefore, the distance between product A and product H will be smaller than between product A and product E.

The analytics facility 134 may utilize the 3D maps to relate clients 101 using those mapped products. Thus, in the example, where the distance of product A with product B is less than from product A to product C, the client 101 using product A may share more attributes with the client 101 using product B as opposed to the client 101 using product C. Similarly, a user may use the analytics facility 134 to generate 3D maps that analyze the similarity between the products.

The analytics facility 134 may utilize various 3D map formulation techniques including, but not limited to, Euclidean distance, Mahalanobis distance, Hamming distance, and Maximum norm. As known in the art, the Euclidean distance is the ordinary distance between two points, which may be measured with a ruler, and is determined by the Pythagorean formula. The "Mahalanobis distance" is a metric that is better adapted than the Euclidian distance to settings involving non-spherically symmetric distributions. It is useful when multinormal distributions are involved. The Hamming distance is a concept used in information theory and measures the minimum number of substitutions required to change one product into another or the number of errors that transformed one product into another.

The 3D maps may facilitate different types of product clusters and the associated clients. In different embodiments of the invention, the clustering may be, without limitation, hierarchical clustering, partitioned clustering, subspace clustering, correlation clustering, and the like. The clustering may facilitate market research related to clusters associated with the clients 101. The clustering may further facilitate positioning of products in the market and offering new products to the clients 101. Further, the clusters may be based on clients, products, price, and the correlated products. The clustering may further allow identifying related clients to offer new products and analyze products to generate overlap among users of two products. The measure of commonality in the overlap may give the related product information that may facilitate better sales.

The 3D maps may facilitate analysis of the client portfolio. The 3D maps may allow creation of product maps for specific clients, creation of product maps based on price of products, and creation of product maps based on the correlated products.

The 3D maps may facilitate creation of product indices. The products with a large amount of information may form the central index for other products. The product indices may facilitate association of different products with indexed products. The product indices may further facilitate bundling of products based on distance and client dimensions.

The 3D maps may facilitate identification of characteristics for buying a product. The identification of characteristics may be facilitated by applying random forest algorithm. This algorithm may include the following steps: Step 1—Create a plot for client 101 from 1 to 100,000 on the X axis and every product on the Y axis; Step 2—Analyze the data to identify clients 101 who purchased versus those who did not to determine the overlap and the odds that another client 101 will buy based on their similarity; Step 3—Identify the odds for selling a given product; Step 4—If something did not sell, go back and recalculate the odds; Step 5—Apply iteratively to refine the algorithm until a successful model emerges; and Step 6—Use optimization techniques for identifying the best possible solutions. Different optimization techniques may be utilized for identifying best possible solutions. The different optimization techniques may include, without limitations, genetic algorithms, simulated annealing, tabu search, artificial immune system, particle swarm optimization, intelligent water drops, ant colony clustering methods, and the like. The optimization parameters may include, without any limitation, brands associated with the products, price of the products, type of products, product association (how closely two products are related), and client retention. In examples, the product association parameter may be used in creating product associations for selling associated products.

The analytics facility 134 may utilize a data mining facility as a Client Relationship Management (CRM) tool to understand the behavior of the client 101. In The data mining facility may conduct affinity analysis to discover co-occurrence relationships among activities performed by (or recorded about) a specific individual client or groups of clients. The affinity analysis may be used to perform the market basket analysis, in which retailers seek to understand the purchase behavior of clients 101. The market basket analysis might tell a retailer that its clients often purchase bread and butter together, so putting both items on promotion at the same time would not create a significant increase in profit, but a promotion involving just one of the items would likely drive sales of the other. In another embodiment of the invention, the data mining facility may be used to identify client satisfaction parameters. In examples, the client satisfaction parameters may include, without any limitation, overall satisfaction with the deal, sales experience, product delivery experience, product experience, product servicing, relationship experience, complaint resolution/grievance handling, and collection experience.

Figure 25:
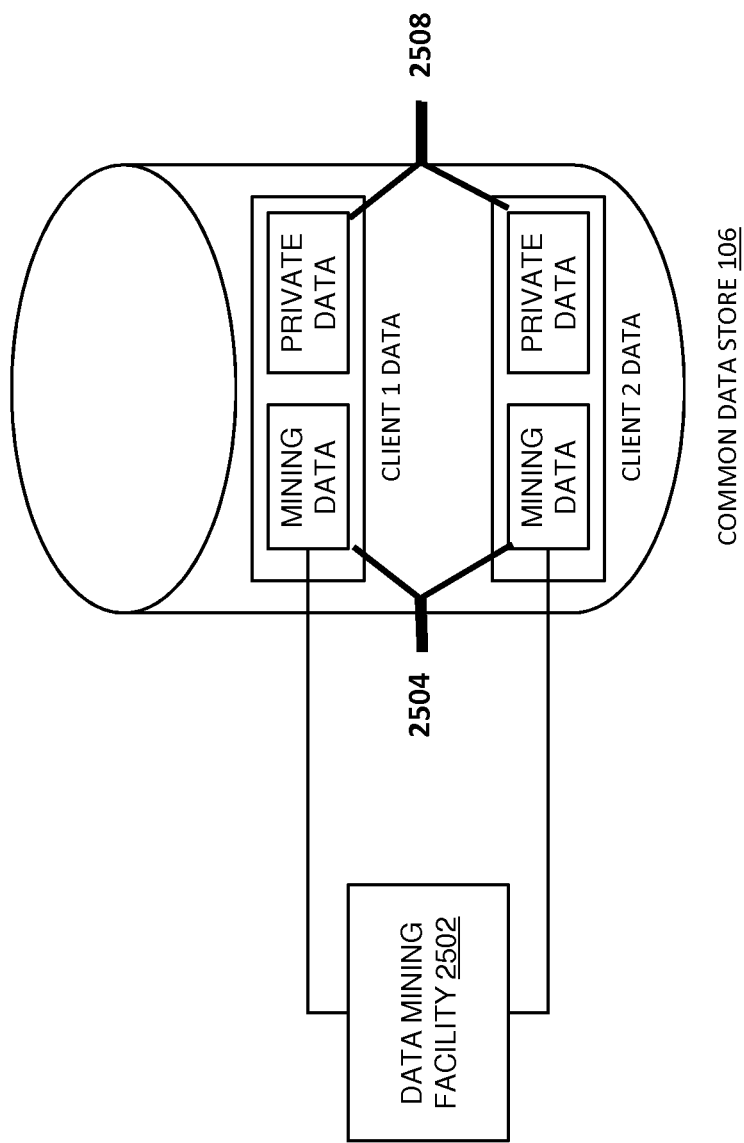
FIG. 25 depicts a common data store that includes data from various individual clients.

The data associated with the activities of the client 101 may be obtained for data mining through various channels. FIG. 25 illustrates a system for data mining the data associated with the activities of the clients 101. The system illustrated in FIG. 25 includes a common data store that may include data from various individual clients 101. In an example, the common data store may include data from two clients 101. Further, the data from each client 101 may have two segments of data. The first segment of data 2504 may include data that may be utilized by a data mining facility 2502 for conducting various types of analyses. The second segment of data 2508 may include private or confidential data. The data mining facility 2502 may obtain the data from the first segment 2504 of both the clients' data for applying various data mining techniques. The analytic module 134 may be coupled to the web hosting platform 100 through an API that may be provided for accessing data from the common data store 106 related to various client attributes, which may be utilized in performing statistical analysis for understanding client behavior. The results may be analyzed to create client retention strategies.

Figure 26:
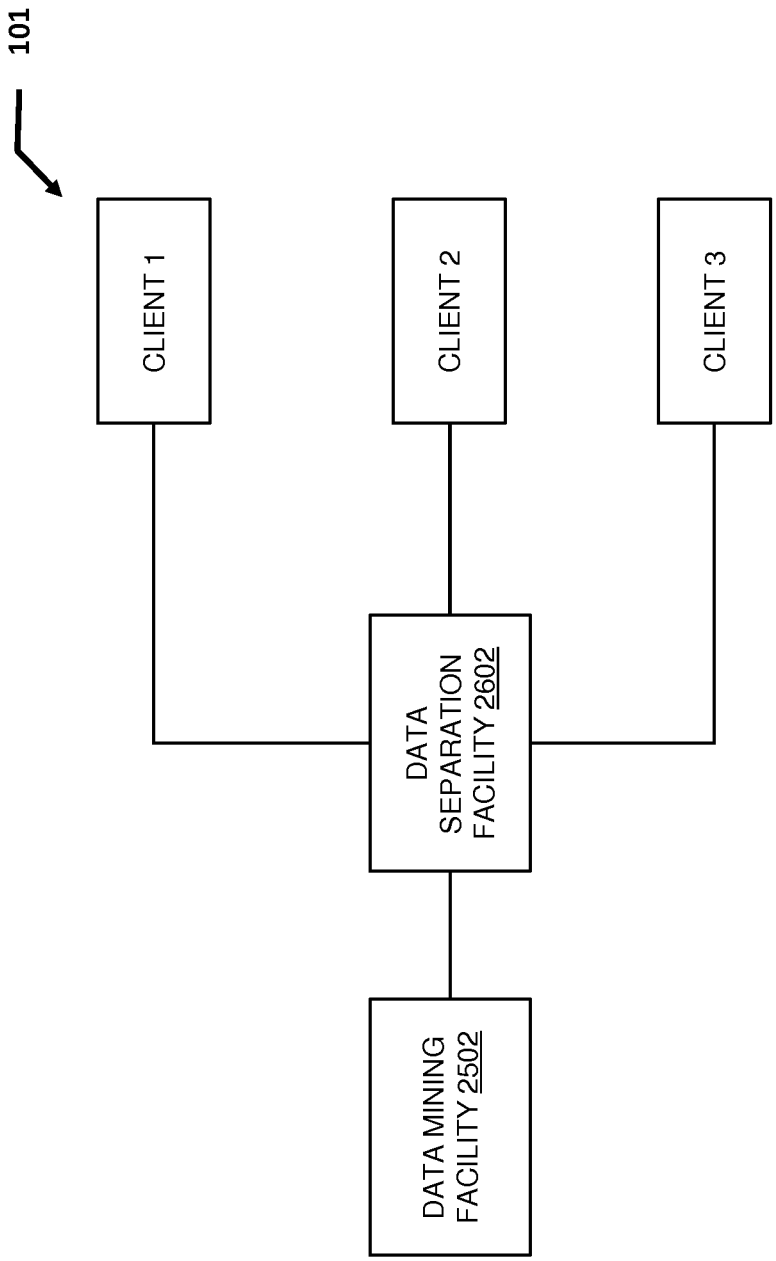
FIG. 26 depicts a system for obtaining data from various clients.

Referring now to FIG. 26, which illustrates a system for obtaining data from various clients 101. In an example, the system may include three different clients: client 1, client 2, and client 3. Further, the data from these three clients 101 may include both private or confidential data and the data to be utilized for data mining. A data separation facility 2602 may separate out the private data and the data to be utilized for data mining from all clients 101. A data mining facility 2502 coupled to the data separation facility 2602 may obtain the data that is to be utilized for data mining from the data separation facility 2602 to conduct various types of analyses.

The data mining techniques may include, without limitations, classification, regression, association rule learning, and clustering. Classification is a data mining technique used to predict group membership for data instances. The common algorithms for classification include decision tree learning, nearest neighbor, naive Bayesian classification, and neural networks. Regression is a data mining technique used to fit an equation to a data set. Association rule learning searches for relationships between variables. For example, a supermarket might gather data on client purchasing habits. Using association rule learning, the supermarket can find out the products frequently bought together and use this information for marketing purposes. Data clustering involves dividing data into groups of similar objects.

The analytics facility 134 may apply predictive analysis for the applications including, but not limited to, analytical Client Relationship Management (CRM), direct marketing, cross-selling, collection analysis, portfolio, product, or economy level prediction, and fraud detection. Analytical CRM is a part of CRM that aims at storing, analyzing, and applying the knowledge about clients and ways to approach clients by typically using databases, statistical tools, data mining, machine learning, business intelligence, and reporting methodologies. Direct marketing is a form of advertising that may reach and communicate with its audience directly without using the traditional forms of advertising through mediums such as television, newspapers, or radio. The advertiser communicates straight with the target audience through fliers, catalogue distribution, promotional letters, and street advertising. Cross-selling is a strategy of pushing new products to current clients based on their past purchases. This strategy is designed to widen the client's reliance on the company and increase the likelihood of client retention. Collection analysis includes analysis of the collection from a source and compares it with collections from other sources.

The analytics facility 134 may apply different models of predictive analysis including, but not limited to, predictive model, descriptive model, and decision model. The predictive model may use the past data for predicting future events. It may be implemented to increase the market efficiency. The descriptive model quantifies relationships in data and may be used to categorize clients 101 by their product preferences. The descriptive model may also be utilized in simulating a large number of individualized agents 118 for making predictions. This model may use the existing data for making a decision.

Figure 27:
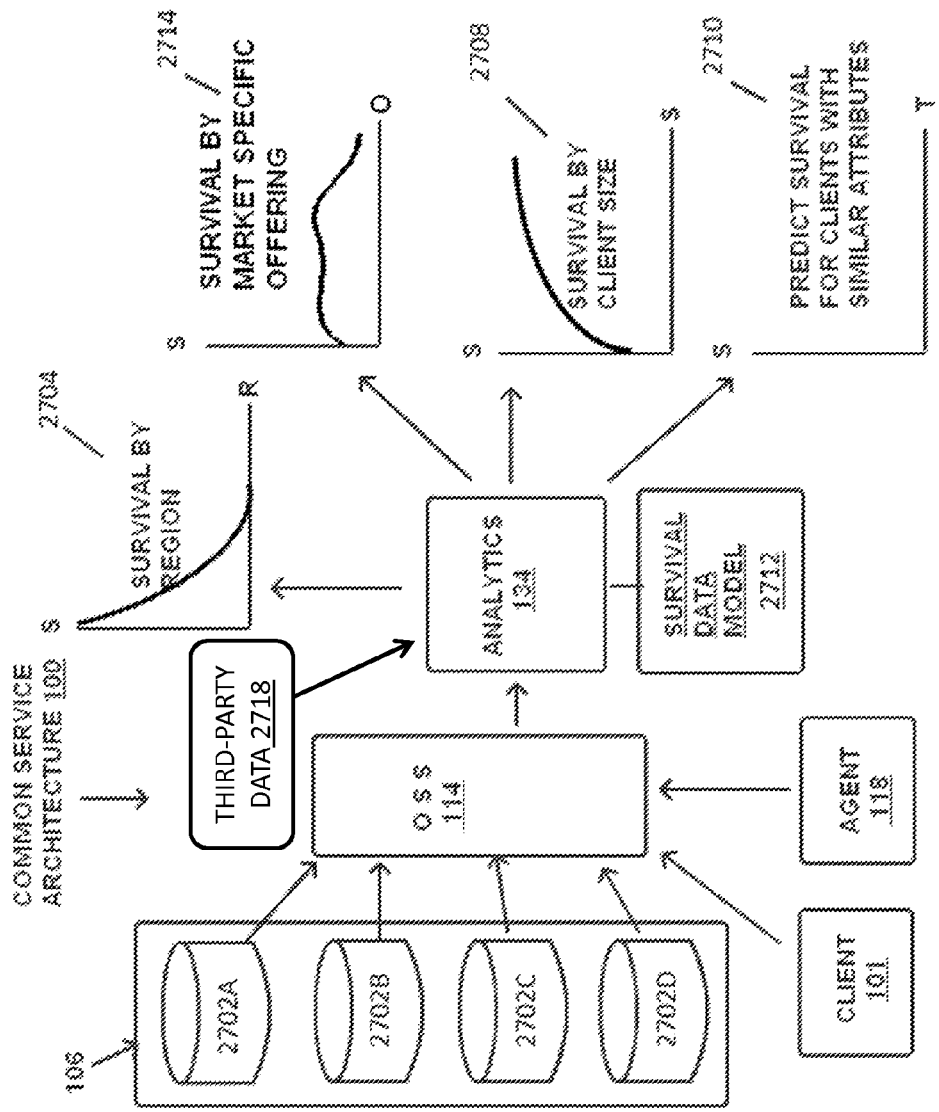
FIG. 27 depicts a schematic block diagram of a common service architecture that supports a website hosting service for providing a client survival analysis.

FIG. 27 illustrates a schematic block diagram of a common service architecture 100 that may support a website hosting service which uses an analytics module 134 to provide a client survival analysis. Survival analysis for a subscription business may be based on an application of statistical models. Survival is generally represented as a mathematical curve starting at 100%, or some specific value, and declining over time, such as a number of subscription days, months, or years on the new web hosting platform. The large populate of clients that use a web hosting platform, such as the web hosting platform 100 described herein, may facilitate building survival analysis applications based on how long clients remain subscribed to the platform, such as to examine how long clients survive and to seek causes for why clients do or do not survive. As the cost of acquiring new clients can be very high, survival of clients has a very high impact on the economic performance of a web hosting business. Longer surviving clients mean longer-term billing, without incurrence of new client acquisition costs. After a completed survival analysis, an agent 118 may view stacked indexes of survival characteristics based on survival rates for a variety of client parameters, such as client origin, client demographics, client type, client location, subscription type, price, service offering, quality of service, presence or absence of specific problems, extent of communication with clients, client size, client referral, and many other factors that can be observed about a collection of clients, subscriptions, offerings, the like.

FIG. 27 includes portions of the common service architecture 100 to exemplify how data from a variety of sources can be analyzed to produce various survival analyses that may be based on one or more types of survival models. At the center of the embodiment of FIG. 27 is the analytics module 134 that is further described elsewhere herein. The analytics module 134 may receive input from the operational support system (OSS) 114 and third-party data 2718 of the common service architecture 100. The data made available to the analytics module 134 may be based on data that is available to the OSS 114, such as data from the common data store 106, data related to or provided by clients 101, and platform and/or client related data that is processed, updated, or otherwise accessible to agents 118. The analytics module 134 may apply one or more survival data models as described herein and represented by way of example in FIG. 27 as survival data model 2712 to data received from the OSS 114 and elsewhere to produce survival analyses depicted variously as 2704, 2708, 2710, and 2714. Further details of the methods of survival analysis as depicted in FIG. 27 are now presented.

Data retained in the common data store 106 may contain client information related to a website hosting account or agreement, information about subscribers, information about types of hosted accounts, information about types of subscriptions, information about pricing, information about past client behavior, information about competitors, and the like. The OSS 114 may retrieve data from the common data store 106 or third party source that can be used to perform a survival analysis. Relevant data may be data related to a particular client, a particular type of client, a particular geographic location, and many other factors as noted herein or as would be understood by one of ordinary skill in the art. The analytics module 134 may analyze the data retrieved by the OSS 114 to populate a client survival data model, produce client survival graphical representations, perform predictive analysis of future survival, store survival analysis results in the common data store, and the like.

In the example of FIG. 27, the client data stored in the common data store 106 that may be retrieved by the OSS 114 is represented by 2702A, 2702B, 2702C, and 2702D, representing data for various clients, previous survival analysis results, control information related to the survival data model, and the like. As an example, and not a limitation, the data elements depicted within the common data store 106 maybe for a single client and may include client data 2702A that may contain identifying information provided by the client during registration such as name, address, telephone number, and the like. Similarly, client data 2702B may contain demographics information such as client size, type of business, public or private status, and the like. Further, client data 2702C may contain geographic information such as client's locations, origin, and the like. Finally, in the example of FIG. 27, client data 2702D may contain website hosting information such as the types of services subscribed to, the length of contract, contract modifications, and the like. Alternatively, 2702A may represent data for a first client, 2702B may represent data for a second client, 2702C may represent business operations related data, 2702D may represent summarized data for former web hosting client, and the like. Any combination of data that may be stored in the common data store 106 can be processed by the analytics module 134 to benefit survival analysis. Likewise, although four different data types are depicted in the embodiment of FIG. 27, a smaller number or a larger number of different data types may be used in the survival analysis operations.

In the example of FIG. 27, the analytics module 134 may be used to analyze client data retrieved by the OSS 114 from the common data store 106. The analytics module 134 may cause the OSS 114 to retrieve client data that is relevant to a particular analysis such as a survival analysis, a client retention analysis, product mapping analysis, and the like. The analytics module 134 may process the client data, and may populate a survival data model 2712. The survival data model 2712 may then be used to perform statistical analysis on the client data. Alternatively, the survival data model 2712 may be derived from survival analysis theory and applications in medical-related survival analysis, actuarial analysis, population survival analysis, and the like. Various survival analysis techniques are described herein and elsewhere that may be appropriately used to generate web hosting client survival analysis.

The analytics module 134 may use a survival data model 2712 populated with client data retrieved by the OSS 114 from the common data store 106 to generate statistical survival information. The statistical survival information may be graphically represented as survival over time. Further in the example of FIG. 27 the statistical survival information is represented by 2704, 2708, 2710, and 2714. In the example, survival region graph 2704 is a graphical representation of client survival based on client region. The analytics module 134 may analyze usage and survival patterns for one or more clients in a given region to create a statistical model of survival for a region or a model for comparing survival rates among different regions. The analysis may be targeted at a particular aspect or feature of the web hosting service and may allow the web hosting provider to better tailor web hosting service offerings to differing geographic locations, with a goal of maximizing the economic benefit of hosting the client by optimizing net profit expected to be received from a population of clients over a predicted period of survival time. Survival size graph 2708 is a graphical representation of client survival based on client size. The analytics module 134 may analyze usage and survival patterns for one or more clients of a given size to create a statistical model of survival related to the size of a client. The analysis may be targeted at a particular aspect or feature of the web hosting service and may allow the web hosting provider to better tailor web hosting service offerings to clients of differing size. The predicted survival graph 2710 is a graphical representation of a predicted client survival based on factors of similarity to a prior client. The analytics module 134 may be able to predict the survival rate for a client that is similar to one or more prior clients. By analyzing the data for the prior client(s) and/or for a new or current client, the analytics module 134 may be able to correlate causes that may be applicable to a prediction of survival for the new or existing client, thereby suggesting changes that may result in longer, or more profitable, survival periods for particular clients or groups of clients.

Survival analysis may also be performed based on multiple overlays including web hosting system data (e.g. client data) and third-party data. In an example, an overlay that includes a mix of subscription terms (e.g. 1 year plan versus 3 year plan) and external data (e.g. macroeconomic data) may facilitate survival outcome analysis. Factors such as employment conditions, interest rate, stock market, and the like that impact portions of the population in general may impact web hosting clients. This data fusion of web hosting and third party data may enable predictable and reliable analysis that allows a web hosting service provider to offer services that are balanced with the external macroeconomic environment.

FIG. 28 illustrates a schematic block diagram of a common service architecture 100 that may support a website hosting service which uses an analytics module 134 to provide a mapping analysis of one or more products, website hosting offerings, service packages, market-specific offerings, and the like. By relationally mapping both dependent and independent products/services/offerings the product mapping analysis may create a product map that may be depicted as a visual representation or matrix of product/service/offering similarity. The product map of similarity may then be used to create a product bundling, a marketing strategy, an advertising concept, a website hosting offering, a service package, a market-specific offering, and the like. The product map of similarity may be presented on a three-dimensional (3D) product/service/offering similarity map or as a 2D matrix of values of similarity. The 3D similarity map may provide a visual element for each product/service/offering covered by the mapping analysis. The 3D similarity map may also provide a visual element depicting the similarity among products/services/offerings. As an example, and not a limitation, two products may be connected by an arrow or a line; space of predetermined distance between products may indicate a degree of similarity; relative size of product/service/offering elements may indicate the degree of similarity, and the like.

FIG. 28 includes portions of the common service architecture 100 to exemplify how data from a variety of clients may be analyzed to produce various product mappings that may be based on one or more types of usage data models. At the center of the embodiment of FIG. 28 is the analytics module 134 that is further described elsewhere herein. The analytics module 134 may receive input from the operational support system (OSS) 114 of the common service architecture 100, a third-party data source 2718, or other sources of data associated with the common service architecture 100. The data that is made available to the analytics module 134 may be based on data available from the third-party data source 2718 and/or data accessible by the OSS 114 such as data from the common data store 106, data related to or provided by clients 101, and platform and/or client related data that is processed, updated, or otherwise accessible to agents 118, and other platform related information including without limitation, existing website products/services/offerings, sales data related thereto; new products/services/offerings not yet offered to clients of the common service architecture 100, products/services/offerings currently offered by a third-party website hosting service (e.g. an acquisition target third-party service), features, benefits, costs, subscription bundling rules, other business rules, sales forecasts, target client information, and the like. The analytics module 134 may apply one or more usage data models as described herein and exemplarily represented in FIG. 28 as usage data model 2802 to data received from the OSS 114 and elsewhere to produce a product/service/offering map consisting of products/services/offerings depicted variously as 2804, 2808, 2810, 2812, and 28214. Further details of the methods of product mapping analysis as depicted in FIG. 28 are now presented.

Data retained in the common data store 106 may contain client information related to a website hosting account or agreement, information about competitors, and the like. The OSS 114 may retrieve data from the common data store 106, or any of the other data sources described herein to be used to perform a mapping analysis of one or more products, website hosting offerings, service packages, market-specific offerings, and the like. Relevant data may be data related to a particular client, a particular type of client, a particular geographic location, a product/service/offering, and the like. The analytics module 134 may analyze the data retrieved by the OSS 114 to populate a usage data model, produce similarity mapping graphical representations, perform predictive analysis of possible product groupings, store product mapping results in the common data store 106, and the like. The similarity mapping 3D representation may support predictive analysis by allowing a user to manipulate the presented elements, causing the analysis to predict required changes in parameters that contribute to the similarity mapping. In an example, by allowing a user to move element 2808 half the distance toward element 2804, a geographic sales parameter may be increased by fifty percent, indicating that if sales in a geographic region were to increase by fifty percent the similarity between the 2808 and 2804 elements would be cut in half. The similarity mapping 3D representation may also allow a user to select a dimension of similarity using drop down selector 2818. By selecting a parameter, such as a primary product/service/offering, new product sales revenue, customer size, and the like, the 3D similarity map may adjust to reflect the selected dimension of similarity. Dimensions of similarity may include any of the data types, sources, desired business outcomes, business actions, and the like that may be appropriate for successfully operating a website hosting platform.

In the example of FIG. 28, the client data stored in the common data store 106 that may be retrieved by the OSS 114 is represented by 2702A, 2702B, 2702C, and 2702D, representing data for various clients, previous similarity mapping analysis results, and the like. As an example, and not a limitation, the data elements depicted within the common data store 106 that are retrieved by the OSS 114 for presenting to the analytics facility 134 may include usage information for a plurality of clients who have purchased a particular product offered by the web hosting service 100. Further in the example, data 2702A may contain a list of products used by a client. 2702B may contain a list of products used by another client, with 2702C and 2702D containing usage data for two additional clients. Alternatively, the data elements depicted within common data store 106 may be for a plurality of products that are thought to be related. Further in the example, data 2702A may contain a list of all clients to have purchased a particular product. 2702B may contain a list of all clients that have purchased a different product, with 2702C and 2702D containing lists of clients who have purchased other products. Similarity among clients purchasing various offerings may suggest what offerings to push to clients who, based on such similarity, might favor a particular offering. Any combination of data that may be stored in the common data store 106 can be processed by the analytics module 134 to benefit survival analysis. Likewise, although four different data types are depicted in the embodiment of FIG. 28, a smaller number or a larger number of different data types may be used in the product mapping/analysis operations.

In the example of FIG. 28, the analytics module 134 may be used to analyze data retrieved by the OSS 114 from the common data store 106 for product/service/offering similarity mapping. The analytics module 134 may cause the OSS 114 to retrieve data that is relevant to a similarity mapping analysis as described herein. The analytics module 134 may then populate a 3D product/service/offering map with the results of its analysis.

The 3D product/service/offering map may facilitate graphically representing various degrees of similarity among different products/services/offerings. The analytics module 134 may use a visual element to represent a product/service/ offering being mapped. In FIG. 28, elements 2804, 2808, 2810, 2812, and 2814 may represent various products/services/offerings in a 3D similarity map. The analytics module 134 may use a connecting element such as an arrow, a line, a distance, or any other visual distinction of elements in the similarity map to represent one or more dimensions of similarity. When the similarity is represented by a connecting element, the size, shape, width, length, appearance, or other visual distinction may indicate a degree of similarity. As an example, a shorter connecting element may represent a closer relationship between two products than a longer connecting element. When the similarity is represented by a distance between elements, the distance in at least two or more dimensions may indicate a degree of similarity. To facilitate visually depicting a plurality of dimensions of similarity, a combination of similarity depicting elements may be used. In the example of FIG. 28, at least three dimensions may be presented by similarity elements including: size of the product/ service/offering element, distance of product/service/offering elements, and a similarity connecting arrow. As depicted in FIG. 28, the analytics module 134 may adjust the size of the product/service/offering elements to graphically represent one or more dimensions of similarity among different products. As an example, product elements that are visually similar in size may represent a closer degree of similarity than product elements that are dissimilar in size.

Figure 28A:
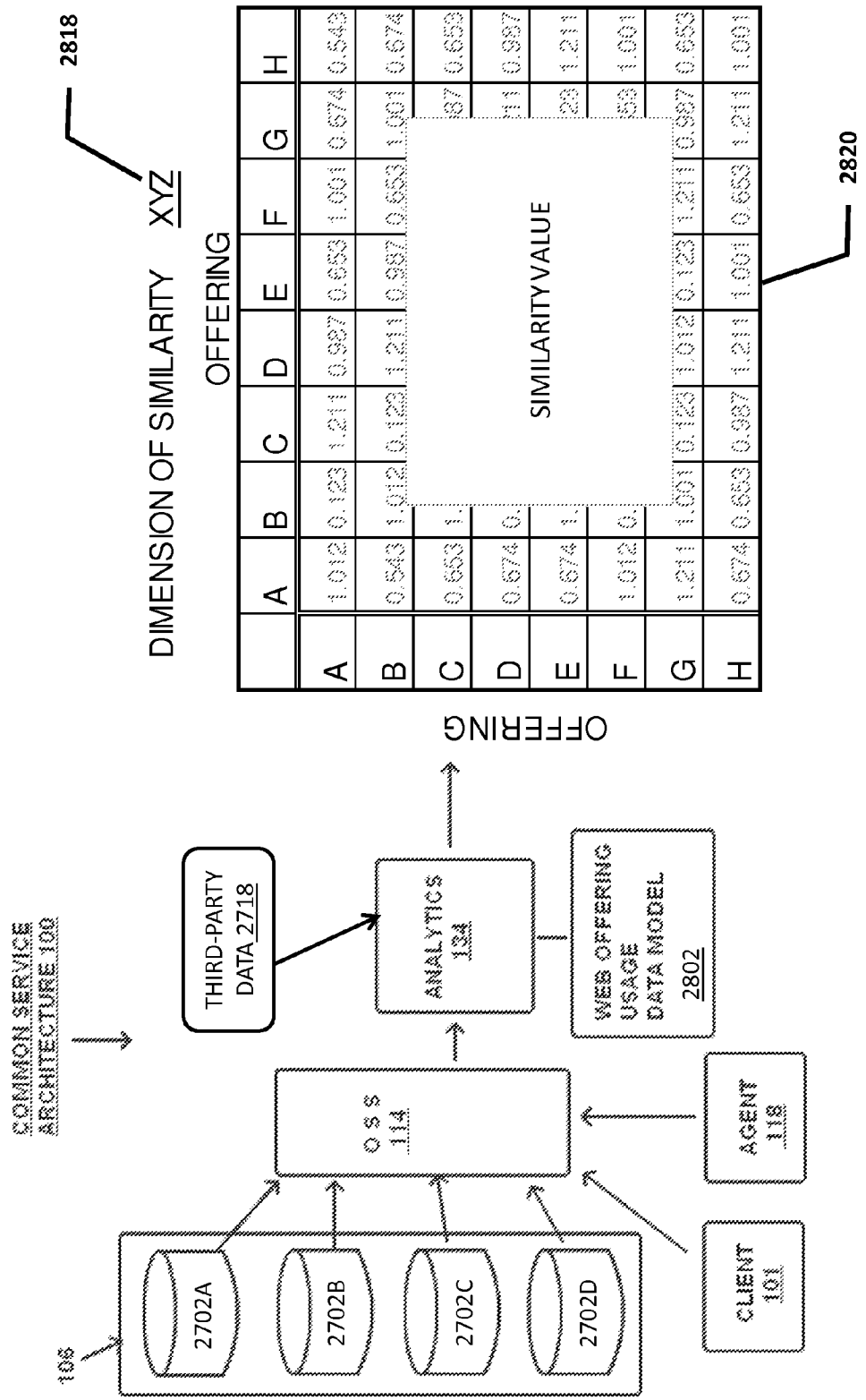
FIG. 28A depicts a block diagram of the embodiment of FIG. 28 wherein the 3D visualization is replaced by a 2D map.

The analytics module 134 may alternatively generate a product similarity matrix that produces values in a table of products for comparison. In the example of FIG. 28A, the aforementioned analytics module 134 and usage model 2802, and the like are used to generate a two or three dimensional matrix 2820 that includes a list of products across the axes of the matrix and a dimension of similarity selector that facilitates looking at product/service/offering similarity for a variety of dimensions. In a three-dimensional embodiment, a data cube may be envisioned to include multi-product similarity values or may include similarity values for any two products for a variety of similarity dimensions.

Figure 29:
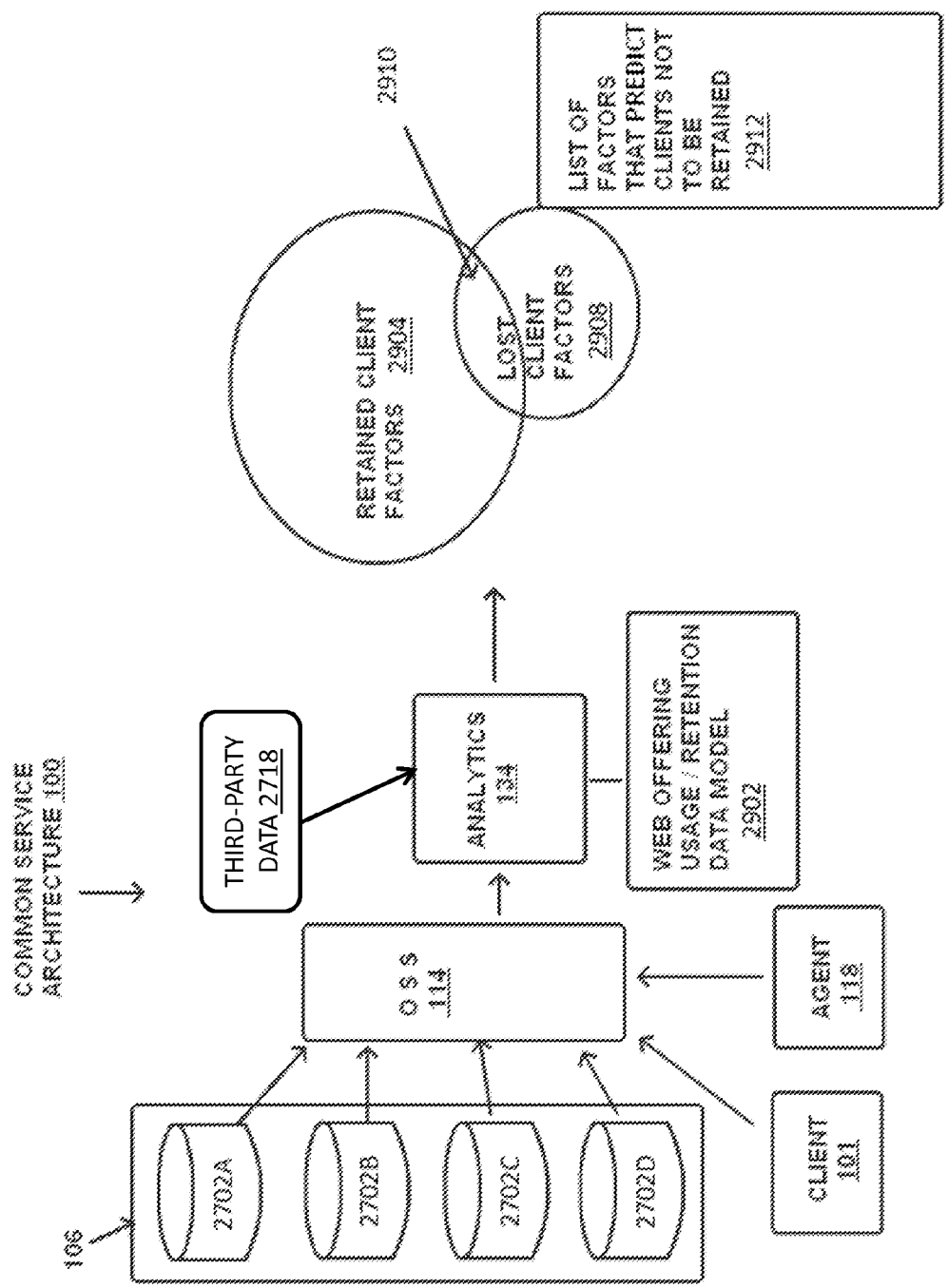
FIG. 29 depicts a schematic block diagram of a common service architecture that supports a website hosting service for providing a client retention analysis.

FIG. 29 illustrates a schematic block diagram of a common service architecture 100 that may support a website hosting service which uses an analytics module 134 to provide a client retention analysis. By analyzing factors that cause a client to be retained as well as factors that cause a client to be lost and the intersection between these factors, the analytics module 134 may create a client factor list which may be used in developing and/or executing a strategy for client retention. The factor list may contain factors relevant to client retention. The retention analysis may facilitate determining a predicted effectiveness of a particular client retention strategy that is being executed by identifying changes in the list of factors, the degree to which a factor contributes to client retention, and the like. The list of factors may include factors that may cause client not to be retained. This list may include weights or priorities for at least some of the factors that may be based on certain client retention goals, business revenue goals, and the like.

FIG. 29 includes portions of the common service architecture 100 to exemplify how data from a variety of clients may be analyzed to produce various client retention analyses that may be based on one or more types of usage/retention data models. At the center of the embodiment of FIG. 29 is the analytics module 134 that is further described elsewhere herein. The analytics module 134 may receive input from the operational support system (OSS) 114 and third-party data 2718 of the common service architecture 100. The data that is made available to the analytics module 134 may be based on data available to the third-party data 2718 and the OSS 114 such as data from the common data store 106, data related to or provided by clients 101, and platform and/or client related data that is processed, updated, or otherwise accessible to agents 118, and other website hosting service related information. The analytics module 134 may apply one or more usage data models as described herein and represented in FIG. 29 as usage/retention data model 2902 to data received from the OSS 114 and elsewhere to produce a client retention results which may include one or more pools of client factors depicted as 2904, 2908, 2910, and 2912. Further details of the methods of retention analysis as depicted in FIG. 29 are now presented.

Data retained in the common data store 106 that may be used in client retention or hazard analysis may contain client information related to a website hosting, information about competitors, third-party data, and the like. The OSS 114 may retrieve data from the common data store 106 that can be used to perform a hazard/retention analysis. Relevant data may be data related to a particular client, a particular type of client, a particular geographic location, and the like. The analytics module 134 may analyze the data retrieved by the OSS 114 to populate a usage/retention data model, produce a client retention representation, perform predictive analysis of possible retention strategies, and the like. Any combination of data that may be stored in the common data store 106 can be processed by the analytics module 134 to benefit client retention analysis. Likewise, although four different data types are depicted in the embodiment of FIG. 29, a smaller number or a larger number of different data types may be used in the product mapping/analysis operations.

Client survival analysis as described herein and in particular with respect to FIG. 27 may be combined with the present hazard/retention analysis to improve analysis results. In an example, client survival analysis may produce a list of clients who have not survived and may identify various factors related thereto. This information may be further analyzed by a hazard/retention analysis to identify potential hazards to client retention that may be applied to a business process for improving client retentions, reducing client retention hazards, and impacting overall client survival. Changes made as a result of a hazard/retention analysis may be found by comparing survival analysis before the changes to survival analysis performed after the changes.

In the example of FIG. 29, the client data stored in the common data store 106 that may be retrieved by the OSS 114 is represented by 2702A, 2702B, 2702C, and 2702D, representing data for various clients, previous retention analysis results, and the like. As an example, and not a limitation, the data elements depicted within the common data store 106 may be for a plurality of clients from a certain geographic region, who have terminated a particular product offering at similar times, who have retained a particular product offering for a specified period of time, and the like. Further in the example, data 2702A may contain factors associated with a client. 2702B may contain factors associated with another client, with 2702C and 2702D containing factors for two additional clients. Representative data elements 2702A through 2702D may alternatively represent data sets of prior hazard/retention analysis output, client retention hazard factors from third-party data sources, and the like.

In the example of FIG. 29, the analytics module 134 may be used to analyze data retrieved by the OSS 114 from the common data store 106 for use with the hazard/retention data model 2902. The analytics module 134 may cause the OSS 114 to retrieve client data that is relevant to a retention analysis. The analytics module 134 may then populate a client retention model 2902, perform retention and/or hazard analysis, produce a graphical presentation of the results of its analysis, store the results in the common data store, forward the results to a third party or another facility of the common service architecture 100 (e.g. business operations 140), and the like. The retention graphical results may, for example visually represent the retention factors associated with client retention. The analytics module 134 may use a visual factors element to represent factors associated with a retained client or a lost client. In FIG. 29, 2904, 2908, 2910, and 2912 represent such retention factor elements.

A retained client may have a common retention factor with a lost client. As an example, in FIG. 29 one or more retention factors depicted in the retained client factor output 2904 may represent factors associated with a retained client. Similarly, one or more retention-related factors in the lost client factor output 2908 may represent factors associated with a lost client. The intersection of such factors (those factors that a retained client and a lost client have in common) may be represented by 2910. Retention factor output 2912 may represent factors that influence or reflect client retention hazards. Retention factor output 2912 may include those factors from lost clients that are not also present in retained clients (e.g. output 2908 exclusive of output 2910), factors that are common to retained and lost clients (output 2910), all factors related to lost clients (output 2908), and the like.

Client hazard/retention analysis may address all client-retention related criteria, or it may be focused on factor elements based on a subset of all possible factors, such as for a group of clients fitting predetermined criteria. In this way, hazard/retention analysis may provide information that may be used to facilitate attempting to retain a particular type of client (e.g. a small business client, a non-profit client, a client who has been a subscriber for more than a minimum number of years, a client who has contacted customer service more than a minimum number of times or more frequently than a minimum rate or the like).

Figure 30:
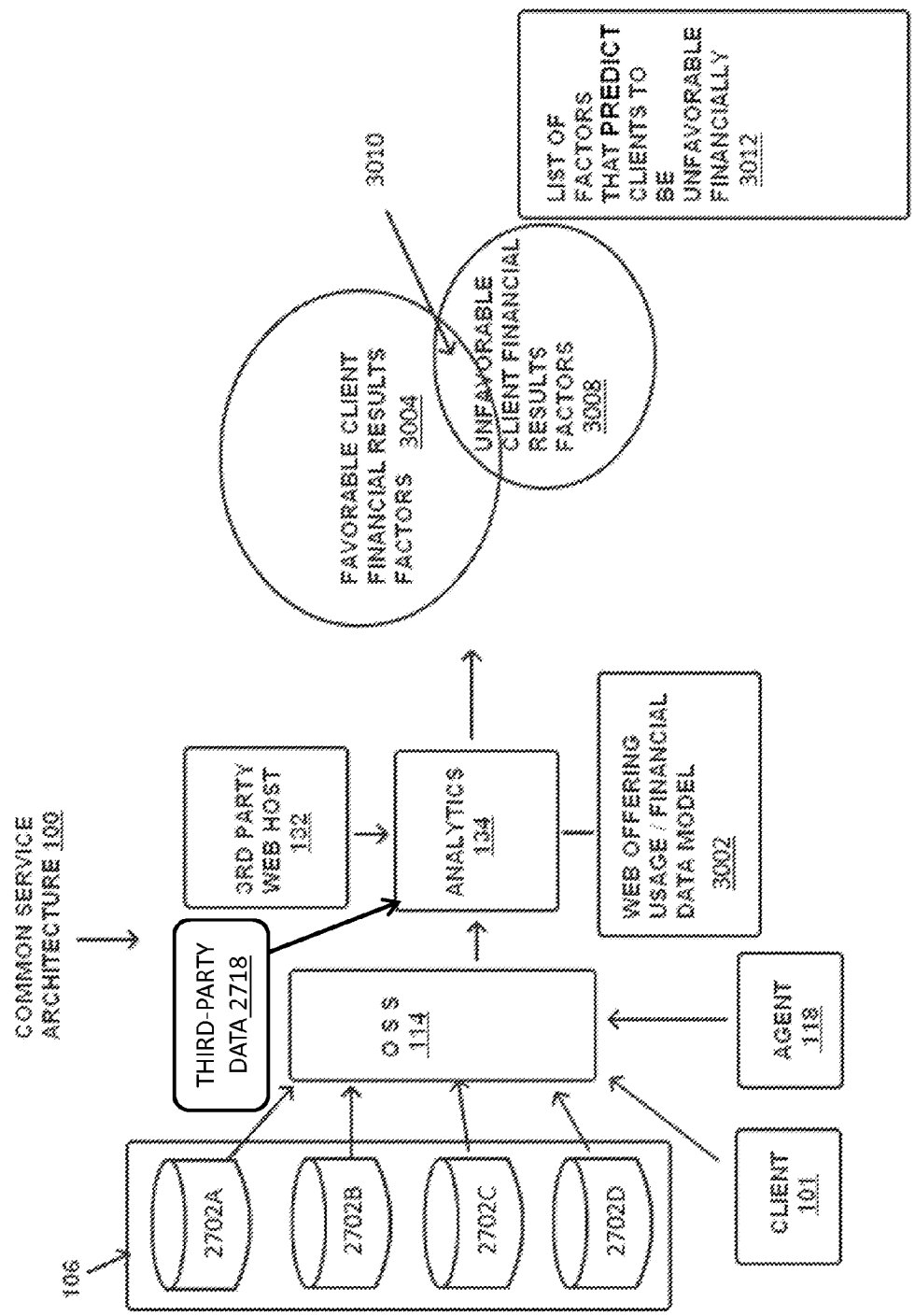
FIG. 30 depicts a schematic block diagram of a common service architecture that supports a website hosting service for providing a client financial impact analysis.

FIG. 30 illustrates a schematic block diagram of a common service architecture 100 that may support a website hosting service which uses an analytics module 134 to provide a client financial impact analysis. By analyzing factors that cause a client to perform well financially as well as factors that cause a client to perform poorly financially and the intersection between the two sets of factors, the analytics module 134 may create a client factor list which may be used in developing and/or executing a strategy for improving client financial results for the service. The factor list may contain factors relevant to client financial performance. The client financial impact analysis may facilitate determining predicted effectiveness of a particular client financial performance strategy that is being executed by identifying changes in the list of factors, the degree to which a factor contributes to client financial impact, and the like. The list of factors may include factors that may cause client not to produce favorable financial results. This list may include weights or priorities for at least some of the factors that may be based on certain client financial performance goals, business revenue goals, and the like.

FIG. 30 includes portions of the common service architecture 100 to exemplify how data from a variety of clients may be analyzed to produce various client financial analyses that may be based on one or more types of usage/financial data models. At the center of the embodiment of FIG. 30 is the analytics module 134 that is further described elsewhere herein. The analytics module 134 may receive input from the operational support system (OSS) 114 and third-party data 2718 of the common service architecture 100. The data that is made available to the analytics module 134 may be based on data available to the third-party data 2718 and the OSS 114 such as data from the common data store 106, data related to or provided by clients 101, and platform and/or client related data that is processed, updated, or otherwise accessible to agents 118, and other website hosting service related information. The analytics module 134 may apply one or more usage data models as described herein and represented in FIG. 30 as usage/financial data model 3002 to data received from the OSS 114 and elsewhere to produce a client financial impact results that may include a graphical presentation which contains lists of factors related to client financial impact depicted as 3004, 3008, 3010, and 3012. Further details of the methods of retention analysis as depicted in FIG. 30 are now presented.

The method of client financial results assessment may include receiving website hosting client usage data for a plurality of website hosting services. Data retained in the common data store 106 may contain client data and information related to a website hosting, information about competitors, and the like. The OSS 114 may retrieve data from the common data store 106 that can be used to perform a financial impact analysis. Relevant data may be data related to a particular client, a particular type of client, a particular geographic location, and the like. The analytics module 134 may analyze the data retrieved by the OSS 114 to populate a usage/financial data model, produce a client financial impact representation, perform predictive analysis of possible maximizing financial benefits strategies, and the like. Any combination of data that may be stored in the common data store 106 can be processed by the analytics module 134 to benefit client financial performance and/or financial impact analysis. Likewise, although four different data types are depicted in the embodiment of FIG. 30, a smaller number or a larger number of different data types may be used in the product mapping/analysis operations.

Client survival and retention analyses as described herein and in particular with respect to FIGS. 27 and 29, may be combined with the present client financial impact analysis to improve analysis results. In an example, client survival analysis may produce a list of clients who have not survived and may identify various factors, including financial factors, related thereto. Client hazard/retention analysis may produce results that relate to financial factors that present hazards to retaining clients. These survival analysis and/or retention analysis results may be further included in a client financial impact analysis to identify potential financial reasons for client survival results and/or financial hazards to client retention that may be applied to a business process for improving client financial performance, reducing client financial performance degradation, and impacting overall client survival. Changes made as a result of a financial impact analysis may be found by comparing survival analysis before the changes to survival analysis performed after the changes. Likewise, retention hazard analysis performed after changes made to improve financial impact may reflect the impact of those changes on financial factors impacting client retention.

In the example of FIG. 30, the client data stored in the common data store 106 that may be retrieved by the OSS 114 is represented by 2702A, 2702B, 2702C, and 2702D, representing data for various clients, previous financial impact analysis results, and the like. As an example, and not a limitation, the data elements depicted within the common data store 106 may be for a plurality of clients from a certain geographic region, who have achieved favorable financial results from using the web hosting service, who have not achieved favorable financial results from using the web hosting service, and the like. Further in the example, data 2702A may contain factors associated with a client. 2702B may contain factors associated with another client, with 2702C and 2702D containing factors for two additional clients. Representative data elements 2702A through 2702D may alternatively represent data sets of prior client financial impact analysis output, client financial impact factors from third-party data sources, and the like.

In the example of FIG. 30, the analytics module 134 may be used to analyze client data retrieved by the OSS 114 from the common data store 106 for use with the financial impact data model 3002. The analytics module 134 may cause the OSS 114 to retrieve client data that is relevant to a financial impact analysis. The analytics module 134 may then populate a client financial impact model 3002, perform financial impact analysis, produce a graphical presentation of the results of its analysis, store the results in the common data store, forward the results to a third party or another facility of the common service architecture 100 (e.g. business operations 140), and the like. The financial impact graphical results may, for example visually represent the financial impact factors associated with client financial impact. The analytics module 134 may use a visual factors element to represent factors associated with a client who produces favorable financial results or clients who do not. In FIG. 30, 3004, 3008, 3010, and 3012 represent such financial impact factor analysis results elements.

The financial impact graphical results may visually represent the factors associated with the financial impact on clients. The analytics module 134 may use a visual factors element to represent factors associated with a financially benefitted client or a client that did not derive a financial benefit from the web hosting service. In FIG. 30, 3004, 3008, 3010, and 3012 represent such factors elements.

A financially benefitted client may have a common client factor with a client that was not benefitted. As an example, in FIG. 30 the factor element 3004 may represent factors associated with a financially benefitted client. Similarly, 3008 may represent factors associated with a client that was not benefitted financially. The intersection of factors (those factors that a financially benefitted client and a client that was not financially benefitted have in common) may be represented by 3010. Financial impact factor output 3012 may represent factors that influence or reflect client financial impact. Financial impact factor output 3012 may include those factors from unfavorable financial results clients that are not also present in favorable financial impact clients (e.g. output 3008 exclusive of output 3010), factors that are common to favorable and unfavorable clients (output 3010), all factors related to unfavorable clients (output 3008), and the like.

Client financial impact analysis may address all client-financial impact related criteria, or it may be focused on factors based on a subset of all possible factors, such as for a group of clients fitting predetermined criteria. In this way, financial impact analysis may provide information that may be used to facilitate attempting to improve a financial impact of a particular type of client (e.g. a small business client, a non-profit client, a client who has been a subscriber for more than a minimum number of years, a client who has contacted customer service more than a minimum number of times or more frequently than a minimum rate or the like, a client who has recently reduced subscription services).

Figure 31:
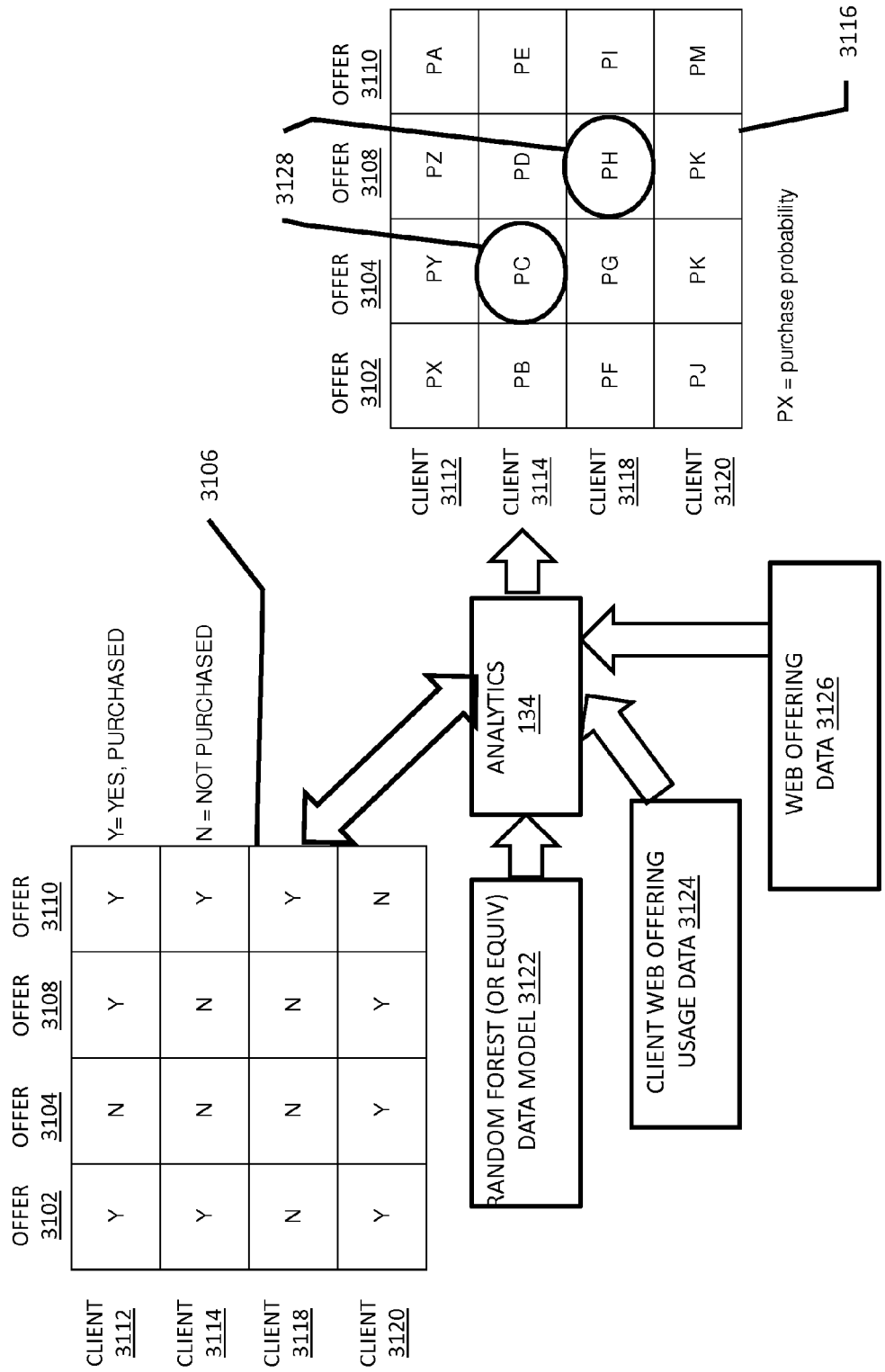
FIG. 31 depicts a schematic block diagram of a common service architecture that supports a website hosting service for facilitating product selection.

FIG. 31 illustrates a schematic block diagram of a common service architecture 100 that may support a website hosting service which uses an analytics module 134 to facilitate product selection, such as via a client purchasing profile. By analyzing a plurality of client's product purchasing activity, the analytics module 134 may create a client product probability grid. The client product probability grid may contain probabilities that a given client will purchase a given product and may be used to facilitate identifying a subset of products that a have a favorable probably of client purchase. A random forest algorithm or similar algorithm may be applied to at least determine the probabilities that a given client will purchase a given product.

FIG. 31 includes portions of the common service architecture 100 to exemplify how data from a variety of clients may be analyzed to produce various client financial analyses that may be based on one or more types of usage data models. At the center of the embodiment of FIG. 31 is the analytics module 134 that is further described elsewhere herein. The analytics module 134 may receive input from the operational support system (OSS) 114 of the common service architecture 100. The data that is made available to the analytics module 134 may be based on data available to the OSS 114 such as data from the common data store 106, data related to or provided by clients 101, and platform and/or client related data that is processed, updated, or otherwise accessible to agents 118, and other website hosting service related information.

In FIG. 31, the products offered by the web hosting service are represented by 3102, 3104, 3108, and 3110. The clients are represented by 3112, 3114, 3118, and 3120. A grid that may be formed when the clients are used as rows and products as columns may include a product purchase grid 3106. The analytics module 134 may create the product purchase grid 3106 from usage data 3124 and web offering data 3126 that may be received from the OSS 114. The analytics module 134 may also apply one or more usage data models as described herein and represented in FIG. 31 as random forest data algorithm 3122 to the product purchase grid 3106 to produce a client product purchase probability grid 3116. Alternatively, the product purchase probability grid 3116 data may be stored in a separate logical layer in the product purchase grid 3106. The client product purchase probability grid 3116 may contain probabilities that a given client will purchase a given product. Further details of the methods of retention analysis as depicted in FIG. 31 are now presented.

Data retained in the common data store 106 may contain client information related to a website hosting, information about competitors, third-party data, and the like. The OSS 114 may retrieve data from the common data store 106 that can be used to perform a client purchasing analysis. Relevant data may be data related to a particular client, a particular type of client, a particular geographic location, and the like. The analytics module 134 may analyze the data retrieved by the OSS 114 and elsewhere to populate a product purchase grid 3106, a client product probability grid 3116, and the like to facilitate performing predictive analysis of possible marketing and sales strategies using bundling of services, offering one or more services to one or more customers, improve utilization of marketing and sales resources, target offers to clients, adjust current offering practices to existing clients, and the like. Any combination of data that may be stored in the common data store 106 can be processed by the analytics module 134 to benefit product purchase probability analysis. Likewise, although four different data types are depicted in the embodiment of FIG. 30, a smaller number or a larger number of different data types may be used in the product purchase probability analysis operations In the example of FIG. 31, the analytics module 134 may be used to analyze client data, website hosting product/service/offering data, purchase probability model data, and other data relevant to purchase probability analysis that may retrieved by the OSS 114 from the common data store 106. The analytics module 134 may cause the OSS 114 to retrieve client data that is relevant to a client's purchasing history. The analytics module 134 may then populate a client product purchasing predictability grid 3116 that may be depicted in a graphical presentation of the analysis results.

In the example of FIG. 31, the analytics module 134 may process the client data, and may populate a random forest data model 3122. The random forest data model 3122 may then be used to perform statistical analysis on the client purchasing data. The random forest data model may allow the analytics module 134 to populate the client product probability grid 3116 with the probability of a client purchasing a particular product.

Once populated, the product purchase probability grid 3116 may be used, along with other criteria to identify entries in the grid 3116 that represent favorable probabilities of purchase. In the example of FIG. 31, favorable entries 3128 may include probabilities of purchase PC for client 3114 with product/offer 3104, and purchase probability PH for client 3118 with product/offer 3108. As described elsewhere herein, the product/client combinations represented by 3128 may indicate a greater likelihood that the client will purchase the product. Such information may significantly benefit a marketing and/or sales program by helping identify sales opportunities.

Figure 32:
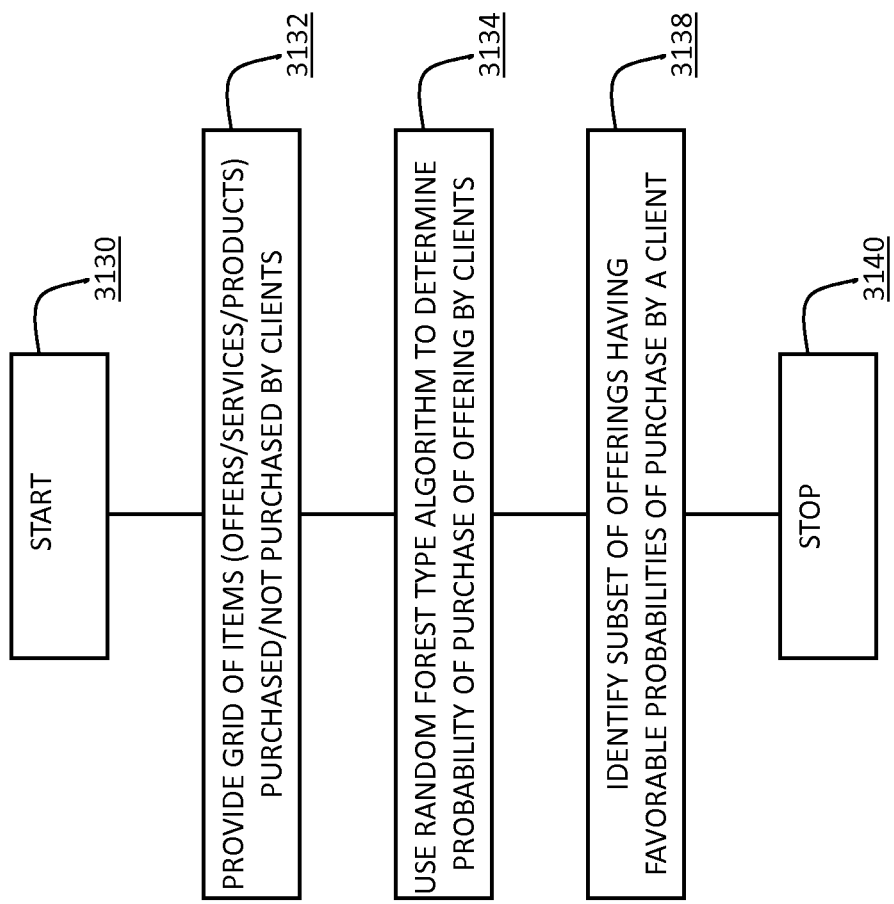
FIG. 32 depicts a flowchart illustrating an operational flow for analyzing client and product purchasing data to produce a purchase probability output.

Now referring to FIG. 32 which depicts an operational flow for analyzing client and product purchasing data to produce a purchase probability output, the operational flow, which may be executed as an algorithm in a computer program, includes a few steps for processing data that has been captured or provided. The flow starts at step 3130 and proceeds to step 3132 during which a grid of items purchased and items not purchased by customers is produced. After at least a portion of the grid of step 3132 is produced, step 3134 may commence to apply a random forest algorithm to facilitate determining probabilities of clients purchasing products. The grid created in step 3132 may be further populated with the purchase probabilities calculated in step 3134, such as by adding a purchase probability data layer to the grid. Alternatively a new grid may be created using similar dimensions (e.g. clients along one axis and products along the other). When at least a portion of the purchase probabilities are calculated in step 3134, step 3138 may commence in which a subset of client/offering combinations may be identified based on the probabilities calculated in step 3134 representing favorable probabilities of purchase of the product/offering by the client. Other factors, such as a sales goal, a product road map, a product phase-out plan, a client retention objective, a per-client revenue goal, client service upgrade goal, and any other type of criteria related to successfully operating a website hosting service may be used to determine which of the purchase probabilities represent favorable probabilities of purchase. The flow may complete when one or more favorable purchase probability entries are identified. Alternatively, the flow may complete once all of the favorable purchase probability entries are identified. The flow terminates at step 3140. Although the steps in the operational flow of FIG. 32 are shown in a logical sequence, steps can be executed in parallel so long as a minimum amount of information that is required by a subsequent step is available to that step; ex: 3134 may commence without completing step 3132 so long as some grid elements are populated.

Figure 33:
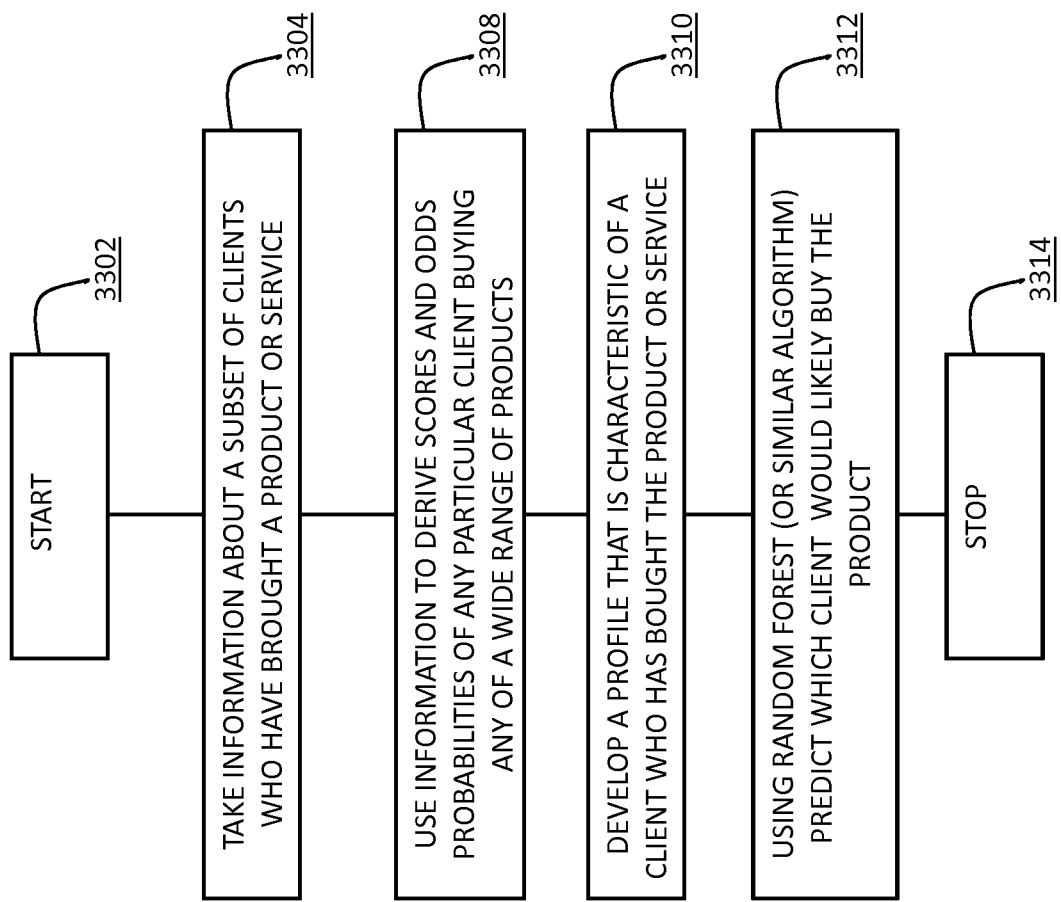
FIG. 33 depicts a flowchart illustrating an operational flow for predicting which of a plurality of clients is likely to purchase a product or service.

Further, FIG. 33 depicts a flowchart illustrating an operational flow for predicting which of a plurality of clients is likely to purchase a product or service. The operational flow may be executed as an algorithm in a computer program that includes a few steps for processing data that has been captured or provided. The flow starts at step 3302 and proceeds to step 3304 during which information about a subset of clients may be taken. The clients may have bought a product or service, such as a web domain hosting service or service package as variously described herein. After the information is taken at step 3304, during step 3308 a processor may use that information to derive scores and odds probabilities of any particular client buying any of a wide range of products/services. At step 3310, a profile may be developed from information available to the new website hosting architecture platform, the profile may be characteristic of a client who may have bought the product or service. Step 3312 may commence by applying a random forest algorithm or any other similar algorithm to the client and product data generated in and/or used to generate the elements in steps 3308 and 3310 to facilitate predicting which clients or potential would likely buy the products. The prediction may be used to determine which action(s) should be taken regarding the product(s) and client(s) that may financially or otherwise benefit the platform, such as offering the product(s) to the clients(s). The flow terminates at step 3314. Although the steps in the operational flow of FIG. 33 are shown in a logical sequence, steps can be executed in parallel so long as a minimum amount of information that is required by a subsequent step is available to that step.

Migration of web hosting services from one architecture to another, such as where at least one of the architectures is a service pool architecture that may be configured to support multiple boxes per customer, may be associated with a website hosting service that is based on a common service architecture and third party services. An automated tool for facilitating migration may include migration of third-party services. Prior to or during migration, the automated tool may determine that certain services available from a first website hosting architecture may be candidates for third-party services in a second website hosting architecture. In an example the first architecture may comprise a server architecture that serves a plurality of services dedicated exclusively to a specific website that may serve the services necessary for the specific website from one or more machines. To ensure that all services are migrated to a second web hosting architecture that may comprise a server architecture that serves a plurality of common services to a plurality of unrelated and/or unaffiliated websites from one or more machines, the tool may determine that at least one of the plurality of services may be available to clients of the second web hosting architecture through a third party [interface/API/plug-in/service] that allows the clients to experience information consistent with a market specific service offering.

By identifying services to be migrated that are available as third-party services, the tool may allow a web hosting service to migrate and incorporate services that are native to the first web hosting architecture as well as third party services that are provided through the first web hosting architecture. In addition to identifying services in the first architecture that may be provided as third-party services in the second architecture, migration may result in third-party services provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where at least one of the architectures is a service pool architecture that may be configured to support multiple boxes per customer, may be associated with a website hosting service that is based on a common services web hosting architecture that supports multiple branding and OSS consistency. An automated tool for facilitating migration may include migration of branding and operational support services. Prior to or during migration, the automated tool may determine that certain branding capabilities or operational support services available from a first website hosting architecture may be candidates for integrating with multiple branding and operational support service capabilities of a second website hosting architecture. In an example, the first architecture may comprise a server architecture that serves a plurality of services dedicated exclusively to a specific website that serves the services necessary for the specific website from one or more machines. To ensure that all services are migrated to a second web hosting architecture that may comprise a server architecture that serves a plurality of common services to a plurality of [unrelated/unaffiliated] websites from one or more machines, the tool may determine that a brand of the first web hosting architecture may be suitable for being made available to clients and prospective clients of the second web hosting architecture through the multiple branding capability. The brand of the first web hosting architecture may be configured as a market specific offering of the second web hosting architecture wherein the offering may be maintained under a consistent look and feel associated with the market specific offering when presenting account service user interfaces. Such offerings may include different brands, messages, service terms and/or different pricing structures.

Migration of web hosting services from one architecture to another, such as where at least one of the architectures is a service pool architecture that may be configured to support multiple boxes per customer, may be associated with a website hosting service that is based on a an unaffiliated web domain common hosting service architecture with one or more service representative plug ins. An automated tool for facilitating migration may include migration of web hosting market-specific information to the common hosting service architecture so that it is accessible through one or more service representative plug ins. In an example, the first architecture may comprise a server architecture that serves a plurality of services dedicated exclusively to a specific website that serves the services necessary for the specific website from one or more machines. To ensure successful migration from the first architecture to a second web hosting architecture that may comprise a server architecture that serves a plurality of common services to a plurality of [unrelated/unaffiliated] websites from one or more machines, the tool may determine that the look and feel of the first architecture may be made marketed to clients and prospective clients of the second architecture through a plurality of websites offering a different market specific offering. The second architecture may provide service representatives that support a plurality of different market specific offerings and such representatives may be provided with information facilitating providing the appropriate service for a particular market specific offering. In such a situation, service representatives of the second architecture would receive information about the market-specific nature of the first architecture to facilitate providing appropriate service to subscription clients of the first architecture in a market-specific way.

Migration of web hosting services from one architecture to another, such as where at least one of the architectures is a service pool architecture that may be configured to support multiple boxes per customer, may be associated with an unaffiliated website hosting service that is based on service pools with flexible resources. An automated tool for facilitating migration may include migration of services from a first architecture to appropriate service pools with flexible resources of a second architecture. Prior to or during migration, the automated tool may determine that certain services available from a first website hosting architecture may be candidates for integrating within one or more service pools that may be adapted to provide flexible resources in a second website hosting architecture. In an example the first architecture may comprise a server architecture that serves a plurality of services dedicated exclusively to a specific website that may serve the services necessary for the specific website from one or more machines. To ensure that all services are migrated to a second web hosting architecture that may comprise a server architecture that serves a plurality of common services to a plurality of [unrelated/unaffiliated] websites from one or more machines, the tool may determine that at least one of the plurality of services of the first architecture may be made available to clients of the second web hosting architecture through one or more of the second architecture service pools that themselves may be distributed across a plurality of servers with each server adapted to provide an overlapping service set to facilitate flexible resources from each of the service pools. In some instances, the servers may be virtualized, physical or a combination of both.

Migration of web hosting services from one architecture to another, such as where a virtual network is used during migration, may be associated with a website hosting service that is based on a common service architecture and third party services. An automated tool for facilitating migration may include migration of third party services. Prior to or during migration, the automated tool may determine that certain services available from a first website hosting architecture may be candidates for third-party services in a second website hosting architecture. In an example, a virtual network is used during migration to facilitate keeping the network active during the movement of IP addresses from one architecture to another. To ensure that all services are migrated to a second web hosting architecture, the tool may establish a virtual network between the first web hosting architecture and the second web hosting architecture that allows for direct access to third-party services when a request for the candidate third-party services is made during migration. In addition, the tool may determine that at least one of the plurality of services may be available to clients of the second web hosting architecture through a third party [interface/API/plug-in/service] that allows the clients to experience information consistent with a market specific service offering.

By identifying services to be migrated that are available as third-party services, the tool may allow a web hosting service to use a virtual network to migrate and incorporate services that are native to the first web hosting architecture as well as third party services that are provided through the first web hosting architecture. In addition to identifying services in the first architecture that may be provided as third-party services in the second architecture, migration may result in third-party services provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where a virtual network is used during migration, may be associated with a website hosting service that is based on a common service architecture that supports multiple branding and OSS consistency. An automated tool for facilitating migration may include migration of branding and operational support services. Prior to or during migration, the automated tool may determine that certain branding capabilities or operational support services available from a first website hosting architecture may be candidates for integrating with multiple branding and operational support service capabilities of a second website hosting architecture. In an example of using a virtual network during migration to facilitate keeping the network active during the movement of IP addresses from one architecture to another the automated tool may handle branding migration. To ensure that all services are migrated to a second web hosting architecture, the tool may determine that a brand of the first web hosting architecture may be suitable for being made available to clients and prospective clients of the second web hosting architecture through the multiple branding capability. The brand of the first web hosting architecture may be configured as a market specific offering of the second web hosting architecture wherein the offering may be maintained under a consistent look and feel associated with the market specific offering when presenting account service user interfaces. Such offerings may include different brands, messages, service terms and/or different pricing structures.

By identifying services to be migrated that are available as branding and operational support services, the tool may allow a web hosting service to use a virtual network to migrate and incorporate services that are native to the first web hosting architecture as well as third party services that are provided through the first web hosting architecture. In addition to identifying services in the first architecture that may be provided as branding and operational support services in the second architecture, migration may result in branding and operational support services provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where a virtual network is used during migration, may be associated with a website hosting service that is based on an unaffiliated web domain common hosting service architecture with one or more service representative plug ins. An automated tool for facilitating migration may include migration of web hosting market-specific information to the common hosting service architecture so that it is accessible through one or more service representative plug ins. In an example of using a virtual network during migration to facilitate keeping the network active during the movement of IP addresses from one architecture to another, the tool may determine that the look and feel of the first architecture may be made marketed to clients and prospective clients of the second architecture through a plurality of websites offering a different market specific offering. The second architecture may provide service representatives that support a plurality of different market specific offerings and such representatives may be provided with information facilitating providing the appropriate service for a particular market specific offering. In such a situation, service representatives of the second architecture would receive information about the market-specific nature of the first architecture to facilitate providing appropriate service to subscription clients of the first architecture in a market-specific way.

Migration of web hosting services from one architecture to another, such as where a virtual network is used during migration, may be associated with an unaffiliated web domain hosting service that is based on service pools with flexible resources. An automated tool for facilitating migration may include migration of services from a first architecture to appropriate service pools with flexible resources of a second architecture. Prior to or during migration, the automated tool may determine that certain services available from a first website hosting architecture may be candidates for integrating within one or more service pools that may be adapted to provide flexible resources in a second website hosting architecture. In an example, a virtual network is used during migration to facilitate keeping the network active during the movement of IP addresses from one architecture to another. To ensure that all services are migrated to a second web hosting architecture, the tool may determine that at least one of the plurality of services of the first architecture may be made available to clients of the second web hosting architecture through one or more of the second architecture service pools that themselves may be distributed across a plurality of servers with each server adapted to provide an overlapping service set in order to facilitate flexible resources from each of the plurality of service pools. In some instances, the servers may be virtualized, physical or a combination of both.

Migration of web hosting services from a dedicated machine first architecture to a cloud and/or grid based computing second architecture may be associated with a website hosting service that is based on a common service architecture and third party services. An automated tool for facilitating migration may include migration of third party services. Prior to or during migration, the automated tool may determine that certain services available from a first website hosting architecture may be candidates for third-party services in a second website hosting architecture. In an example, the first architecture may comprise a server architecture that serves the services necessary for a specific website or a plurality of distinct websites from a dedicated machine. Further, the dedicated machine of the first website hosting architecture may have one or more substantially duplicate machines for backup purposes. To ensure that all services are migrated to a second web hosting architecture that may comprise a server architecture that serves a plurality of common services from a plurality of machines to a plurality of [unrelated/unaffiliated] websites using a cloud and/or grid computing architecture, the tool may determine that at least one of the plurality of services may be available to clients of the second web hosting architecture through a third party [interface/API/plug-in/service] that allows the clients to experience information consistent with a market specific service offering.

By identifying services to be migrated that are available as third-party services, the tool may allow a web hosting service to migrate and incorporate services that are native to the first web hosting architecture as well as third party services that are provided through the first web hosting architecture. In addition to identifying services in the first architecture that may be provided as third-party services in the second architecture, migration may result in third-party services provided through the first architecture to be migrated to services that are natively provided by the second architecture. This may provide a more highly integrated and smoother running web hosting experience for the clients who are migrated from the first architecture to the second architecture.

Migration of web hosting services from a dedicated machine first architecture to a cloud and/or grid based computing second architecture may be associated may be associated with a website hosting service that is based on a common service architecture that supports multiple branding and OSS consistency. An automated tool for facilitating migration may include migration of branding and operational support services. Prior to or during migration, the automated tool may determine that certain branding capabilities or operational support services available from a first website hosting architecture may be candidates for integrating with multiple branding and operational support service capabilities of a second website hosting architecture. In an example, the first architecture may comprise a server architecture that serves the services necessary for a specific website or a plurality of distinct websites from a dedicated machine. Further, the dedicated machine of the first website hosting architecture may have one or more substantially duplicate machines for backup purposes. To ensure that all services are migrated to a second web hosting architecture that may comprise a server architecture that serves a plurality of common services from a plurality of machines to a plurality of [unrelated/unaffiliated] websites using a cloud and/or grid computing architecture, the tool may determine that a brand of the first web hosting architecture may be suitable for being made available to clients and prospective clients of the second web hosting architecture through the multiple branding capability. The brand of the first web hosting architecture may be configured as a market specific offering of the second web hosting architecture wherein the offering may be maintained under a consistent look and feel associated with the market specific offering when presenting account service user interfaces. Such offerings may include different brands, messages, service terms and/or different pricing structures.

Migration of web hosting services from one architecture to another, such as where at least one of the architectures is a one box per customer or multiple customers that may be configured to many boxes per many customers using a grid and/or a cloud computing architecture, may be associated with a website hosting service that is based on an unaffiliated web domain common hosting service architecture with one or more service representative plug ins. An automated tool for facilitating migration may include migration of service representative plug-ins. Prior to or during migration, the automated tool may determine that certain services available from a first website hosting architecture may be candidates for one or more service representative plug-ins in a second website hosting architecture. In an example, the first architecture may comprise a server architecture that serves the services necessary for a specific website or a plurality of distinct websites from a dedicated machine. Further, the dedicated machine of the first website hosting architecture may have one or more substantially duplicate machines for backup purposes. To ensure that all services are migrated to a second web hosting architecture that may comprise a server architecture that serves a plurality of common services from a plurality of machines to a plurality of [unrelated/unaffiliated] websites using a cloud and/or grid computing architecture, the tool may determine that at least one of the plurality of services may be available to clients of the second web hosting architecture where the web hosting service may be marketed through a plurality of websites offering a different market specific offering wherein service representatives may be provided that support a plurality of different market specific offerings and such representatives may also be provided with information facilitating providing the appropriate service for a particular market specific offering.

By identifying services to be migrated that are available as service representatives, the tool may allow a web hosting service to migrate and incorporate services that are native to the first web hosting architecture as well as third party services that are provided through the first web hosting architecture. In addition to identifying services in the first architecture that may be provided as service representatives in the second architecture, migration may result in service representatives provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where at least one of the architectures is a one box per customer or multiple customers that may be configured to many boxes per many customers using a grid and/or a cloud computing architecture, may be associated with an unaffiliated web domain hosting service that is based on service pools with flexible resources. An automated tool for facilitating migration may include migration of service pools that may be adapted to provide flexible resources. Prior to or during migration, the automated tool may determine that certain services available from a first website hosting architecture may be candidates for service pools that may be adapted to provide flexible resources in a second website hosting architecture. In an example, the first architecture may comprise a server architecture that serves the services necessary for a specific website or a plurality of distinct websites from a dedicated machine. Further, the dedicated machine of the first website hosting architecture may have one or more substantially duplicate machines for backup purposes. To ensure that all services are migrated to a second web hosting architecture that may comprise a server architecture that serves a plurality of common services from a plurality of machines to a plurality of [unrelated/unaffiliated] websites using a cloud and/or grid computing architecture, the tool may determine that at least one of a plurality of service pools may be available to clients of the second web hosting architecture where each of the plurality of service pools may be adapted to contribute services to distinct service packages and where each of the service pools may be distributed across a plurality of servers adapted to provide an overlapping service set in order to facilitate flexible resources from each of the plurality of service pools. In some instances, the servers may be virtualized, physical or a combination of both.

By identifying services to be migrated that are available as service pools with flexible resources, the tool may allow a web hosting service to migrate and incorporate services that are native to the first web hosting architecture as well as third party services that are provided through the first web hosting architecture. In addition to identifying services in the first architecture that may be provided as service pools with flexible resources in the second architecture, migration may result in service pools with flexible resources services provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where at least one of the architectures is a dedicated environment for each customer that may be configured to support a shared environment for multiple customers, may be associated with a website hosting service that is based on a common service architecture and third party services. An automated tool for facilitating migration may include migration of third party services. Prior to or during migration, the automated tool may determine that certain services available from a first website hosting architecture may be candidates for third-party services in a second website hosting architecture. In an example, the first architecture may comprise a virtualized or non-virtualized server architecture that serves a plurality of common services from a plurality of machines to a plurality of [unrelated/unaffiliated] websites and/or that serves the services necessary for a customer's websites from a dedicated machine and/or a specific virtual machine. To ensure that all services are migrated to a second web hosting architecture that may comprise a server architecture that serves a plurality of common or uncommon services to a plurality of [unrelated/unaffiliated] customers and/or websites from a plurality of shared servers and/or machines, the tool may determine that at least one of the plurality of services may be available to clients of the second web hosting architecture through a third party [interface/API/plug-in/service] that allows the clients to experience information consistent with a market specific service offering. Further, the dedicated environment or at least one environment may include dedicated memory for each customer wherein the shared environment includes shared memory across multiple servers, and the shared environment may be a cloud or grid computing environment. The shared environment or at least one environment may also include a plurality of common service pools disposed across a plurality of servers.

By identifying services to be migrated that are available as third-party services, the tool may allow a web hosting service to migrate and incorporate services that are native to the first web hosting architecture as well as third party services that are provided through the first web hosting architecture. In addition to identifying services in the first architecture that may be provided as third-party services in the second architecture, migration may result in third-party services provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where at least one of the architectures is a dedicated environment for each customer that may be configured to support a shared environment for multiple customers, may be associated with a website hosting service that is based on a common service architecture with multiple branding and OSS consistency. An automated tool for facilitating migration may include migration of branding and operational support services. Prior to or during migration, the automated tool may determine that certain services available from a first website hosting architecture may be candidates for branding and operational support services in a second website hosting architecture. In an example, the first architecture may comprise a virtualized or non-virtualized server architecture that serves a plurality of common services from a plurality of machines to a plurality of [unrelated/unaffiliated] websites and/or that serves the services necessary for a customer's websites from a dedicated machine and/or a specific virtual machine. To ensure that all services are migrated to a second web hosting architecture that may comprise a server architecture that serves a plurality of common or uncommon services to a plurality of [unrelated/unaffiliated] customers and/or websites from a plurality of shared servers and/or machines, the tool may determine that at least one of the plurality of services may be available to clients of the second web hosting architecture and therefore offer a different market specific offering wherein each offering may be maintained under a consistent look and feel associated with the market specific offering when presenting account service user interfaces. Such offerings may include different brands, messages, service terms and/or different pricing structures. Further, the dedicated environment or at least one environment may include dedicated memory for each customer wherein the shared environment includes shared memory across multiple servers, and the shared environment may be a cloud or grid computing environment. The shared environment or at least one environment may also include a plurality of common service pools disposed across a plurality of servers.

By identifying services to be migrated that are available as branding and operational support services, the tool may allow a web hosting service to migrate and incorporate services that are native to the first web hosting architecture as well as third party services that are provided through the first web hosting architecture. In addition to identifying services in the first architecture that may be provided as branding and operational support services in the second architecture, migration may result in branding and operational support services provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where at least one of the architectures is a dedicated environment for each customer that may be configured to support a shared environment for multiple customers, may be associated with a website hosting service that is based on an unaffiliated web domain common hosting service architecture with one or more service representative plug ins. An automated tool for facilitating migration may include migration of one or more service representative plug-ins. Prior to or during migration, the automated tool may determine that certain services available from a first website hosting architecture may be candidates for one or more service representative plug-ins in a second website hosting architecture. In an example, the first architecture may comprise a virtualized or non-virtualized server architecture that serves a plurality of common services from a plurality of machines to a plurality of [unrelated/unaffiliated] websites and/or that serves the services necessary for a customer's websites from a dedicated machine and/or a specific virtual machine. To ensure that all services are migrated to a second web hosting architecture that may comprise a server architecture that serves a plurality of common or uncommon services to a plurality of [unrelated/unaffiliated] customers and/or websites from a plurality of shared servers and/or machines, the tool may determine that at least one of the plurality of services may be available to clients of the second web hosting architecture where the web hosting service may be marketed through a plurality of websites offering a different market specific offering wherein service representatives may be provided that support a plurality of different market specific offerings and such representatives may also be provided with information facilitating providing the appropriate service for a particular market specific offering. Further, the dedicated environment or at least one environment may include dedicated memory for each customer wherein the shared environment includes shared memory across multiple servers, and the shared environment may be a cloud or grid computing environment. The shared environment or at least one environment may also include a plurality of common service pools disposed across a plurality of servers.

By identifying services to be migrated that are available as service representatives, the tool may allow a web hosting service to migrate and incorporate services that are native to the first web hosting architecture as well as third party services that are provided through the first web hosting architecture. In addition to identifying services in the first architecture that may be provided as service representatives in the second architecture, migration may result in service representatives provided through the first architecture to be migrated to services that are natively provided by the second architecture. This may provide a more highly integrated and smoother running web hosting experience for the clients who are migrated from the first architecture to the second architecture.

Migration of web hosting services from one architecture to another, such as where at least one of the architectures is a dedicated environment for each customer that may be configured to support a shared environment for multiple customers, may be associated with an unaffiliated web domain hosting service that is based on service pools with flexible resources. An automated tool for facilitating migration may include migration of service pools that may be adapted to provide flexible resources. Prior to or during migration, the automated tool may determine that certain services available from a first website hosting architecture may be candidates for service pools that may be adapted to provide flexible resources in a second website hosting architecture. In an example, the first architecture may comprise a virtualized or non-virtualized server architecture that serves a plurality of common services from a plurality of machines to a plurality of [unrelated/unaffiliated] websites and/or that serves the services necessary for a customer's websites from a dedicated machine and/or a specific virtual machine. To ensure that all services are migrated to a second web hosting architecture that may comprise a server architecture that serves a plurality of common or uncommon services to a plurality of [unrelated/unaffiliated] customers and/or websites from a plurality of shared servers and/or machines, the tool may determine that at least one of the plurality of service pools may be available to clients of the second web hosting architecture where each of the plurality of service pools may be adapted to contribute services to distinct service packages and where each of the service pools may be distributed across a plurality of servers adapted to provide an overlapping service set in order to facilitate flexible resources from each of the plurality of service pools. In some instances, the servers may be virtualized, physical or a combination of both. Further, the dedicated environment or at least one environment may include dedicated memory for each customer wherein the shared environment includes shared memory across multiple servers, and the shared environment may be a cloud or grid computing environment. The shared environment or at least one environment may also include a plurality of common service pools disposed across a plurality of servers.

By identifying services to be migrated that are available as service pools with flexible resources, the tool may allow a web hosting service to migrate and incorporate services that are native to the first web hosting architecture as well as third party services that are provided through the first web hosting architecture. In addition to identifying services in the first architecture that may be provided as service pools with flexible resources in the second architecture, migration may result in service pools with flexible resources provided through the first architecture to be migrated to services that are natively provided by the second architecture. This may provide a more highly integrated and smoother running web hosting experience for the clients who are migrated from the first architecture to the second architecture.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A method of website hosting, comprising:
   serving a plurality of website hosting services, at least two different website hosting services of the plurality of website hosting services are served from different service pools of servers, wherein each service pool of servers provides only one website hosting service and all servers of a service pool provide only the one website hosting service of the plurality of website hosting services;
   adapting at least one of the plurality of website hosting services to meet a website service requirement;
   combining the at least two website hosting services into at least one service package wherein at least one of the combined website hosting services has been adapted; and
   serving a plurality of different service packages to at least a plurality of unrelated websites, a first service package of the plurality of different service packages is provided to at least one website that is unaffiliated with a plurality of related websites.

2. The method of claim 1, wherein at least one of the plurality of website hosting services is adapted to meet a website service requirement of each of a plurality of unrelated websites.

3. The method of claim 1, wherein at least one of the plurality of website hosting services is adapted differently for each of a plurality of different service packages.

4. The method of claim 1, wherein the plurality of different service packages comprises a first package of services for a first website and a second package of services for a second website.

5. The method of claim 4, wherein the first website and second website are unrelated websites.

6. The method of claim 1, wherein the plurality of website hosting services is comprised of at least one common service provided by a common service architecture comprising a service pool platform comprising a plurality of the service pools, a load balance facility for allocating service requests to the plurality of service pool servers, and a code library for facilitating adapting website hosting services.

7. The method of claim 6, wherein the common service architecture comprises a cloud computing based server architecture.

8. The method of claim 6, wherein the common service architecture comprises a grid computing based server architecture.

9. The method of claim 1, wherein the first service package of the plurality of different service packages is provided to a plurality of related websites.

10. The method of claim 9, wherein the plurality of related websites share a common client website hosting subscriber.

* * * * *